United States Patent [19]

Robinson

[11] Patent Number: 5,768,591

[45] Date of Patent: Jun. 16, 1998

[54] METHOD OF DE-BUGGING HOST-PROCESSOR SOFTWARE IN A DISTRIBUTED PROCESSING SYSTEM HAVING A HOST PROCESSOR AND AT LEAST ONE OBJECT ORIENTED PROCESSOR

[75] Inventor: Jeffrey I. Robinson, New Fairfield, Conn.

[73] Assignee: IQ Systems, Sandy Hook, Conn.

[21] Appl. No.: 525,383

[22] Filed: Sep. 8, 1995

[51] Int. Cl.$^6$ .................................................. G06F 9/44
[52] U.S. Cl. .................. 395/704; 395/705; 395/200.31; 395/800.28
[58] Field of Search ........................ 395/704, 705, 395/800, 683, 200.05, 800.28, 200.31

[56] References Cited

U.S. PATENT DOCUMENTS

| | | | |
|---|---|---|---|
| 4,791,550 | 12/1988 | Stevenson et al. | 395/650 |
| 5,036,459 | 7/1991 | Den Haan et al. | 395/200.14 |
| 5,241,673 | 8/1993 | Schelvis | 395/600 |
| 5,345,550 | 9/1994 | Bloofied | 395/156 |
| 5,384,911 | 1/1995 | Bloomfield | 395/157 |
| 5,430,850 | 7/1995 | Papadopoulos et al. | 395/375 |
| 5,634,070 | 5/1997 | Robinson | 395/800 |

OTHER PUBLICATIONS

"CAN controlling from cars to X-rays" by McLaughlin, undated.

Lonworks Products Motorola Master Selection Guide Revision 7, 2nd quarter 1994 pp. 2.6-2 through 2.6-7.

"Intel i960 RP sports PCI-to-PCI bridge", by Wirbel, EE Times, Jun. 19, 1995.

*Primary Examiner*—Emanuel T. Voeltz
*Assistant Examiner*—Kakali Chaki
*Attorney, Agent, or Firm*—David P. Gordon; Thomas A. Gallagher

[57] ABSTRACT

Distributed processing systems having a host processor and at least one object oriented processor are disclosed. An object oriented processor according to the invention has a communications interface, an intelligent message handler, and a task-specific functionality. The communications interface is coupled to a host processor via a message based communications link. A high level command language is provided which is easily implemented in a host processor program. The command language includes subsets of commands which are understood by different object oriented processors having different functionality. According to one embodiment, the object oriented processor includes support for a broad array of input and output devices. The command language includes high level commands for initializing, reading from and/or writing to the peripherals supported by the object oriented processor. According to another embodiment, the object oriented processor of the invention is addressable and several object oriented processors having similar functionality can be coupled to a single host via the same comms link. According to yet another embodiment, an object oriented processor according to the invention further includes a linking table and a periodic message generator which allows one object oriented processor to communicate directly with another object oriented processor without supervision by the host processor.

13 Claims, 10 Drawing Sheets

METHOD OF DE-BUGGING HOST-PROCESSOR SOFTWARE IN A DISTRIBUTED PROCESSING SYSTEM HAVING A HOST PROCESSOR AND AT LEAST ONE OBJECT ORIENTED PROCESSOR

BACKGROUND OF THE INVENTION

1. Field of the Invention

The invention relates to distributed processing systems. More particularly, the invention relates to methods and apparatus for distributing processing tasks between a real-time host processor and at least one object oriented processor, such as an I/O processor, wherein the host processor is substantially relieved of real time interrupts.

2. State of the Art

Early ("batch mode") data processors operated with peripheral devices in a strictly sequential manner governed by a sequential software program. For example, a software program instructed the central processor to control a card reader to sequentially read input from punched cards. The input was sequentially manipulated according to the program and the processor was instructed to control a line printer to print output one line at a time in a sequential manner. At no time did two peripheral devices attempt to operate simultaneously.

Modern ("real time" or "multi-tasking") computers permit seemingly simultaneous operation of peripherals by interrupting the processor periodically to control several peripheral devices. For example, as a user types on a keyboard, the input from this peripheral to the processor is seemingly simultaneously displayed by the processor on a video display peripheral. In reality, the processor is interrupted periodically from displaying output on the video display in order to obtain input from the keyboard. It is only because the processor operates at a very high speed that there is an illusion of simultaneity. In a more complex processing system, there may be several peripherals vying for processor attention at any time. For example, in a desktop multimedia computer, several peripheral devices must be controlled by the processor in a seemingly simultaneous manner in order to produce the proper results. The peripheral devices in this system might include a CD-ROM drive, a hard disk drive, a color video display, a stereo sound card, a keyboard, and a mouse, a joystick, or a graphics tablet. Moreover, the programming environment in a system having so many demanding peripheral devices is incredibly complex. The system software must be written to schedule processor attention to each device, assign priority to each device and allow each device to interrupt the processor at appropriate times. The system software must then schedule tasks for the processor in response to the interrupts from various peripheral devices.

The complexity of task scheduling if further complicated by the fact that control of the peripherals is typically at a very low level and on an event by event basis. Each peripheral device is controlled by peeking and poking values stored in a set of registers which is typically unique to each peripheral and which registers are mapped in the memory addressed by the host. Often these memory mapped peripherals flag activity to the host via interrupts. Given the low level at which these peripheral devices require support, interrupts must be serviced by the host in a very time-critical manner. Any delay in the servicing of interrupts can easily cause the system to malfunction.

Prior art FIG. 1 shows a schematic block diagram of a plurality of peripherals 10, 12, 14, 16, 18, 20 coupled to a host processor 22 by an interrupt driven bus 24. Inputs from and outputs to the peripheral devices 10-20 are orchestrated by the host processor 22 under guidance from system software 26 on an event-by-event basis. The software must fully account for each peripheral and how communication with that peripheral is to be handled. This gives rise to complicated task scheduling problems when there are a number of peripheral devices.

Prior art FIG. 2 shows a schematic illustration of the complexity of the host software necessary to handle a plurality of peripheral devices. Separate peripheral I/O handler routines 30 must be written to communicate with each peripheral at a very low level taking into account the register addresses and their content for each individual peripheral. Access to each peripheral must be scheduled in a main task loop 32 so that timely access to each peripheral is achieved. Data to/from each peripheral must be processed at 34 in order to be used with a data processing program 36. From the foregoing, it will be understood that it is difficult to expand the number of peripherals, because each peripheral added to the bus gives rise to new scheduling problems in the host software. Moreover, as the number of interrupt driven devices increases, so does the possibility arise that a coincidence of interrupts (collision) will cause the system to malfunction. In addition, it is possible that data expected to be available by the data processing program is not available because of a scheduling error.

In addition to scheduling problems, software in a multi-tasking (multi-threaded) system is difficult to debug. Single stepping techniques cannot be used because during any single step of the software program, peripherals serviced by interrupt handlers will be non-functional; i.e., any data that the main program was expecting to read or write will be unavailable as only a single thread can be operational during single stepping. Moreover, since peripheral devices typically require that both hardware timing and software execution be synchronized, it is extremely difficult to emulate a system for the purpose of testing and debugging.

The handling of interrupts by the processor is determined in part by the bus protocol and in part by the design of the processor itself. Typically, the bus is designed to work with a particular processor or group of processors; and peripheral devices are designed to work with a particular bus. Moreover, each processor-bus system handles interrupts in a different way. This makes it difficult, if not impossible, to adapt program code used on one processor-bus system for use on another. Thus, simple I/O functions frequently need to be re-engineered for each processor-bus system. For example, a typical "front panel" interface for a computer controlled device may require the use of over sixty peripherals in the form of switches, LEDs, LCDs, rotary encoders, sound output drivers, etc. Functions which might seem superficially simple, such as driving an LED display, can be problematic. In a multiplexed LED display, e.g., the brightness of a particular column is directly proportional to the time the column is active. If this time varies significantly, as it will easily do when driven by a processor subject to a number of interrupts, the display will flicker.

In summary, coupling peripheral devices to a host processor for real-time computing/event handling is problematic for the following reasons: scheduling is difficult, communication with peripherals is tedious and inconsistent, addition of peripherals requires major program changes, debugging is difficult, and code adaptation is difficult. Nevertheless, virtually all real-time processor systems deal with peripherals using this type of memory mapping and interrupt driven bus system where the host is required to service the peripherals on an event-by-event basis. The state of the art solution to dealing with scheduling problems is to provide a faster processor which expedites the execution of the peripheral supervision code and thus reduces the latency between concurrent interrupts simplifying the scheduling task. However, due to the criticality of interrupt scheduling, the finite speed of even the fastest processors, and the limitations of the bandwidth of the bus system, scheduling problems are still the single greatest challenge in the writing of software today. Achieving the most potential from any processor depends to a large degree on programming skill in scheduling tasks in response to interrupts. However, the complexity of even marginally efficient task scheduling is daunting to most developers.

The speed and complexity of real time processor systems also depends on the number of processes being managed by the host processor. For example, if the processor is managing input from a serial communications port, output to a printer, and manipulating a complex data set, even the fastest processor will slow dramatically and the software management of these events will be extremely complex. Even if the input from the communications port is merely being transferred as output to the printer, without manipulation, the host processor must be involved in taking the data from the communications port and then sending it to the printer.

In order to relieve the host processor from performing every task, multiprocessor systems have been proposed. Some multiprocessor systems are successful in dividing tasks among processors when the tasks are well defined. For example, it is not uncommon to divide tasks between a data processor and a signal processor in systems which deal with signals and data in real time. It is more difficult to divide data processing tasks among several data processors. The operating system must decide which tasks will be performed by which processor and must schedule tasks so that processors do not remain idle while waiting for new tasks or while waiting for other processors to complete tasks so as to provide needed results. Consequently, there has been very little success in developing a general purpose multiprocessor system and there is no standard programming language for programming a multiprocessor system.

Throughout the years there have been great advances in software development tools which simplify the writing of computer programs. Perhaps the greatest single improvement in these development tools is the utilization of "object oriented" programming languages such as "Smalltalk". Object oriented programming allows the developer to raise the level of abstraction so that complex problems can be solved at a higher level. The elements that provide for this approach are modules of code each of which is referred to as an "object". These objects can be individually debugged and re-used in other programs to shorten the time it takes to develop software. A developer can assemble a number of objects, each of which performs a specific task needed to complete the larger task performed by the software package and write a program which calls upon these objects in an appropriate order. Nevertheless, when the software accesses hardware, e.g. peripheral devices, the software must be written to "micro-manage" the hardware on an event-by-event basis.

SUMMARY OF THE INVENTION

It is therefore an object of the invention to provide methods and apparatus for distributing processing tasks between a host processor and at least one object oriented processor which relieve the host of scheduling real time interrupts.

It is also an object of the invention to provide methods and apparatus for distributing processing tasks between a host processor and at least one object oriented processor which eliminates the need for memory mapped organization of peripheral devices and replaces it with the sending and receiving of message packets.

It is still another object of the invention to provide methods and apparatus distributing processing tasks between a host processor and at least one object oriented processor which simplifies debugging of host software.

It is also an object of the invention to provide methods and apparatus for distributing processing tasks between a host processor and at least one object oriented processor which enables code to be easily adapted from one host processor and/or system to another.

It is another object of the invention to provide methods and apparatus for distributing processing tasks between a host processor and a plurality of object oriented processors which allow object oriented processors to communicate directly with each other without host supervision.

It is also an object of the invention to provide methods and apparatus for distributing processing tasks between a host processor and at least one object oriented processor which enables a consistent hardware and message interface.

It is another object of the invention to provide methods and apparatus for distributing processing tasks between a host processor and at least one object oriented processor which enables software emulation of peripheral hardware devices.

It is still another object of the invention to provide methods and apparatus for distributing processing tasks among a host processor and a plurality of object oriented processors where at least one of the plurality of object oriented processors performs at least one task for each of the other object oriented processors.

It is also an object of the invention to provide methods and apparatus for distributing processing tasks between a host processor and at least one object oriented processor where communication between the host processor and the object oriented processor is message based.

It is also an object of the invention to provide a messaging system for communications between the host processor and the object oriented processor which can be mapped into any hardware bus system.

It is another object of the invention to provide methods and apparatus for distributing processing tasks among a host processor and a plurality of object oriented processors where communications between the host processor and each of the object oriented processors do not collide.

It is still another object of the invention to provide methods and apparatus for distributing processing tasks among a host processor and a plurality of object oriented processors where communications among each of the object oriented processors do not collide.

It is yet another object of the invention to provide methods and apparatus for distributing processing tasks among a host processor and a plurality of object oriented processors where communications among the host processor and the object oriented processors is in the form of a consistent message based language.

In accord with these objects which will be discussed in detail below, the methods and apparatus of the present invention include a combination of software and hardware for distributing processing tasks among a host processor and a plurality of object oriented processors. The hardware according to the invention includes object oriented processors, each having a communications interface, an intelligent message handler (an input parser and an output message former), and a task-specific layer. According to a presently preferred embodiment, the hardware of the invention is implemented as a virtual machine by programming a processor to perform the functions of the communications interface, the intelligent message handler, and the task-specific layer. One object oriented processor will typically support a plurality of related but different specific tasks. The communications interface is coupled to a host processor via a message based communications link (comms link) which may be implemented as a serial or parallel bus.

The software according to the invention provides a high level command language which is understood by the input parser of the intelligent message handler and which is easily implemented in a host processor program. The host processor program distributes processing tasks among the object oriented processors by calling on them to perform their respective specific tasks in much the same way as an object oriented program calls on software modules. According to a presently preferred embodiment of the invention, the command language includes at least three types of messages (command, data, and exceptions/acknowledgments) to enable communications between the host and each object oriented processor. The command language optionally includes linking script messages to enable communications between object oriented processors without host processor intervention. The commands are preferably task-specific such that each implemented task responds to unique commands. The input parser of the intelligent message handler recognizes messages composed from the command language, checks syntax of the messages, checks the bounds of parameters, and identifies errors. According to a preferred embodiment of the invention, the message handler also optionally identifies errors in the comms link itself through checksum operations or other error checking algorithm such as CRC. The output message former of the message handler responds to messages from the host by providing data and/or an exception/acknowledgment.

According to a presently manufactured and practical implementation of the invention, the task-specific (functional) layer is embodied as a hardware interface. According to one presently manufactured embodiment of the invention, the object oriented processor includes support for a broad array of input and output devices including rotary encoders, switches, keypads, sensors, discrete LEDs, seven segment LED displays, and smart LCD displays. Several such devices can be coupled to the object oriented processor, via ports provided by the processor, either directly or with the use of supporting devices such as decoders, multiplexers and the like. The command language for this object oriented processor includes high level commands for initializing, reading from and/or writing to the peripherals supported by the object oriented processor. Low level operation commands to and from the peripherals are handled by the object oriented processor and converted to/from high level messages which are exchanged with the host via the comms link. This object oriented processor is designed to support a number of specific peripheral devices, but is host processor independent; i.e., the object oriented processor may be used with any host processor. Since the command language which operates the object oriented processor is implemented through a message based interface with the host, any code written to implement the command language on a specific processor is highly portable. Moreover, since the command language is very high level, the programmer need not be concerned with the low level operation of individual peripherals as the low level operation is controlled by the object oriented processor of the invention.

Systems utilizing the object oriented processors according to the invention are easy to debug and to emulate. Since the specific tasks performed by the object oriented processors are debugged prior to manufacture, the programmer need only debug communication between the host processor and the object oriented processor. Since the communication between the host processor and the object oriented processor is message based and similar in nature to the messages exchanged between software objects, the system may be entirely emulated in software even when the task specific layer of the object oriented processor involves communication with hardware peripheral devices.

According to another embodiment of the invention, the object oriented processors of the invention are addressable and several object oriented processors can be coupled to a single host via the same comms link. The command language according to this embodiment of the invention is provided with an addressing syntax for command messages. Host programs may incorporate messaging to and from two or more object oriented processors via the same comms link.

According to yet another embodiment of the invention, object oriented processors according to the invention further include a linking table and a periodic message generator which allows one object oriented processor to communicate directly with another object oriented processor without supervision by the host processor. For example, a data acquisition (DAQ) peripheral can be coupled through the object oriented processors of the invention to an output device, so that data acquired by the DAQ is continually displayed on the output device without constant host processor supervision.

According to still another embodiment of the invention, object oriented processors are arranged hierarchically so that two or more object oriented processors "inherit" functionality of another object oriented processor. A practical implementation of this embodiment of the invention, for example, is a "parent" object oriented processor which has the specific task of formatting data for display via an LED or an LCD, and two "child" object oriented processors, one of which has the task of driving an LED display and the other of which has the task of driving an LCD display. Both of the "child" processors rely on the functionality of the parent processor for display formatting.

According to yet other embodiments of the invention, the task specific layer of an object oriented processor may include other processors such as floating point processors and the like and may be used to perform specific data manipulation as called upon by the host processor. In these embodiments, the object oriented processors act as callable subroutines each of which has a dedicated subroutine processor. Moreover, the invention allows several subroutines to be executed simultaneously with the timing of subroutine tasks being governed by the sending and receiving of messages to and from the object oriented processors. A programmer may therefore use the object oriented processors to distribute processing tasks without concern about the timing or computational needs of one subroutine affecting any other part of the system.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 3:
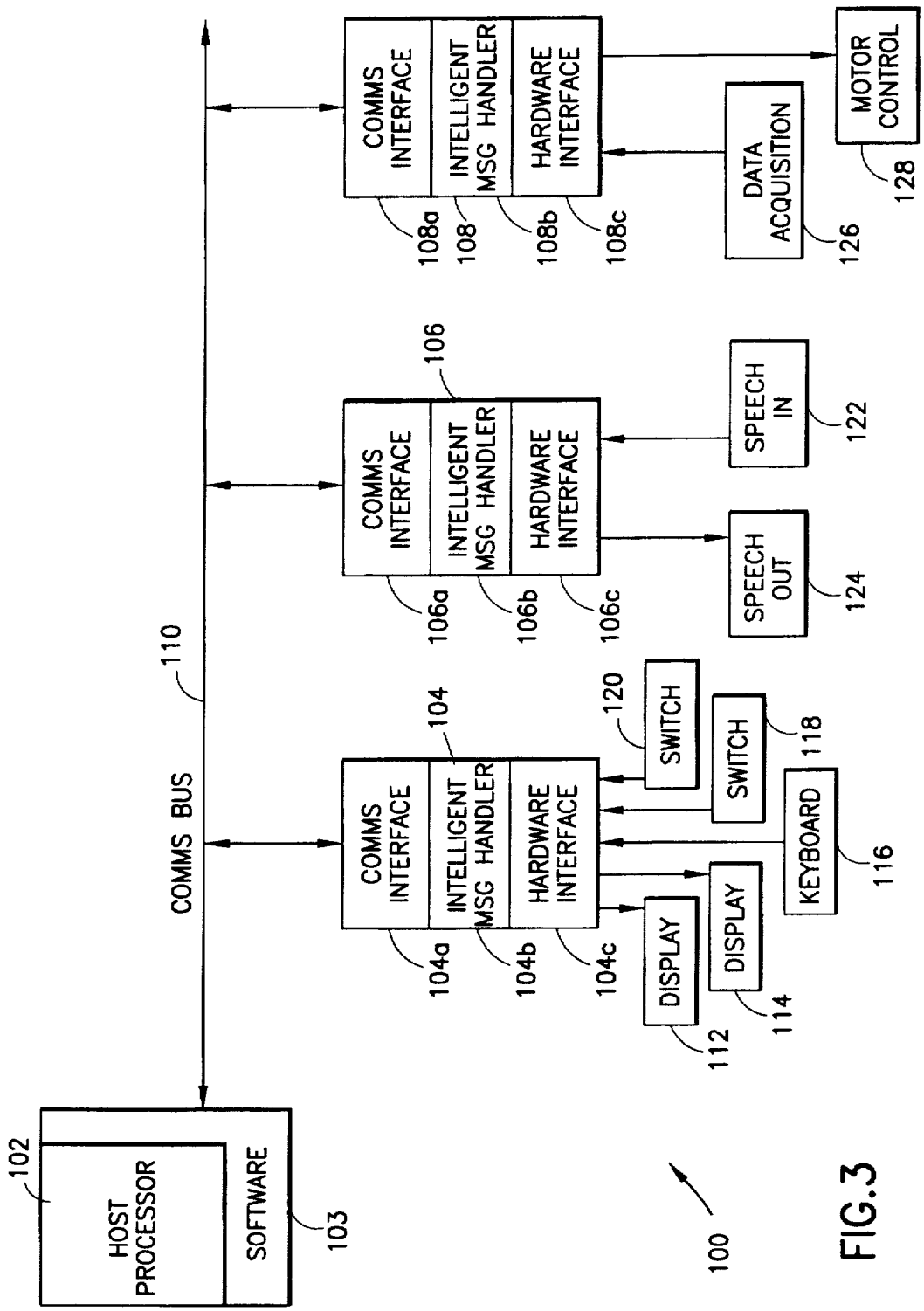
FIG. 3 is a schematic block diagram of a system according to the invention in which peripheral devices are coupled to a host processor via a communications channel and object oriented processors.

Referring now to FIG. 3, the methods and apparatus of a first embodiment of the invention are illustrated with reference to an exemplary system 100 which includes a host processor 102, and a plurality of object oriented processors 104, 106, 108 which are coupled to the processor 102 via a Comms bus 110. Each of the object oriented processors 104, 106, 108 includes a Comms interface 104a, 106a, 108a, an intelligent message handler 104b, 106b, 108b, and an task-specific layer which in the examples shown is a hardware (peripheral) interface 104c, 106c, 108c. Each object oriented processor 104, 106, 108 is bidirectionally coupled via its respective Comms interface 104a, 106a, 108a to the Comms bus 110 which is coupled to the host processor 102 in a conventional manner. According to a method of the invention, a high level command language is provided for host communication with the object oriented processors 104, 106, 108. High level messages sent by the host, as instructed by the host software 103, are interpreted by the respective intelligent message handlers 104b, 106b, 108b and used to control the respective hardware interfaces 104c, 106c, 108c in to control the peripheral devices as described in more detail below. Similarly, data from the peripheral devices are received by the respective hardware interfaces 104c, 106c, 108c, interpreted by the respective intelligent message handlers 104b, 106b, 108b and transmitted to the host as high level messages.

As shown in FIG. 3, each of the exemplary object oriented processors 104, 106, 108 is preferably designed to support different types of peripherals. The first object oriented processor 104 has the task of a universal front panel controller (a user interface controller). It is designed to support peripheral devices such as LED/LCD alphanumeric displays 112, 114, a keypad or keyboard 116 (which is actually a matrix of switches), and several rotary encoders or switches 118, 120. As such, the hardware interface 104c (which is described in more detail below) is specifically designed to accommodate these peripheral devices. Moreover, the intelligent message handler 104b (which is also described in more detail below) of this object oriented processor 104 need only respond to messages appropriate for the types of peripherals serviced by it. The second object oriented processor 106 is a speech messaging controller and is designed to support a sound digitizer 122 and a digital-to-analog converter 124. Consequently, the hardware interface 106c is specifically designed to accommodate these peripheral devices. Moreover, the intelligent message handler 106b of this object oriented processor 106 need only respond to messages appropriate for the types of peripherals serviced by it. The third object oriented processor 108 (which is described in more detail below) has the task of an analog interface and is designed to support analog data acquisition devices 126 and pulse width modulation controlled analog devices such as power supplies and motor controls 128. As such, the hardware interface 108c is specifically designed to accommodate these peripheral devices. Moreover, the intelligent message handler 108b of this object oriented processor 108 need only respond to commands appropriate for the types of peripherals serviced by it.

From the foregoing, and as set forth in detail below, so long as the system 100 does not include two object oriented processors having the same type of task (i.e. handling the same type of peripherals), when the host communicates with the peripherals via the object oriented processors, there is no need for the host to provide addresses for the object oriented processors, since each object oriented processor only responds to messages appropriate to it. However, if the system contains two or more object oriented processors having the same type of task, an addressing scheme is required.

A high level command language according to a first embodiment of the invention includes three distinct message types: {command}, [data], and (exceptions/acknowledgments), where the delimiting braces "{ }", brackets "[]", and parenthesis "( )" designate the type of message contained therebetween. The host processor is programmed to send command messages to the object oriented processors and the object oriented processors respond with data, exceptions/acknowledgments, or nothing if exceptions/acknowledgments are turned off by the host processor. All of the commands take the form {<function>params} where "<function>" is usually a one or two digit alphanumeric name which is followed by parameters. Optionally, if enabled as described in more detail below, the message format may take the form {<function>params} [checksumByte], where the checksumByte is the least significant byte of the sum of all of the characters in the message including the opening and closing delimiters, in this case the braces "{}". In either case, the intelligent message handler checks the parameters for completeness and propriety, rejects a command which does not have appropriate parameters, and returns an error message to the host. The command language also may include an addressing scheme, in which case, the message format would be {<address><function>params}.

A complete listing of the command language for an addressable user interface controller 104 is contained in Appendix A (IQC826 Specification-rev. 1.0) which also includes a listing of the status of registers after a hardware reset and a listing of error codes generated by the intelligent message handler 104b. The command language includes commands for initializing and driving LED and LCD displays, commands for addressing and reading switches and encoders, commands for creating a sound, as well as miscellaneous commands for defining signal polarity, for resetting the chip, etc. For example, a command to initialize a smart LCD display has the form {COnpq}. The parameter n refers to the display enable line (either 0 or 1). The parameter p is a hexadecimal digit which indicates the number of display lines (from 1 through 4). The parameter q is a hexadecimal digit (from 1 through 4) which indicates the width of the display lines. When q is 1, the width is 16 characters. When q is 2, the width is 20 characters. When q is 3, the width is 24 characters, and when q is 4, the width is 40 characters. This command is checked by the message handler for proper format and a two digit hexadecimal error code is generated if an error is found in the command. For example, the error code EA is given if the parameter p is out of bounds. The error code EB is given if the parameter p is not a hexadecimal digit.

A typical dialog between the host processor 102 and a user interface object oriented processor 104 without addressing is illustrated in Table 1 below.

TABLE 1

| Host Processor | {C0042} | Initialize the LCD Display on LCD Enable 0–4 lines, 20 characters wide |
| --- | --- | --- |
| | {C50} | Make display 0 the active display |
| | {D0} | Clear display 0 |
| | {D5}Display this message<cr> | Write the message "Display this message" and terminate with a CR |
| Host Processor | {O} | Requests the contents of the output buffer of the object oriented processor |
| Object oriented processor | [O4] | "Scan code" 04 which represents encoder number 4 has changed its value |
| Host Processor | {N14} | Requests the contents of the counter supporting encoder number 4 and requests that the counter be reset after the contents are transmitted |
| Object oriented processor | [F9] | Transmits the contents of the counter in hexadecimal format |

As suggested above, if the system 100 were to be provided with more than one user interface controller 104, the dialog between the host processor 102 and a controller 104 would include an addressing syntax as illustrated, for example, in Table 2 below.

TABLE 2

| Host Processor | {01O} | Requests the contents of the output buffer of the object oriented processor having address 01 - (decimal) |
| --- | --- | --- |

TABLE 2-continued

| Object oriented processor | [0118] | An encoder with the address 01 (hex) and a switch having a scan code 18 (hex) connected to the object oriented processor have changed state |
| --- | --- | --- |
| Host Processor | {Z} | Global reset of all Object oriented processors |
| Host Processor | {A1} | Global enablement of acknowledge |
| Host Processor | {00C0042} | Initialize the LCD display connected to the object oriented processor having address 00 to 4 lines 20 characters wide |
| Object oriented processor | ^ | Acknowledgment that the display is initialized |

Another modified form of the command language may include a name, in lower case, for the object oriented processor. The name may be expressed as a single letter or as two or more letters dependent on the number of object oriented processors in the system and the amount of bus bandwidth available. For example, the minimal command to initialize an LED display with an active low row and column drive of a width of eight characters is {E008}. If the user interface object oriented processor has the name "u", this command would be written as {uE008}. If the user interface uses the address 03, this command would be written as {03uE008}.

As mentioned above, each of the object oriented processors 104, 106, 108 may be implemented as a virtual machine by programming a processor to perform the hardware functions described briefly above and in more detail below. According to a presently preferred embodiment, the object oriented processor 104 is implemented by programming an Intel 8051 processor with the code listed in Appendix B (version 0.1). The program code is preferably stored in ROM and the processor 104 and ROM are preferably supplied on a single chip. According to the presently preferred embodiment, the chip is available in three packages: 40 pin DIP, 44 pin PLCC, or 44 pin QPFP. Thirty-seven pins are used to implement the controller 104 and are identified below in Table 3.

TABLE 3

| Pin Name | Function |
| --- | --- |
| CA0 through CA3 | Encoded column address output for encoder and keyboard scanning |
| R0 through R3 | Row return lines from the encoder and keyboard matrix |
| Reset | An active reset with Schmitt input |
| RxD | The UART receive input |
| TxD | The UART transmit output |
| !INIT | An active low output signal generated immediately after a hardware reset used to strobe initialization data into the chip |
| !Status | An active low signal which signifies that there is data in the output buffer |
| Sound | Sound output pin (requires buffering to drive a loudspeaker) |
| RS | Register select output signal to LCD module |

TABLE 3-continued

| Pin Name | Function |
|---|---|
| DWrt | Display write pulse of user defined polarity (default is active low) |
| PWrt | Peripheral write pulse of user defined polarity (default is active low) |
| Xtal2 | Crystal oscillator output pin |
| Xtal1 | Crystal oscillator input pin |
| Gnd | Power ground pin |
| A0 | Aux port 0 |
| A1 | Aux port 1 and LCD0 enable |
| A2 | Aux port 2 and LCD1 enable |
| A3 | Aux port 3 and LED3 enable |
| A4 | Aux port 4 and LED2 enable |
| A5 | Aux port 5 and LED1 enable |
| A6 | Aux port 6 and LED0 enable |
| A7 | Aux port 7 and LED column enable |
| D0 through D7 | Data port and device hardware initialization inputs |
| VCC | Positive power supply |

The object oriented processor, as implemented with the code of Appendix B, supports thirty-two digits of seven segment LED display organized as an N column by four rows matrix. See, generally, code lines 1305 through 1323 and 2690 through 4016 in Appendix B. The number of columns scanned is user definable over the range one through eight. Left or right format, bright up digit and flashing underbar cursors, numeric and alpha decode, horizontal message scrolling, display flashing for error alert etc. are all supported. An undecoded mode is available for sixteen segment and custom format displays. The object oriented processor also supports up to two smart LCD alphanumeric displays (up to 4×40 format) using commands which are syntactically the same as for LED displays. See, generally, code lines 1402 through 1969 and 2287 through 2350 in Appendix B. The object oriented processor also supports bus write mode, enabling eight or sixteen bit peripherals to be written to directly from the Comms bus. See, generally, code lines 2579 through 2617 in Appendix B. The bus write mode may be used to support smart displays, indicators, D/A converters etc. Up to eight rotary encoders are supported with quadrature decoding, optional saturation or roll over count modes, and a high scan rate for accurate detection of rapid rotation. See, generally, code lines 2429 through 2495 and 4018 through 4369 in Appendix B. Forty-eight switches are debounced, supported by an internal FIFO and provided with selectable auto repeat. Three switches can be defined as SHIFT, CONTROL, and ALT and thereby provide a keyboard with up to 176 keypress combinations. See, generally, code lines 1001 through 1017, 2352 through 2404, 2497 through 2541, 4095 through 4111, and 4747 through 4752 in Appendix B. The object oriented processor includes a sound generator with programmable frequency and duration. See, generally, code lines 2619 through 2624 in Appendix B. The object oriented processor is available with UART/RS232 Comms interface or with a proprietary interface for coupling it to a host processor via a communications bus.

Figure 4:
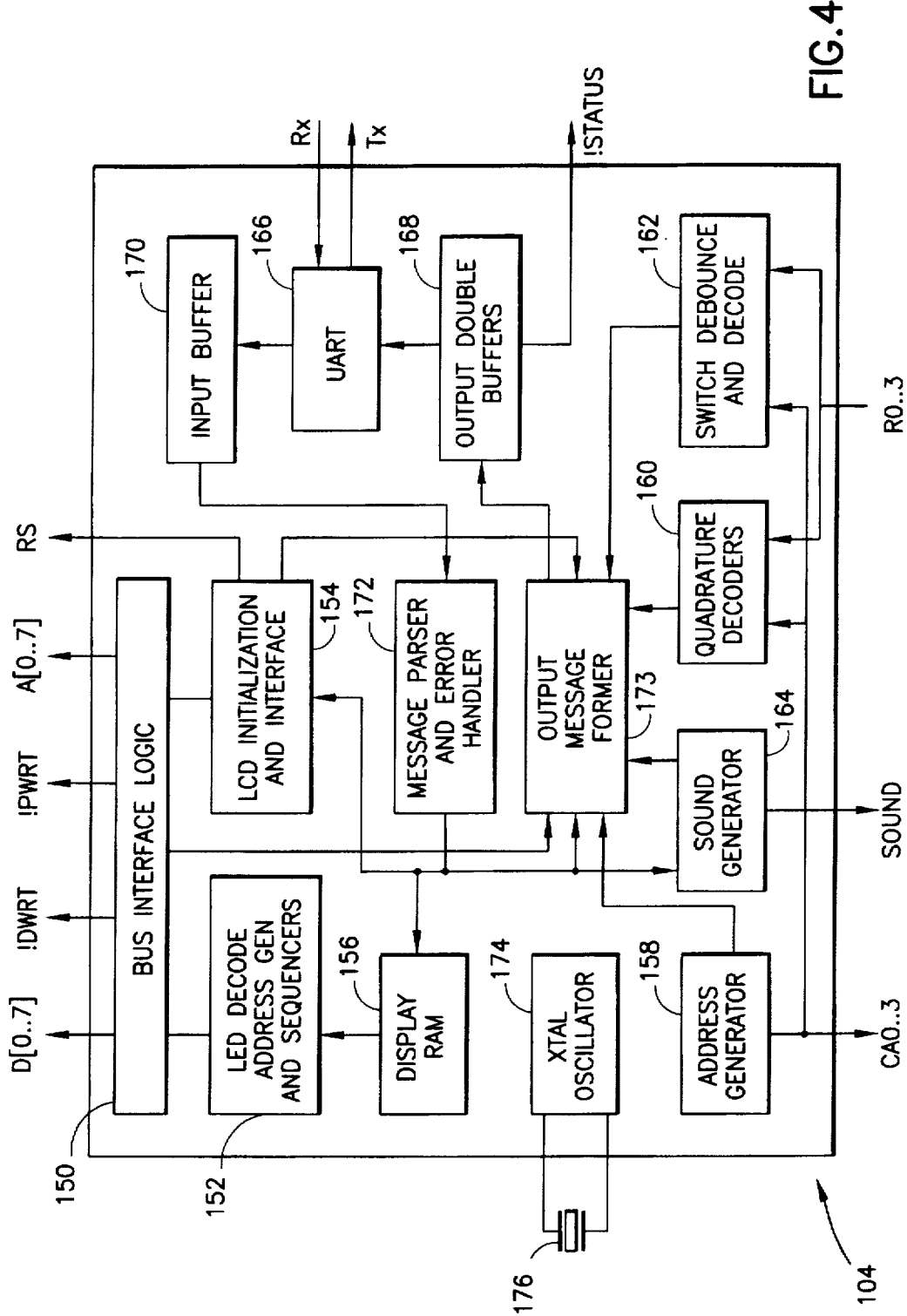
FIG. 4 is a schematic block diagram of an object oriented processor according to the invention with the specified task of universal front panel controller and remote terminal (user interface)

Referring now to FIG. 4 and with reference to Table 3 and Appendix B, a block diagram implemented by the object oriented processor 104 is seen. The processor 104 is shown to include: bus interface logic 150, LED decode address generators and sequencers 152, LCD initialization and interfaces 154, a display RAM 156, quadrature decoders 160, switch debouncers and decoders 162, a sound generator 164, and an address generator 158 which together may be considered as implementing the hardware interface 104c (task-specific layer) (FIG. 3); a message parser and error handler 172 and an output message former 173 which may be considered as implementing the intelligent message handler 104b (FIG. 3); a UART 166 with output buffers 168, and input buffers 170 which together may be considered as implementing the comms interface 104a (FIG. 3); and a crystal oscillator 174 which is typically driven by an external crystal 176. It should be appreciated that the timing of operations within the processor 104 are preferably governed by the crystal oscillator 174.

Turning first to the comms interface, it is seen that communication between the object oriented processor 104 and the host processor 102 (FIG. 3) is via the UART 166. The UART transmits data to the host from the output buffers 168 which, as discussed below, receive input device data from the quadrature decoders 160 and switch debounce and decoders 162. When input device data is present in the output buffers 168, the !Status output is activated (brought low). The !Status output can be OR'd with other such signals to create a host hardware interrupt if desired. According to the invention, however, the !Status output may be ignored. In the receiving direction, the UART 166 receives command messages from the host and places them an input buffer 170. The command messages in the input buffer 170 are retrieved by the message parser and error handler 172. The message parser and error handler 172 interprets the command messages and if they contain an error (see Appendix A) an error code is sent via the output message former 173 to the output buffers 168 for transmission to the host. If the messages do not contain errors, they are interpreted and used to operate on the functional layer, e.g. to control the output devices. In particular, in response to the command messages, the message parser 172 controls the LCD initialization and interface 154, the display RAM 156, the address generator 158, and the sound generator 164. If a display is required on an LED peripheral displays (e.g., display 112), the message parser writes to the display RAM 156 which continually refreshes the LED decode address generator and sequencers 152. The LED decode address generator and sequencers 152, in turn, cause the bus interface logic 150 to drive and output appropriate data (whether initialization data or otherwise) on outputs D0 through D7. Likewise, if a display is required on an LCD, the message parser 172 drives LCD initialization and interface block 154 which likewise causes the bus interface logic 150 to drive and output appropriate data on outputs D0 through D7. Whenever outputs D0 through D7 are being written, the !DWRT display write pulse is activated. The !PWRT peripheral write signal is activated immediately after a write to the data port with the {W0pq} command. Outputs D0–D7 act as an eight bit bus and support up to two LCD displays and four LED displays. When more than one display is used, the outputs A0–A7 are used to enable a particular display. See Table 3, above. Alternatively, the outputs A0–A7 can be coupled to a single 8-bit peripheral device and the outputs D0–D7 can be coupled to a single 8-bit peripheral device. As another alternative, the outputs D0–D7 and A0–A7 can be coupled to a single 16-bit peripheral device. If an LCD module is connected to the outputs D0–D7, the RS register select output is coupled to the LCD module. The RS signal is defined by LCD manufacturers and distinguishes between display control information (RS is low) and display data (RS is high).

A sound generator 164 is provided and controlled by the message parser and error handler 172. The sound generator produces sounds having a pitch and duration according to a command from the host processor.

An address generator 158 provides the encoded column address outputs CA0 through CA3 for encoder and keyboard scanning and the return lines R0 through R3 from encoders and keyboard matrices are supplied to quadrature decoders 160 and switch debounce and decoders 162 which also receive input from the address generator 158. Keyboards and encoders are coupled to the column address outputs CA0–CA3 and to the row return lines R0–R3. The return row lines are scanned for each column and the scan codes are decoded by the quadrature decoders 160 and the switch debounce and decoder 162. Standard switches and keyboard switches are debounced by double scanning. The depression or release of a switch is registered only when the state of the switch is stable for two successive scans. When the state of any switch or encoder is changed, the scan code for the switch or encoder is entered into the output buffer 168 via the output message former 173. When data is placed in the output buffer, the !Status output is activated and this signal may be used to generate hardware interrupts, if desired.

In addition to error messages and data, the output message former 173 optionally provides the output buffers 168 with acknowledgement messages from the bus interface logic 150, the address generator 158, and the sound generator 164 to acknowledge output messages from the host.

Details regarding the physical coupling of specific hardware devices (encoders, switches, and displays) are set forth in Appendix A which includes electrical specifications and timing characteristics.

Figure 4A:
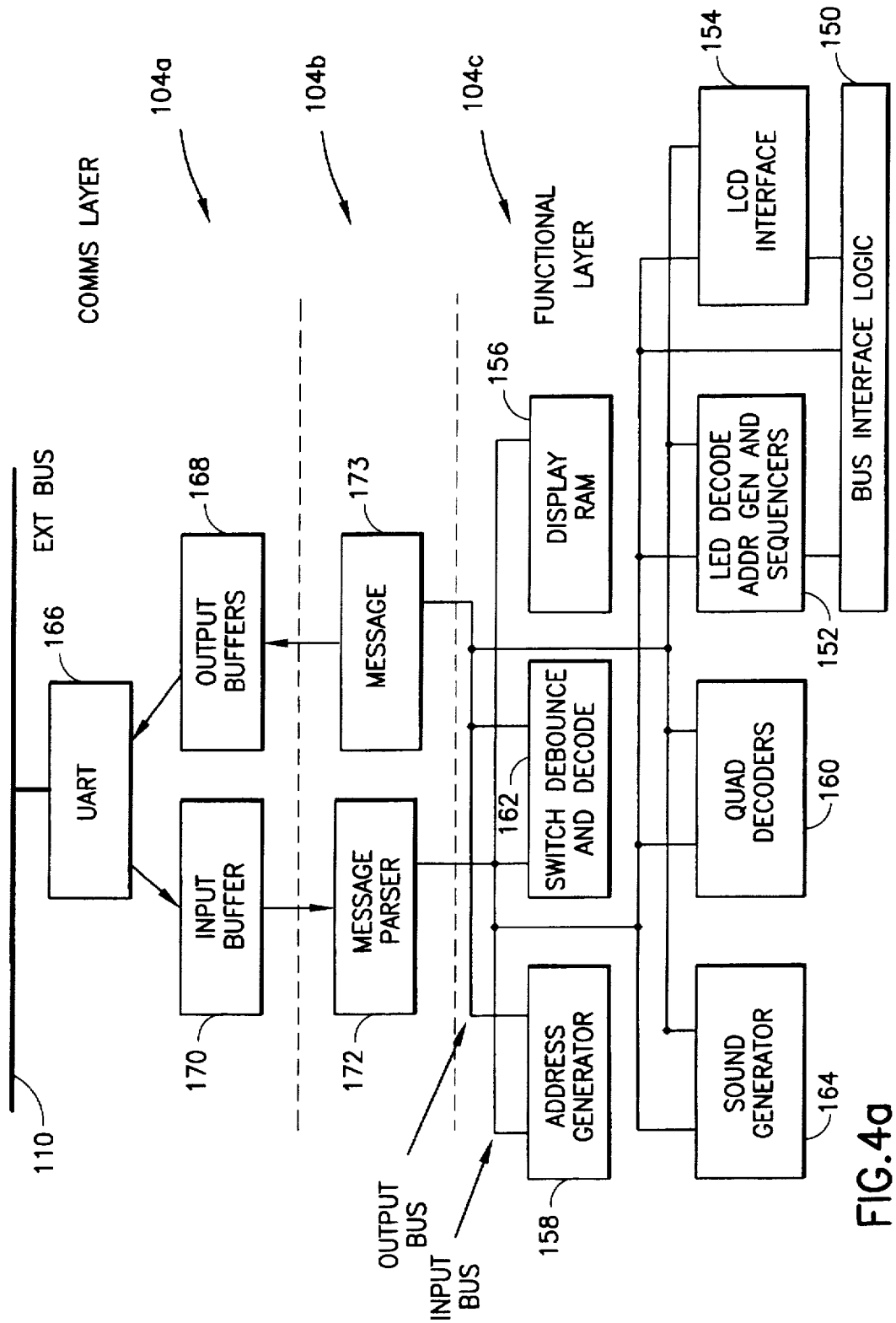
FIG. 4a is a schematic block diagram of the object oriented processor of FIG. 4 shown in a layered organization according to the invention.

As mentioned above, the object oriented processor 104 is preferably implemented as a virtual machine and therefore, the diagram of FIG. 4 is somewhat conceptual. Moreover, as shown in FIG. 3, the object oriented processors according to the invention are conveniently described as having three "layers", i.e. a communications interface layer 104a, a message handling layer 104b, and a hardware interface or functional layer 104c. Turning now to FIG. 4a, the functional elements of FIG. 4 are shown arranged according to the layers described above. Thus, the communications layer 104a includes the UART 166, the output buffers 168, and the input buffer 170. The message handling layer 104b includes the message parser 172 and the message former 173. The functional layer 104c includes the bus interface logic 150, the LED decode address generators and sequencers 152, the LCD initialization and interfaces 154, the display RAM 156, the quadrature decoders 160, the switch debouncers and decoders 162, the sound generator 164, and the address generator 158.

As mentioned above, the host processor operating system is easily programmed to communicate with the object oriented processor. Code written for the host processor may call on comms and interface routines to communicate with the object oriented processor 104 using the command language listed in Appendix A. The comms and interface routines are provided as code libraries which the programmer can easily include in a standard C-program for the host processor. Sample code libraries COMM51.C, COMM51.H, INTF51.C, INTF51.H, UTILS.C, UTILS.H, and GLOBALS.C are attached hereto as Appendix C. The code fragment below illustrates a portion of the code used by a host processor to control the user interface for a frequency synthesizer.

```
while(1) {
    poll816();
    if(encoderOFlag) {
        encoderOFlag=O; //reset the flag
        writeEncoderFreq(readResetEncoder('O'),&fSynth);
    }
```

-continued

```
    while(c=popSwitch()){
        switch(c){
            case MENUKEY:
                displayMenu();break;
            case LEFTKEY:
                editFreq(RHS,&fSynth);
                writeFreq(&fSynth);
                writeSynth(fsynth);
                break;
            case RIGHTKEY:
                editFreq(LHS,&fSynth);
                writeFreq(&fsynth);
                writeSynth(fSynth);
                break;
            case SCANKEY:
                reqSweep();
                break;
            default:
                makeErrorSound();
        }
        if(c) {
            ledFormat(LEDDISPLAYO,LEFT,NUMERIC);
            writeDisplay(fSynth);
        }
    }
}
```

The code fragment listed above is the main task handler for the frequency synthesizer. The "while(1)" loop executes its contents forever. The "poll816( )" instruction gets the status of the object oriented processor using the {O} command described above and decodes the response. The complete code for the "poll816( ) instruction can be found in the COMM51.C listing in Appendix C. In this example only a single encoder (encoder0) is used and it is therefore only necessary to detect its change of state with the "if(encoder0 . . . " statement. If the encoder's flag is set (state has changed), it is reset by the host so that subsequent changes will be detected. The value of the encoder is then read with the "readResetEncoder('0')" statement. Both the display and the "freq synth" hardware are updated with the "writeEncoderFreq . . . " instruction.

The switch scan codes obtained with the "poll816( )" instruction are stored in a stack and are retrieved from the stack using the "popswitch( )" function which is coded in the COMM51.C listing in Appendix C. When this function returns a zero, this is an indication that there are no more switches left to be processed. Thus, the "while(c=popswitch ( ))" loop gets switches from this stack, determines what kind of switch they are and then takes the appropriate action. The labels MENUKEY, LEFTKEY, etc. would be defined in another portion of the code (not shown) with numeric values corresponding to scan codes returned from the stack. The "switch(c)" statement looks at the scan code, in this case "c", and jumps to the label having the matching value. If the scan code does not match any label value, the statement jumps to "default" and makes an error sound. If the switch scan code matches the value of the label MENUKEY, e.g., the statement "displayMenu" calls upon routines to list a menu. The LEFTKEY routine moves the display cursor to the left, etc. The "if( ) . . . while( )" loop continues so long as non-zero values return from the stack.

As explained above, each object oriented processor according to the invention is designed (programmed) with a specific functionality (task-specific layer), for example to support specific kinds of peripherals. The object oriented processor 108 (FIG. 3), for example, is programmed with the functionality of a smart analog interface which is used to interface with analog devices such as motors and analog sensors. The analog interface of the processor 108 is implemented in much the same way as the user interface of the processor 104 described above with reference to FIG. 4. It will be appreciated, however, that the functionality of the pins on the chip implementing the analog interface 108 will be different from the functionality of the pins on the chip implementing the user interface 104.

A presently preferred embodiment of the analog interface processor 108 utilizes a Phillips 80576 processor which is programmed to achieve the functionality described below with reference to FIG. 5. The object oriented processor 108 is available in 44 pin QPFP, 44 pin PLCC, or 40 pin DIP packages. Table 4 is a listing of the pins and their functions in the analog interface object oriented processor 108.

TABLE 4

| Pin Name | Function |
| --- | --- |
| AVCC | Analog Vcc supply voltage |
| AVSS | Analog Vss supply voltage |
| AIN0 through AIN5 | Six channels of ten bit analog data acquisition |
| !RESET | Active reset |
| RxD | The UART receive input |
| TxD | The UART transmit output |
| !INIT | An active low output signal generated immediately after a hardware reset used to strobe initialization data into the chip |
| ST/ENAB | Status or Enable |
| CMP+ | Analog comparator input |
| CMP− | Analog comparator input |
| !WR | Parallel interface write signal |
| !RD | Parallel interface read signal |
| !CS | Parallel interface chip select signal |
| Xtal2 | Crystal oscillator output pin |
| Xtal1 | Crystal oscillator input pin |
| Gnd | Power ground pin |
| GD0 through GD3 | General purpose digital outputs |
| PWM0 and PWM5 | PWM output |
| D0 through D7 | Remote data port or parallel connection to host |
| VCC | Positive power supply |

Figure 5:
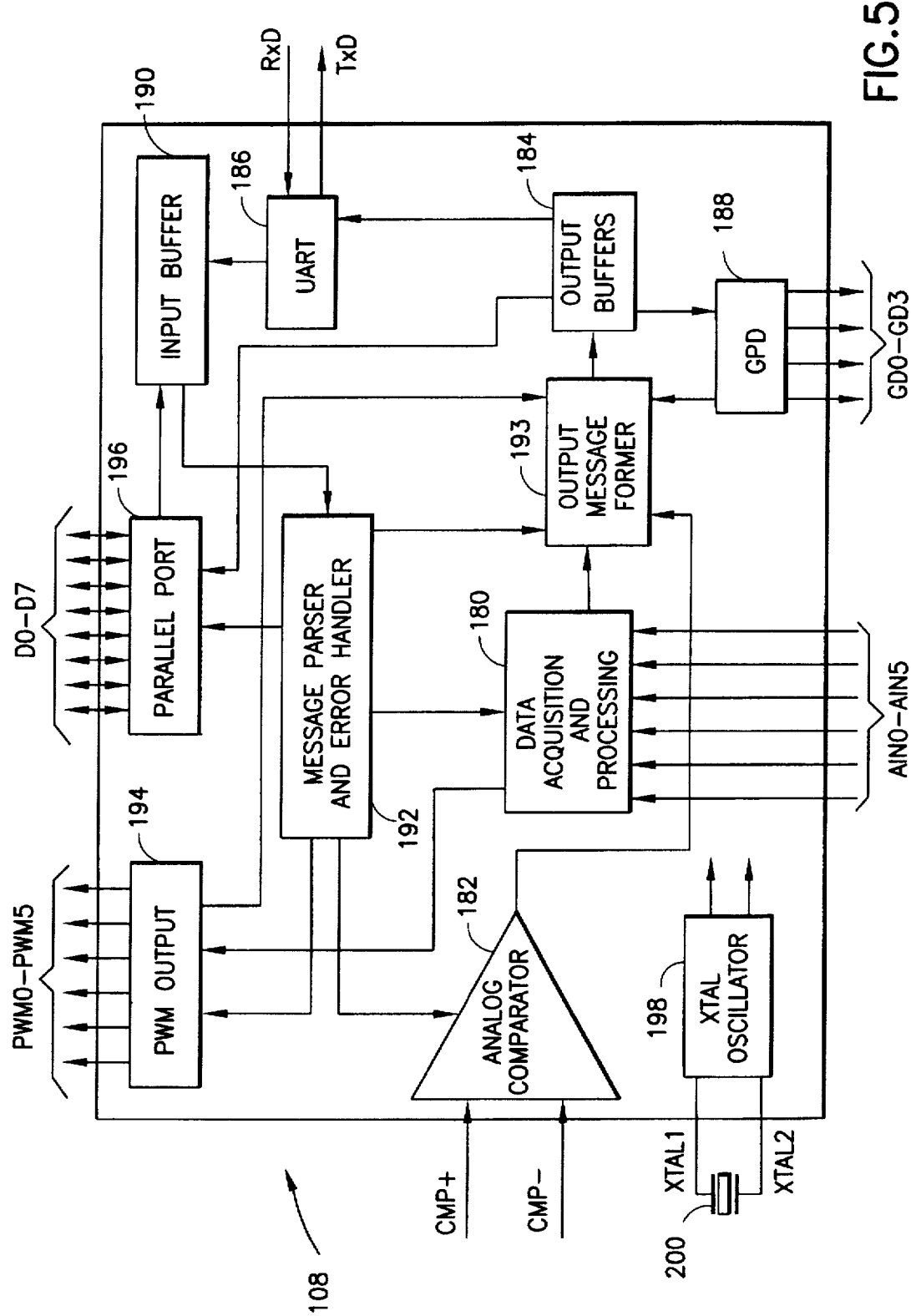
FIG. 5 is a schematic block diagram of an object oriented processor according to the invention with the specified task of an analog interface.

FIG. 5 shows a schematic block diagram of the analog interface object oriented processor 108 according to the invention. Referring now to FIGS. 3 and 5, the communications interface 108a (FIG. 3) is implemented by the UART 186, the output buffer 184, the input buffer 190, and if desired, the parallel port 196. The intelligent message handler 108b is implemented by the message parser and error handler 192 and the output message former 193. The hardware (peripheral) interface (task specific layer) 108c is implemented by the data acquisition and processing block 180 ("DAQ"), the analog comparator 182, the PWM output 194, the parallel port 196, and the general purpose digital outputs 188. Timing of the functions implemented on the chip is regulated by a crystal oscillator 198 which is coupled to an external crystal 200.

The presently preferred embodiment of the analog interface object oriented processor 108 according to the invention supports six channels (pins AIN0 through AIN5) of analog data acquisition, with twelve bit A/D resolution and programmable signal conditioning. Signal conditioning functions include root mean square (rms) value, average value, positive and negative peak detect, gain, and modulus (rectify). All computations are preferably processed with thirty-two bit resolution for high accuracy. Six PWM outputs are provided with optional on-chip closed loop processing. The maximum PWM output frequency in the provided embodiment is 23 KHz. Four general purpose digital outputs, GD0 through GD3, are provided and can be user configured to generate local clocks or measure pulse widths. A parallel port, pins D0 through D7, can be used as a remote digital I/O port with separate read and write signals, or as a parallel port connection to the host with standard read (!RD), write (!WR), and chip select (!CS) signals.

Referring now to FIG. 5 and with reference to Table 4, messages received from the host processor via the UART 186 are placed in the input buffer 190 and read by the message parser and error handler 192 which controls the hardware (peripheral) interface. If a message from the host contains an error, it is handled as described above with an error message being sent to the host (via the output buffer 184 and UART 186). Error-free messages are interpreted by the message parser 192 and used to control the DAQ logic 180, the comparator 182, and the output buffers 184, as well as to send commands from the host processor to direct the message parser and error handler 192 to alter the output frequency of the PWM output 194, to configure the output of the digital outputs 188, to read from or write to the parallel port 196, etc. An exemplary command set for use by the host processor to control the analog interface processor 108 is provided in the attached Appendix D (Command Set to the Analog Interface Object).

As suggested above, the analog interface object oriented processor 108 communicates with external analog devices. Thus, the analog interface processor 108 is provided with an analog comparator 182 which receives input through pins CMP+ and CMP−, and a data acquisition and processing ("DAQ") logic block 180 which receives six channels of analog inputs from pins AIN0–AIN5 and A/D converts the analog inputs to a ten bit resolution. According to the presently preferred embodiment, each of the six channels of the DAQ 180 is provided with an output buffer having a depth of eight bytes (four samples). Samples are returned as sixteen bit signed integers which are transmitted to the host in ASCII code as four hexadecimal digits via the output message former 193. The DAQ 180 is configurable to condition incoming signals in several ways. The presently preferred embodiment includes conditioning signals to detect rms value, average value, positive and negative peak values, gain, and modulus. The analog interface processor 108 can be operated in an open loop (measurement mode) or in a closed loop (controller mode). When in the closed loop mode, input to the DAQ logic 180 is conditioned and then directed to the PWM output 194. When in the open loop mode, input to the DAQ logic 180 is conditioned and placed in the output buffers 184 by the output message former 193. It should be appreciated that any output from the DAQ 180 and the comparator 182 which are placed in the output buffers 184 can be transmitted to the host processor via the UART 186 as described above with reference to the processor 104.

The eight bit bidirectional parallel port 196 may be used as a remote data port or may be used to provide a parallel connection to the host processor. This port may also be used as a remote I/O expander when the processor 108 is coupled to a host via a serial bus. The byte wide parallel port effectively adds control pins to the host and at a remote location as well.

In addition to error messages and data, the output message former 193 optionally provides acknowledgement messages from the DAQ, the comparator, the GDP, and the PWM for transmission to the host via the output buffers and the UART.

Figure 6:
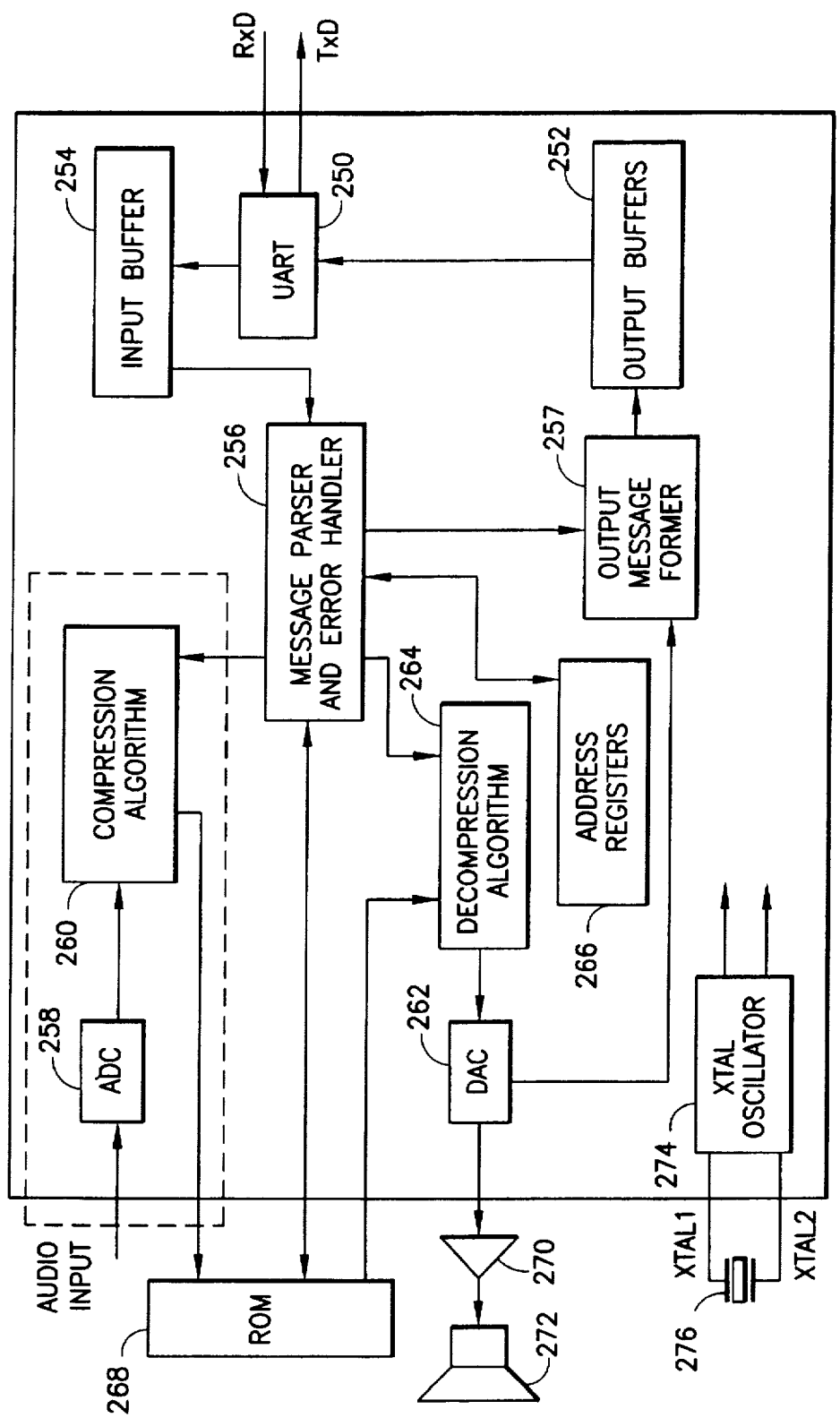
FIG. 6 is a schematic block diagram of an object oriented processor according to the invention with the specified task of a speech processor.

As mentioned above with reference to FIG. 3, an object oriented processor 106, according to the invention is provided with speech processing functionality. FIG. 6 shows a schematic block diagram of such an object oriented processor according to the invention. As with the processors described above, the speech processor 106 is preferably implemented as a virtual machine by programming a general purpose processor to achieve the functionality described below.

Turning now to FIG. 6, and with reference to FIG. 3, the communications interface 106a (FIG. 3) is implemented by the UART 250, the output buffers 252, and the input buffer 254. The intelligent message handler 106b is implemented by the message parser and error handler 256 and the output message former 257. The hardware interface 106c (task specific or functionality layer) is implemented by the analog to digital converter (ADC) 258 having an associated compression algorithm 260, the digital to analog converter (DAC) 262 having an associated decompression algorithm 264, and address registers 266. In addition, the functionality of this processor will typically require off-chip memory 268, preferably in the non-volatile form of ROM, EPROM, or static RAM. Moreover, in its primary mode as an audio player (rather than an audio recorder), an off-chip amplifier 270 and speaker 272 will also be required. Timing of the functions implemented on the chip is regulated by a crystal oscillator 274 which is coupled to an external crystal 276.

Communications and message handling in the speech processor is substantially the same as described above, but with functionally unique commands. The processor 106 is provided with an audio input for recording speech, although it is anticipated that most applications will require only one recording session after which the audio input will not be used again. In any event, the audio input is coupled to the ADC 258 which converts analog audio signals into digital signals which are highly compressed using the compression algorithm 260. In applications which require only record once and play many times, the ADC and compression algorithm may be provided off-chip in a PC or the like (not shown) as suggested by the dotted line surrounding the ADC and the compression algorithm. Recorded and compressed messages would be transferred to the ROM chip 268 by the PC and the ROM chip then coupled to the processor 106. Compressed digital signals are stored in the memory 268 and addressed as pages (each of which has a duration of about one second of decompressed audio) which are referenced in the address registers 266. Pages of compressed audio may be selectively recalled from memory 268, decompressed using the decompression algorithm 264, and converted to an analog signal using DAC 262. The analog output from the DAC 262 may be amplified using the amplifier 270 and output through the speaker 272. The presently contemplated use of the processor 106 is to store and retrieve common phrases. Consequently, the commands used to operate the processor include a PLAY command with parameters of start.page and stop.page. For example, with page addresses of five (5) hex digits, a play command might take the form {Pabcdezyxwv} where abcde is the address of the first page and zyxwv is the address of the last page. By concatenating phrases from different memory pages using sequential PLAY commands, different audio messages may be created.

The output message former 257 in FIG. 6 is used to provide error messages and, optionally, to provide acknowledgment messages for transmission to the host via the output buffers 252 and the UART 250.

As mentioned above, the methods and apparatus of the invention allow relatively easy software simulation of a distributed processing system and thus allow for rapid debugging of the system and the development of system software. An example of software simulation of the user interface 104 (FIG. 3) can be gleaned from the C code listing in Appendix E which provides a demonstration of the capabilities of the object oriented processor having user interface functionality.

Those skilled in the art will appreciate that the message based communication system provided by the invention allows for rapid debugging of host software and simulation of the object oriented processors. Since all communications between peripheral devices and object oriented processors are pre-tested and since the bus system used for the host and the object oriented processors is also pre-tested, it is only necessary to simulate the communications between the host and the object oriented processors in order to de-bug host software. Since the communication between the host software and the object oriented peripherals is message based, it operates in the same way as software to software communication and the developer is freed from software to hardware communication concerns.

One method of system development according to the invention is to couple one or more object oriented processors via a communications bus (e.g. serial port) to a development PC and to write the host software on the development PC. The system can be debugged in real time because of the message based communication between the host software and the object oriented processors.

A presently preferred method of system development utilizes full software simulation. Full software simulation is easily implemented since the object oriented processors are easily emulated as virtual machines in software. For example, in the case of the user interface 104, the code listed in Appendix B may be used as a guide to create virtual machine software which can run on a development PC. Those skilled in the art will appreciate that the hardware devices such as LEDs, LCDs, switches, etc can also be simulated as a graphic interface on the host computer, thereby greatly simplifying system software development.

Figure 9:
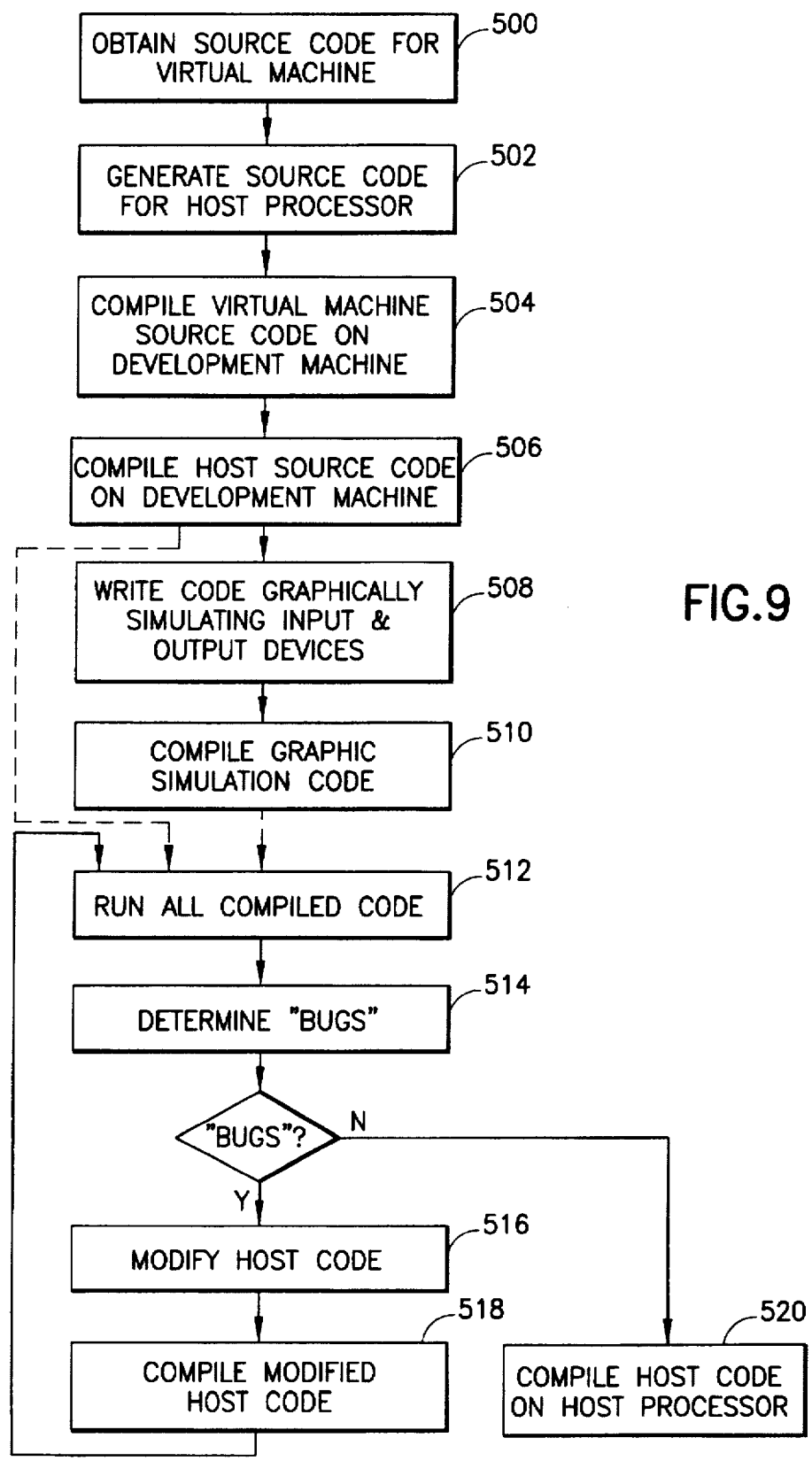
FIG. 9 is a flow chart illustrating a method of debugging host software according to the invention.

FIG. 9 illustrates the steps in an example of development of host software utilizing the de-bugging and simulation features of the invention. First, the object oriented processor is realized as a virtual machine and source code for the virtual machine is obtained at 500. A first generation of source code for a host processor is written at 502. The virtual machine code is compiled or interpreted at 504 to run on a development computer. The first generation host source code is similarly compiled or interpreted at 506 to run on the development computer. Code for graphically simulating input and output devices such as LEDs, switches, etc. is optionally written at 508. The graphical simulation code is compiled or interpreted at 510. All of the compiled/interpreted code is run on the development computer at 512 using known de-bugging methods. In addition, the code for the object oriented processor aids in de-bugging by providing error messages as described above when messages from the host software have incorrect syntax or invalid parameters. Bugs in the host software are determined at 514. Modified host code is written at 516. The modified code is compiled/interpreted at 518. The process returns to 512 to de-bug the modified host code. Steps 512, 514, 516, and 518 are repeated until no bugs remain in the host code. The host code is compiled/interpreted to run on the host processor at 520. The object oriented processor is implemented as a virtual machine using the code obtained at 500 or is implemented as a circuit having the functionality of the code obtained at 500, or is implemented as a virtual machine using the code obtained at 500 as a guide.

Those skilled in the art will appreciate that the code for the object oriented processor(s) and for the host is preferably written in a single object oriented programming environment. The code for each object oriented processor would be written as a class and the code for the host processor would be written as the main.

Thus far, a first generation of object oriented processors has been described together with methods of connecting peripherals to a host processor using the object oriented processors. These methods and apparatus relieve the host processor of scheduling real time interrupts for multiple peripherals by placing all interrupts on the single comm bus, allow faster and easier development of system software, enable portability of system software, and facilitate debugging. A second generation of object oriented processors, which will be described below, achieves all of the functionality of the first generation described above and also allows for direct communication between object oriented processors without continuous host processor supervision. This additional functionality is achieved by providing an object oriented processor with a periodic message generator (PMG), a link table, and linking scripts. The link table and the linking scripts are stored in memory locations in the object oriented processor and may be downloaded to the object oriented processor from the host processor. The PMG is coded into the programming of the object oriented processor and may be activated by the host processor to locally generate messages within the object oriented processor which would normally come from the host processor. The message contents, the number of repetitions of the message, and the interval between repetitions of the message by the PMG are user selectable through commands from the host processor. It will be appreciated that if the object oriented processor is implemented as a circuit or a gate array, the PMG will be hard wired accordingly rather than programmed in software.

According to a presently preferred embodiment of the invention, the link table contains space for jump vectors corresponding to each command which is understandable by the object oriented processor. Each jump vector points to the memory location of a downloaded linking script associated with the command, if a linking script linked to the command has been downloaded. When a script is downloaded to the object oriented processor, the object oriented processor assigns a new jump vector in the link table to the memory location starting point of the downloaded script. When a message is interpreted by the message parser, it is passed to the link table to determine if there is a script associated with the command. If there is, the script is executed (either before or after) the functional layer executes the command. Scripts may be defined as either pre-command or post-command scripts in order to define when the script will be executed. According to a preferred embodiment, post-command scripts are processed through via the output message former which passes output messages to the link table to determine the presence of a post-command script.

Figure 7:
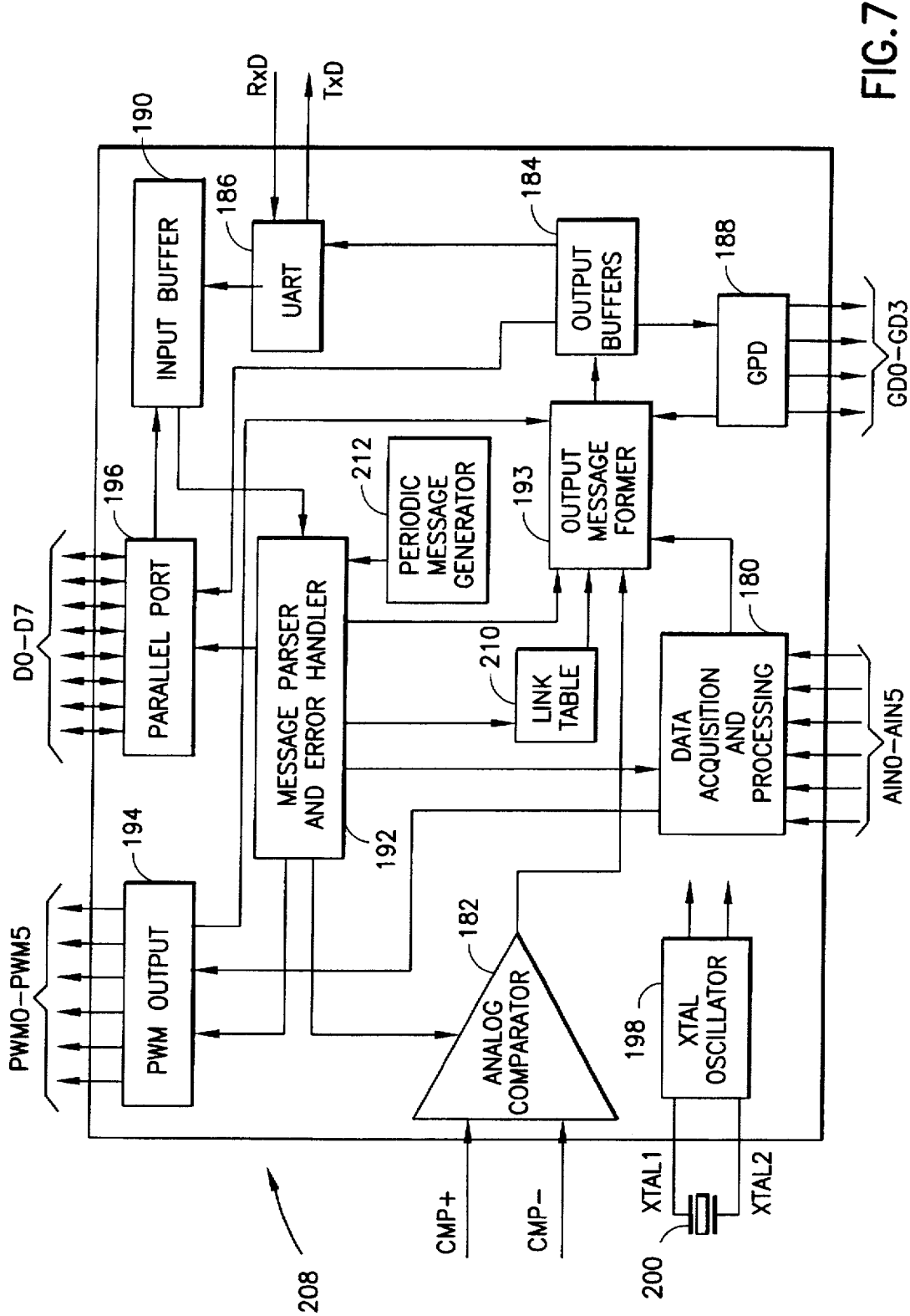
FIG. 7 is a schematic block diagram of an analog interface similar to the interface shown in FIG. 5, but with the added functionality according to another embodiment of the invention.

Turning now to FIG. 7, a second generation object oriented processor is exemplified in a smart analog interface 208 which includes all of the functionality of the analog interface 108 described above. In addition, the analog interface 208 is provided with a link table 210 which is, in effect, a list of starting memory locations of storage space into which scripts can be downloaded from the host processor. The link table is coupled to the message parser and error handler 192 so that scripts may be executed locally. Preferably, the interface 208 is also provided with a periodic message generator 212 which is, in effect, a timer and associated processing for the local generation of message sequences.

As mentioned above, the PMG, link table, and linking scripts allow an object oriented processor such as the analog interface 208 to be instructed to communicate directly with another object oriented processor. For example, the object oriented processor 208 described with reference to FIG. 7 can be instructed by the host processor to send data directly to a smart user interface (object oriented processor 104 in FIG. 4) via the Comms bus or via another bus. To effect this functionality, the host processor will download a linking script to processor 208 and activate the PMG 212 to locally generate messages periodically. According to the invention, an extended command language syntax is provided for downloading linking scripts. Appendix F (Message Format Specification for the IQ1000 Bus-Rev 0.3) includes a description of the extended command language syntax used for this purpose. The syntax takes the form, for example, as shown in the following script message: A@{ch0.1.printf ("Ue5{0\}~Uf0~Uf5{The RMS value =%f\}~".ch0Value) ;}!~. The first character A is name of the object oriented processor to which the message is sent. An optional address number may precede the name character. The @ character identifies the message as a linking script. The first { character identifies the start of the parameter field. The first parameter, ch0, identifies the primary message to which the script will be linked. The second parameter, 1, indicates that the script is to be post-executed (rather than pre-executed) once the primary message has been executed. The string of characters from printf through the last } character is the script itself which is shown by example in a high level language. In actual practice, the script may be written in machine code and transmitted as a hex string for the target object oriented processor. If the target object oriented processor is provided with a code interpreter, then the script could be a source code script such as shown in the example. The ! character in the script message is the reserved name for the host and indicates the identity of the sender of the message. The final ~ character indicates the end of a message packet.

At any given time, the link table may contain jump vectors to several scripts or no scripts. The link table will default to "no scripts" when the object oriented processor is initialized or reset.

In the example given above, it is not necessary for the object oriented processor 104 to have a PMG or linking table since it is only receiving messages from the comms link as if they had come from the host processor. However, if the analog interface object oriented processor 104 is provided with the capability of executing linking scripts, the example above may be carried further to include, for example, the speech processor 106. For example, the host may download a script to the analog interface 104 directing it to send messages to the speech processor 106 to speak the information displayed by the analog interface.

From the foregoing, it will be appreciated that the object oriented processors according to the invention are not limited to the examples given. The object oriented processors may be used to distribute processing tasks in any processor system. For example, those skilled in the art will appreciate from the foregoing that a desktop multimedia computer may be designed using the object oriented processors according to the invention. Separate object oriented processors could be programmed with functionality for controlling a disk drive, a joystick, and a video display, for example. The host processor could download linking scripts directing the disk drive processor to periodically send video data from the disk drive to the video display processor and directing the joystick processor to periodically send messages to the video display processor indicating the position of the joystick. The video display processor may be programmed to move an overlay such as a sprite or group of sprites on the video display in response to messages from the joystick processor. It will therefore be appreciated that a relatively complex programming task for a multimedia game, for example, may easily be distributed into several relatively simple tasks which are carried out by separate object oriented processors.

Figure 8:
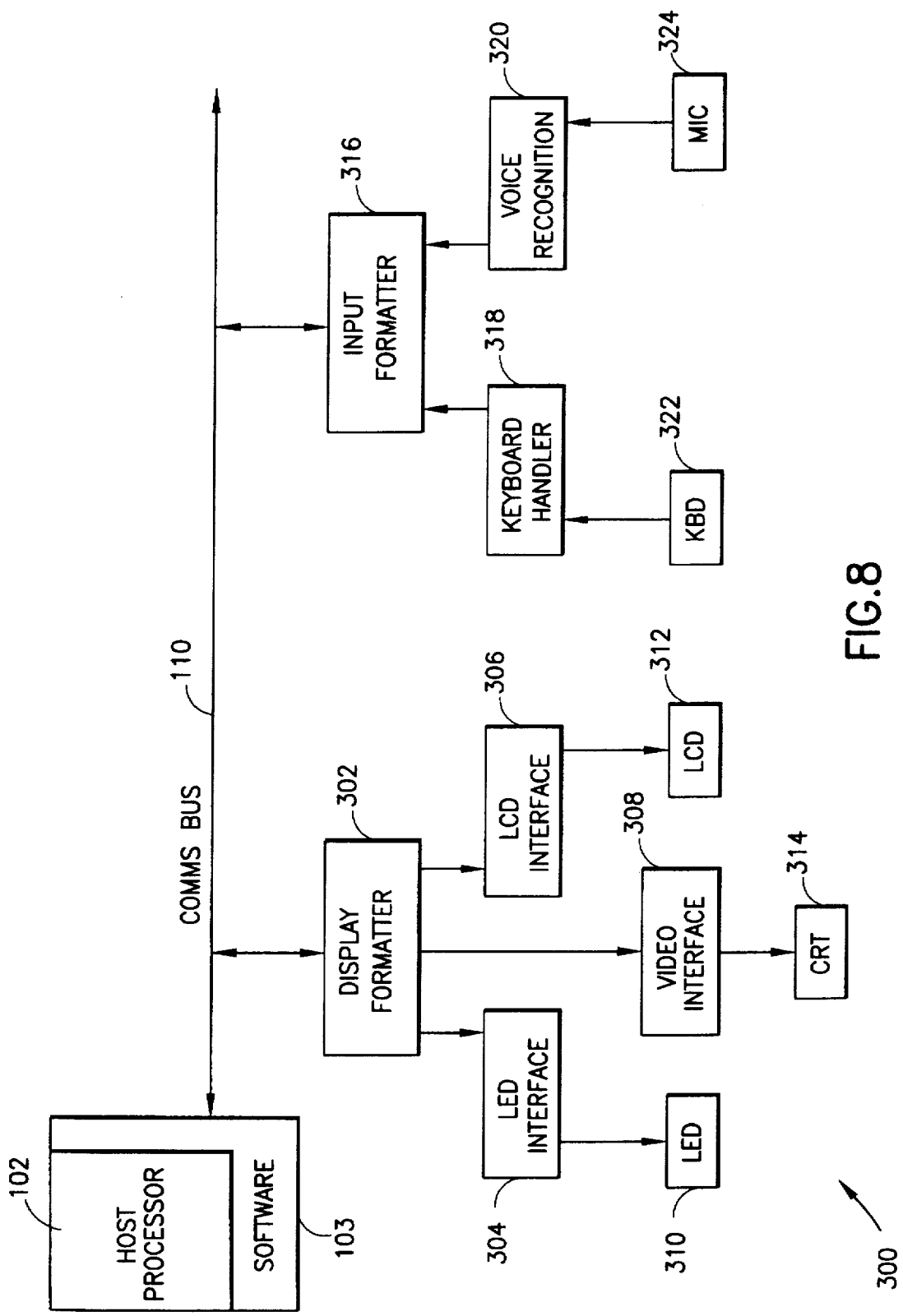
FIG. 8 is a schematic block diagram of another embodiment of the invention in which two object oriented processors share the functionality of a third object oriented processor.

Furthermore, it will be appreciated that processing tasks may be distributed in many different ways utilizing the object oriented processors of the invention. For example, as shown in FIG. 8, a distributed processing system 300 according to the invention may be implemented using a host processor 102 with software 103 and a comms bus 110 as described above. Several hierarchies of object oriented processors may be provided. For example, the display formatter object oriented processor 302 may be programmed to preformat a display for use by a number of different display devices. The preformatted display is adapted to an LED 310 by the LED interface object oriented processor 304, to an LCD 312 by the LCD interface object oriented processor 306, and to a CRT 314 by a video interface object oriented processor 308. Similarly, an object oriented processor 316 may be provided for formatting input from a variety of sources including, for example, a keyboard 322 and a microphone 324. The input formatter object oriented processor 316 would receive pre-processed input from the keyboard handler object oriented processor 318 and the voice recognition object oriented processor 320. It will therefore be appreciated that in the hierarchical arrangement of object oriented processors shown in FIG. 8, the functionality of one processor is shared by several other processors; i.e., the functionality of the display formatter object oriented processor 302 is shared by the interface object oriented processors 304, 306, and 308; and the functionality of the input formatter object oriented processor 316 is shared by the keyboard handler object oriented processor 318 and the voice recognition object oriented processor 320. According to this embodiment of the invention, the accuracy of data can be enhanced and the speed of communication between object oriented processors can be increased.

As described herein, the object oriented processors communicate with the host processor and with each other via the "comms link" or "comms bus". Those skilled in the art will appreciate that the command language disclosed herein may be used with any type of communications link or bus, be it serial or parallel. Appendix F illustrates how the command language of the invention can be mapped onto the protocols of different bus systems.

There have been described and illustrated herein several embodiments of distributed processing systems, methods of debugging host software in such systems, and methods of interprocessor communication in such systems. While particular embodiments of the invention have been described, it is not intended that the invention be limited thereto, as it is intended that the invention be as broad in scope as the art will allow and that the specification be read likewise. Thus, while particular source code and object code have been disclosed, it will be appreciated that other source code and object code could be utilized. Also, while object oriented processors with certain functionality have been shown, it will be recognized that the invention contemplates object oriented processors having other types of functionality as well. Moreover, while particular configurations have been disclosed in reference to the functionality of the disclosed object oriented processors, it will be appreciated that other configurations could be used as well. Furthermore, while the communication language of the invention has been disclosed as having a specific advantageous syntax, it will be understood that a different syntax can achieve the same or similar function as disclosed herein. In addition, while the object oriented processors according to the invention have been described as preferably implemented as virtual machines, it will be understood that the object oriented processors could be implemented as circuits having the functionality described herein. Further, while the message based communications link has been described as a serial communications bus, it will be understood that any communications bus could be used and several bus systems are described in Appendix F. It will therefore be appreciated by those skilled in the art that yet other modifications could be made to the provided invention without deviating from its spirit and scope as so claimed.

APPENDIX A

IQ Systems, Inc.

IQC826 — User Interface Controller with multi-drop capability
A member of the IQ Silicon Object™ family.

Features

- Supports 32 digits of 7 segment LED display, organized as an N cols by 4 rows matrix. The number of columns scanned is user definable over the range one through eight. Left or right format, bright up digit and flashing underbar cursors. Numeric and alpha decode. Horizontal message scrolling. Display flashing for error alert etc. Undecoded mode available for 16 segment and custom format displays.

- Supports up to 2 smart LCD alpha numeric displays (up to 4 × 40 format). Commands syntactically the same as for LED displays.

- Supports bus write mode, enabling 8 or 16 bit peripherals to be written from serial input. Typically used for the addition of smart displays, indicators, D/A converters etc.

- Supports up to 8 rotary encoders with quadrature decoding. Optional saturation or roll over count modes. High scan rate for accurate detection of rapid rotation.

- Supports 48 switches (176 with control keys). Switches are de-bounced, supported by an internal FIFO and have selectable auto repeat, shift, control etc.

- Tone generation with programmable frequency and duration.

- Easy interface to host via point to point UART/RS232 or multi-drop UART.

- Low power consumption -10mA typ.

- Member of the IQ Silicon Object family.

Packages

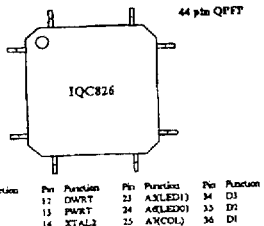

44 pin QFP

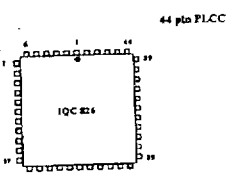

44 pin PLCC

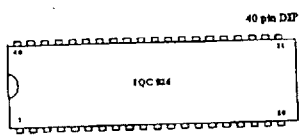

40 pin DIP

*Do NOT connect to any pins marked NC*

Information furnished by IQ Systems is believed to be accurate. However no responsibility is assumed by IQ Systems for its use, nor for any infringements of patents or other rights of third parties which may result from its use. No license is granted by implication or otherwise under any patents or patent rights of IQ Systems.

Copyright © 1994 IQ Systems, Inc.
IQ Systems, Inc., 20 Church Hill Road
Newtown, CT 06470
Tel: (203) 270-8667  Fax: (203) 270-9064
The IQ Command Set is copyright © 1994
IQ Systems Inc. - all rights reserved IQC826 Specification - rev 1.0                                    A-2

Overview

The IQC826 is a comprehensive user interface chip designed to relieve the host from all of the real time tasks of front panel control. The chip supports both point to point UART (RS232) and multi-drop UART configurations. It is able to handle a wide range of input and output devices that include rotary encoders, switches, keypads, sensors, discrete LEDs, seven segment LED displays, and smart LCD displays. Two levels of error detection have been built into the device to ensure robust operation.

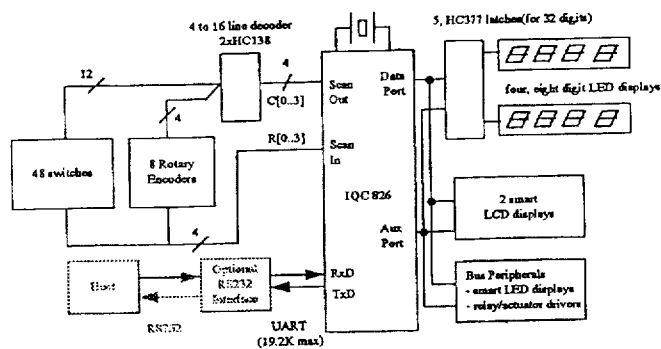

Figure 1:
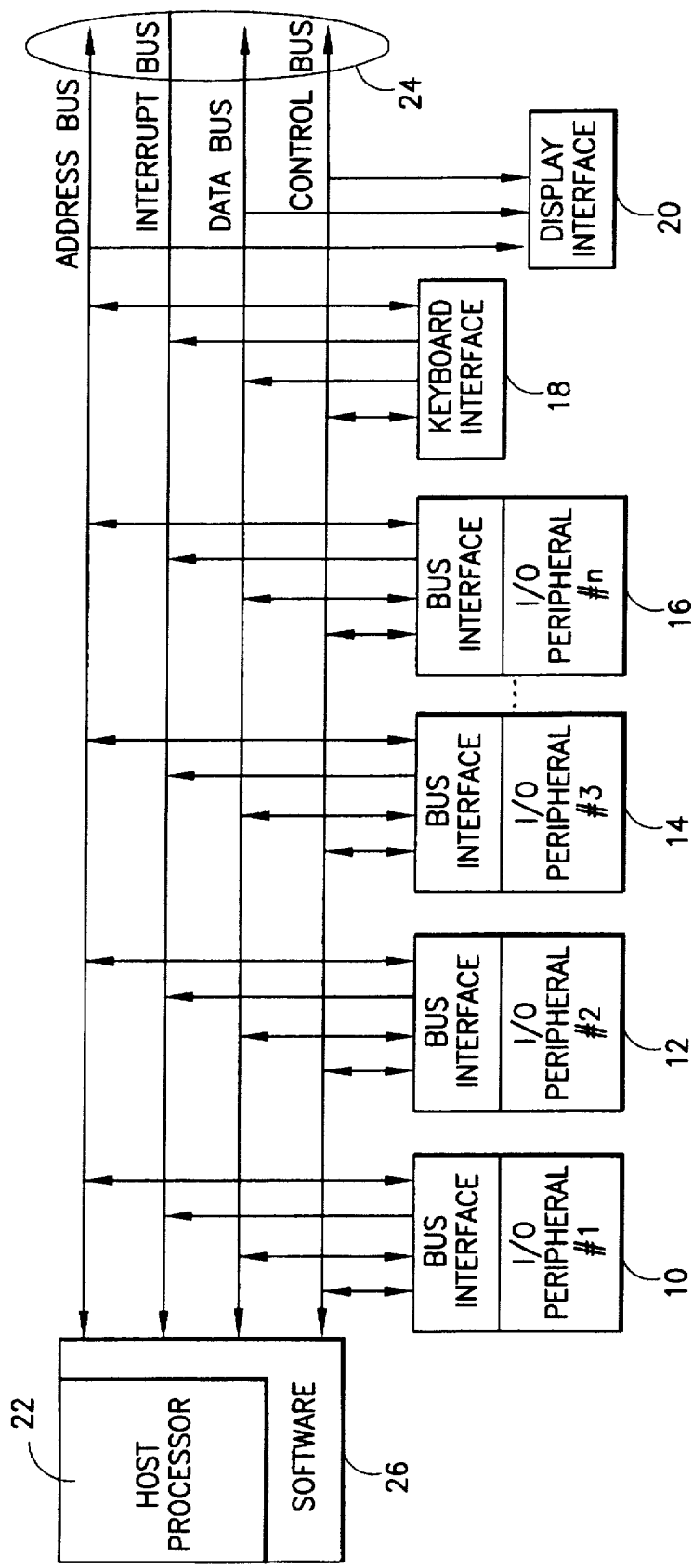
FIG. 1 is a schematic block diagram of a prior art system in which peripheral devices are coupled to a host processor via an interrupt driven bus.

*A fully expanded IQC826 in standard UART or RS232 mode*
Figure 1.1

A fully expanded application in standard UART mode is shown in figure 1.1. The external components required are two HC138s (supports 8 encoders and 48 switches), possibly some bus peripheral drivers for the indicators, relays etc.

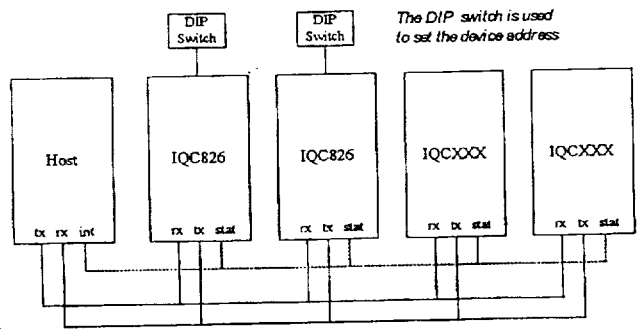

*A multi-drop UART configuration*
Figure 1.2

IQC826 Specification - rev 1.0

Figure 1.2 illustrates a multi-drop UART implementation. The wired OR connection of the STATUS outputs to an interrupt input on the host is available but not normally needed. If two or more identical chips are included in the network then a hardware address must be assigned. This is done via DIP switches or diodes as described later in this specification.

Notes on the chip

(i) Each rotary encoder is coupled to an eight bit binary up/down counter. This counter can either underflow or overflow at the end of range, i.e. in the count down direction 0FFh will succeed 00h and the count up direction 00h will succeed 0FFh, or can saturate at 07Fh positive going and 80h negative going. For differential counting (i.e. a count of the difference since the last time the encoder was sampled) use the {N1x} function to reset the count once it has been read.

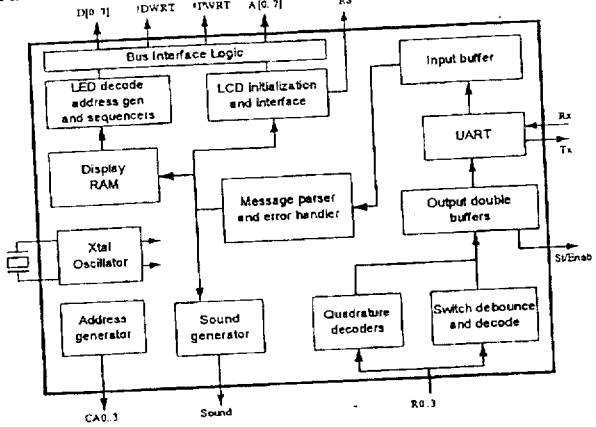

*Simplified block diagram of the IQC826*
Figure 1.3

(ii) In keyboard mode a switch is only entered into the keyboard FIFO on the depression of the switch. Keyboard switches have available to them the control keys SHIFT, CONTROL and ALT, as well as auto-repeat.

(iii) In the standard switch space both the depression and release of the switch is entered into the keyboard FIFO with different scan codes (MSB set on release). The control and auto-repeat functions are disabled for standard switches.

(iv) The address space from the CA0..3 lines (CA = column address) is decoded into 16 columns. The first four columns are dedicated to the encoders, two encoders are contained in each column. The space from 04h to 0Fh is divided by a soft (user definable) demarcation termed keyBoardEnd. The address can be programmed via the {K0p} function. Columns 04h through keyBoardEnd IQC826 Specification - rev 1.0

A-4 inclusive are keyboard switches, keyBoardEnd+1 through 0Fh are standard switches. KeyBoardEnd can be set to 3 to set the entire space to standard switches. Alternately it can be set to 0Fh to set the entire space to keyboard switches. Any intermediate value provides for a mixture of keyboard and standard switches to be serviced.

(v) The output buffer contains the scan codes of the switches and the addresses of the encoders that have changed since the last read. If the buffer is empty then the IQC826 returns null [ ]. Thus the {O} function is a convenient method of getting the status of the chip. The buffer is reset once it is read. The buffer is 4 bytes deep and will discard information once it is full. The status pin is taken low on the entry of any information into this buffer to provide for hardware interrupt driven systems.(see IQ Command set for soft interrupt technique)

(v) With LED displays the width can be soft adjusted over the range one through eight. The narrower the display the brighter the digits.

(vi) A cursor is implemented in LED mode either by multiple scans of the selected digit/character or by flashing the lowest horizontal segment.

(vii) The chip employs two write signals of user definable polarity. The DWRT signal is the display write signal used by the LED and LCD displays. The PWRT signal is a peripheral write signal, again of user definable polarity, that is active immediately after a write to the data port with the {W0pq} command.

- 1.4 -

IQC826 Specification - rev 1.0

A listing of the device pins and their function

| Pin Name | Function |
|---|---|
| CA0..3 | Encoded column address output for encoder and keyboard scanning. |
| R0..3 | The row return lines from the encoder and keyboard matrix. |
| Reset | An active high reset with Schmitt input. |
| RxD | The UART receive input |
| TxD | The UART transmit output |
| !INIT | An active low output signal generated immediately after a hardware reset used to strobe initialization data into the chip. |
| !Status | An active low signal which signifies there is data in the output buffer. |
| Sound | Sound output pin - requires buffering to drive a loudspeaker. |
| RS | Register select output signal to LCD module. |
| DWrt | Display write pulse of user defined polarity - default active low. |
| PWrt | Peripheral write pulse of user defined polarity - default active low. |
| Xtal2 | Crystal oscillator output pin |
| Xtal1 | Crystal oscillator input pin. |
| Gnd | Power ground pin. |
| A0 | Aux port 0 |
| A1 | Aux port 1 and LCD0 enable |
| A2 | Aux port 2 and LCD1 enable |
| A3 | Aux port 3 and LED3 enable |
| A4 | Aux port 4 and LED2 enable |
| A5 | Aux port 5 and LED1 enable |
| A6 | Aux port 6 and LED0 enable |
| A7 | Aux port 7 and LED column enable |
| D0..7 | Data port and device hardware initialization inputs. |
| VCC | Positive supply |

- 1.5 -

IQC826 Specification - rev 1.0

A-6

CONTENTS

2. Electrical Specification .................................................................................... 2.1
   2.1. Absolute Maximum Ratings ..................................................................... 2.1
   2.2. DC Electrical Characteristics .................................................................... 2.1
   2.3. AC Electrical Characteristics .................................................................... 2.1
      2.3.1. Encoder and Switch Timing and Address Generation ............... 2.2
      2.3.2. Data and Auxiliary Port Timing ................................................. 2.3
      2.3.3. LCD Display Timing ................................................................. 2.4
      2.3.4. LED Display Timing ................................................................. 2.5
      2.3.5. LED Decode ROMs ................................................................. 2.6
   2.4. Initialization of Comm Port, Checksum and Device Address ................... 2.7
   2.5 Hardware Reset ....................................................................................... 2.7

3. Hardware Application Notes ........................................................................... 3.1
   3.1. Connecting Encoders and Switches ........................................................ 3.1
      3.1.1. Connection of Mechanical Rotary Encoders ............................ 3.1
      3.1.2. Connection of Optical Rotary Encoders ................................... 3.2
      3.1.3. Keyboard and Standard Switches ............................................ 3.2
      3.1.4. Keyboard Switch Scan Codes .................................................. 3.3
      3.1.5. Standard Switch Scan Codes .................................................. 3.3
   3.2. Connecting Peripherals, Indicators or Actuators ..................................... 3.4
   3.3. Connecting LCD Displays ........................................................................ 3.4
      3.3.1. LCD Display Combinations ...................................................... 3.5
   3.4. Connecting LED Displays ........................................................................ 3.6

4. Software Interface Specification ..................................................................... 4.1
   4.1. IQ Command Set ..................................................................................... 4.2
   4.2. Initialization ............................................................................................. 4.5
   4.3. Error Codes ............................................................................................. 4.6
   4.4. Comms Channel Error Handling .............................................................. 4.7

5. Other Notes .................................................................................................... 5.1
   5.1. Using Acknowledge ................................................................................. 5.1
   5.2. Working with Encoders ............................................................................ 5.2
   5.3. Working with LCD Displays ..................................................................... 5.2
   5.4. Working with LED Displays ..................................................................... 5.2
   5.5. Working with Sound ................................................................................. 5.3

IQC826 Specification - Electrical Specification

2. Electrical Specification

2.1. Absolute Maximum Ratings

| Parameter | | Rating | Unit |
|---|---|---|---|
| Operating temperature under bias | Commercial | 0 to 70 or | °C |
| | Industrial | -40 to 85 | |
| Storage temperature | | -65 to 150 | °C |
| Maximum IOL per pin | | 15 | mA |

*Table 2.1*

2.2. DC Electrical Characteristics

Tamb = 0°C to + 70°C, Vcc=5V±10%, Vss=0V   Commercial version.
Tamb = -40°C to + 85°C, Vcc=5V±10%, Vss=0V   Industrial version.

| Symbol | Parameter | Test Conds | Min Limit | Typ | Max Limit | Unit |
|---|---|---|---|---|---|---|
| VIL | Input low voltage | | -0.5 | | 0.2VCC - 0.1 | V |
| VIH | Input high voltage | | 0.2VCC + 0.9 | | VCC + 0.5 | V |
| IIL | Logic 0 input current | | | | -50 | uA |
| VOL | Output low voltage | IOL =1.6mA | | | 0.45 | V |
| VOH | Output high voltage | IOH= -60uA | 2.4 | | | V |
| | | IOH= -25uA | 0.75VCC | | | V |
| | | IOH= -10uA | 0.9VCC | | | V |
| ICC | Power supply current | Vcc=4.5v to 5.5v | | 10 | 17.5 | mA |

*Table 2.2*

2.3. AC Electrical Characteristics

Tamb = 0°C to + 70°C, Vcc=5V±10%, Vss=0V   Commercial version
Tamb = -40°C to + 85°C, Vcc=5V±10%, Vss=0V   Industrial version
Crystal freq = 11.06MHz ± 100ppm.
All pins are assumed to be loaded with 80pF.

*Note: The bulk of the AC parameters have a single value and do not have the more usual min, typical, max format. This is because the internal synchronous logic design of the IQC826 provides for timings that are almost exclusively dependent on the crystal frequency.*

The IQC826 AC characteristics are detailed in the following sections:

(1) Switch and encoder timing.
(2) Data and auxiliary port timing
(3) LCD display timing.
(4) LED display timing and decode ROMs.

rev 1.0

IQC826 Specification - Electrical Specification

2.3.1. Encoder and Switch Timing and Address Generation

The IQC826 samples the row input lines at regular intervals in time - note however that the decode time for encoders and switches is different.

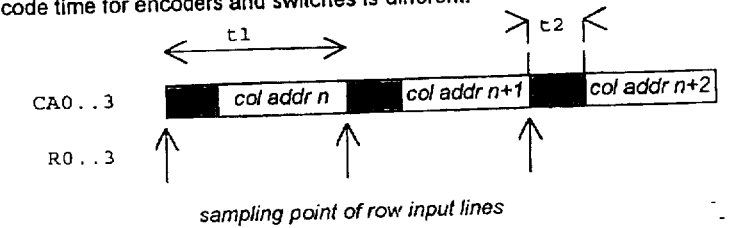

*sampling point of row input lines*

Figure 2:
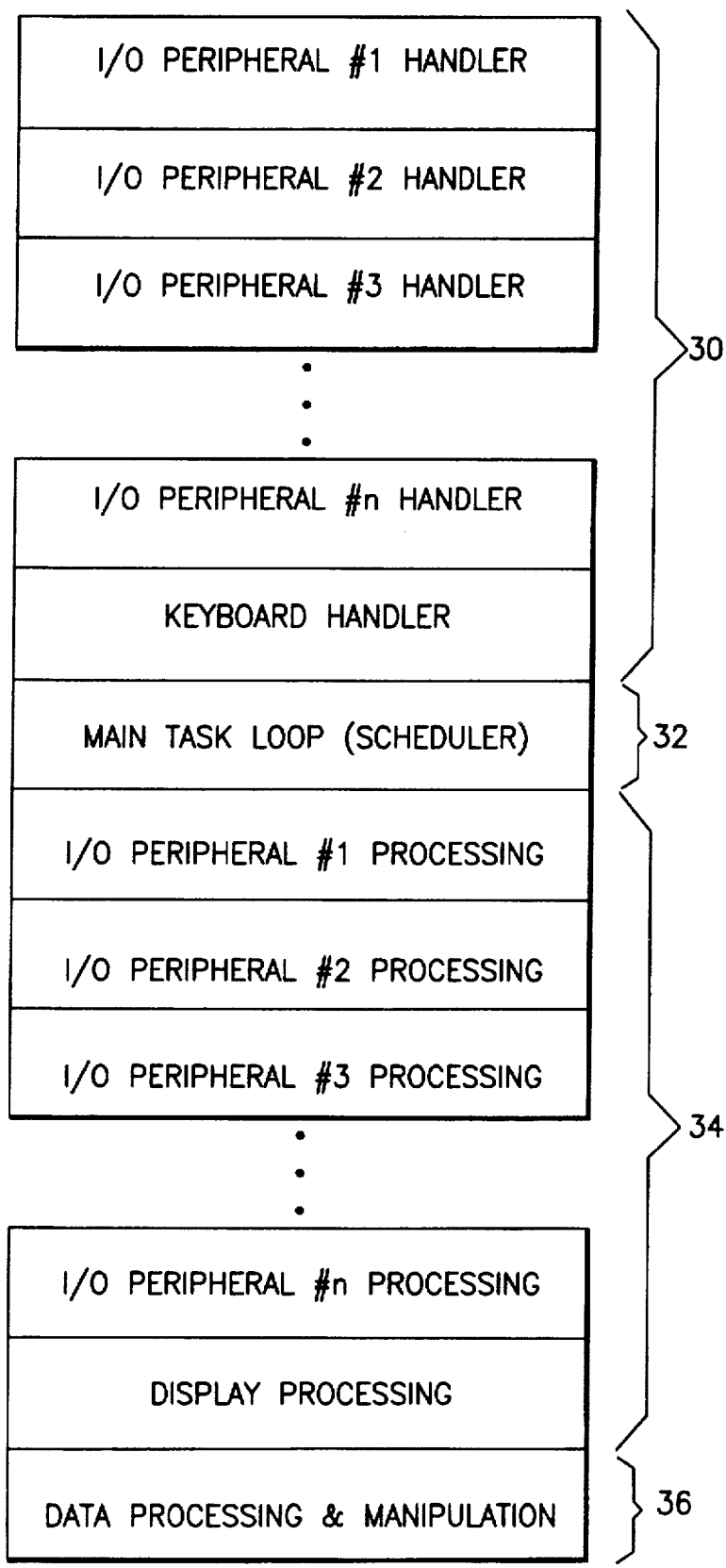
FIG. 2 is a schematic block diagram illustrating prior art system software handling of peripheral devices on an interrupt driven bus.

*Address generation and processing timing for encoders and switches*
*Figure 2.1*

| Parameter | Value | Units |
|---|---|---|
| t1 - column address generation period | 555 | us |
| t2 - read and process encoder data | 80 | us |
| t2 - read and process switch data | 160 | us |

*Parameter specification for figure 2.1*
*Table 2.1*

As encoders can create signals of much higher frequency than can standard switches the encoders are scanned more frequently than the switch space. A switch column is scanned on the conclusion of each <u>complete</u> scan of the encoder space *(for a definition of encoder and switch address space see Section 3)*. Thus a typical scan sequence for a system configured for all encoders would be:

0,1,2,3,4,0,1,2,3,5,0,1,2,3,6,0,1,....

A scan is initiated every 555us thus in a fully populated system with 8 encoders (4 columns) and 48 switches (12 columns) each encoder will be scanned at a maximum interval of:

Maximum encoder sampling period = 5 * 555us = 2.775 ms

Similarly a switch (column) will be scanned with a maximum interval of:

Maximum switch sampling period = 5 * 12(cols) * 555us = 33.3ms

In a system with 4 encoders (2 columns) and 16 switches (4 columns) the sampling periods are:
Encoder sampling period = 3 * 555us = 1.665ms
Switch sampling period = 3*4(cols) * 555us = 6.66ms Note that the encoder scan rate is only dependent on the number of encoders - it is independent of the number of switches employed in the system.

rev 1.0      - 2.2 -

IQC826 Specification - Electrical Specification

2.3.2. Data and Auxiliary Port Timing

The data and auxillary port timing is shown in figure 2.2. A write to the auxillary port with {W1pq} results in this port assuming the value 'pq' hex. When a write is made to the data port {W0pq} then a write pulse, of user defined polarity, is generated 1us after the data lines are stable. It is also guaranteed at the time the write pulse is active that the auxillary port lines will be stable at their defined value. (These lines are also used as enables for the LED and LCD displays).

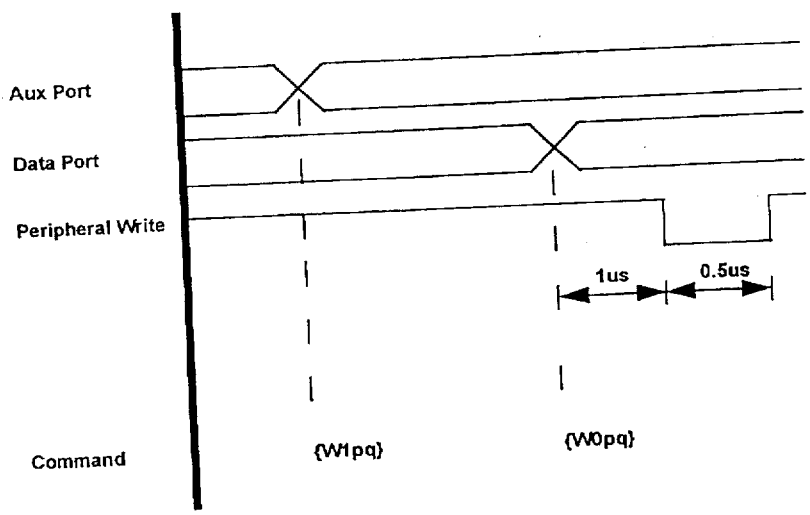

*Macro view of the utilization of the data and address ports*
*Figure 2.2*

This timing arrangement makes it easy to write to bus peripherals by first writing an address (either decoded or encoded) to the auxillary port with the {W1pq} command, and then writing data to the data port with the {W0pq} command.

rev 1.0      - 2.3 -

IQC826 Specification - Electrical Specification                          A-10

2.3.3. LCD Display Timing

The smart LCD display drive waveforms are shown in figure 2.3. The command and character write cycles are only differentiated by RS being low/high respectively. These timings are compliant with the popular smart displays from Optrex, Sharp, Seiko and  others. The enable pulse for the smart LCD displays is generated via a two input NOR gate as shown in the adjacent diagram. The output from this NOR gate is shown in the diagrams below for the purposes of clarity. As this gate is external to the IQC826 no specifications on timing are given but with any of the popular TTL families the pulse output is essentially equal to 't3' - the IQC826 write pulse width.

Note that if only a single LCD display is being used then the NOR gate can be omitted, the display write pulse made active high with the {P01} command and then taken directly to the LCD enable line.

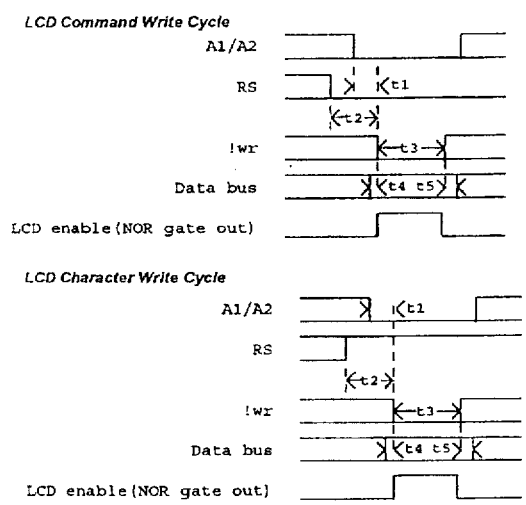

*Timing waveforms for the LCD displays*
*Figure 2.3*

| Parameter | Value | Units |
|---|---|---|
| t1 - Aux port set up time prior to write going low | >200 | ns |
| t2 - Register select set up time prior to write going low | >1.0 | us |
| t3 - Write pulse width | >450 | ns |
| t4 - data port set up time prior to write going low | >100 | ns |
| t5 - data port hold time subsequent to write going high | >100 | ns |

*Parameter specification for figure 2.3*
*Table 2.2* rev 1.0                                    - 2.4 -

IQC826 Specification - Electrical Specification

2.3.4. LED Display Timing

The LED displays are connected in a 4 rows x N columns matrix - N is user definable but has a maximum value of eight. The waveforms in figure 2.4 relate to mode 0 - set with the {E0xp} command - modes 1 through 3 provide for all the other row and column drive polarity permutations. The IQC826 walks a zero along the columns, the digits for the active column are then updated from row 0 through row 3. All four rows (displays) are written to, regardless of the number in use in a particular application.

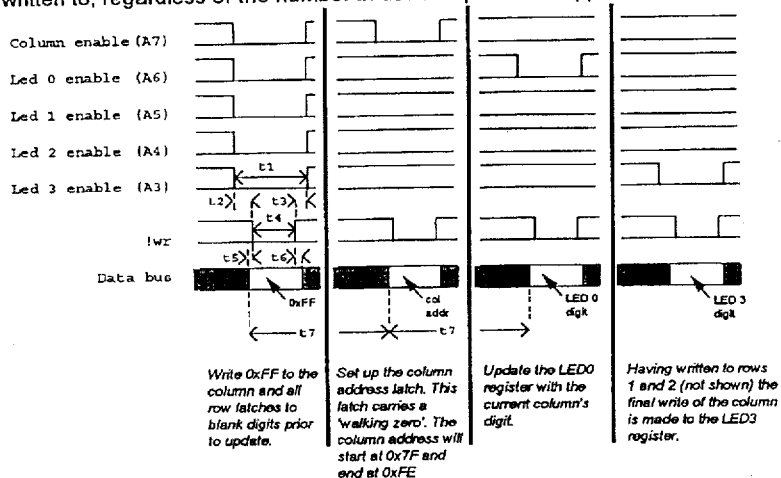

*Timing waveforms for a common anode LED display*
*Figure 2.4*

| Timing Parameter | Value | Units |
|---|---|---|
| t1 - aux port display register enable width | 14 | us |
| t2 - aux port set up time prior to write going low | 6 | us |
| t3 - aux port hold time subsequent to write going high | 7 | us |
| t4 - write pulse width | 1 | us |
| t5 - data port set up time prior to write going low | 3 | us |
| t6 - data port hold time subsequent to write going high | 4 | us |
| t7 - interval between register updates. | 30 | us |

*Parameter specification for figure 2.4*
*Table 2.3*

IQC826 Specification - Electrical Specification

A-12

2.3.5. LED Decode ROMs

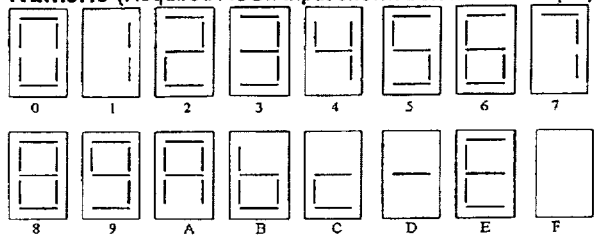

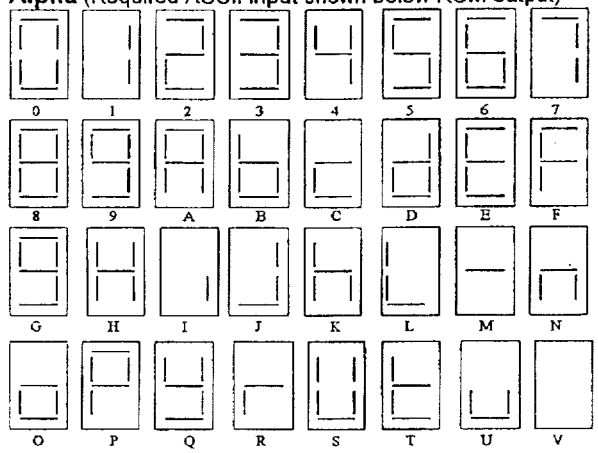

The IQC826 has two decode modes - numeric and alpha. In numeric mode any digit can have the decimal point on or off. Ordinarily only one of the decimal points will be on but if two, three digit numbers were to be displayed on a single 8 wide display, for example, then each could have its own decimal point.

In alpha mode the decimal point bit is used instead to decode a second page of characters. This enables 17 of the 26 characters of the alphabet to be displayed on standard seven segment displays. Certain letters such as capital 'O' and 'S' are displayed the same as the 'numbers' 0 and 5.

Examples of typical messages and numbers displayed in exponent format are given opposite.

LED displays 0 and 1 can be in a different mode to displays 2 and 3. However setting the mode for LED display 0 also sets the mode for 1 (and vice versa) and setting the mode for LED display 2 sets the mode for display 3

*Description of the Numeric and Alpha LED decode ROMs*
*Figure 2.6* rev 1.0 — - 2.6 -

IQC826 Specification - Electrical Specification          A-13

2.4. Initialization of Comm Port, Checksum and Device Address

The IQC826 UART has a fixed 8N1 (8 data bits, no parity, 1 stop bit) format. The speed and utilization of a checksum are programmable. The IQC826 will read a register enabled via the !INIT signal immediately after either a hardware or software reset. If this register is not present then the data bus will assume the 0FFh state and the default communications parameters will be selected. These are:

| (i)   | Comms rate     | = | 9600 bps |
| (ii)  | Checksum       | = | OFF      |
| (iii) | Device Address | = | 00       |

Tables 2.4 and 2.5 detail the programmable options with H = high, L = low and X=don't care.

| Comms Rate (bps) | D7 | D6 | D5 | D4 | D3 | D2 | D1 | D0 |
|---|---|---|---|---|---|---|---|---|
| 1200 | X | X | X | X | X | H | L | L |
| 2400 | X | X | X | X | X | H | L | H |
| 4800 | X | X | X | X | X | H | H | L |
| 9600 | X | X | X | X | X | H | H | H |
| 19200 | X | X | X | X | X | L | H | H |
| Error Check | | | | | | | | |
| Checksum OFF | X | X | X | X | H | X | X | X |
| Checksum ON | X | X | X | X | L | X | X | X |

*Table 2.4*

The lines D7 (msb) through D4 (lsb) represent the device address with active low logic. If these lines are left open circuit then the device will assume address 00. Some other example addresses are given in table 2.5.

| Device Address (dec) | D7 | D6 | D5 | D4 | D3 | D2 | D1 | D0 |
|---|---|---|---|---|---|---|---|---|
| 00 | H | H | H | H | X | X | X | X |
| 03 | H | H | L | L | X | X | X | X |
| 10 | L | H | L | H | X | X | X | X |
| 15 | L | L | L | L | X | X | X | X |

*Table 2.5*

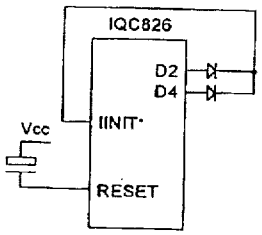

*Figure 2.7*
*Hardware initialization using diodes*

Figure 2.7 illustrates how to use a pair of diodes to initialize the IQC826 to 19.2K bps and set the address to 01.

2.5 Hardware Reset

The hardware reset input on the chip is active high. This pin can either be driven from an external logic output or a one micro-farad capacitor should be wired from this pin to the positive supply - see figure 2.7.

rev 1.0          - 2.7 -

IQC826 Specification - Hardware Application Notes

3. Hardware Application Notes

3.1. Connecting Encoders and Switches

The pins CA0..3 are the encoded column address for the encoder and switch space. Either one or two, three to eight line de-multiplexer chips are required (depending on the number of switches to be scanned) to provide the column select signals (active low logic). This space of 16 columns by 4 return lines is segmented as detailed in table 3.1:

| Address 0 -> 3 | encoders |
|---|---|
| Address 4 -> keyboardEnd | keyboard switches |
| Address keyboardEnd+1 -> 0xF | standard switches. |

*Definition of the Encoder / Keyboard / Switch Space*
*Table 3.1*

Two encoders or four switches are contained in a column. Thus the encoder space can address 8 encoders and the switch space can address 48 switches. The number of switches addressed can be increased to 176 with the use of SHIFT, CONTROL and ALT. key modifiers. These modifiers are always located at the start of the keyboard space (i.e. column 4) with the assignments given in table 3.2.

| Row 0 | SHIFT |
|---|---|
| Row 1 | CONTROL |
| Row 2 | ALT. |

*Location of the Shift, Control and Alt Keys*
*Table 3.2*

3.1.1. Connection of Mechanical Rotary Encoders

Mechanical encoders are interfaced to the chip as shown in figure 3.1. The diodes ensure that an encoder cannot short together the return lines. Note also that the

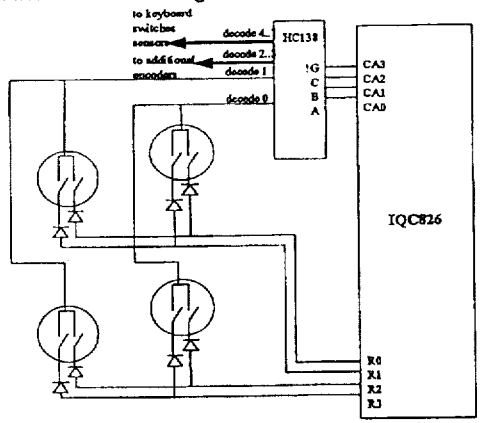

*Connecting mechanical rotary encoders*
*Figure 3.1* rev 1.0

IQC826 Specification - Hardware Application Notes common terminal is taken to the address decoder output and not to ground as is more usually the case.

3.1.2. Connection of Optical Rotary Encoders

Because optical encoders have active outputs a tri-state buffer is required to couple the outputs into the IQC826. In the example, shown in figure 3.2, four optical encoders are

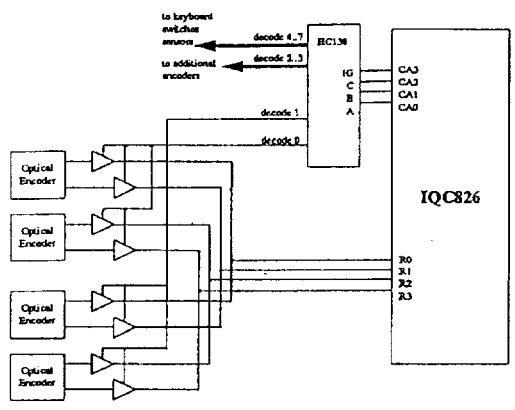

Tri state buffers 74HC367
*The connection of optical encoders*
*Figure 3.2* coupled to the IQC826 via a 74HC367.

3.1.3. Keyboard and Standard Switches

As described in table 3.1 the space from 04h to 0Fh can be partitioned into two switch types; keyboard switches and standard switches. The differences between these switch types is detailed below.

Keyboard switches:
    1. Only enter a scan code in the output buffer on the depression of the switch.
    2. Can have the SHIFT, CONTROL and ALT. modifiers applied to them.
    3. Can have auto-repeat applied.

Standard switches:
    1. Enter scan codes for both the depression and the release of the switch.
    2. Cannot have the SHIFT, CONTROL and ALT. modifiers applied to them.
    3. Cannot have auto-repeat applied.

In either case the IQC826 will debounce a depression or release by ensuring that the state change is maintained for two successive scans of the keyboard. Only when the state is stable will the scan code be entered into the output buffer. Figure 3.3 illustrates a typical connection to both mechanical encoders and a keypad.

rev 1.0          - 3.2 -

IQC826 Specification - Hardware Application Notes

A-16

3.1.4. Keyboard Switch Scan Codes
Keyboard switches return the following scan codes:

| CONTROL | SHIFT | encoded column address | encoded row address |
|---------|-------|------------------------|---------------------|
| 1 bit   | 1 bit | 4 bits                 | 2 bits              |

*Table 3.3*

ALT sets both the CONTROL and SHIFT bits.

*Example*
(i) Given keyboardEnd is set to 8, and the switch at column 5 row 2 is pressed then the scan code 00010110 (0x16) will be entered into the output buffer.
(ii) Given keyboardEnd is set to 8, and the switch at column 6 row 3 is pressed and released together with SHIFT then the scan code 01011011 (0x5B) will be entered into the output buffer.

3.1.5. Standard Switch Scan Codes
Standard switches return the following scan codes:

| Release | Reserved - always zero | encoded column address | encoded row address |
|---------|------------------------|------------------------|---------------------|
| 1 bit   | 1 bit                  | 4 bits                 | 2 bits              |

*Table 3.4*

*Example*
(i) Given keyboardEnd is set to 8, and the switch in column 9 row 1 is pressed and released then 2 scan codes 00100101, 0x25 (on depression) and 10100101, 0xA5 (on release) will be entered into the output buffer.

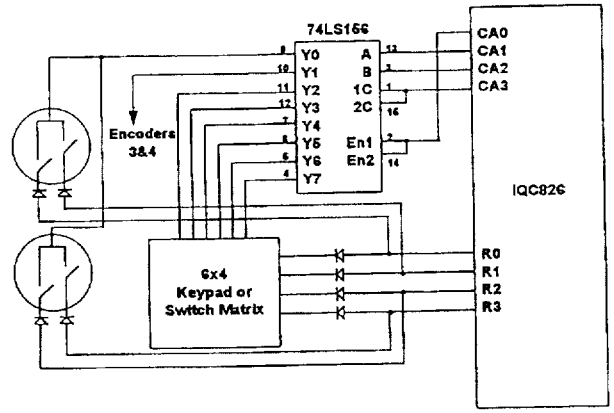

*Connection to Encoders and Keypad*
Figure 3.3 rev 1.0

IQC826 Specification - Hardware Application Notes

3.2. Connecting Peripherals, Indicators or Actuators

The IQC826 has a bus write capability that enables an almost limitless number of peripherals to be addressed. These peripherals might typically include indicators, relays, and additional smart displays (LED, LCD, VF). Figure 3.4 shows the connection of two 8 bit driver/latches. If you are using a driver with an active high enable (such as Allegro's UCN5801) then set the peripheral clock polarity high with the {P11} command. Then write the decoded address , ie to address the first latch write {W101} taking the enable line high. Finally when writing the data with the {W0pq} command a clock pulse is generated on the peripheral write output strobing the data into the latch.

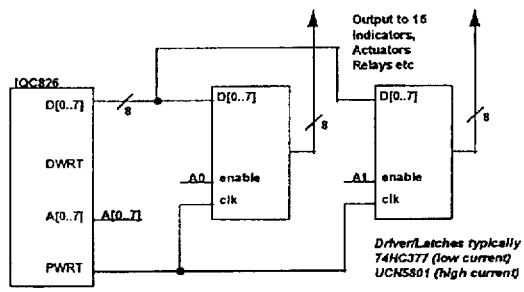

*Connecting peripherals via the data and aux ports*
*Figure 3.4*

3.3. Connecting LCD Displays

The IQC826 is able to handle the following formats of smart LCD displays produced by Sharp, Optrex, Seiko and a number of other manufacturers:

|  | 16 chars x 2 lines | 16 chars x 4 lines |
|---|---|---|
|  | 20 chars x 2 lines | 20 chars x 4 lines |
|  | 24 chars x 2 lines |  |
| 40 chars x 1 line | 40 chars x 2 lines | 40 chars x 4 lines |

The IQC826 has two LCD enable lines - LCD0 and LCD1. These lines allow a maximum of 4 lines of LCD display to be used - each of the LCD lines is referred to as a 'display'. Each of these displays can be separately cleared, written to, etc. as a consequence of functionality within the IQC826.

Figure 3.5 shows the connection of a single LCD display module to the IQC826. No external components are required. The LED scan MUST be turned OFF with the {E3000} command, and the DWRT signal, for most LCDs, is programmed to be active high.

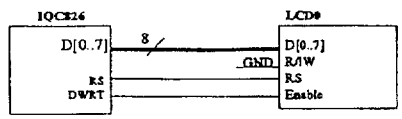

*Connection of a Single LCD Display Module (1 thro 4 lines)*
*Figure 3.5* rev 1.0

IQC826 Specification - Hardware Application Notes

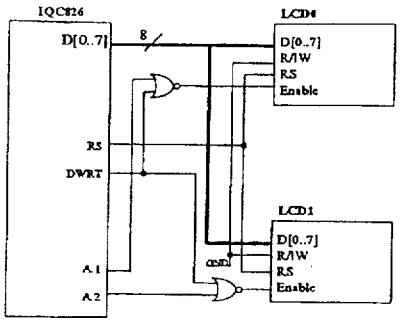

*Connection of a Two Seperate LCD Display Modules*
*Figure 3.6*

With the addition of two NOR gates and the use of the LCD display enable signals from the IQC826, two separate LCD displays can be addressed - see figure 3.6. These displays can operate in conjunction with LED displays now that specific decode signals are being used. The display write signal must now be programmed to be active low - the default setting.

3.3.1. LCD Display Combinations
The LCD display enables can have any combination of display types attached provided they are of the same width (at least the IQC826 will treat them as such) and that the total number of lines is less than or equal to four. Table 3.5 illustrates the possible combinations with comments.

| LCD0ENABLE | LCD1ENABLE | COMMENTS |
| --- | --- | --- |
| N chars x 1 row | N chars x 1 row | The display on LCD0Enable is display 0. The display on LCD1Enable is display 2. |
| N chars x 2 rows | N chars x 1 row | The upper line of the display on LCD0Enable is display 0, the lower line on this display is display 1. The one line display on LCD1Enable is display 2. |
| N chars x 1 row | N chars x 2 rows | The one line display on LCD0Enable is display 0. The upper line of the display on LCD1Enable is display 2, the lower line on this display is display 3. |
| N chars x 2 rows | N chars x 2 rows | The upper line of the display on LCD0Enable is display 0, the lower line is display 1. The upper line of the display on LCD1Enable is display 2 the lower line is display 3. |
| 16 or 20 chars x 4 rows | NONE | Displays are in numerical order 0 through 3. No display can be addressed on LCD1Enable. |

*Table 3.5* rev 1.0     - 3.5 -

IQC826 Specification - Hardware Application Notes

Note that the 40 x 4 displays are electrically two 40 x 2 displays in a single package. Thus these displays have two enables and are wired to the IQC826 and treated exactly the same as two 40 x 2 displays.

3.4. Connecting LED Displays

The LED outputs can be used in the following configurations:

(1) Decoded numeric or alpha mode and the displays driven via TTL latches.

(2) Undecoded mode where the user either provides an external ROM for a custom decode or uses the outputs to directly drive other types of display, eg. bargraph.

Figure 3.7 illustrates the connection of common anode LED displays to the IQC826. The column address is a walking zero that is used to drive a PNP column drive transistor. The collector of this transistor is wired to the common anode connection of all four LED digits in any particular column. If peak segment currents of circa 20mA are sufficient then standard TTL can sink this directly. Note that the width of the display is soft programmable from one to eight digits - the narrower the display the brighter it will be. Note also that the peak collector current of the column drive transistor is as much as 32 times the segment current (4 digits * (7 segments + decimal point)). If the segment current is 20mA then the collector current for the column drive transistor could be a maximum of 640mA - ensure that your choice of PNP transistor type can source this much current.

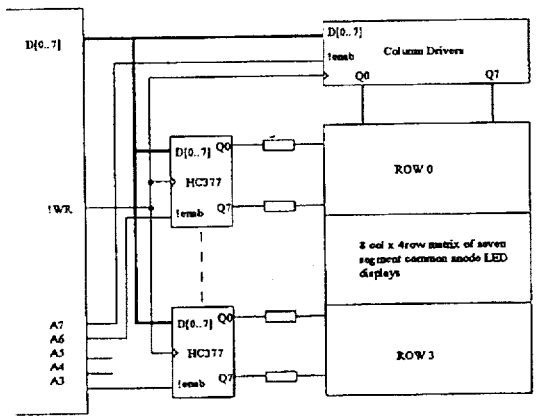

*Connection of common anode LED displays to the IQC826*
*Figure 3.7*

In the undecoded byte mode the IQC826 will output the column address row 0 and row 2. A ROM on these rows will provide for a custom decode. This mode is also useful for driving bargraph displays and up to 128 discrete LEDs (8 bits x 8 columns x 2 rows). Figure 3.8 illustrates a mixed mode system where rows 0 and 1 are decoded rev 1.0 - 3.6 -

IQC Specification - Hardware Application Notes
seven segment displays and row 2 is in undecoded byte mode and is driving a mixture of bargraph and discrete LEDs.
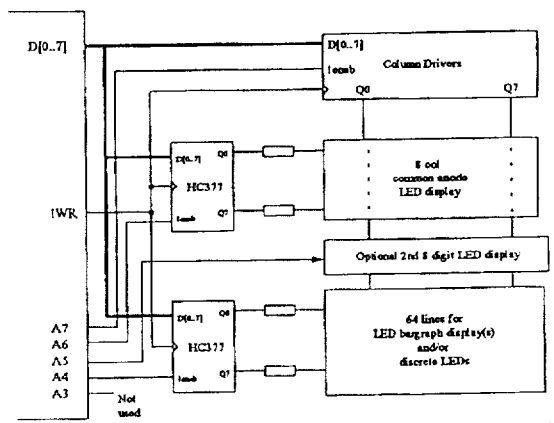
*Illustration of mixed decoded and undecoded LED displays*
*Figure 3.8*

IQC826 Specification - Software Interface Specification

A-21

4. Software Interface Specification

The software interface to the IQC826 is defined exclusively via the IQ Command Set. This command set is common to all IQ's Smart I/O Processors and the subset applicable to the IQC826 is detailed in this section.

The IQ Command Set comprises 3 distinct message types {command}, [data], and (errors) where the braces "{ }", brackets "[ ]" or parentheses "( )" determine the type of message. The host transmits commands to the Smart I/O Processor(s) to which it will respond with either [data], (errors), or nothing (i.e. writing to a display with acknowledge turned off). In addition to these message types there is the special char '^' which signifies an acknowledgment of task completed from the Smart I/O Processor to the host.

The command messages are of the form:
    {<addr><letter><params>}[checksum]

The address is a two decimal digit number that can range from 00 to 15 (decimal) for the IQC826. If the address is omitted then the message becomes a global broadcast. The <letter> defines a specific instruction. The parameter list that follows is of variable length but all parameters must be supplied and be within range otherwise the instruction will be rejected and, if enabled, an error message is returned to the host. There is an optional checksum on messages - this feature is enabled as described in section 2.4. The checksum is derived by summing all the transmitted characters using modulo 256 arithmetic i.e. it represents the least significant byte of the sum (ignoring overflows) - which is not necessarily an ASCII character. Note also that the checksum itself is not included in the computation.

Examples:

| Host to IQC826 | IQC826 to Host | Comments |
|---|---|---|
| {O} | [0118] | Host asks an 826 in point-to-point mode for the contents of the output buffer. The 826 responds with a data message showing that encoder 0x01 and a switch with scan code 0x18 have changed state. *This is an invalid message if two or more 826's are connected to the host -see below* |
| {01O} | [0118] | As above but out-going command specifies the 826 in a network at address 01 (dec). |
| {Z} | | Global reset of all Smart I/O devices. |
| {A1} | | Global turning on of command acknowledge. |
| {00C0042} | ^ | Initialize the LCD display on the 826 at address 00 to 4 lines 20 chars wide. The '^' is returned as an acknowledgment once the display is initialized - assuming, of course, acknowledge is switched on. | rev 1.0

IQCE Specification - Software Interface Sp    ification

A-22

4.1. IQ Command Set [1]

The command set for the IQC826 is listed below. All the examples are global broadcasts, remember to preceed these messages with an address where necessary. The following conventions are used:

- x    indicates a boolean (2 state) parameter.
- p,q    are hex numbers.
- n    is a display enable line (0 to1 for LCD, 0 to 3 for LED).
- d    is a display number (0 to 3 for both LCD and LED).

| Command | Description | Example |
|---|---|---|
| LCD Initialization Commands | | |
| C0npq | Initialize smart LCD display(*)<br>n=LCD display enable line (0 or 1)<br>p=number of display lines (1<=p<=4)<br>q=width where 1=16chars, 2=20chars<br>3=24chars, 4=40chars. | {C0022}<br>Initialize the display on LCD enable line 0 as a 2 line display of width 20 chars. |
| C1 | Reserved | |
| C2x | Define cursor type<br>x=0 blinking underbar<br>x=1 flashing digit | {C21}<br>Make the cursor a flashing digit. |
| C3 | Reserved | |
| C4n | Download user defined characters as string of bytes - terminate with '}'<br>n=LCD display enable line (0 or 1) | {C40}<string of bytes>'}'<br>Download <string of bytes> to the display on LCD enable line 0. |
| C5d | Make display d the active display.<br>Note this command <u>must</u> be executed prior to any LCD active display commands. | {C51}<br>Make LCD display 1 the active display. |
| LCD Active Display Commands | | |
| D0 | Cursor home and clear the active LCD display | {D0}<br>Cursor home and clear the active LCD display |
| D1xpq | Transmit a direct byte to the active display.<br>x=state RS line, pq=byte to write to display. | {D107F}<br>With RS low write the byte 0x7F to the active display. |
| D2x | Turn on/off the edit cursor and/or display<br>x=0 turn off the edit cursor<br>x=1 turn on the edit cursor | {D21}<br>Turn on the cursor on the active display. |
| D3pq | Move the cursor to character position 'pq' hex. Note if the cursor position is less than 0x10 then both p and q must still be supplied -see example | {D30A}<br>Move the cursor to char position 0xA (10 dec) |
| D4c | Write ASCII char 'c' at the current cursor position. | {D4A}<br>Write 'A' at the current cursor position. |
| D5 | Enable the writing of a string to the active display starting at the home cursor position, terminate with either 0xA(CR), 0xD(LF) or 0x0 | {D5}Hello\n<br>Write the word 'Hello' and terminate with a LF. |

---

[1] The IQ Command Set is copyright © 1994 IQ Systems, Inc - all rights reserved.

rev 1.0    -4.2-

IQC826 Specification - Software Interface Specification

| Command | Description | Example |
|---|---|---|
| LED Initialization Commands | | |
| E0pq | Initialize LED displays to be:<br>p=0 active low row, active low column drive<br>p=1 active high row, active high column drive<br>p=2 active low row, active high column drive<br>p=3 active high row, active low column drive<br>q=width(1 to 8) | {E008}<br>Initialize displays to be active low row and column drive and of width 8 digits. |
| E1x | Flash all displays at approx 3 Hz rate.<br>x=0 turn flash off<br>x=1 turn flash on | {E11}<br>Flash all displays |
| E2x | Define cursor type<br>x=0 blinking underbar<br>x=1 bright up digit | {E21}<br>Make the cursor for all LED displays a bright up digit. |
| E3dxp | Define display format<br>d = display (0 -> 3)<br>x=0 left format, x=1 right format<br>p=0 display scan disabled<br>p=1 undecoded byte mode.<br>p=2 numeric mode<br>p=3 alpha mode | {E3112}<br>Make LED display1 a right formatted display in numeric mode. |
| E4 | Reserved | |
| E5d | Make display d the active display.<br>Note this command must be exercised prior to any active display commands and subsequent to any format changes effected with the {E3nxp} command | {E53}<br>Make LED display 3 the active display. |
| LED Active Display Commands | | |
| F0 | Cursor home and clear the active LED display | {D0}<br>Cursor home and clear the active LED display |
| F1 | reserved | |
| F2x | Turn on/off the edit cursor<br>x=0 turn off the edit cursor<br>x=1 turn on the edit cursor | {F21}<br>Turn on the cursor on the active display. |
| F3p | Move the cursor to character position 'p' hex where 1 <= p <= LED display width. | {F34}<br>Move the cursor to char position 4. |
| F4c | Write ASCII char 'c' at the current cursor position. | {F4A}<br>Write 'A' at the current cursor position. |
| F5 | Enable the writing of a string to the active display starting at the home cursor position, terminate with either 0xA(CR), 0xD(LF) or 0X0 | {F5}1.234\n<br>Write the word '1.234' and terminate with a LF. | rev 1.0

IQC826 Specification - Software Interface Specification  A-24

| Command | Description | Example |
|---|---|---|
| Flow Control Commands | | |
| Ax | Acknowledge reporting control<br>x=0 acknowledge off<br>x=1 acknowledge on | {A1}<br>Turn task acknowledge on. |
| Bx | Error reporting control<br>x=0 error reporting off<br>x=1 error reporting on. | {B1}<br>Turn IQC826 errors on. |
| Keyboard / Encoder Commands | | |
| K0p | Define keyboardEnd<br>encoderEnd<p<=0xF | {K08}<br>Set keyboardEnd to address 8. |
| K1p | Define switchEnd<br>keyboardEnd< p <=0xF | {K1A}<br>Set switchEnd to 0xA |
| K2pq | Auto repeat control.<br>p=0 auto repeat off<br>p=1->0xF sets delay in intervals of 250ms<br>q=1->0xF sets rep period in intervals of 250ms | {K221}<br>Turn on auto repeat with a delay of 0.5 sec and a rep period of 0.25 sec |
| M0p | Define encodersEnd<br>0<=p<=3 | {M01}<br>Define encodersEnd to be addr 1 (4 encoders) |
| M1x | Encoder saturation control.<br>x=0 saturation off (counters roll over)<br>x=1 saturation on (counters limit at 0x7F pos going and 0x80 neg going) | {M10}<br>Turn off saturation on the encoder counters. |
| N0p<br>N1p | Read encoder 'p' do not reset<br>Read encoder 'p' and then reset | {N15}<br>Read and then reset encoder 5. |
| O | Read the output buffer | {O}<br>Read the output buffer of the IQC826. |
| Miscellaneous Commands | | |
| P0x | Define the display write signal polarity.<br>x = 0 active low.<br>x = 1 active high. | {P10}<br>Make the display write signal active low. |
| P1x | Define the peripheral write signal polarity.<br>x = 0 active low.<br>x = 1 active high. | {P11}<br>Make the peripheral write signal active high. |
| Spq | Create sound<br>p = period 1->0xF  (inc of 0.25ms)<br>q = duration 1->0xF (inc of 0.25sec) | {S23}<br>Make a sound of period 0.5ms for a duration of 0.75 secs |
| Wxpq | Write to the data or auxiliary port<br>x=0 data port<br>x=1 aux port<br>pq = hex value to be written | {W05C}<br>Write the value 0x5C to the data port. This will also cause the peripheral write signal to pulse to its active state. |
| Z | Soft reset | {Z}<br>Soft reset the IQC826 | rev 1.0                                    -4.4-

IQC826 Specification - Software Interface Specification

4.2. Initialization
The following is a listing of the state of the chip after a hardware reset.

| Register | Value | Comments |
|---|---|---|
| LCD display width | Undefined | |
| LCD cursor type | Flashing digit | |
| LCD active display | Undefined | |
| LED display RAM | First 16 values of the alpha ROM. | Displays 0 & 1 will have zero through seven, displays 2 & 3 will have eight through 0xF. |
| LED display width | 8 | |
| LED cursor type | Underbar | |
| LED active display | Undefined | |
| LED mode | Alpha | All LED displays |
| Encoders | Undefined | Value will either be -1, 0 , +1 undefined as to which. Encoders can be reset to zero by performing a 'dummy' read with the {N1p} command. |
| Switch debounce RAMs | 0xFF | The switch state and debounce RAMs are initialized to 0xFF. This corresponds to all switches open. |
| EncoderEnd | 3 | |
| KeyboardEnd | 8 | |
| Auto repeat | Off | |
| Auto rep delay | Undefined | |
| Auto rep period | Undefined | |
| Output buffer | Undefined | Initialize with a read buffer command{0}. Discard the returned string the output buffer will now be empty. |
| Comms interrupt | Off | |
| Acknowledge | Off | |
| Sound pitch | Undefined | |
| Sound duration | Undefined | |
| Aux port | 0xFF | The 'steady state' value for the auxiliary port is initialized to 0xFF |
| Data port | 0xFF | The 'steady state' value for the data port is initialized to 0xFF | rev 1.0 -4.5-

IQC826 Specification - Software Interface Specification   A-26

4.3. Error Codes

The following tables list the error codes returned by the IQC826. The 'Error Source' column is terminated at the point in the message the error was detected.

| Code | Error Source | Explanation |
|---|---|---|
| FF |  | Checksum error |
| FE |  | Invalid start character |
| FD |  | Primary msg out of bounds |
| FC |  | Primary msg is a non-function for this chip. |
| LCD | | |
| EF | {CX | X contains a non-hex digit. |
| EE | {CX | X is out of bounds |
| ED | {CXn | n contains a non-hex digit. |
| EC | {CXn | display n is out of bounds. |
| EB | {C0np | p is not a hex digit. |
| EA | {C0np | p is out of bounds. |
| E9 | {C0npq | pq contains a non hex digit. |
| E8 | {C0npq | pq is out of bounds. |
| E7 | {C2x | x is not a hex digit. |
| E6 | {C2x | x is out of bounds. |
| E3 | {DX | X contains a non-hex digit. |
| E2 | {DX | X is out of bounds. |
| E1 | {D1n | n contains a non-hex digit. |
| E0 | {D1n | n is out of bounds. |
| DF | {D1npq | pq contains a non-hex digit. |
| DE | {D2n | n is not a hex digit. |
| DD | {D2n | n is out of bounds |
| DC | {D3pq | pq contains a non-hex digit. |
| DB | {D3pq | pq is out of bounds. |
| LED | | |
| CF | {EX | X contains a non-hex digit. |
| CE | {EX | X is out of bounds. |
| CD | {E0x | x contains a non-hex digit. |
| CC | {E0x | x is out of bounds. |
| CB | {E0xp | p is a non-hex digit. |
| CA | {E0xp | p is out of bounds. |
| C9 | {E1x | x is not a hex digit. |
| C8 | {E1x | x is out of bounds. |
| C7 | {E2x | x is not a hex digit |
| C6 | {E2x | x is out of bounds |
| C5 | {E3d | d is not a hex digit. |
| C4 | {E3d | d is out of bounds. |
| C3 | {E3dx | x is not a hex digit |
| C2 | {E3dx | x is out of bounds |
| C1 | {E3dxp | p is not a hex digit. |
| C0 | {E3dxp | p is out of bounds. |
| BF | {E5d | d is not a hex digit. |
| BE | {E5d | d is out of bounds. |
| BD | {FX | X contains a non-hex digit. |
| BC | {FX | X is out of bounds. |
| BB | {F2x | x contains a non-hex digit. |
| BA | {F2x | x is out of bounds. |
| B9 | {F3p | p is not a hex digit. |
| B8 | {F3p | p is out of bounds. |
| B7 | {F1x | x contains a non-hex digit. |
| B6 | {F1x | x is out of bounds. | rev 1.0            -4.6-

IQC826 S    fication - Software Interface Specification    A-27

Error Codes (cont)

Keyboard

| | | |
|---|---|---|
| AF | {KX | X contains a non-hex digit. |
| AE | {KX | X is out of bounds. |
| AD | {K0p | p contains a non-hex digit. |
| AC | {K0p | p is out of bounds. |
| AB | {K1p | p is not a hex digit. |
| AA | {K1p | p is out of bounds. |
| A9 | {K2p | p is a non-hex digit. |
| A8 | {K2pq | q is a non-hex digit. |

Encoder

| | | |
|---|---|---|
| BA | {MX | X contains a non-hex digit. |
| B9 | {MX | X is out of bounds. |
| B8 | {M0p | p contains a non-hex digit. |
| B7 | {M0p | p is out of bounds. |
| B6 | {M1x | x is not a hex digit. |
| B5 | {M1x | x is out of bounds. |
| B4 | {NX | X contains a non-hex digit. |
| B3 | {NX | X is out of bounds. |
| B2 | {NXp | p contains a non-hex digit. |
| B1 | {NXp | p is out of bounds. |

Sound

| | | |
|---|---|---|
| 9F | {Sp | p is a non-hex digit. |
| 9E | {Spq | q is a non-hex digit. |

Port

| | | |
|---|---|---|
| 9D | {Wx | x is not a hex digit. |
| 9C | {Wx | x is out of bounds. |
| 9B | {Wxpq | pq contains a non hex digit. |
| 9A | {Wxpq | pq is out of bounds. |
| 99 | {P0x | x is not a hex digit. |
| 98 | {P0x | x is out of bounds. |
| 97 | {P1x | x is not a hex digit. |
| 96 | {P1x | x is out of bounds. |

4.4. Comms Channel Error Handling

In addition to the message parsing and error code generation detailed in the previous section, the IQC826 will optionally perform a checksum on the comms link itself. In many embedded applications the UARTs of the IQC826 and the microprocessor will be physically close together and thus one can usually assume the 'channel' to be error free. In such an application the checksum can be safely turned off. For highly secure or remote applications where errors on the channel are possible the checksum should be turned on. All messages are fully formed (i.e. an opening brace followed by ASCII chars and then a closing brace) within the IQC826 before being acted upon. If the checksum fails the message is discarded and an error message, if enabled, is sent to the host. If the checksum is successful then the message itself must parse correctly before being acted upon. *If you are using checksum on a network remember to have error reporting enabled on only one device at a time.* rev 1.0    -4.7-

IQC826 Specification - Other Notes

5. Other Notes
Figure 5.1 illustrates in block diagram form the output memory organization of the chip.

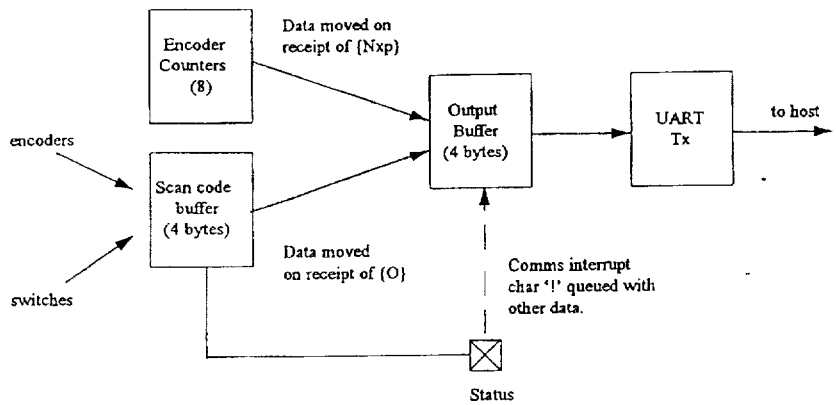

*The output memory organization of the IQC826*
Figure 5.1

Information is queued sequentially in the output buffer. This strict sequencing ensures that it is not possible to get an acknowledge character in the middle of some other message from the UART.

5.1. Using Acknowledge
The smart LCD modules are comparatively slow peripherals. The LCD display initialization command, for example, takes in excess of 10ms to complete - this is completely a function of the display. Other commands such as clear the active display are implemented by writing a LCD display width's worth of spaces to the display - this can also take several milliseconds. In order that the host understands when the display is ready to receive additional data or commands, the IQC826 will inform the host when these, or any other, activities are complete.

Acknowledge can be turned on by sending the command {A1} and turned off by transmitting {A0}. Normally it is only used on those commands that are slow to complete, for the IQC826 these commands are given in table 5.1.

| Command | Function | Approx ExecutionTime |
|---------|----------|----------------------|
| {C0npq} | initialize an LCD display | 10 ms |
| {D0} | Clear the active display | 60us * display width |

*Slower LCD commands*
Table 5.1

IQ 6 Specification - Other Notes

Thus a typical sequence for clearing the active display might look like:

| IQC826 to Host | Host to IQC826 | Explanation |
|---|---|---|
| | {A1} | Turn on acknowledge. |
| | {D0} | Clear active display. |
| A | | IQC826 informs host activity complete by sending the acknowledge character. |
| | {A0} | Host turns off acknowledge. |

*A command sequence for slow LCD commands*
Table 5.2

As a final comment acknowledge on all commands might be useful for remote applications as an extra guarantee that a command was received and executed.

5.2. Working with Encoders

Encoders will enter their scan code (0x0 through 0x7) into the output buffer exactly once if they are rotated. For example assume encoder 3 is rotated in a clockwise direction causing its count to increase from 0x10 to some value - *determined by the point in time the read encoder message is received*. As soon as the IQC826 detects the rotation from 0x10 to 0x11 the encoder's scan code of 0x3 is entered into the output buffer. At this point the status line will go low. The host either responds to the hardware interrupt or polls the IQC826 by sending a 'read the output buffer' {O} command and in turn receives the scan code 0x3. This is decoded to mean 'encoder 3 has changed state' and thus to get this new state the host either sends a {N03}, which reads and does not reset the encoder count, or the host sends a {N13} which will read and the reset the count. In either case at the instant that the read encoder count is received the current value is transferred to the output buffer for transmittal to the host.

5.3. Working with LCD Displays

Notes on handling the slow response times of these displays are discussed in section 5.2. Outside of this the only other area of note for LCD displays relates to the manner in which the IQC826 formats these displays. The display is fixed, ie not allowed to scroll. This is necessary because each line of the display is presented to the host as a separate entity that can be selectively cleared, written to etc. If the display were allowed to scroll then characters from one 'display' would be shifted into an adjacent 'display'.
The cursor is hard limited to whatever is the defined width of the display.

If an application calls for the direct control of the display, for whatever reason, then this is provided for with the {D1xpq} command. This enables the programmer to effectively bypass the LCD control of the IQC826 yet still retain the comms interface and other functionality.

5.4. Working with LED Displays

Section 2.3.5 details the different ROM decodes available with the chip. Working with non-seven segment displays (eg bargraph, 14 segment alpha numeric, etc) is provided for with the undecoded byte mode. Note that in this mode the IQC826 can support 16 and not 32 characters.

rev 1.0 -5.2-

IQC826 Specification - Other Notes

Scrolling message LED displays can be implemented using the right formatted mode. Additional control from the host will be required to concatenate displays for messages of longer than eight characters. Note this facility is available in either decoded or undecoded mode.

5.5. Working with Sound

The sound generator on the IQC826 is 're-triggerable' in the sense that if a new sound command is received while one is currently playing then this new command will override the current duration and pitch. This can be used to effect a smooth transition from one note to another by programming each note to be longer than required and then writing the new note at an appropriate point in time. The following is a simple example:

| {S2F} | {S4F} | {S6F} | {S2F} | etc |
|---|---|---|---|---|
| t=0 | t=250ms | t=500ms | t=750ms | .... |

Although the duration is programmed to be 0.25 * 15 = 3.75 seconds a new note is written to the chip after only 250ms. This sequence would then be played without any gaps or timing criticalities between host and IQC826.

*B* − Page 43

```
the display)
                    =1  3152    ;and the chars scroll to the left.
                    =1  3153
                    =1  3154         ?lwcFromPtr EQU     R0
                    =1  3155

?lwcToPtr    EQU    R1
                    =1  3156    ;?plwChar    EQU    R2 (reminder)
                    =1  3157    ?lwcLoop     EQU    R3
                    =1  3158
                    =1  3159         ;clr ledAutoIncFlag
090B 08             =1  3160    inc R0      ;R0 is the input FIFO ptr here.
090C E6             =1  3161    mov A,@R0
                    =1  3162
090D                =1  3163    _ledWriteString:    ;Entry point for string
                    =1  3164    ;**************
090D FA             =1  3165    mov R2,A              ;save in R2
                    =1  3166 +1 macGetLedActiveMode
                    =1  3167 +1
090E E55C           =1  3168 +1 mov A,ledActiveDisplay
0910 C4             =1  3169 +1 swap A
0911 540F           =1  3170 +1 anl A,#0Fh
0913 B4031C         =1  3172    cjne A,#3,_ledCheckNum
                    =1  3173         ;LED Alpha mode
0916 BA2004         =1  3174    cjne R2,#' ',_lwcAlphaPlus
0919 7A56           =1  3175         mov R2,#'V'
091B 217D           =1  3176         ajmp _lwcLblA
                    =1  3177
091D                =1  3178    _lwcAlphaPlus:
091D BA2B04         =1  3179    cjne R2,#'+',_lwcAlphaDP
0920 7A56           =1  3180         mov R2,#'V'
0922 217D           =1  3181         ajmp _lwcLblA
                    =1  3182
0924                =1  3183    _lwcAlphaDP:
0924 BA2E04         =1  3184    cjne R2,#'.',_lwcAlphaMinus
0927 7A56           =1  3185         mov R2,#'V'
0929 217D           =1  3186         ajmp _lwcLblA
                    =1  3187
092B                =1  3188    _lwcAlphaMinus:
092B BA2D4F         =1  3189    cjne R2,#'-',_lwcLblA
092E 7A4D           =1  3190         mov R2,#'M'
0930 217D           =1  3191         ajmp _lwcLblA
                    =1  3192
                         =1  3193   ;------------------------ Numeric
------------------------------------
0932                =1  3194    _ledCheckNum:
0932 B40248          =1  3195        cjne A,#2,_lwcLblA    ;if neither alpha nor
numeric its byte mode.
0935 BA2004         =1  3196    cjne R2,#20h,_lwcPlus
0938 7A46           =1  3197         mov R2,#'F'   ;code a SPACE as null char
093A 217D           =1  3198         ajmp _lwcLblA
                    =1  3199
093C                =1  3200    _lwcPlus:
093C BA2B04         =1  3201    cjne R2,#'+',_lwcMinus
093F 7A46           =1  3202         mov R2,#'F'   ;code a PLUS as a null char
0941 217D           =1  3203         ajmp _lwcLblA
                    =1  3204
```

β - Page 44

```
0943            =1  3205          _lwcMinus:
0943 BA2D04     =1  3206          cjne R2,#'-',_lwcLetE
0946 7A44       =1  3207              mov R2,#'D'
0948 217D       =1  3208              ajmp _lwcLblA
                =1  3209
094A            =1  3210          _lwcLetE:
094A BA6504     =1  3211          cjne R2,#'e',_lwcDp
094D 7A45       =1  3212              mov R2,#'E'
094F 217D       =1  3213              ajmp _lwcLblA
                =1  3214
0951            =1  3215          _lwcDp:
0951 BA2E29     =1  3216          cjne R2,#'.',_lwcLblA
                =1  3217          ;This is the DP routine. Complication if in left format and
                =1  3218          ;auto inc as need to effectively set the DP of the previous
                =1  3219          ;digit.
                =1  3220 +1           macGetLedActiveDisplay
                =1  3221 +1
0954 E55C       =1  3222 +1      mov A,ledActiveDisplay
0956 540F       =1  3223 +1      anl A,#0Fh
0958 A231       =1  3225              mov C,ledAutoIncFlag      ;If auto inc and left display
095A B02C       =1  3226              anl C,/rFormatFlag        ;need to turn on DP of 'previous digit'
095C 5010       =1  3227              jnc _lwcDp1
095E 2454       =1  3228                  add A,#ledDpReg0      ;This is an explicit instantiation
0960 F8         =1  3229                  mov R0,A              ;of the macLedResetDP macro with the
0961 E55D       =1  3230                  mov A,ledActiveCursor ;added 'dec A' instruction.
0963 14         =1  3231                  dec A                 ;<<< Extra instruction for prev digit.
                =1  3232 +1                  macInvOctalToBitPos
                =1  3233 +1
0964 900AA4     =1  3234 +1      mov DPTR,#invBPTable
0967 93         =1  3235 +1      movc A,@A+DPTR
0968 F4         =1  3237                  cpl A
0969 56         =1  3238                  anl A,@R0
096A F6         =1  3239                  mov @R0,A
096B 020057     =1  3240                  jmp _ledEditReturn
                =1  3241
096E            =1  3242          _lwcDp1:
                =1  3243 +1          macLedResetDP             ;The DP bit at zero
                =1  3244 +1
                =1  3245 +1
                =1  3246 +1
096E 2454       =1  3247 +1      add A,#ledDpReg0
0970 F8         =1  3248 +1      mov R0,A                    ;reverse octal to bit pos.
0971 E55D       =1  3249 +1      mov A,ledActiveCursor
                =1  3250 +2      macInvOctalToBitPos
                =1  3251 +2
0973 900AA4     =1  3252 +2      mov DPTR,#invBPTable
0976 93         =1  3253 +2      movc A,@A+DPTR
0977 F4         =1  3254 +1      cpl A
0978 56         =1  3255 +1      anl A,@R0
0979 F6         =1  3256 +1      mov @R0,A
097A 020057     =1  3258                  jmp _ledEditReturn   ;turns on.
```

B- Page 45

```
                    =1  3259
097D                =1  3260        _lwcLbl A:
                    =1  3261        ;mov R2,A        ;R2 is parmeter location before call to
prvLedWriteChar.
                    =1  3262
097D 202C09         =1  3263        jb rFormatFlag,_lwcRight
                    =1  3264
                    =1  3265        ;Routine for left formatted display
                    =1  3266        ;------------------------------------
0980 31F2           =1  3267        acall prvLedWriteChar
0982 303154         =1  3268        jnb ledAutoIncFlag,_lwcExit
0985 5193           =1  3269            acall subMoveCursorRight
0987 21D9           =1  3270            ajmp _lwcExit
                    =1  3271
                    =1  3272
0989                =1  3273        _lwcRight:
                    =1  3274        ;Routine for right formatted display
                    =1  3275        ;------------------------------------
0989 30314B         =1  3276        jnb ledAutoIncFlag,_lwcWrite
                    =1  3277 +1         macLeftShiftChars R0,R3,R4,R5,R6        ;Can't use
R2 - contains char
                    =1  3278 +1
                    =1  3279 +1 ;The following parameters require assignment
                    =1  3280 +1     ?lscPtr        SET R0     ;(must be R0 or R1)
                    =1  3281 +1     ?lscDestMask   SET R3
                    =1  3282 +1     ?lscSourceMask SET R4
                    =1  3283 +1     ?lscLoop       SET R5
                    =1  3284 +1     ?lscTemp       SET R6
                    =1  3285 +1
098C 7D07           =1  3286 +1     mov ?lscLoop,#7
                    =1  3287 +1
                    =1  3288 +1         ;Patch inserted Thu  01-05-1995   to provide for
bytes
098E E558           =1  3289 +1     mov A,ledMode
0990 20270C         =1  3290 +1     jb upperFlag,_lscUpperMode
0993 5402           =1  3291 +1         anl A,#2
0995 7014           =1  3292 +1         jnz _lscNibble
0997 7CFF           =1  3293 +1             mov ?lscSourceMask,#0FFh
0999 7B00           =1  3294 +1             mov ?lscDestMask,#0
099B 7844           =1  3295 +1             mov ?lscPtr,#ledBuffer
099D 21C0           =1  3296 +1         ajmp _lscLoopStart
099F                =1  3297 +1     _lscUpperMode:
099F 5408           =1  3298 +1         anl A,#8
09A1 7008           =1  3299 +1         jnz _lscNibble
09A3 7CFF           =1  3300 +1             mov ?lscSourceMask,#0FFh
09A5 7B00           =1  3301 +1             mov ?lscDestMask,#0
09A7 784C           =1  3302 +1             mov ?lscPtr,#ledBuffer+8
09A9 21C0           =1  3303 +1         ajmp _lscLoopStart
                    =1  3304 +1     ;patch end
                    =1  3305 +1
09AB                =1  3306 +1     _lscNibble:
09AB 7444           =1  3307 +1     mov A,#ledBuffer
09AD 302702         =1  3308 +1     jnb upperFlag,_LabelA
09B0 2408           =1  3309 +1     add A,#8
                    =1  3310 +1
09B2                =1  3311 +1     _LabelA:
09B2 F8             =1  3312 +1     mov ?lscPtr,A
09B3 202D06         =1  3313 +1     jb oddFlag,_lscShiftUpperNibble
09B6 7C0F           =1  3314 +1     mov ?lscSourceMask,#0Fh
```

B - Page 46

```
09B8 7BF0          =1  3315 +1        mov ?lscDestMask,#0F0h
09BA 21C0          =1  3316 +1        ajmp _lscLoopStart
                   =1  3317 +1
09BC               =1  3318 +1    _lscShiftUpperNibble:
09BC 7CF0          =1  3319 +1        mov ?lscSourceMask,#0F0h
09BE 7B0F          =1  3320 +1        mov ?lscDestMask,#0Fh
                   =1  3321 +1
09C0               =1  3322 +1    _lscLoopStart:
09C0 08            =1  3323 +1        inc ?lscPtr
09C1 E6             =1  3324 +1        mov A,@?lscPtr           ;get the source cintents
09C2 5C            =1  3325 +1        anl A,?lscSourceMask     ;zero unwanted nibble
09C3 FE            =1  3326 +1        mov ?lscTemp,A
09C4 18            =1  3327 +1        dec ?lscPtr
09C5 E6             =1  3328 +1        mov A,@?lscPtr           ;get the destination contents.
09C6 5B            =1  3329 +1        anl A,?lscDestMask       ;zero lower nibble
09C7 4E            =1  3330 +1        orl A,?lscTemp
09C8 F6            =1  3331 +1        mov @?lscPtr,A
09C9 08            =1  3332 +1        inc ?lscPtr
09CA DDF4          =1  3333 +1        djnz ?lscLoop,_lscLoopStart
                   =1  3334 +1
                   =1  3335 +1        ;Now move the decimal pt info one to the left
                   =1  3336 +2        macGetLedActiveDisplay
                   =1  3337 +2
09CC E55C          =1  3338 +2        mov A,ledActiveDisplay
09CE 540F          =1  3339 +2        anl A,#0Fh
09D0 2454          =1  3340 +1        add A,#ledDpReg0
09D2 F8            =1  3341 +1        mov ?lscPtr,A
09D3 E6             =1  3342 +1        mov A,@?lscPtr           ;Because the display is really
09D4 C3            =1  3343 +1        clr C                    ;organised in a default left format
09D5 23            =1  3344 +1        rl A                     ;manner the MSD is in col0 and LSD
09D6 F6            =1  3345 +1        mov @?lscPtr,A           ;in col7 thus rl A actually moves the
                   =1  3346 +1                                 ;DP to the RIGHT wrt the display.
                   =1  3348
09D7               =1  3349        _lwcWrite:
09D7 31F2          =1  3350            acall prvLedWriteChar
                   =1  3351
09D9               =1  3352        _lwcExit:
09D9 020057        =1  3353            jmp _ledEditReturn
                   =1  3354
                   =1  3355
                   =1  3356        ;**************
09DC               =1  3357        ledWriteEnable:
                   =1  3358        ;**************
09DC D231          =1  3359            setb ledAutoIncFlag
09DE D241          =1  3360            setb mfExtCmdFlag
09E0 D230          =1  3361            setb ledExtCmdFlag       ;enable subsequent bytes to this display.
09E2 D203          =1  3362            setb PFLAG
                   =1  3363
09E4 755D00        =1  3364            mov ledActiveCursor,#0
09E7 302C05        =1  3365            jnb rFormatFlag,_lweLeft
```

β - Page 47

```
                   =1  3366 +1        macGetEndOfDisplay
                   =1  3367 +1
09EA E559          =1  3368 +1        mov A,ledWidth
09EC 14            =1  3370               dec A                    ;remember EOD is +1 on col address.
09ED F55D          =1  3371               mov ledActiveCursor,A    ;see notes in led.asm.
09EF               =1  3372        _lweLeft:
09EF 020057        =1  3373        jmp _ledEditReturn
                   =1  3374
                   =1  3375        ;jmp ledClear                   ;This is an entry pt in ledHome to clear dsiplay.
                   =1  3376        ;jmp _ledEditReturn
                   =1  3377
                   =1  3378
                   =1  3379        ;**************
09F2               =1  3380        prvLedWriteChar:
                   =1  3381        ;**************
                   =1  3382        ;Calling routines puts char to be written into ?plwChar(R2), this routine
                   =1  3383        ;does the rest. Ensure calling routine doesn't mind having registers below
                   =1  3384        ;corrupted.
                   =1  3385        ?plwDpPtr      EQU     R0
                   =1  3386        ?plwCharPtr    EQU     R1
                   =1  3387        ?plwChar       EQU     R2
                   =1  3388        ?plwTemp       EQU     R3
                   =1  3389        ?plwBSave      EQU     R4
                   =1  3390
                   =1  3391
                   =1  3392        ;Compute pointer to the byte in LedBuffer.
                   =1  3393        ;-----------------------------------------
09F2 7444          =1  3394        mov A,#ledBuffer
09F4 255D          =1  3395            add A,ledActiveCursor       ;address of byte in lower buffer.
                   =1  3396
09F6 302702        =1  3397        jnb upperFlag,_plwLblA
09F9 2408          =1  3398            add A,#8                    ;add offset to pt to upper buffer.
                   =1  3399
09FB               =1  3400        _plwLblA:
09FB F9            =1  3401            mov ?plwCharPtr,A           ;now saved pointer to byte to be processed.
                   =1  3402
                   =1  3403        ;If Numeric(2) or Alpha(3) then jump for further processing.
                   =1  3404        ;-----------------------------------------------------------
                   =1  3405 +1        macGetLedActiveMode
                   =1  3406 +1
09FC E55C          =1  3407 +1        mov A,ledActiveDisplay
09FE C4            =1  3408 +1        swap A
09FF 540F          =1  3409 +1        anl A,#0Fh
0A01 20E109        =1  3411        jb ACC.1,_plwWrtNibble
                   =1  3412
0A04 20E002        =1  3413        jb ACC.0,_plwDirectByte
0A07 4192          =1  3414            ajmp _plwExit
                   =1  3415
                   =1  3416        ;Just write the byte directly to the buffer.
                   =1  3417        ;-------------------------------------------
```

$\mathcal{B}$ — Page 48

```
0A09           =1  3418        _plwDirectByte:
0A09 EA        =1  3419            mov A,?plwChar         ;store the 'Z' parameter in ?plwChar
0A0A F7        =1  3420            mov @?plwCharPtr,A
0A0B 4192      =1  3421            ajmp _plwExit
               =1  3422
               =1  3423        ;Determine if Numeric or Alpha processing.
               =1  3424        ;-----------------------------------------
0A0D           =1  3425        _plwWrtNibble:
0A0D 30E046    =1  3426            jnb ACC.0,_plwWrtNumeric   ;ACC still contains the mode.
               =1  3427
               =1  3428        ;Alpha processing
               =1  3429        ;----------------
0A10 E7        =1  3430            mov A,@?plwCharPtr         ;get byte from ledBuffer.
0A11 202D0C    =1  3431            jb oddFlag,_plwWrtAlpha1or3
               =1  3432
0A14           =1  3433        _plwwrtAlpha0or2:
               =1  3434        ;-----------------
0A14 54F0      =1  3435            anl A,#0F0h                ;ACC has byte from ledBuffer with LN zeroed.
0A16 FB        =1  3436            mov ?plwTemp,A
0A17 EA        =1  3437            mov A,?plwChar             ;get the number to be written
0A18 24B9      =1  3438            add A,#-'G'
0A1A 20E721    =1  3439            jb ACC.7,_plwWrtAlphaDigit ;If negative then this is a hex digit.
0A1D 4B        =1  3440            orl A,?plwTemp
0A1E 412C      =1  3441            ajmp _plw1
               =1  3442
               =1  3443
0A20           =1  3444        _plwWrtAlpha1or3:
               =1  3445        ;-----------------
0A20 C4        =1  3446            swap A
0A21 54F0      =1  3447            anl A,#0F0h
0A23 FB        =1  3448            mov ?plwTemp,A
0A24 EA        =1  3449            mov A,?plwChar             ;get the number to be written
0A25 24B9      =1  3450            add A,#-'G'
0A27 20E714    =1  3451            jb ACC.7,_plwWrtAlphaDigit
0A2A 4B        =1  3452            orl A,?plwTemp
0A2B C4        =1  3453            swap A
               =1  3454
0A2C           =1  3455        _plw1:
0A2C F7        =1  3456            mov @?plwCharPtr,A         ;store the nibble part.
               =1  3457
               =1  3458        ;set the approp DP to signify Extd (alpha) char.
               =1  3459        ;-----------------------------------------------
               =1  3460 +1        macGetLedActiveDisplay     ;set DP bit for this char
               =1  3461 +1
0A2D E55C      =1  3462 +1        mov A,ledActiveDisplay
0A2F 540F      =1  3463 +1        anl A,#0Fh
               =1  3465 +1        macLedSetDP
               =1  3466 +1
               =1  3467 +1
               =1  3468 +1
0A31 2454      =1  3469 +1        add A,#ledDpReg0
```

β – Page 49

```
0A33 F8          =1  3470 +1      mov R0,A                    ;Need to effectively have a reverse
0A34 E55D        =1  3471 +1      mov A,ledActiveCursor
                 =1  3472 +2      macInvOctalToBitPos
                 =1  3473 +2
0A36 900AA4      =1  3474 +2      mov DPTR,#invBPTable
0A39 93          =1  3475 +2      movc A,@A+DPTR
0A3A 46          =1  3476 +1      orl A,@R0                   ;turn off 'DP' with a 1
0A3B F6          =1  3477 +1      mov @R0,A
0A3C 4192        =1  3479         ajmp _plwExit               ;(END write alpha char)
                 =1  3480
                 =1  3481
0A3E             =1  3482         _plwWrtAlphaDigit:
                 =1  3483         ;================
0A3E D2D5        =1  3484         setb F0                     ;use as F0 to show this is an alpha digit.
0A40 4156        =1  3485         ajmp _plwWrtNumeric
                 =1  3486
0A42             =1  3487         _plwClrDp:                  ;routine returns here after _plwWrtNumeric
                 =1  3488         ;================
0A42 C2D5        =1  3489         clr F0
                 =1  3490         ;clear the approp DP to signify a hex digit.
                 =1  3491         ;-------------------------------------------
                 =1  3492 +1         macGetLedActiveDisplay   ;clear DP bit for this digit
                 =1  3493 +1
0A44 E55C        =1  3494 +1      mov A,ledActiveDisplay
0A46 540F        =1  3495 +1      anl A,#0Fh
                 =1  3497 +1      macLedResetDp
                 =1  3498 +1
                 =1  3499 +1
                 =1  3500 +1
0A48 2454        =1  3501 +1      add A,#ledDpReg0
0A4A F8          =1  3502 +1      mov R0,A                    ;reverse octal to bit pos.
0A4B E55D        =1  3503 +1      mov A,ledActiveCursor
                 =1  3504 +2      macInvOctalToBitPos
                 =1  3505 +2
0A4D 900AA4      =1  3506 +2      mov DPTR,#invBPTable
0A50 93          =1  3507 +2      movc A,@A+DPTR
0A51 F4          =1  3508 +1      cpl A
0A52 56          =1  3509 +1      anl A,@R0
0A53 F6          =1  3510 +1      mov @R0,A
0A54 4192        =1  3512         ajmp _plwExit               ;(END write alpha letter)
                 =1  3513
                 =1  3514
0A56             =1  3515         _plwWrtNumeric:
                 =1  3516         ;==============
0A56 E7          =1  3517            mov A,@?plwCharPtr       ;get the existing ledBuffer byte.
0A57 202D1A      =1  3518         jb oddFlag,_plwWrtNum1or3
                 =1  3519
0A5A             =1  3520         _plwWrtNum0or2:
                 =1  3521         ;---------------
0A5A 54F0        =1  3522         anl A,#0F0h
0A5C F5F0        =1  3523         mov B,A
0A5E EA          =1  3524            mov A,?plwChar           ;get the number to be written
```

*B* – Page 50

```
                      =1  3525 +1       macAsciiToHex _plwA       ;uses UR7
                      =1  3526 +1
                       =1 3527 +1 ;Routine uses UR7 for temp storage - ensure that your
routine
                       =1 3528 +1 ;does not use this register at the point this macro is
inserted.
0A5F F50F             =1  3529 +1       mov UR7,A
0A61 24BF             =1  3530 +1       add A,#-'A'
0A63 20E706           =1  3531 +1       jb ACC.7,_plwA1
0A66 E50F             =1  3532 +1       mov A,UR7
0A68 24C9             =1  3533 +1       add A,#-('A'-10)
0A6A 4170             =1  3534 +1       ajmp _plwA2
0A6C                  =1  3535 +1       _plwA1:
0A6C E50F             =1  3536 +1       mov A,UR7
0A6E 24D0             =1  3537 +1       add A,#-'0'
0A70                  =1  3538 +1       _plwA2:
0A70 45F0             =1  3540           orl A,B                   ;combine new digit into
bye
0A72 418E             =1  3541           ajmp _plwWrtNumExit
                      =1  3542
0A74                  =1  3543           _plwWrtNum1or3:           ;OK write to the upper
nibble
                      =1  3544           ;---------------
0A74 C4               =1  3545           swap A
0A75 54F0             =1  3546           anl A,#0F0h
0A77 F5F0             =1  3547           mov B,A
0A79 EA               =1  3548            mov A,?plwChar           ;get the number to be
written
                      =1  3549 +1       macAsciiToHex _plwB        ;Uses UR7
                      =1  3550 +1
                       =1 3551 +1 ;Routine uses UR7 for temp storage - ensure that your
routine
                       =1 3552 +1 ;does not use this register at the point this macro is
inserted.
0A7A F50F             =1  3553 +1       mov UR7,A
0A7C 24BF             =1  3554 +1       add A,#-'A'
0A7E 20E706           =1  3555 +1       jb ACC.7,_plwB1
0A81 E50F             =1  3556 +1       mov A,UR7
0A83 24C9             =1  3557 +1       add A,#-('A'-10)
0A85 418B             =1  3558 +1       ajmp _plwB2
0A87                  =1  3559 +1       _plwB1:
0A87 E50F             =1  3560 +1       mov A,UR7
0A89 24D0             =1  3561 +1       add A,#-'0'
0A8B                  =1  3562 +1       _plwB2:
0A8B 45F0             =1  3564           orl A,B                   ;combine new digit into
bye
0A8D C4      ·        =1  3565           swap A
                      =1  3566
0A8E                  =1  3567           _plwWrtNumExit:
                      =1  3568           ;==============
0A8E F7               =1  3569           mov @?plwCharPtr,A        ;store
0A8F 20D5B0           =1  3570           jb F0,_plwClrDp           ;if this was an alpha
digit clear DP bit.
                      =1  3571
0A92                  =1  3572           _plwExit:
                      =1  3573           ;======
0A92 22               =1  3574       ret ;(END subLedWriteDigit)
                      =1  3575
                      =1  3576       ;******************
```

*B*- Page 51

```
0A93            =1  3577    subMoveCursorRight:
                =1  3578    ;******************
                =1  3579    ;    ?mcrEOD EQU UR2
0A93 E559       =1  3580        mov A,ledWidth
0A95 D3         =1  3581        setb C
0A96 955D       =1  3582        subb A,ledActiveCursor
0A98 6002       =1  3583        jz _mcrNoInc
0A9A 055D       =1  3584        inc ledActiveCursor
0A9C            =1  3585    _mcrNoInc:
0A9C 22         =1  3586    ret
                =1  3587
                =1  3588    ;*****************
0A9D            =1  3589    subMoveCursorLeft:
                =1  3590    ;*****************
 000A           =1  3591        ?mclEOD EQU UR2
0A9D E55D       =1  3592        mov A,ledActiveCursor
0A9F 6002       =1  3593        jz _mclNoDec
0AA1 155D       =1  3594            dec ledActiveCursor
0AA3            =1  3595    _mclNoDec:
0AA3 22         =1  3596    ret
                =1  3597
                =1  3598    ;;========
0AA4 80402010   =1  3599    invBPTable: DB 80h,40h,20h,10h,08h,04h,02h,01h
0AA8 08040201
                =1  3600    ;;========
                =1  3601    $include(led.asm)
                =1  3602    ;(10U&k4S(s#8&18D
                =1  3603        ?ledBufPtr      EQU     R0
                =1  3604        ?ledFlashPtr    EQU     R1
                =1  3605        ?ledInvertPtr   EQU     R1
                =1  3606        ?ledTemp        EQU     R2
                =1  3607        ?ledColAddr     EQU     R3
                =1  3608        ?ledDigit0      EQU     R4    ;The absolute addresses of these digits
                =1  3609        ?ledDigit1      EQU     R5    ;is used in the flash routines - remember.
                =1  3610        ?ledDigit2      EQU     R6
                =1  3611        ?ledDigit3      EQU     R7
 0009           =1  3612        ?ledP2          EQU     UR1   ;!!!Double check this allcoation.
                =1  3613
 007F           =1  3614        COLREG          EQU     07Fh
 00BF           =1  3615        ROWREG0         EQU     0BFh
 00DF           =1  3616        ROWREG1         EQU     0DFh
 00EF           =1  3617        ROWREG2         EQU     0EFh
 00F7           =1  3618        ROWREG3         EQU     0F7h
 0087           =1  3619        ALLREGS         EQU     087h
                =1  3620
 0006           =1  3621        RESCAN          EQU     6
                =1  3622
                =1  3623    ;*********
0AAC            =1  3624    ledReScan:
                =1  3625    ;*********
                =1  3626        ;Identify the active display. Do not write to this or the column
                =1  3627        ;register. Write 0FFh to the inactive displays.Make use of the fact
                =1  3628        ;that these can be parallel addressed
                =1  3629
```

β- Page 52

```
00C7            =1  3630       BLANK123   EQU    0C7h
00A7            =1  3631       BLANK023   EQU    0A7h
0097            =1  3632       BLANK013   EQU    097h
008F            =1  3633       BLANK012   EQU    08Fh
                =1  3634
                =1  3635
0AAC D55B05     =1  3636              djnz ledBCount,_lbcStayBright
0AAF C224       =1  3637              clr reScanFlag
0AB1 0200D0     =1  3638       jmp _ledReturn
                =1  3639
0AB4            =1  3640       _lbcStayBright:
                =1  3641              ;mov ?ledTemp,P0          ;Store the state of the
port.
                =1  3642              ;mov ?ledP2,P2
0AB4 7582FF     =1  3643              mov DPL,#0FFh                  ;mov A,#0FFh
;This will turn off all segments.

0AB7 202713     =1  3644              jb upperFlag,_lbcUpper
0ABA 202D08     =1  3645              jb oddFlag,_lbc1
                =1  3646       ;Display 0
0ABD 7583C7     =1  3647              mov DPH, #BLANK123     ;mov DPTR,#BLANK123
;These external writes put zeros
0AC0 1200D9     =1  3648              call clock             ;movx @DPTR,A
;(ie HC377 enables) on all registers
0AC3 41DE       =1  3649              ajmp _lbcExit          ;we want to blank.
                =1  3650
0AC5            =1  3651       _lbc1:
0AC5 7583A7     =1  3652              mov DPH,#BLANK023      ;mov DPTR,#BLANK023
0AC8 1200D9     =1  3653              call clock             ;movx @DPTR,A
0ACB 41DE       =1  3654              ajmp _lbcExit
                =1  3655
0ACD            =1  3656       _lbcUpper:
                =1  3657       ;--------
0ACD 202D08     =1  3658              jb oddFlag,_lbc3
0AD0            =1  3659       _lbc2:
0AD0 758397     =1  3660              mov DPH,#BLANK013      ;mov DPTR,#BLANK013
0AD3 1200D9     =1  3661              call clock             ;movx @DPTR,A
0AD6 41DE       =1  3662              ajmp _lbcExit
                =1  3663
0AD8            =1  3664       _lbc3:
0AD8 75838F     =1  3665              mov DPH,#BLANK012      ;mov DPTR,#BLANK012
0ADB 1200D9     =1  3666              call clock             ;movx @DPTR,A
                =1  3667
0ADE            =1  3668       _lbcExit:
0ADE 0200D0     =1  3669       jmp _ledReturn
                =1  3670
                =1  3671       ;END(_ledBCycle)
                =1  3672
                =1  3673
                =1  3674       ;**********
0AE1            =1  3675       prvLedNumeric:
                =1  3676       ;**********
                =1  3677       ;On entry
                =1  3678       ;          UR2 lower decimal point reg
                =1  3679       ;          UR3 upper decimal point reg
                =1  3680       ;On exit
                =1  3681       ;          UR4 byte representing lower decoded digit
                =1  3682       ;          UR5 byte representing upper decoded digit
                =1  3683
```

β - Page 53

```
               =1 3684            ?lnDpRegA  EQU  UR2
    000A       =1 3685            ?lnDpRegB  EQU  UR3
    000B       =1 3686            ?lnDigitA  EQU  UR4
    000C       =1 3687            ?lnDigitB  EQU  UR5
    000D       =1 3688
               =1 3689            mov  A,@?ledBufPtr        ;get byte from lower buffer
0AE1 E6        =1 3690            anl  A,#0Fh              ;get the lower digit
0AE2 540F      =1 3691            mov  DPTR,#ledNumDecode
0AE4 900B40    =1 3692            movc A,@A+DPTR           ;get the decoded digit
0AE7 93        =1 3693            mov  ?lnDigitA,A         ;temp store
0AE8 F50C      =1 3694
               =1 3695            mov  A,@?ledBufPtr
0AEA E6        =1 3696            swap A
0AEB C4        =1 3697            anl  A,#0Fh
0AEC 540F      =1 3698            movc A,@A+DPTR           ;DPTR already initialized.
0AEE 93        =1 3699            mov  ?lnDigitB,A
0AEF F50D      =1 3700
               =1 3701            mov  A,?ledColAddr       ;get the decode Col address
0AF1 EB        =1 3702            orl  A,?lnDpRegA         ;the row address acts as a
0AF2 450A
mask. 0=DP on
0AF4 F4        =1 3703            cpl  A
0AF5 7006      =1 3704            jnz  _ln1                ;If not zero then need to
leave on the dec pt
0AF7 E50C      =1 3705            mov  A,?lnDigitA         ;Set the MSB so as to turn
off the dec pt.
0AF9 D2E7      =1 3706            setb ACC.7
0AFB F50C      =1 3707            mov  ?lnDigitA,A
               =1 3708
0AFD           =1 3709            _ln1:
0AFD EB        =1 3710            mov  A,?ledColAddr
0AFE 450B      =1 3711            orl  A,?lnDpRegB
0B00 F4        =1 3712            cpl  A
0B01 7006      =1 3713            jnz  _ln2
0B03 E50D      =1 3714            mov  A,?lnDigitB
0B05 D2E7      =1 3715            setb ACC.7
0B07 F50D      =1 3716            mov  ?lnDigitB,A
0B09           =1 3717            _ln2:
0B09 22        =1 3718            ret
               =1 3719
               =1 3720
               =1 3721            ;********
0B0A           =1 3722            prvLedAlpha:
               =1 3723            ;********
               =1 3724            ;On entry
               =1 3725            ;         UR2 lower decimal point reg
               =1 3726            ;         UR3 upper decimal point reg
               =1 3727            ;On exit
               =1 3728            ;         UR4 byte representing lower decoded digit
               =1 3729            ;         UR5 byte representing upper decoded digit
               =1 3730
    000A       =1 3731            ?laDpRegA  EQU  UR2
    000B       =1 3732            ?laDpRegB  EQU  UR3
    000C       =1 3733            ?laDigitA  EQU  UR4
    000D       =1 3734            ?laDigitB  EQU  UR5
               =1 3735
0B0A EB        =1 3736            mov  A,?ledColAddr
0B0B 450A      =1 3737            orl  A,?laDpRegA
0B0D F4        =1 3738            cpl  A
0B0E 7005      =1 3739            jnz  _la0
```

*B* - Page 54

```
0B10  900B60      =1    3740          mov DPTR,#ledExtnDecode    ;The ExtnDecode is used
is the
0B13  6118        =1    3741          ajmp _la1                  ;the DP bit is a '1'
                  =1    3742
0B15              =1    3743          _la0:
0B15  900B50      =1    3744          mov DPTR,#ledHexDecode     ;The Hex Decode is used
if the
                  =1    3745                                     ;DP bit is a '0'.
0B18              =1    3746          _la1:
0B18  E6          =1    3747          mov A,@?ledBufPtr
0B19  540F        =1    3748          anl A,#0Fh
0B1B  93          =1    3749          movc A,@A+DPTR
0B1C  D2E7        =1    3750          setb ACC.7
0B1E  F50C        =1    3751          mov ?laDigitA,A
                  =1    3752
                  =1    3753          ;Now for the other 'digit' (char)
0B20  EB          =1    3754          mov A,?ledColAddr
0B21  450B        =1    3755          orl A,?laDpRegB
0B23  F4          =1    3756          cpl A
0B24  7005        =1    3757          jnz _la2
0B26  900B60      =1    3758          mov DPTR,#ledExtnDecode
0B29  612E        =1    3759          ajmp _la3
                  =1    3760
0B2B              =1    3761          _la2:
0B2B  900B50      =1    3762          mov DPTR,#ledHexDecode
                  =1    3763
0B2E              =1    3764          _la3:
0B2E  E6          =1    3765          mov A,@?ledBufPtr
0B2F  C4          =1    3766          swap A
0B30  540F        =1    3767          anl A,#0Fh
0B32  93          =1    3768          movc A,@A+DPTR
0B33  D2E7        =1    3769          setb ACC.7
0B35  F50D        =1    3770          mov ?laDigitB,A
0B37  22          =1    3771    ret
                  =1    3772
0B38  7FBFDFEF    =1    3773          ledDpPos:                  DB
07Fh,0BFh,0DFh,0EFh,0F7h,0FBh,0FDh,0FEh
0B3C  F7FBFDFE
                  =1    3774
0B40  40792430    =1    3775          ledNumDecode:              DB
40h,79h,24h,30h,19h,12h,02h,78h,00h,10h
0B44  19120278
0B48  0010
                  =1    3776    ;              0,1,2,3,4,5,6,7,8,
9
                  =1    3777
0B4A  0803463F    =1    3778          DB 08h,03h,46h,3Fh,06h,7Fh
0B4E  067F
                  =1    3779    ;              A,B,C,-,E,NULL
                  =1    3780
0B50  40792430    =1    3781          ledHexDecode:              DB
40h,79h,24h,30h,19h,12h,02h,78h,00h,10h
0B54  19120278
0B58  0010
                  =1    3782    ;              0,1,2,3,4,5,6,7,8,
9
                  =1    3783
0B5A  08032721    =1    3784          DB 08h,03h,27h,21h,06h,0Eh
0B5E  060E
```

B - Page 55

```
                           =1  3785    ;                    A , B , C , D , E , F
                           =1  3786
0B60    10097B71           =1  3787              ledExtnDecode:         DB
10h,09h,7Bh,71h,0Bh,47h,3Fh,2Bh,23h,0Ch,11h,2Fh
0B64 0B473F2B
0B68 230C112F
                           =1  3788    ;                    G , H , I , J ,k h, L ,m -, N , o ,
P ,q Y, r
                           =1  3789
0B6C 4107637F              =1  3790                         DB  41h,07h,63h,7Fh
                           =1  3791    ;                        S U, T , u ,v NULL
                           =1  3792
                           =1  3793
                           =1  3794
                                                                                =1     3795
;=====================================================================
                           =1  3796    ;FUNCTION ledDisplay
                                                                                =1     3797
;=====================================================================
                           =1  3798    ;**********
0B70                       =1  3799    ledDisplay:
                           =1  3800    ;**********
                           =1  3801 +1     isThisARescan?
                           =1  3802 +1
0B70 302402                =1  3803 +1     jnb reScanFlag,noDoNormalScan
                           =1  3805 +1         jumpRescan
                           =1  3806 +1
0B73 41AC                  =1  3807 +1     ajmp ledReScan
                           =1  3809
0B75                       =1  3810    noDoNormalScan:
                           =1  3811 +1     decodeDigits
                           =1  3812 +1
0B75 E55A                  =1  3813 +1     mov A,ledBufPtr         ;determine the decode for
colAddr
0B77 C3                    =1  3814 +1     clr C
0B78 9444                  =1  3815 +1     subb A,#ledBuffer
0B7A 900B38                =1  3816 +1     mov DPTR,#ledDpPos
0B7D 93                    =1  3817 +1     movc A,@A+DPTR
0B7E FB                    =1  3818 +1     mov ?ledColAddr,A
                           =1  3819 +1
0B7F A85A                  =1  3820 +1     mov ?ledBufPtr,ledBufPtr
                           =1  3821 +2     macGetLowerMode
                           =1  3822 +2
0B81 E558                  =1  3823 +2     mov A,ledMode
0B83 5403                  =1  3824 +2     anl A,#03h
0B85 7006                  =1  3825 +1     jnz _ledLblA
0B87 7CFF       .          =1  3826 +1         mov ?ledDigit0,#0FFh    ;Turn off both digits.
0B89 7DFF                  =1  3827 +1         mov ?ledDigit1,#0FFh
0B8B 61A9                  =1  3828 +1         ajmp _ledUpperDisplay
                           =1  3829 +1
0B8D                       =1  3830 +1     _ledLblA:
0B8D 14                    =1  3831 +1     dec A
0B8E 7006                  =1  3832 +1     jnz _ledLblB
0B90 E6                    =1  3833 +1         mov A,@?ledBufPtr       ;In the direct mode only
0B91 FC                    =1  3834 +1         mov ?ledDigit0,A        ;displays 0 and 2 are
written.
0B92 7DFF                  =1  3835 +1         mov ?ledDigit1,#0FFh    ;turn this digit off.
0B94 61A9                  =1  3836 +1         ajmp _ledUpperDisplay
                           =1  3837 +1
```

B - Page 56

```
0B96            =1  3838 +1      _ledLblB:
0B96 14         =1  3839 +1       dec A
                =1  3840 +1      ;Set up for call to the numeric/alpha decode for displays0/1.
0B97 85540A     =1  3841 +1       mov ?lnDpRegA,ledDpReg0
0B9A 85550B     =1  3842 +1       mov ?lnDpRegB,ledDpReg1
0B9D 7004       =1  3843 +1       jnz _ledLblC
0B9F 51E1       =1  3844 +1          call prvLedNumeric
0BA1 61A5       =1  3845 +1          ajmp _ledLowerStore
                =1  3846 +1
0BA3            =1  3847 +1      _ledLblC:
0BA3 710A       =1  3848 +1          call prvLedAlpha
0BA5            =1  3849 +1      _ledLowerStore:
0BA5 AC0C       =1  3850 +1          mov ?ledDigit0,?laDigitA
0BA7 AD0D       =1  3851 +1          mov ?ledDigit1,?laDigitB
                =1  3852 +1
0BA9            =1  3853 +1      _ledUpperDisplay:
0BA9 E8         =1  3854 +1       mov A,?ledBufPtr
0BAA 2408       =1  3855 +1       add A,#8
0BAC F8         =1  3856 +1       mov ?ledBufPtr,A
                =1  3857 +2      macGetUpperMode
                =1  3858 +2
0BAD E558       =1  3859 +2       mov A,ledMode
0BAF 540C       =1  3860 +2       anl A,#0Ch
0BB1 03         =1  3861 +2       rr A
0BB2 03         =1  3862 +2       rr A
0BB3 7006       =1  3863 +1       jnz _ledLbl1A
0BB5 7EFF       =1  3864 +1          mov ?ledDigit2,#0FFh    ;Turn off both digits.
0BB7 7FFF       =1  3865 +1          mov ?ledDigit3,#0FFh
0BB9 61D7       =1  3866 +1          ajmp _ledUpperExit
                =1  3867 +1
0BBB            =1  3868 +1      _ledLbl1A:
0BBB 14         =1  3869 +1       dec A
0BBC 7006       =1  3870 +1       jnz _ledLbl1B
0BBE E6         =1  3871 +1          mov A,@?ledBufPtr       ;In the direct mode only
0BBF FE         =1  3872 +1          mov ?ledDigit2,A        ;displays 0 and 2 are written.
0BC0 7FFF       =1  3873 +1          mov ?ledDigit3,#0FFh    ;turn this digit off.
0BC2 61D7       =1  3874 +1          ajmp _ledUpperExit
                =1  3875 +1
0BC4            =1  3876 +1      _ledLbl1B:
0BC4 14         =1  3877 +1       dec A
                =1  3878 +1      ;Set up for call to the numeric decode for displays0/1.
0BC5 85560A     =1  3879 +1       mov ?lnDpRegA,ledDpReg2
0BC8 85570B     =1  3880 +1       mov ?lnDpRegB,ledDpReg3
0BCB 7004       =1  3881 +1       jnz _ledLbl1C
0BCD 51E1       =1  3882 +1          call prvLedNumeric
0BCF 61D3       =1  3883 +1          ajmp _ledUpperStore
                =1  3884 +1
0BD1            =1  3885 +1      _ledLbl1C:
0BD1 710A       =1  3886 +1          call prvLedAlpha
0BD3            =1  3887 +1      _ledUpperStore:
0BD3 AE0C       =1  3888 +1          mov ?ledDigit2,?laDigitA
0BD5 AF0D       =1  3889 +1          mov ?ledDigit3,?laDigitB
0BD7            =1  3890 +1      _ledUpperExit:
                =1  3892 +1      cursorEnabled?
                =1  3893 +1      ;##################
0BD7 302623     =1  3894 +1          jnb ledCursorEnableFlag,noCursorOff
```

β - Page 57

```
                   =1  3896 +1          yesIsThisTheActiveColumn?
                   =1  3897 +1
0BDA E55D          =1  3898 +1      mov A,ledActiveCursor
0BDC 2444          =1  3899 +1      add A,#ledBuffer
0BDE B55A1C        =1  3900 +1      cjne A,ledBufPtr,noNotActiveColumn
                   =1  3902 +1          whatCursorType?
                   =1  3903 +1  ;###################
0BE1 302507        =1  3904 +1      jnb cursorTypeFlag,cursorIsFlash
0BE4               =1  3906                    cursorIsBrightUp:
                   =1  3907 +1                     initRescanVars
                   =1  3908 +1  ;###################
0BE4 D224          =1  3909 +1      setb reScanFlag
0BE6 755B06        =1  3910 +1      mov ledBCount,#RESCAN
0BE9 61FD          =1  3912                     ajmp outputToDisplay
                   =1  3913                     ;jumpRescan
                   =1  3914
0BEB               =1  3915                 cursorIsFlash:
                   =1  3916 +1                  getActiveDigit
                   =1  3917 +1
                   =1  3918 +2      macGetLedActiveDisplay   ;Remember digits are org
vert by display num.
                   =1  3919 +2
0BEB E55C          =1  3920 +2      mov A,ledActiveDisplay
0BED 540F          =1  3921 +2      anl A,#0Fh
0BEF 2404          =1  3922 +1      add A,#4            ;the address of ?ledDigit0
0BF1 F9            =1  3923 +1       mov ?ledFlashPtr,A    ;this is pointer to active
digit.
0BF2 E7            =1  3924 +1      mov A,@?ledFlashPtr
                   =1  3926 +1                  routeLfOscToSegD
                   =1  3927 +1
0BF3 200C04        =1  3928 +1          jb lfClkFlag,_ledSetSegD
                   =1  3929 +1          ;reset seg D
0BF6 54F7          =1  3930 +1          anl A,#0F7h
0BF8 61FC          =1  3931 +1          ajmp _ledFlashExit
                   =1  3932 +1
0BFA               =1  3933 +1      _ledSetSegD:
0BFA 4408          =1  3934 +1          orl A,#08h
                   =1  3935 +1
0BFC               =1  3936 +1      _ledFlashExit:
0BFC F7            =1  3937 +1      mov @?ledFlashPtr,A
                   =1  3939                     ;ajmp outputToDisplay
                   =1  3940
0BFD               =1  3941         noNotActiveColumn:
0BFD               =1  3942         noCursorOff:
0BFD               =1  3943         outputToDisplay:
                   =1  3944
0BFD 302E0A        =1  3945         jnb invertRowFlag,_ledCheckCol
                   =1  3946 +1          yesInvertRow
                   =1  3947 +1
0C00 7904          =1  3948 +1      mov ?ledInvertPtr,#4       ;absolute address of
?ledCol
0C02 7A04          =1  3949 +1      mov ?ledTemp,#4            ;range over col + 4
digits
0C04               =1  3950 +1      _ledInvLoop:
0C04 E7            =1  3951 +1          mov A,@?ledInvertPtr
0C05 F4            =1  3952 +1          cpl A
0C06 F7            =1  3953 +1          mov @?ledInvertPtr,A
0C07 09            =1  3954 +1          inc ?ledInvertPtr
0C08 DAFA          =1  3955 +1          djnz ?ledTemp,_ledInvLoop
```

ℒ - Page 58

```
               =1 3957
 0C0A         =1 3958         _ledCheckCol:
 0C0A 302F03  =1 3959         jnb invertColFlag,_ledOutDigits
               =1 3960 +1         yesInvertCol
               =1 3961 +1
 0C0D EB      =1 3962 +1      mov A,?ledColAddr
 0C0E F4      =1 3963 +1      cpl A
 0C0F FB      =1 3964 +1      mov ?ledColAddr,A
               =1 3966
 0C10         =1 3967         _ledOutDigits:
               =1 3968 +1      writeDigitsToDisplay
               =1 3969 +1
 0C10 74FF    =1 3970 +1      mov A,#0FFh
 0C12 302E01  =1 3971 +1      jnb invertRowFlag,_ledOut
 0C15 F4      =1 3972 +1          cpl A    ;complement for common anode
 0C16         =1 3973 +1      _ledOut:
 0C16 758387  =1 3974 +1         mov DPH,#ALLREGS  ;mov DPTR,#ALLREGS       ;This turns off every segment
 0C19 F582    =1 3975 +1         mov DPL,A         ;movx @DPTR,A            ;with a parallel write.
 0C1B 1200D9  =1 3976 +1      call clock
               =1 3977 +1
 0C1E 303308  =1 3978 +1      jnb flashFlag,_ledDisplayFlashExit
 0C21 D55E02  =1 3979 +1          djnz ledFlashCounter,_ledFlash1
               =1 3980 +1       ;   mov ledFlashCounter,#00
 0C24 B234    =1 3981 +1          cpl displayOnFlag
 0C26         =1 3982 +1      _ledFlash1:
 0C26 303428  =1 3983 +1      jnb displayOnFlag,_flashFrog
 0C29         =1 3984 +1      _ledDisplayFlashExit:
 0C29 75837F  =1 3985 +1         mov DPH,#COLREG                  ;  mov DPTR,#COLREG
 0C2C 8B82    =1 3986 +1         mov DPL,?ledColAddr              ;  mov A,?ledColAddr
 0C2E 1200D9  =1 3987 +1         call clock              ;  movx @DPTR,A
 0C31 7583BF  =1 3988 +1         mov DPH,#ROWREG0                 ;  mov DPTR,#ROWREG0
 0C34 8C82    =1 3989 +1         mov DPL,?ledDigit0               ;  mov A,?ledDigit0
 0C36 1200D9  =1 3990 +1         call clock              ;  movx @DPTR,A
 0C39 7583DF  =1 3991 +1         mov DPH,#ROWREG1                 ;  mov DPTR,#ROWREG1
 0C3C 8D82    =1 3992 +1         mov DPL,?ledDigit1               ;  mov A,?ledDigit1
 0C3E 1200D9  =1 3993 +1         call clock              ;  movx @DPTR,A
 0C41 7583EF  =1 3994 +1         mov DPH,#ROWREG2                 ;  mov DPTR,#ROWREG2
 0C44 8E82    =1 3995 +1         mov DPL,?ledDigit2               ;  mov A,?ledDigit2
 0C46 1200D9  =1 3996 +1         call clock              ;  movx @DPTR,A
 0C49 7583F7  =1 3997 +1         mov DPH,#ROWREG3                 ;  mov DPTR,#ROWREG3
 0C4C 8F82    =1 3998 +1         mov DPL,?ledDigit3               ;  mov A,?ledDigit3
 0C4E 1200D9  =1 3999 +1         call clock              ;  movx @DPTR,A
               =1 4000 +1
 0C51         =1 4001 +1      _flashFrog:
 0C51         =1 4003         _ledUpdatePtr:
               =1 4004 +1      updateThePointer
               =1 4005 +1    ;###########################
```

ß - Page 59

```
0C51 055A       =1  4006 +1    inc ledBufPtr              ;increment the pointer then check for
0C53 E559       =1  4007 +1    mov A,ledWidth             ;end of range next.
0C55 2444       =1  4008 +1    add A,#ledBuffer
0C57 B55A03     =1  4009 +1    cjne A,ledBufPtr,_ledExit
0C5A 755A44     =1  4010 +1    mov ledBufPtr,#ledBuffer   ;reset
                =1  4012
0C5D            =1  4013   _ledExit:
0C5D 0200D0     =1  4014       jmp _ledReturn
                =1  4015       $include(scan.asm)
                =1  4016       ;(10U&k2S(s#8&18D
                =1  4017       ;*******
0C60            =1  4018   scanOut:
                =1  4019       ;*******
                =1  4020       ;Dec 13th 94 Complete revision to produce interleaved scan of encoders and
                =1  4021       ;----------- switches. Routine will scan the encoder space from 0 to
                =1  4022       ;            encoderEnd and then outputs the next switch address.
                =1  4023
                =1  4024       ?soEncEnd       EQU     R2
                =1  4025       ?soSwEnd        EQU     R3
                =1  4026       ?soEncCol       EQU     R4
                =1  4027       ?soSwCol        EQU     R5
                =1  4028
                =1  4029       ;Get switch and encoder end
0C60 E563       =1  4030       mov A,encAddrData
0C62 C4         =1  4031       swap A
0C63 540F       =1  4032       anl A,#0Fh
0C65 FA         =1  4033       mov ?soEncEnd, A           ;Store encoderEnd
0C66 E564       =1  4034       mov A,swAddrData
0C68 C4         =1  4035       swap A
0C69 540F       =1  4036       anl A,#0Fh
0C6B FB         =1  4037       mov ?soSwEnd,A             ;Store switchEnd
                =1  4038
                =1  4039       ;Check if address beyond encoderEnd
0C6C E563       =1  4040       mov A,encAddrData
0C6E 540F       =1  4041       anl A,#0Fh
0C70 FC         =1  4042       mov ?soEncCol,A            ;Store current encoder column addr for use later
0C71 D3         =1  4043       setb C                     ;Setting carry will ensure then when equal
0C72 9A         =1  4044       subb A,?soEncEnd           ;result will still be negative.
0C73 20E721     =1  4045       jb ACC.7,_soOutEncAddr     ;This is now less than OR equal to.
                =1  4046
                =1  4047       ;If here beyond end of encoder space so its time to
                =1  4048       ;output a switch address -first zero the encoder address
0C76 5363F0     =1  4049       anl encAddrData,#0F0h
                =1  4050
                =1  4051       ;OK now check that swCol is within range
0C79 E564       =1  4052       mov A,swAddrData
0C7B 540F       =1  4053       anl A,#0Fh
0C7D FD         =1  4054       mov ?soSwCol,A             ;Store current switch col addr for use later.
                =1  4055       ;setb C
```

℘ - Page 60

```
0C7E C3          =1  4056            clr C
0C7F 9B          =1  4057            subb A,?soSwEnd
0C80 20E70D      =1  4058            jb ACC.7,_soOutSwAddr    ;check for less than or equal
                 =1  4059
                 =1  4060            ;If here then switch address equal or beyond switchEnd
                 =1  4061            ;So reset swAddr (for switch scan AFTER this) to 04h
                 =1  4062            ;and output addr = swEnd.
0C83 C23B        =1  4063            clr encScanFlag          ;indicate this is start of a switch scan
0C85 E564        =1  4064            mov A,swAddrData
0C87 54F0        =1  4065            anl A,#0F0h
0C89 4404        =1  4066            orl A,#4
0C8B F564        =1  4067            mov swAddrData,A         ;store composite data
0C8D EB          =1  4068            mov A,?soSwEnd
0C8E 819C        =1  4069            ajmp _soOutAddr          ;Tue  05-23-95
                 =1  4070        ;   orl A,#0F0h              ;make the USN of P1 inputs
                 =1  4071        ;   mov P1,A                 ;output data to keyboard
                 =1  4072        ;jmp _scanOutReturn
                 =1  4073
0C90             =1  4074            _soOutSwAddr:
                 =1  4075            ;Output the current value of swCol and increment
0C90 C23B        =1  4076            clr encScanFlag          ;indicate for read routines that
                 =1  4077                                     ;we have just output a switch address.
0C92 0564        =1  4078            inc swAddrData           ;inc the sw column address for next time.
0C94 ED          =1  4079            mov A,?soSwCol
0C95 819C        =1  4080            ajmp _soOutAddr
                 =1  4081
0C97             =1  4082            _soOutEncAddr:
0C97 D23B        =1  4083            setb encScanFlag         ;indicate for read routines that
                 =1  4084                                     ;we have just output an encoder address.
                 =1  4085            ;Output the current value of encCol and increment.
0C99 0563        =1  4086            inc encAddrData          ;inc the enc column address for next time.
0C9B EC          =1  4087            mov A,?soEncCol
0C9C             =1  4088            _soOutAddr:
0C9C 44F0        =1  4089            orl A,#0F0h              ;make the USN inputs.
0C9E F590        =1  4090            mov P1,A
0CA0 0200D0      =1  4091            jmp _scanOutReturn
                 =1  4092
                 =1  4093
                 =1  4094            ;**********
0CA3             =1  4095            readFpData:
                 =1  4096            ;**********
                 =1  4097            ;This function is called by the th0Flag indicating that the the front panel
                 =1  4098            ;has settled. The routine determines from the P1 address whether it was
                 =1  4099            ;the encoders, keyboard or switches that were scanned and directs processing
                 =1  4100            ;calls accordingly.
                 =1  4101
                 =1  4102            ;Tue 12-13-1994  Re-written to be compatable with new
```

C - Page 61

```
scan routine - and
                 =1   4103   ;                   much shorter.
0CA3 E590        =1   4104        mov A,P1
0CA5 203B05      =1   4105        jb encScanFlag,encoders
0CA8 A1B1        =1   4106        ajmp processSwitches
0CAA             =1   4107   _processSwitchesReturn:
0CAA             =1   4108   _encodersReturn:
                 =1   4109
0CAA 0200CD      =1   4110   jmp _readFpDataReturn
                 =1   4111
                 =1   4112   ;********
0CAD             =1   4113   encoders:
                 =1   4114   ;********
                 =1   4115   ;We can determine from the address which 2 encoders are being
                 =1   4116   ;scanned.
                 =1   4117
                 =1   4118        ?counterPtr      EQU     R0
                 =1   4119        ?oldStatePtr    EQU     R1
                 =1   4120        ?currentState   EQU     R2
                 =1   4121        ?oldState       EQU     R3
                 =1   4122        ?inputData      EQU     R4
                 =1   4123        ?shiftedData    EQU     R5
                 =1   4124        ?encoderAddr    EQU     R6
                 =1   4125        ?encTemp        EQU     R7
                 =1   4126
                 =1   4127        ;Address CASE statement
                 =1   4128        ;----------------------
0CAD 20E113      =1   4129        jb ACC.1,_eCols23
0CB0 20E008      =1   4130        jb ACC.0,_eCol1
                 =1   4131
0CB3 7865        =1   4132        mov ?counterPtr,#counter0    ;Col 0 - encoders0/1
0CB5 796D        =1   4133        mov ?oldStatePtr,#oldState0
0CB7 7E00        =1   4134        mov ?encoderAddr,#0
0CB9 81D4        =1   4135        ajmp _processEncoders
                 =1   4136
0CBB             =1   4137   _eCol1:
0CBB 7867        =1   4138        mov ?counterPtr,#counter2    ;Col 1 - encoders2/3
0CBD 796E        =1   4139        mov ?oldStatePtr,#oldState1
0CBF 7E02        =1   4140        mov ?encoderAddr,#2
0CC1 81D4        =1   4141        ajmp _processEncoders
                 =1   4142
0CC3             =1   4143   _eCols23:
0CC3 20E008      =1   4144        jb ACC.0,_eCol3
0CC6 7869        =1   4145        mov ?counterPtr,#counter4    ;Col2 - encoders4/5
0CC8 796F        =1   4146        mov ?oldStatePtr,#oldState2
0CCA 7E04        =1   4147        mov ?encoderAddr,#4
0CCC 81D4        =1   4148        ajmp _processEncoders
                 =1   4149
0CCE             =1   4150   _eCol3:
0CCE 786B        =1   4151        mov ?counterPtr,#counter6    ;Col3 - encoders6/7
0CD0 7970        =1   4152        mov ?oldStatePtr,#oldState3
0CD2 7E06        =1   4153        mov ?encoderAddr,#6
                 =1   4154
                 =1   4155
0CD4             =1   4156   _processEncoders:
0CD4 C4          =1   4157        swap A
0CD5 FC          =1   4158        mov ?inputData,A
0CD6 5403        =1   4159        anl A,#03h
```

β — Page 62

```
0CD8 FA         =1   4160       mov  ?currentState,A
0CD9 E7         =1   4161       mov  A,@?oldStatePtr
0CDA 5403       =1   4162       anl  A,#03h
0CDC FB         =1   4163       mov  ?oldState,A
0CDD C3         =1   4164       clr  C
0CDE 9A         =1   4165       subb A,?currentState
0CDF 6026       =1   4166       jz   _eUpperEncoder
                =1   4167
0CE1 120D45     =1   4168       call quadDecode         ;Decode the lower encoder
                =1   4169                               ;Func returns +1, -1 or zero.
0CE4 FF         =1   4170       mov  ?encTemp,A         ;encTemp stores effectively rotational dir
0CE5 26         =1   4171       add  A,@?counterPtr     ;Update the counter.
0CE6 F6         =1   4172       mov  @?counterPtr,A
                =1   4173
0CE7 303C14     =1   4174       jnb  encSatFlag,_eLowAddrUpdate
0CEA BF0002     =1   4175          cjne ?encTemp,#0,_eCheckPosDir
0CED 81FE       =1   4176             ajmp _eLowAddrUpdate
                =1   4177
0CEF            =1   4178       _eCheckPosDir:
0CEF BF0107     =1   4179          cjne ?encTemp,#1,_eCheckNegDir
                =1   4180             ;Here then check for 80h
0CF2 B48009     =1   4181             cjne A,#80h,_eLowAddrUpdate
0CF5 767F       =1   4182                mov @?counterPtr,#07Fh ;notch back to +ve limit
0CF7 81FE       =1   4183                ajmp _eLowAddrUpdate
                =1   4184
0CF9            =1   4185       _eCheckNegDir:
                =1   4186          ;Here check for 7Fh
0CF9 B47F02     =1   4187          cjne A,#7Fh,_eLowAddrUpdate
0CFC 7680       =1   4188             mov @?counterPtr,#80h
                =1   4189
0CFE            =1   4190       _eLowAddrUpdate:
0CFE EE         =1   4191          mov  A,?encoderAddr      ;enter encoder addr in output buffer.
0CFF 120D84     =1   4192       call prvWriteOutputBuffer
                =1   4193
0D02 E7         =1   4194       mov  A,@?oldStatePtr     ;Update the old state.
0D03 54FC       =1   4195       anl  A,#0FCh
0D05 4A         =1   4196       orl  A,?currentState
0D06 F7         =1   4197       mov  @?oldStatePtr,A
                =1   4198
0D07            =1   4199       _eUpperEncoder:
0D07 E7         =1   4200       mov  A,@?oldStatePtr
                =1   4201 +1    maskAndShift             ;ACC contains the composite
0D08 540C       =1   4202 +1       anl A,#0Ch
0D0A FD         =1   4203 +1       mov ?shiftedData,A
0D0B C3         =1   4204 +1       clr C
0D0C 03         =1   4205 +1       rr  A
0D0D 03         =1   4206 +1       rr  A
                =1   4208                               ;old state for this column.
0D0E FB         =1   4209       mov  ?oldState,A        ;old state for upper encoder
                =1   4210
0D0F EC         =1   4211       mov  A,?inputData       ;retrieve the upper channel data
                =1   4212 +1    maskAndShift
0D10 540C       =1   4213 +1       anl A,#0Ch
0D12 FD         =1   4214 +1       mov ?shiftedData,A
```

*δ* - Page 63

```
0D13 C3         =1   4215 +1        clr C
0D14 03         =1   4216 +1        rr A
0D15 03         =1   4217 +1        rr A
0D16 FA         =1   4219           mov ?currentState,A
                =1   4220
0D17 C3         =1   4221           clr C
0D18 9B         =1   4222           subb A,?oldState
0D19 6028       =1   4223           jz _eExit
                =1   4224
0D1B 120D45     =1   4225           call quadDecode          ;Decode the upper encoder
0D1E FF         =1   4226           mov ?encTemp,A           ;Store dir rotation
0D1F 08         =1   4227           inc ?counterPtr
0D20 26         =1   4228           add A,@?counterPtr
0D21 F6         =1   4229           mov @?counterPtr,A
0D22 303C14     =1   4230           jnb encSatFlag,_eHighAddrUpdate
0D25 BF0002     =1   4231               cjne ?encTemp,#0,_eCheckHiPosDir
0D28 A139       =1   4232                   ajmp _eHighAddrUpdate
                =1   4233
0D2A            =1   4234           _eCheckHiPosDir:
0D2A BF0107     =1   4235               cjne ?encTemp,#1,_eCheckHiNegDir
                =1   4236               ;Here then check for 80h
0D2D B48009     =1   4237               cjne A,#80h,_eHighAddrUpdate
0D30 767F       =1   4238                   mov @?counterPtr,#07Fh ;notch back to +ve limit
0D32 A139       =1   4239                   ajmp _eHighAddrUpdate
                =1   4240
0D34            =1   4241           _eCheckHiNegDir:
                =1   4242               ;Here check for 7Fh
0D34 B47F02     =1   4243               cjne A,#7Fh,_eHighAddrUpdate
0D37 7680       =1   4244                   mov @?counterPtr,#80h
                =1   4245
0D39            =1   4246           _eHighAddrUpdate:
0D39 EE         =1   4247               mov A,?encoderAddr       ;enter encoder addr in output buffer.
0D3A 04         =1   4248               inc A
0D3B 120D84     =1   4249               call prvWriteOutputBuffer
                =1   4250
0D3E E7         =1   4251               mov A,@?oldStatePtr      ;store upper diBit of lower nibble.
0D3F 54F3       =1   4252               anl A,#0F3h
0D41 4D         =1   4253               orl A,?shiftedData
0D42 F7         =1   4254               mov @?oldStatePtr,A      ;Update the old State.
                =1   4255
0D43            =1   4256           _eExit:
0D43 81AA       =1   4257           jmp _encodersReturn
                =1   4258
                =1   4259
                =1   4260
                =1   4261           ;**********
0D45            =1   4262           quadDecode:
                =1   4263           ;**********
                =1   4264           ;The serviceEncoders routine has found a channel with stable data that
                =1   4265           ;is different to the previous scan. It has passed the information through
                =1   4266           ;to this routine to have it be decoded into a directional rotation, This
                =1   4267           ;routine returns a '0' for clockwise and a '1' for anti-clockwise.
```

β – Page 64

```
                        =1   4268
0D45 EB                 =1   4269            mov A,?oldState          ;get the ?oldState
0D46 B4000B             =1   4270            cjne A,#0,_qdTestState1
0D49 EA                 =1   4271                mov A,?currentState      ;get the ?currentState
0D4A B40102             =1   4272                cjne A,#1,_qdAcw2
0D4D A17B               =1   4273                    ajmp _qdCw
0D4F                    =1   4274                _qdAcw2:
0D4F B4022F             =1   4275                cjne A,#2,_qdReSync
0D52 A17E               =1   4276                    ajmp _qdAcw
                        =1   4277
                        =1   4278
0D54                    =1   4279        _qdTestState1:
0D54 B4010B             =1   4280            cjne A,#1,_qdTestState2
0D57 EA                 =1   4281                mov A,?currentState      ;get current state
0D58 B40302             =1   4282                cjne A,#3,_qdAcw0
0D5B A17B               =1   4283                    ajmp _qdCw
0D5D                    =1   4284                _qdAcw0:
0D5D B40021             =1   4285                cjne A,#0,_qdReSync
0D60 A17E               =1   4286                    ajmp _qdAcw
                        =1   4287
0D62                    =1   4288        _qdTestState2:
0D62 B4020B             =1   4289            cjne A,#2,_qdState3
0D65 EA                 =1   4290                mov A,?currentState
0D66 B40002             =1   4291                cjne A,#0,_qdAcw3
0D69 A17B               =1   4292                    ajmp _qdCw
0D6B                    =1   4293                _qdAcw3:
0D6B B40313             =1   4294                cjne A,#3,_qdReSync
0D6E A17E               =1   4295                    ajmp _qdAcw
                        =1   4296
0D70                    =1   4297        _qdState3:
0D70 EA                 =1   4298            mov A,?currentState      ;it is assumed that if the old state is none
0D71 B40202             =1   4299            cjne A,#2,_qdAcw1        ;of the above then it must be 3.
0D74 A17B               =1   4300                ajmp _qdCw
0D76                    =1   4301            _qdAcw1:
0D76 B40108             =1   4302            cjne A,#1,_qdReSync
0D79 A17E               =1   4303                ajmp _qdAcw
                        =1   4304
0D7B                    =1   4305        _qdCw:
0D7B 7401               =1   4306            mov A,#1
0D7D 22                 =1   4307        ret
0D7E                    =1   4308        _qdAcw:
0D7E 74FF               =1   4309            mov A,#-1
0D80 22                 =1   4310        ret
0D81                    =1   4311        _qdReSync:
0D81 7400               =1   4312            mov A,#0
0D83 22                 =1   4313        ret
                        =1   4314        ;(END quadDecode)
                        =1   4315        $include(kb.asm)
                        =1   4316        ;(10U&k2S(s#8&18D
                        =1   4317        ;$include(KB.H)
                        =1   4318
                        =1   4319        ;****************
0D84                    =1   4320        prvWriteOutputBuffer:
                        =1   4321        ;****************
                        =1   4322        ;On entry ACC = byte to be written
                        =1   4323
00B3                    =1   4324            statusPin   EQU P3.3
```

B - Page 65

```
                    =1  4325
                    =1  4326        ?wobPtr        EQU  R1
          000A      =1  4327        ?wobChar       EQU  UR2
                    =1  4328
 0D84  8909         =1  4329        mov UR1,R1              ;save R1
                    =1  4330
                    =1  4331        ;First check that for addresses (incoming bytes) that
                    =1  4332        ;represent encoders (00h->07h) that a byte doesn't
                    =1  4333        ;already exist.
 0D86  F50A         =1  4334        mov ?wobChar,A          ;save input byte
 0D88  24F8         =1  4335        add A,#-8
 0D8A  30E711       =1  4336        jnb ACC.7,_wobEnterByteInBuffer ;Not encoder so enter in buffer.
                    =1  4337
                    =1  4338        ;Ok encoder - if not at end of buffer get byte and compare.
 0D8D  7978         =1  4339        mov ?wobPtr,#sBuffer
                    =1  4340
 0D8F               =1  4341        _wobLoop:
 0D8F  E9           =1  4342        mov A,?wobPtr
 0D90  B54002       =1  4343        cjne A,sBufPtr,_wobTest
 0D93  A19E         =1  4344            ajmp _wobEnterByteInBuffer ;if we got to the end of buffer
                    =1  4345                                       ;then can't already be here
 0D95               =1  4346        _wobTest:
 0D95  E7           =1  4347        mov A,@?wobPtr
 0D96  B50A02       =1  4348        cjne A,?wobChar,_incAndRecheck
 0D99  A1AE         =1  4349            ajmp _wob1              ;byte already here exit without storing.
 0D9B               =1  4350        _incAndRecheck:
 0D9B  09           =1  4351        inc ?wobPtr
 0D9C  A18F         =1  4352        ajmp _wobLoop
                    =1  4353
 0D9E               =1  4354        _wobEnterByteInBuffer:
 0D9E  30B302       =1  4355        jnb statusPin,_wobMoreData    ;Wed  06-07-95 invert sense
 0DA1  C2B3         =1  4356        clr statusPin                 ;of the statusPin.
                    =1  4357
 0DA3               =1  4358        _wobMoreData:
 0DA3  A940         =1  4359        mov ?wobPtr,sBufPtr
 0DA5  A70A         =1  4360        mov @?wobPtr,?wobChar
 0DA7  B97C02       =1  4361        cjne ?wobPtr,#(sBuffer+4),_wobIncPtr
 0DAA  A1AE         =1  4362            ajmp _wob1              ;at end of buffer don't increment
 0DAC               =1  4363        _wobIncPtr:
 0DAC  0540         =1  4364        inc sBufPtr
 0DAE               =1  4365        _wob1:
 0DAE  A909         =1  4366        mov R1,UR1              ;restore R1
 0DB0  22           =1  4367        ret
                    =1  4368
                    =1  4369
                    =1  4370        ;**************
 0DB1               =1  4371        processSwitches:
                    =1  4372        ;**************
                    =1  4373        ;Routine is entered with scan Byte in ACC
                    =1  4374
                    =1  4375        ;LOCAL VARS:
                    =1  4376            ?t2RomPtr      EQU  R0
```

B — Page 66

```
                    =1  4377       ?psTmpPtr     EQU    R1
                    =1  4378       ?t1RomPtr     EQU    R2
                    =1  4379       ?psScanByte   EQU    R3
                    =1  4380       ?psColAddr    EQU    R4
                    =1  4381       ?psShftCol    EQU    R5
                    =1  4382       ?t1RomData    EQU    R6
                    =1  4383       ?t2RomData    EQU    R7
                    =1  4384
                    =1  4385   ;CODE:
ODB1 FB             =1  4386       mov ?psScanByte,A        ;store the scanByte
                    =1  4387
                    =1  4388
                    =1  4389                                 ;compare the incoming scanByte to data in
                    =1  4390                                 ;(t-1)ROM compute the address in
ODB2 C220           =1  4391       clr col4Flag             ;SROM = addr/2 -1 with remainder stored in
ODB4 C21D           =1  4392       clr kbAddrFlag           ;the oddAddrByte.
ODB6 540F           =1  4393       anl A,#0Fh               ;get the address
ODB8 FC             =1  4394       mov ?psColAddr,A         ;and store
                    =1  4395
ODB9 B40402         =1  4396       cjne A,#4,_ps0
ODBC D220           =1  4397       setb col4Flag            ;if kb start column then this is potentially the
                    =1  4398                                ;modifier keys (ie Shift, Ctrl, Alt)
                    =1  4399
ODBE                =1  4400   _ps0:
ODBE D3             =1  4401       setb C                   ;To ensure that ACC is still negative
ODBF 9543           =1  4402       subb A,keyboardEnd       ;when colAddr = keyBoardEnd
ODC1 30E702         =1  4403       jnb ACC.7,_ps0a
ODC4 D21D           =1  4404       setb kbAddrFlag          ;if address beyond keyboardEnd set flag.
                    =1  4405
ODC6                =1  4406   _ps0a:
ODC6 A220           =1  4407       mov C,col4Flag
ODC8 821D           =1  4408       anl C,kbAddrFlag
ODCA 5002           =1  4409       jnc _ps0b                ;if not kb mode or not col4 process 'real key'
ODCC E13A           =1  4410       ajmp _kbModKey           ;otherwise process the modifier key.
                    =1  4411
ODCE                =1  4412   _ps0b:
ODCE EC             =1  4413       mov A,?psColAddr
                    =1  4414
ODCF C3             =1  4415       clr C
ODD0 13             =1  4416       rrc A                    ;divide by 2 and store lsb in carry
ODD1 921C           =1  4417       mov oddAddrFlag,C        ;store addr LSB in oddAddrFlag.
                    =1  4418
ODD3 201B0E         =1  4419       jb oddCycleFlag,_ps1     ;if odd cycle jump
ODD6 2432           =1  4420       add A,#(SROM0-2)
ODD8 F9             =1  4421       mov ?psTmpPtr,A
ODD9 FA             =1  4422       mov ?t1RomPtr,A
ODDA E7             =1  4423       mov A,@?psTmpPtr
ODDB FE             =1  4424       mov ?t1RomData,A
```

```
0DDC EA       =1  4425        mov A,?t1RomPtr
0DDD 2406     =1  4426        add A,#6
0DDF F8       =1  4427        mov ?t2RomPtr,A
0DE0 E6       =1  4428        mov A,@?t2RomPtr
0DE1 FF       =1  4429        mov ?t2RomData,A
              =1  4430
0DE2 A1F0     =1  4431        ajmp _ps2
              =1  4432
0DE4          =1  4433        _ps1:
0DE4 2438     =1  4434        add A,#(SROM1-2)
0DE6 F9       =1  4435        mov ?psTmpPtr,A
0DE7 FA       =1  4436        mov ?t1RomPtr,A
0DE8 E7       =1  4437        mov A,@?psTmpPtr
0DE9 FE       =1  4438        mov ?t1RomData,A
0DEA EA       =1  4439        mov A,?t1RomPtr
0DEB 24FA     =1  4440        add A,#-6
0DED F8       =1  4441        mov ?t2RomPtr,A
0DEE E6       =1  4442        mov A,@?t2RomPtr
0DEF FF       =1  4443        mov ?t2RomData,A
              =1  4444
              =1  4445
0DF0          =1  4446        _ps2:
0DF0 201C06   =1  4447          jb oddAddrFlag,_ps3    ;if even address then need to swap
0DF3 EE       =1  4448        mov A,?t1RomData         ;contents of t1/?t2RomData
0DF4 C4       =1  4449        swap A
0DF5 FE       =1  4450        mov ?t1RomData,A
0DF6 EF       =1  4451        mov A,?t2RomData
0DF7 C4       =1  4452        swap A
0DF8 FF       =1  4453        mov ?t2RomData,A
              =1  4454
              =1  4455
              =1  4456
0DF9          =1  4457        _ps3:                    ;Now need to prep scanByteIn to give
0DF9 EB       =1  4458        mov A,?psScanByte        ;just data (not addr)
0DFA 54F0     =1  4459        anl A,#0F0h              ;get the data
0DFC 6E       =1  4460          xrl A,?t1RomData       ;any bits that are now '1' are not stable
0DFD F529     =1  4461        mov psMaskReg,A          ;Store this debounce mask
              =1  4462
              =1  4463
0DFF EC       =1  4464        mov A,?psColAddr         ;get the col address
0E00 C3       =1  4465        clr C                    ;move addr into the right
0E01 23       =1  4466        rl A                     ;position for inclusion in
0E02 23       =1  4467        rl A                     ;scanByte.
0E03 FD       =1  4468          mov ?psShftCol,A       ;store the adjusted column addr
              =1  4469
0E04 EB       =1  4470          mov A,?psScanByte      ;now use A for the DATA portion of scanByte
              =1  4471
0E05 8FF0     =1  4472        mov B,?t2RomData         ;B is bit addressable
              =1  4473
              =1  4474
              =1  4475 +1     macProcessRowReturn 3,_ps3
              =1  4476 +1
              =1  4477 +1     IF(3=3)
0007          =1  4478 +1         EXT SET 7
```

B- Page 68

```
                    =1  4479 +1         ENDIF
                    =1  4480 +1         IF(3=2)
                    =1  4481 +1             EXT SET 6
                    =1  4482 +1         ENDIF
                    =1  4483 +1
                    =1  4484 +1         IF(3=1)
                    =1  4485 +1             EXT SET 5
                    =1  4486 +1         ENDIF
                    =1  4487 +1
                    =1  4488 +1         IF(3=0)
                    =1  4489 +1             EXT SET 4
                    =1  4490 +1         ENDIF
                    =1  4491 +1
OE07 EB             =1  4492 +1         mov A,?psScanByte
OE08 204F2B         =1  4493 +1         jb psMaskReg.EXT,_ps3NextBit
OE0B 8D2A           =1  4494 +1         mov psScanCode,?psShftCol
                    =1  4495 +1
                    =1  4496 +1         IF(3=3)
OE0D D251           =1  4497 +1             setb psScanCode.1
OE0F D250           =1  4498 +1             setb psScanCode.0
                    =1  4499 +1         ENDIF
                    =1  4500 +1
                    =1  4501 +1         IF(3=2)
                    =1  4502 +1             setb psScanCode.1
                    =1  4503 +1         ENDIF
                    =1  4504 +1
                    =1  4505 +1         IF(3=1)
                    =1  4506 +1             setb psScanCode.0
                    =1  4507 +1         ENDIF
                    =1  4508 +1
OE11 20E708         =1  4509 +1         jb ACC.EXT,_ps3Bitis1
OE14 30F71F         =1  4510 +1         jnb B.EXT,_ps3NextBit
OE17 201D10         =1  4511 +1         jb kbAddrFlag,_ps3WrtKBuf
OE1A C124           =1  4512 +1         ajmp _ps3WrtSBuf
                    =1  4513 +1
OE1C                =1  4514 +1     _ps3Bitis1:
OE1C 20F717         =1  4515 +1         jb B.EXT,_ps3NextBit
OE1F D257           =1  4516 +1         setb psScanCode.7
OE21 201D06         =1  4517 +1         jb kbAddrFlag,_ps3WrtKBuf
                    =1  4518 +1
OE24                =1  4519 +1     _ps3WrtSBuf:
OE24 E52A           =1  4520 +1         mov A,psScanCode
OE26 B184           =1  4521 +1         call prvWriteOutputBuffer
OE28 C136           =1  4522 +1         ajmp _ps3NextBit
                    =1  4523 +1
OE2A                =1  4524 +1     _ps3WrtKBuf:
OE2A A919           =1  4525 +1         mov ?psTmpPtr,kTmpPtr
OE2C A72A           =1  4526 +1         mov @?psTmpPtr,psScanCode
OE2E 74E1           =1  4527 +1         mov A,#-(kTmpBuf+1)
OE30 29             =1  4528 +1         add A,?psTmpPtr
OE31 30E702         =1  4529 +1         jnb ACC.7,_ps3NextBit
OE34 0519           =1  4530 +1         inc kTmpPtr
                    =1  4531 +1
OE36                =1  4532 +1     _ps3NextBit:
                    =1  4533 +1
                    =1  4535
                    =1  4536 +1         macProcessRowReturn 2,_ps2
                    =1  4537 +1
                    =1  4538 +1         IF(2=3)
```

β – Page 69

```
                      =1  4539 +1         EXT SET 7
                      =1  4540 +1     ENDIF
                      =1  4541 +1     IF(2=2)
    0006              =1  4542 +1         EXT SET 6
                      =1  4543 +1     ENDIF
                      =1  4544 +1
                      =1  4545 +1     IF(2=1)
                      =1  4546 +1         EXT SET 5
                      =1  4547 +1     ENDIF
                      =1  4548 +1
                      =1  4549 +1     IF(2=0)
                      =1  4550 +1         EXT SET 4
                      =1  4551 +1     ENDIF
                      =1  4552 +1
0E36 EB               =1  4553 +1     mov A,?psScanByte
0E37 204E29           =1  4554 +1     jb psMaskReg.EXT,_ps2NextBit
0E3A 8D2A             =1  4555 +1     mov psScanCode,?psShftCol
                      =1  4556 +1
                      =1  4557 +1     IF(2=3)
                      =1  4558 +1         setb psScanCode.1
                      =1  4559 +1         setb psScanCode.0
                      =1  4560 +1     ENDIF
                      =1  4561 +1
                      =1  4562 +1     IF(2=2)
0E3C D251             =1  4563 +1         setb psScanCode.1
                      =1  4564 +1     ENDIF
                      =1  4565 +1
                      =1  4566 +1     IF(2=1)
                      =1  4567 +1         setb psScanCode.0
                      =1  4568 +1     ENDIF
                      =1  4569 +1
0E3E 20E608           =1  4570 +1     jb ACC.EXT,_ps2Bitis1
0E41 30F61F           =1  4571 +1     jnb B.EXT,_ps2NextBit
0E44 201D10           =1  4572 +1     jb kbAddrFlag,_ps2WrtKBuf
0E47 C151             =1  4573 +1     ajmp _ps2WrtSBuf
                      =1  4574 +1
0E49                  =1  4575 +1   _ps2Bitis1:
0E49 20F617           =1  4576 +1     jb B.EXT,_ps2NextBit
0E4C D257             =1  4577 +1     setb psScanCode.7
0E4E 201D06           =1  4578 +1     jb kbAddrFlag,_ps2WrtKBuf
                      =1  4579 +1
0E51                  =1  4580 +1   _ps2WrtSBuf:
0E51 E52A             =1  4581 +1     mov A,psScanCode
0E53 B184             =1  4582 +1     call prvWriteOutputBuffer
0E55 C163             =1  4583 +1     ajmp _ps2NextBit
                      =1  4584 +1
0E57                  =1  4585 +1   _ps2WrtKBuf:
0E57 A919             =1  4586 +1     mov ?psTmpPtr,kTmpPtr
0E59 A72A             =1  4587 +1     mov @?psTmpPtr,psScanCode
0E5B 74E1             =1  4588 +1     mov A,#-(kTmpBuf+1)
0E5D 29               =1  4589 +1     add A,?psTmpPtr
0E5E 30E702           =1  4590 +1     jnb ACC.7,_ps2NextBit
0E61 0519             =1  4591 +1     inc kTmpPtr
                      =1  4592 +1
0E63                  =1  4593 +1   _ps2NextBit:
                      =1  4594 +1
                      =1  4596
                      =1  4597 +1     macProcessRowReturn 1,_ps1
                      =1  4598 +1
```

*B* - Page 70

```
                  =1  4599 +1       IF(1=3)
                  =1  4600 +1           EXT SET 7
                  =1  4601 +1       ENDIF
                  =1  4602 +1       IF(1=2)
                  =1  4603 +1           EXT SET 6
                  =1  4604 +1       ENDIF
                  =1  4605 +1
                  =1  4606 +1       IF(1=1)
     0005         =1  4607 +1           EXT SET 5
                  =1  4608 +1       ENDIF
                  =1  4609 +1
                  =1  4610 +1       IF(1=0)
                  =1  4611 +1           EXT SET 4
                  =1  4612 +1       ENDIF
                  =1  4613 +1
0E63 EB           =1  4614 +1       mov A,?psScanByte
0E64 204D29       =1  4615 +1       jb psMaskReg.EXT,_ps1NextBit
0E67 8D2A         =1  4616 +1       mov psScanCode,?psShftCol
                  =1  4617 +1
                  =1  4618 +1       IF(1=3)
                  =1  4619 +1           setb psScanCode.1
                  =1  4620 +1           setb psScanCode.0
                  =1  4621 +1       ENDIF
                  =1  4622 +1
                  =1  4623 +1       IF(1=2)
                  =1  4624 +1           setb psScanCode.1
                  =1  4625 +1       ENDIF
                  =1  4626 +1
                  =1  4627 +1       IF(1=1)
0E69 D250         =1  4628 +1           setb psScanCode.0
                  =1  4629 +1       ENDIF
                  =1  4630 +1
0E6B 20E508       =1  4631 +1       jb ACC.EXT,_ps1Bitis1
0E6E 30F51F       =1  4632 +1       jnb B.EXT,_ps1NextBit
0E71 201D10       =1  4633 +1       jb kbAddrFlag,_ps1WrtKBuf
0E74 C17E         =1  4634 +1       ajmp _ps1WrtSBuf
                  =1  4635 +1
0E76              =1  4636 +1    _ps1Bitis1:
0E76 20F517       =1  4637 +1       jb B.EXT,_ps1NextBit
0E79 D257         =1  4638 +1       setb psScanCode.7
0E7B 201D06       =1  4639 +1       jb kbAddrFlag,_ps1WrtKBuf
                  =1  4640 +1
0E7E              =1  4641 +1    _ps1WrtSBuf:
0E7E E52A         =1  4642 +1       mov A,psScanCode
0E80 B184         =1  4643 +1       call prvWriteOutputBuffer
0E82 C190         =1  4644 +1       ajmp _ps1NextBit
                  =1  4645 +1
0E84              =1  4646 +1    _ps1WrtKBuf:
0E84 A919         =1  4647 +1       mov ?psTmpPtr,kTmpPtr
0E86 A72A         =1  4648 +1       mov @?psTmpPtr,psScanCode
0E88 74E1         =1  4649 +1       mov A,#-(kTmpBuf+1)
0E8A 29           =1  4650 +1       add A,?psTmpPtr
0E8B 30E702       =1  4651 +1       jnb ACC.7,_ps1NextBit
0E8E 0519         =1  4652 +1       inc kTmpPtr
                  =1  4653 +1
0E90              =1  4654 +1    _ps1NextBit:
                  =1  4655 +1
                  =1  4657
                  =1  4658 +1       macProcessRowReturn 0,_ps0
```

```
                    =1 4659 +1
                    =1 4660 +1        IF(0=3)
                    =1 4661 +1            EXT SET 7
                    =1 4662 +1        ENDIF
                    =1 4663 +1        IF(0=2)
                    =1 4664 +1            EXT SET 6
                    =1 4665 +1        ENDIF
                    =1 4666 +1
                    =1 4667 +1        IF(0=1)
                    =1 4668 +1            EXT SET 5
                    =1 4669 +1        ENDIF
                    =1 4670 +1
                    =1 4671 +1        IF(0=0)
    0004            =1 4672 +1            EXT SET 4
                    =1 4673 +1        ENDIF
                    =1 4674 +1
0E90 EB             =1 4675 +1        mov   A,?psScanByte
0E91 204C27         =1 4676 +1        jb    psMaskReg.EXT,_ps0NextBit
0E94 8D2A           =1 4677 +1        mov   psScanCode,?psShftCol
                    =1 4678 +1
                    =1 4679 +1        IF(0=3)
                    =1 4680 +1            setb psScanCode.1
                    =1 4681 +1            setb psScanCode.0
                    =1 4682 +1        ENDIF
                    =1 4683 +1
                    =1 4684 +1        IF(0=2)
                    =1 4685 +1            setb psScanCode.1
                    =1 4686 +1        ENDIF
                    =1 4687 +1
                    =1 4688 +1        IF(0=1)
                    =1 4689 +1            setb psScanCode.0
                    =1 4690 +1        ENDIF
                    =1 4691 +1
0E96 20E408         =1 4692 +1        jb    ACC.EXT,_ps0Bitis1
0E99 30F41F         =1 4693 +1        jnb   B.EXT,_ps0NextBit
0E9C 201D10         =1 4694 +1        jb    kbAddrFlag,_ps0WrtKBuf
0E9F C1A9           =1 4695 +1        ajmp  _ps0WrtSBuf
                    =1 4696 +1
0EA1                =1 4697 +1    _ps0Bitis1:
0EA1 20F417         =1 4698 +1        jb    B.EXT,_ps0NextBit
0EA4 D257           =1 4699 +1        setb  psScanCode.7
0EA6 201D06         =1 4700 +1        jb    kbAddrFlag,_ps0WrtKBuf
                    =1 4701 +1
0EA9                =1 4702 +1    _ps0WrtSBuf:
0EA9 E52A           =1 4703 +1        mov   A,psScanCode
0EAB B184           =1 4704 +1        call  prvWriteOutputBuffer
0EAD C1BB           =1 4705 +1        ajmp  _ps0NextBit
                    =1 4706 +1
0EAF                =1 4707 +1    _ps0WrtKBuf:
0EAF A919           =1 4708 +1        mov   ?psTmpPtr,kTmpPtr
0EB1 A72A           =1 4709 +1        mov   @?psTmpPtr,psScanCode
0EB3 74E1           =1 4710 +1        mov   A,#-(kTmpBuf+1)
0EB5 29             =1 4711 +1        add   A,?psTmpPtr
0EB6 30E702         =1 4712 +1        jnb   ACC.7,_ps0NextBit
0EB9 0519           =1 4713 +1        inc   kTmpPtr
                    =1 4714 +1
0EBB                =1 4715 +1    _ps0NextBit:
                    =1 4716 +1
                    =1 4718
```

β— Page 72

```
             =1 4719
             =1 4720        ;Ok its now time to update the t2Rom and
             =1 4721        ;------------------------------------------
             =1 4722        ;then to toggle the oddCycleFlag(true when odd)
             =1 4723        ;------------------------------------------
OEBB         =1 4724        _ps5:
OEBB EB      =1 4725        mov A,?psScanByte
OEBC 54F0    =1 4726        anl A,#0F0h         ;get the data
OEBE 201C08  =1 4727        jb oddAddrFlag,_ps6
OEC1 C4      =1 4728        swap A
OEC2 F5F0    =1 4729        mov B,A
OEC4 E6      =1 4730        mov A,@?t2RomPtr
OEC5 54F0    =1 4731        anl A,#0F0h              ;zero lower nibble
             =1 4732
OEC7 C1CE    =1 4733        ajmp _ps7
             =1 4734
OEC9         =1 4735        _ps6:
OEC9 F5F0    =1 4736        mov B,A
OECB E6      =1 4737        mov A,@?t2RomPtr
OECC 540F    =1 4738        anl A,#0Fh               ;zero upper nibble
             =1 4739
OECE         =1 4740        _ps7:
OECE 45F0    =1 4741        orl A,B
OED0 F6      =1 4742        mov @?t2RomPtr,A         ;now write back the updated
byte to t2Rom
             =1 4743
             =1 4744
             =1 4745        ;(10U&k2S(s#8&18D
                                                             =1      4746
;>>>>>>>>>>>>>>>>>>>>>>>>>>>>><<<<<<<<<<<<<<<<<<<<<<<<<<<<<<
             =1 4747        ;KEYBOARD PROCESSING
                                                             =1      4748
;>>>>>>>>>>>>>>>>>>>>>>>>>>>>><<<<<<<<<<<<<<<<<<<<<<<<<<<<<<
             =1 4749             ?kbRomPtr      EQU     R0
             =1 4750             ?kbLoop        EQU     R7
             =1 4751
OED1         =1 4752        _kbStart:
OED1 E564    =1 4753        mov A,swAddrData         ;[swEnd][swColAddr]
OED3 C4      =1 4754        swap A                   ;  MSN     LSN
OED4 540F    =1 4755        anl A,#0Fh
OED6 B50479  =1 4756            cjne A,AR4,_psExit          ;R4 = ?psColAddr
- need abs reg reference here.
             =1 4757
             =1 4758        ;If we are here then we have reached the end of this
particular
             =1 4759        ;kb scan and its time to process the data.
OED9 E519    =1 4760        mov A,kTmpPtr
OEDB 24E2    =1 4761        add A,#-kTmpBuf          ;(kTmpPtr-kTmpBuf)=number of
keys in buffer.
OEDD 6017    =1 4762        jz _kbCheckForAutoRep
             =1 4763
OEDF E51F    =1 4764        mov A,(kTmpBuf+1)        ;look at the 2nd char.
OEE1 7049    =1 4765        jnz _kbExit              ;if non-zero 2nd entry dump
everything.
OEE3 E51E    =1 4766        mov A,kTmpBuf            ;get the key
OEE5 20E70A  =1 4767        jb ACC.7,_kbKeyRelease
             =1 4768                                 ;init the delay and auto rep counters
regardless or whether
             =1 4769                    ;they are being used.
```

β- Page 73

```
OEE8 851C1D      =1  4770            mov autoRepCounter,autoRepPeriod
OEEB 854241      =1  4771            mov delayCounter,delayPeriod
OEEE D21F        =1  4772            setb keyPressedFlag      ;note that a key is down.
OEF0 E11E        =1  4773            ajmp _kbWrtByte
                 =1  4774
OEF2             =1  4775    _kbKeyRelease:
OEF2 C21F        =1  4776            clr keyPressedFlag
OEF4 E12C        =1  4777            ajmp _kbExit
                 =1  4778
OEF6             =1  4779    _kbCheckForAutoRep:
                 =1  4780            ;Triple check that a key is still down by ANDing all of
                 =1  4781            ;the bytes of the current kbStateROMs. Remember that
                 =1  4782            ;key depression/release is edge triggered.
                 =1  4783
OEF6 7834        =1  4784            mov ?kbRomPtr,#SROM0
OEF8 301B02      =1  4785            jnb oddCycleFlag,_kbGoCheck
OEFB 783A        =1  4786            mov ?kbRomPtr,#SROM1
OEFD             =1  4787    _kbGoCheck:
OEFD 7F05        =1  4788            mov ?kbLoop,#5
OEFF E6          =1  4789            mov A,@?kbRomPtr               ;init the ACC
OF00 08          =1  4790            inc ?kbRomPtr
OF01             =1  4791    _kbLoop:
OF01 56          =1  4792            anl A,@?kbRomPtr
OF02 08          =1  4793            inc ?kbRomPtr
OF03 DFFC        =1  4794            djnz ?kbLoop,_kbLoop
OF05 B4FF02      =1  4795            cjne A,#0FFh,_kbCFAR1
OF08 C1F2        =1  4796            ajmp _kbKeyRelease      ;Somehow missed the release.
                 =1  4797
OF0A             =1  4798    _kbCFAR1:
OF0A A21E        =1  4799            mov C,autoRepFlag
OF0C 821F        =1  4800            anl C,keyPressedFlag
OF0E 501C        =1  4801            jnc _kbExit
                 =1  4802
OF10             =1  4803    _kbCheckDelay:
OF10 E541        =1  4804            mov A,delayCounter
OF12 6004        =1  4805            jz _kbAutoRepKey
OF14 1541        =1  4806            dec delayCounter
OF16 E12C        =1  4807            ajmp _kbExit
                 =1  4808
OF18             =1  4809    _kbAutoRepKey:
OF18 D51D11      =1  4810            djnz autoRepCounter,_kbExit
OF1B 851C1D      =1  4811            mov autoRepCounter,autoRepPeriod
                 =1  4812            ;Having reset the autoRepCounter we can drop thro
                 =1  4813            ;to the write byte routine.
OF1E             =1  4814    _kbWrtByte:
OF1E B2B4        =1  4815            cpl SOUNDOUTPIN          ;make a click
OF20 E51E        =1  4816            mov A,kTmpBuf            ;get the key
                 =1  4817
OF22 A222        =1  4818            mov C,shiftFlag          ;This routine assumes that the row and col
OF24 92E6        =1  4819            mov ACC.6,C              ;address info is in place and just need to
```

B - Page 74

```
0F26 A221      =1  4820         mov C,cntrlFlag           ;add any modifer info.
0F28 92E7      =1  4821         mov ACC.7,C
0F2A B184      =1  4822         call prvWriteOutputBuffer
               =1  4823
0F2C           =1  4824     _kbExit:
0F2C 75191E    =1  4825         mov kTmpPtr,#kTmpBuf      ;reset the pointer and flags.
0F2F 751F00    =1  4826         mov (kTmpBuf+1),#0        ;reset 2nd char for 2 key lock out tests
0F32 C222      =1  4827         clr shiftFlag
0F34 C221      =1  4828         clr cntrlFlag
0F36 B21B      =1  4829         cpl oddCycleFlag
               =1  4830
0F38 E152      =1  4831         ajmp _psExit
               =1  4832
                                                          =1      4833
;>>>>>>>>>>>>>>>>>>>>>>>>>>>>>><<<<<<<<<<<<<<<<<<<<<<<<<<<<<<
               =1  4834
0F3A           =1  4835     _kbModKey:
0F3A EB        =1  4836         mov A,?psScanByte
0F3B 54F0      =1  4837         anl A,#0F0h
0F3D B4E004    =1  4838         cjne A,#0E0h,_kmk1
0F40 D222      =1  4839         setb shiftFLag
0F42 E152      =1  4840         ajmp _psExit
               =1  4841
0F44           =1  4842     _kmk1:
0F44 B4D004    =1  4843         cjne A,#0D0h,_kmk2
0F47 D221      =1  4844         setb cntrlFlag
0F49 E152      =1  4845         ajmp _psExit
               =1  4846
0F4B           =1  4847     _kmk2:
0F4B B4B004    =1  4848         cjne A,#0B0h,_psExit
0F4E D222      =1  4849         setb shiftFlag
0F50 D221      =1  4850         setb cntrlFlag
               =1  4851
                                                          =1      4852
;>>>>>>>>>>>>>>>>>>>>>>>>>>>>>><<<<<<<<<<<<<<<<<<<<<<<<<<<<<<
0F52           =1  4853     _psExit:
0F52 020CAA    =1  4854         ljmp _processSwitchesReturn
               =1  4855     ;END
               =1  4856     $include(serialTx.asm)
               =1  4857     ;*********
0F55           =1  4858     subTxData:
               =1  4859     ;*********
0F55 20040A    =1  4860         jb serOutActiveFlag,_stdExit
0F58 F55F      =1  4861         mov txBufPtr,A
0F5A D204      =1  4862         setb serOutActiveFlag
0F5C D205      =1  4863         setb txFlag
0F5E D236      =1  4864         setb txStartMsgFlag
0F60 C239      =1  4865         clr  txTextFlag
0F62           =1  4866     _stdExit:
0F62 22        =1  4867         ret
               =1  4868
               =1  4869     ;********
0F63           =1  4870     serialTx:
               =1  4871     ;********
               =1  4872     ;This routine requires txBufPtr initialized to the start of the
```

B - Page 75

```
                         =1  4873        ;block of data to be transmited and then the message
length + 1
                         =1  4874        ;writing to txMsgLen.
                         =1  4875
005B                     =1  4876        TXDATASTARTCHAR     EQU     '['
005D                     =1  4877        TXDATAENDCHAR       EQU     ']'
0028                     =1  4878        TXERRSTARTCHAR      EQU     '('
0029                     =1  4879        TXERRENDCHAR        EQU     ')'
                         =1  4880
                         =1  4881        ;LOCAL VARS
                         =1  4882        ?txPtr              EQU     R0
                         =1  4883        ?txChar             EQU     R2
                         =1  4884
0F63 303616              =1  4885        jnb txStartMsgFlag,_tx0
0F66 C236                =1  4886                    clr txStartMsgFlag
0F68 C237                =1  4887                    clr txEndMsgFlag        ;just a pre-caution
should already be low.
0F6A 303806              =1  4888                jnb txErrorMsgFlag,_txDataStart
0F6D 759928              =1  4889                    mov SBUF,#TXERRSTARTCHAR
0F70 020082              =1  4890        jmp _serialTxReturn
                         =1  4891
0F73                     =1  4892        _txDataStart:
0F73 75995B              =1  4893                    mov SBUF,#TXDATASTARTCHAR
0F76 75625B              =1  4894                    mov txCheckSum,#TXDATASTARTCHAR
0F79 020082              =1  4895        jmp _serialTxReturn
                         =1  4896
0F7C                     =1  4897        _tx0:
0F7C 203A4F              =1  4898        jb txEndChecksumFlag,_txStdExit
0F7F 20376E              =1  4899        jb txEndMsgFlag,_txEndMsg
0F82 10353A              =1  4900            jbc txNextDigitFlag,_txOutLSDigit    ;if previous
write was the MS digit
                         =1  4901                                                 ;then now
output the LS digit.
0F85 D56003              =1  4902                    djnz txMsgLen,_tx1
                         =1  4903                    ;reached end of buffer, reset and exit
0F88 020FD9              =1  4904                    jmp _txTermChar
                         =1  4905
0F8B                     =1  4906        _tx1:
0F8B 30390D              =1  4907        jnb txTextFlag,_txHexDigit
0F8E 855F82              =1  4908                    mov DPL,txBufPtr
0F91 055F                =1  4909                    inc txBufPtr
0F93 758300              =1  4910                    mov DPH,#0
0F96 E4                  =1  4911                    clr A
0F97 93                  =1  4912                    movc A,@A+DPTR
0F98 020FC5              =1  4913        jmp _txAsciiLetter
                         =1  4914
0F9B                     =1  4915        _txHexDigit:
0F9B A85F                =1  4916                    mov ?txPtr,txBufPtr
0F9D E6                  =1  4917                    mov A,@?txPtr           ;get the byte to be
transmitted.
                         =1  4918
0F9E 055F                =1  4919                    inc txBufPtr            ;inc for ptr next time.
0FA0 FA                  =1  4920                    mov ?txChar,A
0FA1 D235                =1  4921                    setb txNextDigitFlag
0FA3 540F                =1  4922                    anl A,#0Fh
0FA5 F561                =1  4923                    mov txLsByte,A
0FA7 EA                  =1  4924                    mov A,?txChar
0FA8 54F0                =1  4925                    anl A,#0F0h
0FAA C4                  =1  4926                    swap A
```

β - Page 76

```
                    =1    4927
        OFAB        =1    4928            _txReprocess:
        OFAB F5F0   =1    4929            mov B,A
        OFAD C3     =1    4930            clr C
        OFAE 940A   =1    4931            subb A,#10
        OFB0 30E707 =1    4932            jnb ACC.7,_txAlphaDigit
        OFB3 E5F0   =1    4933            mov A,B
        OFB5 2430   =1    4934            add A,#'0'
        OFB7 020FC5 =1    4935            jmp _txAsciiLetter
                    =1    4936
        OFBA        =1    4937            _txAlphaDigit:
        OFBA 2441   =1    4938            add A,#'A'
        OFBC 020FC5 =1    4939            jmp _txAsciiLetter
                    =1    4940
        OFBF        =1    4941            _txOutLSDigit:
        OFBF E561   =1    4942            mov A,txLsByte
        OFC1 C235   =1    4943            clr txNextDigitFlag
        OFC3 80E6   =1    4944            jmp _txReprocess
                    =1    4945
        OFC5        =1    4946        _txAsciiLetter:
                    =1    4947        ;checksum code
        OFC5 F599   =1    4948                    mov SBUF,A
        OFC7 2562   =1    4949            add A,txChecksum
        OFC9 F562   =1    4950            mov txChecksum,A
        OFCB 020FD6 =1    4951            jmp _txExit
                    =1    4952
        OFCE        =1    4953            _txStdExit:
        OFCE C237   =1    4954        clr txEndMsgFlag
        OFD0 C204   =1    4955        clr serOutActiveFlag
        OFD2 C238   =1    4956        clr txErrorMsgFlag
        OFD4 C23A   =1    4957            clr txEndChecksumFlag
        OFD6        =1    4958        _txExit:
        OFD6 020082 =1    4959        jmp _serialTxReturn
                    =1    4960
        OFD9        =1    4961            _txTermChar:
        OFD9 303806 =1    4962        jnb txErrorMsgFlag,_txDataEnd
        OFDC 759929 =1    4963                    mov SBUF,#TXERRENDCHAR
        OFDF 020FEB =1    4964            jmp _txFlagEnd
        OFE2        =1    4965        _txDataEnd:
        OFE2 75995D =1    4966                    mov SBUF,#TXDATAENDCHAR
        OFE5 745D   =1    4967                mov A,#TXDATAENDCHAR
        OFE7 2562   =1    4968                    add A,txChecksum
        OFE9 F562   =1    4969                    mov txChecksum,A
        OFEB        =1    4970        _txFlagEnd:
        OFEB D237   =1    4971                setb txEndMsgFlag
        OFED 020082 =1    4972        jmp _serialTxReturn
                  - =1    4973
        OFF0        =1    4974            _txEndMsg:
        OFF0 2038DB =1    4975                jb txErrorMsgFlag,_txStdExit    ;Error codes do
        not have checksums
        OFF3 3009D8 =1    4976            jnb checksumFlag,_txStdExit
        OFF6 856299 =1    4977                mov SBUF,txChecksum
        OFF9 D23A   =1    4978                setb txEndCheckSumFlag
        OFFB 020082 =1    4979        jmp _serialTxReturn
                    =1    4980
                          4981        END VERSION 1.2k ASSEMBLY COMPLETE, 0 ERRORS FOUND
?ACADMODE. . . . . . . . . . . . .     NUMB   0005H
```

B - Page 77

```
?ARDELAYPERIOD  . . . . . . . . .   REG3
?ATHERROR. . . . . . . . . . . .    NUMB    000EH
?ATHTEMP . . . . . . . . . . . .    NUMB    000FH
?BCERR . . . . . . . . . . . . .    NUMB    000EH
?BCLOWER . . . . . . . . . . . .    NUMB    000CH
?BCTEMP. . . . . . . . . . . . .    NUMB    000FH
?BCUPPER . . . . . . . . . . . .    NUMB    000DH
?CADDIGITPTR . . . . . . . . . .    REG0
?CADDPPTR. . . . . . . . . . . .    REG1            NOT USED
?CADLOOP . . . . . . . . . . . .    REG4
?CADMODE . . . . . . . . . . . .    REG5
?CADRST. . . . . . . . . . . . .    REG3
?COUNTERPTR. . . . . . . . . . .    REG0
?CURRENTSTATE. . . . . . . . . .    REG2
?ENCODERADDR . . . . . . . . . .    REG6
?ENCTEMP . . . . . . . . . . . .    REG7
?FIFORDPTR . . . . . . . . . . .    REG0
?GBERR . . . . . . . . . . . . .    NUMB    000EH
?GBLOWER . . . . . . . . . . . .    NUMB    000CH
?GBUPPER . . . . . . . . . . . .    NUMB    000DH
?GNPERR. . . . . . . . . . . . .    NUMB    000EH
?GNPFIFOPTR. . . . . . . . . . .    REG0
?GNPLOWER. . . . . . . . . . . .    NUMB    000CH
?GNPUPPER. . . . . . . . . . . .    NUMB    000DH
?INITLOOP. . . . . . . . . . . .    REG2
?INITPTR . . . . . . . . . . . .    REG0
?INITTEMP. . . . . . . . . . . .    REG3            NOT USED
?INPUTDATA . . . . . . . . . . .    REG4
?KBLOOP. . . . . . . . . . . . .    REG7
?KBROMPTR. . . . . . . . . . . .    REG0
?LADIGITA. . . . . . . . . . . .    NUMB    000CH
?LADIGITB. . . . . . . . . . . .    NUMB    000DH
?LADPREGA. . . . . . . . . . . .    NUMB    000AH
?LADPREGB. . . . . . . . . . . .    NUMB    000BH
?LDMDATA . . . . . . . . . . . .    REG3
?LDMWIDTH. . . . . . . . . . . .    REG2            NOT USED
?LEDBUFPTR . . . . . . . . . . .    REG0
?LEDCOLADDR. . . . . . . . . . .    REG3
?LEDDIGIT0 . . . . . . . . . . .    REG4
?LEDDIGIT1 . . . . . . . . . . .    REG5
?LEDDIGIT2 . . . . . . . . . . .    REG6
?LEDDIGIT3 . . . . . . . . . . .    REG7
?LEDFLASHPTR . . . . . . . . . .    REG1
?LEDINVERTPTR. . . . . . . . . .    REG1
?LEDP2 . . . . . . . . . . . . .    NUMB    0009H   NOT USED
?LEDTEMP . . . . . . . . . . . .    REG2
?LEPPARAM. . . . . . . . . . . .    REG3            NOT USED
?LEPSUBFUNC. . . . . . . . . . .    REG2            NOT USED
?LFDISPLAYNUM. . . . . . . . . .    REG2
?LFLEFTRIGHT . . . . . . . . . .    REG3
?LFMODE. . . . . . . . . . . . .    REG4
?LMADISPLAY. . . . . . . . . . .    REG2
?LMAPTR. . . . . . . . . . . . .    REG0            NOT USED
?LMCDISPLAYEND . . . . . . . . .    REG3            NOT USED
?LNDIGITA. . . . . . . . . . . .    NUMB    000CH
?LNDIGITB. . . . . . . . . . . .    NUMB    000DH
?LNDPREGA. . . . . . . . . . . .    NUMB    000AH
?LNDPREGB. . . . . . . . . . . .    NUMB    000BH
?LSCDESTMASK . . . . . . . . . .    REG3            REDEFINABLE
```

β - Page 78

```
?LSCLOOP . . . . . . . . . . . . .    REG5            REDEFINABLE
?LSCPTR. . . . . . . . . . . . . .    REG0            REDEFINABLE
?LSCSOURCEMASK . . . . . . . . .      REG4            REDEFINABLE
?LSCTEMP . . . . . . . . . . . . .    REG6            REDEFINABLE
?LWCFROMPTR. . . . . . . . . . .      REG0            NOT USED
?LWCLOOP . . . . . . . . . . . . .    REG3            NOT USED
?LWCTOPTR. . . . . . . . . . . . .    REG1            NOT USED
?MCLEOD. . . . . . . . . . . . . .    NUMB   000AH    NOT USED
?MFWRTPTR. . . . . . . . . . . . .    REG0
?OHLOOP. . . . . . . . . . . . . .    REG2
?OHTEMP. . . . . . . . . . . . . .    REG7            NOT USED
?OIENABLINE. . . . . . . . . . . .    REG2
?OILINES . . . . . . . . . . . . .    REG3
?OIPSUBFUNC. . . . . . . . . . . .    REG3
?OIWIDTH . . . . . . . . . . . . .    REG4
?OLDSTATE. . . . . . . . . . . . .    REG3
?OLDSTATEPTR . . . . . . . . . .      REG1
?OMADISPLAY. . . . . . . . . . . .    REG2
?OMCTEMP . . . . . . . . . . . . .    REG7            NOT USED
?OPWCHAR . . . . . . . . . . . . .    REG2
?OPWWIDTH. . . . . . . . . . . . .    REG3
?OPXBOOLPARAM. . . . . . . . . .      REG3            NOT USED
?OTBPTEMP. . . . . . . . . . . . .    NUMB   000FH    NOT USED
?PLWBSAVE. . . . . . . . . . . . .    REG4            NOT USED
?PLWCHAR . . . . . . . . . . . . .    REG2
?PLWCHARPTR. . . . . . . . . . . .    REG1
?PLWDPPTR. . . . . . . . . . . . .    REG0            NOT USED
?PLWTEMP . . . . . . . . . . . . .    REG3
?PSCOLADDR . . . . . . . . . . .      REG4
?PSSCANBYTE. . . . . . . . . . . .    REG3
?PSSHFTCOL . . . . . . . . . . . .    REG5
?PSTMPPTR. . . . . . . . . . . . .    REG1
?REPTR . . . . . . . . . . . . . .    REG1
?RERESETFLAG . . . . . . . . . .      REG2
?RKBFMPTR. . . . . . . . . . . . .    REG0
?RKBLOOP . . . . . . . . . . . . .    REG2
?RKBNUMBYTES . . . . . . . . . .      REG3
?RKBTOPTR. . . . . . . . . . . . .    REG1
?SHIFTEDDATA . . . . . . . . . .      REG5
?SOENCCOL. . . . . . . . . . . . .    REG4
?SOENCEND. . . . . . . . . . . . .    REG2
?SOSWCOL . . . . . . . . . . . . .    REG5
?SOSWEND . . . . . . . . . . . . .    REG3
?T1ROMDATA . . . . . . . . . . .      REG6
?T1ROMPTR. . . . . . . . . . . . .    REG2
?T2ROMDATA . . . . . . . . . . .      REG7
?T2ROMPTR. . . . . . . . . . . . .    REG0
?TXCHAR. . . . . . . . . . . . . .    REG2
?TXPTR . . . . . . . . . . . . . .    REG0
?WCTCHAR . . . . . . . . . . . . .    REG2
?WCTP2 . . . . . . . . . . . . . .    NUMB   0009H    NOT USED
?WCTTEMP . . . . . . . . . . . . .    NUMB   0008H    NOT USED
?WOBCHAR . . . . . . . . . . . . .    NUMB   000AH
?WOBPTR. . . . . . . . . . . . . .    REG1
?WPLWRTLINE. . . . . . . . . . . .    REG3
?WPPORT. . . . . . . . . . . . . .    REG2
AC . . . . . . . . . . . . . . . .  B ADDR  00D6H    NOT USED
ACC. . . . . . . . . . . . . . . .  D ADDR  00E0H
ACKENABLEFLAG. . . . . . . . . .    B ADDR  0047H
```

B - Page 79

```
ACKFLAG. . . . . . . . . . . . . . .  B ADDR  0008H
ADDRFORMINGFLAG. . . . . . . . .     B ADDR  0045H
ADDRMSD. . . . . . . . . . . . . .   D ADDR  0073H
ALLREGS. . . . . . . . . . . . . .    NUMB   0087H
AUTOREPCOUNTER . . . . . . . . .     D ADDR  001DH
AUTOREPEAT . . . . . . . . . . .     C ADDR  05DDH
AUTOREPFLAG. . . . . . . . . . .     B ADDR  001EH
AUTOREPPERIOD. . . . . . . . . .     D ADDR  001CH
B. . . . . . . . . . . . . . . . .   D ADDR  00F0H
BITCOUNTER . . . . . . . . . . .      NUMB   0047H  REDEFINABLE
BLANK012 . . . . . . . . . . . .      NUMB   008FH
BLANK013 . . . . . . . . . . . .      NUMB   0097H
BLANK023 . . . . . . . . . . . .      NUMB   00A7H
BLANK123 . . . . . . . . . . . .      NUMB   00C7H
CHECKADDRFLAG. . . . . . . . . .     B ADDR  0044H
CHECKSUMFLAG . . . . . . . . . .     B ADDR  0009H
CLOCK. . . . . . . . . . . . . .     C ADDR  00D9H
CNTRLFLAG. . . . . . . . . . . .     B ADDR  0021H
COL4FLAG . . . . . . . . . . . .     B ADDR  0020H
COLREG . . . . . . . . . . . . .      NUMB   007FH
COUNTER0 . . . . . . . . . . . .     D ADDR  0065H
COUNTER1 . . . . . . . . . . . .     D ADDR  0066H  NOT USED
COUNTER2 . . . . . . . . . . . .     D ADDR  0067H
COUNTER3 . . . . . . . . . . . .     D ADDR  0068H  NOT USED
COUNTER4 . . . . . . . . . . . .     D ADDR  0069H
COUNTER5 . . . . . . . . . . . .     D ADDR  006AH  NOT USED
COUNTER6 . . . . . . . . . . . .     D ADDR  006BH
COUNTER7 . . . . . . . . . . . .     D ADDR  006CH  NOT USED
CURSORISBRIGHTUP . . . . . . . .     C ADDR  0BE4H  NOT USED
CURSORISFLASH. . . . . . . . . .     C ADDR  0BEBH
CURSORTYPEFLAG . . . . . . . . .     B ADDR  0025H
CY . . . . . . . . . . . . . . .     B ADDR  00D7H  NOT USED
DATACOUNTER. . . . . . . . . . .      NUMB   0078H  REDEFINABLE
DDMULT . . . . . . . . . . . . .     D ADDR  0030H
DEFKEYBOARDEND . . . . . . . . .     C ADDR  05B6H
DEFSWITCHEND . . . . . . . . . .     C ADDR  05C5H
DELAYCOUNTER . . . . . . . . . .     D ADDR  0041H
DELAYPERIOD. . . . . . . . . . .     D ADDR  0042H
DEVICEADDR . . . . . . . . . . .     D ADDR  001AH
DISABLELEDFLAG . . . . . . . . .     B ADDR  000AH
DISPLAYONFLAG. . . . . . . . . .     B ADDR  0034H
DPH. . . . . . . . . . . . . . .     D ADDR  0083H
DPL. . . . . . . . . . . . . . .     D ADDR  0082H
EA . . . . . . . . . . . . . . .     B ADDR  00AFH  NOT USED
ENCADDRDATA. . . . . . . . . . .     D ADDR  0063H
ENCODERINITPARSER. . . . . . . .     C ADDR  0602H
ENCODERREAD. . . . . . . . . . .     C ADDR  0633H
ENCODERS . . . . . . . . . . . .     C ADDR  0CADH
ENCSATFLAG . . . . . . . . . . .     B ADDR  003CH
ENCSCANFLAG. . . . . . . . . . .     B ADDR  003BH
ENDEXTCMD1 . . . . . . . . . . .      NUMB   0000H
ENDEXTCMD2 . . . . . . . . . . .      NUMB   000AH
ENDEXTCMD3 . . . . . . . . . . .      NUMB   000DH
ENDOFFLAGS . . . . . . . . . . .      NUMB   0028H
ERRENABLEFLAG. . . . . . . . . .     B ADDR  0032H
ERRORFLAG. . . . . . . . . . . .     B ADDR  0001H
ES . . . . . . . . . . . . . . .     B ADDR  00ACH  NOT USED
ET0. . . . . . . . . . . . . . .     B ADDR  00A9H  NOT USED
ET1. . . . . . . . . . . . . . .     B ADDR  00ABH  NOT USED
```

β - Page 80

```
EX0. . . . . . . . . . . . . . . . .  B ADDR  00A8H  NOT USED
EX1. . . . . . . . . . . . . . . . .  B ADDR  00AAH  NOT USED
EXT. . . . . . . . . . . . . . . . .    NUMB  0004H  REDEFINABLE
F0 . . . . . . . . . . . . . . . . .  B ADDR  00D5H
FIFODEPTH. . . . . . . . . . . . . .    NUMB  0005H
FLASHFLAG. . . . . . . . . . . . . .  B ADDR  0033H
FOURHZOSC. . . . . . . . . . . . . .  D ADDR  002FH
IE . . . . . . . . . . . . . . . . .  D ADDR  00A8H
IE0. . . . . . . . . . . . . . . . .  B ADDR  0089H  NOT USED
IE1. . . . . . . . . . . . . . . . .  B ADDR  008BH  NOT USED
IGNOREFLAG . . . . . . . . . . . . .  B ADDR  0043H
INITIALIZATION . . . . . . . . . . .  C ADDR  014BH
INT0 . . . . . . . . . . . . . . . .  B ADDR  00B2H  NOT USED
INT1 . . . . . . . . . . . . . . . .  B ADDR  00B3H  NOT USED
INVBPTABLE . . . . . . . . . . . . .  C ADDR  0AA4H
INVERTCOLFLAG. . . . . . . . . . . .  B ADDR  002FH
INVERTROWFLAG. . . . . . . . . . . .  B ADDR  002EH
IP . . . . . . . . . . . . . . . . .  D ADDR  00B8H
IT0. . . . . . . . . . . . . . . . .  B ADDR  0088H  NOT USED
IT1. . . . . . . . . . . . . . . . .  B ADDR  008AH  NOT USED
KBADDRFLAG . . . . . . . . . . . . .  B ADDR  001DH
KBINITPARSER . . . . . . . . . . . .  C ADDR  05A0H
KEYBOARDEND. . . . . . . . . . . . .  D ADDR  0043H
KEYPRESSEDFLAG . . . . . . . . . . .  B ADDR  001FH
KTMPBUF. . . . . . . . . . . . . . .  D ADDR  001EH
KTMPPTR. . . . . . . . . . . . . . .  D ADDR  0019H
LCD0ENABLE . . . . . . . . . . . . .    NUMB  00FDH
LCD1ENABLE . . . . . . . . . . . . .    NUMB  00FBH
LEDACTIVECURSOR. . . . . . . . . . .  D ADDR  005DH
LEDACTIVEDISPLAY . . . . . . . . . .  D ADDR  005CH
LEDAUTOINC . . . . . . . . . . . . .  C ADDR  08C8H
LEDAUTOINCFLAG . . . . . . . . . . .  B ADDR  0031H
LEDBCOUNT. . . . . . . . . . . . . .  D ADDR  005BH
LEDBUFFER. . . . . . . . . . . . . .  D ADDR  0044H
LEDBUFPTR. . . . . . . . . . . . . .  D ADDR  005AH
LEDCLEAR . . . . . . . . . . . . . .  C ADDR  0871H
LEDCURSORENABLEFLAG. . . . . . . . .  B ADDR  0026H
LEDCURSORONOFF . . . . . . . . . . .  C ADDR  08E0H
LEDCURSORTYPE. . . . . . . . . . . .  C ADDR  07BBH
LEDDEFMODE . . . . . . . . . . . . .  C ADDR  076FH
LEDDISPLAY . . . . . . . . . . . . .  C ADDR  0B70H
LEDDPPOS . . . . . . . . . . . . . .  C ADDR  0B38H
LEDDPREG0. . . . . . . . . . . . . .  D ADDR  0054H
LEDDPREG1. . . . . . . . . . . . . .  D ADDR  0055H
LEDDPREG2. . . . . . . . . . . . . .  D ADDR  0056H
LEDDPREG3. . . . . . . . . . . . . .  D ADDR  0057H
LEDEDITPARSER. . . . . . . . . . . .  C ADDR  0745H
LEDEXTCMDFLAG. . . . . . . . . . . .  B ADDR  0030H
LEDEXTNDECODE. . . . . . . . . . . .  C ADDR  0B60H
LEDFLASHCOUNTER. . . . . . . . . . .  D ADDR  005EH
LEDFORMAT. . . . . . . . . . . . . .  C ADDR  07CDH
LEDFORMATFLAGSBYTEADDR . . . . . . .    NUMB  0025H
LEDHEXDECODE . . . . . . . . . . . .  C ADDR  0B50H
LEDINITPARSER. . . . . . . . . . . .  C ADDR  0726H
LEDMAKEACTIVE. . . . . . . . . . . .  C ADDR  081EH
LEDMODE. . . . . . . . . . . . . . .  D ADDR  0058H
LEDMOVECURSOR. . . . . . . . . . . .  C ADDR  08F8H
LEDNUMDECODE . . . . . . . . . . . .  C ADDR  0B40H
LEDRESCAN. . . . . . . . . . . . . .  C ADDR  0AACH
```

*B* - Page 81

```
LEDSCANCOUNT . . . . . . . . . . .  D ADDR  001BH
LEDSETFLASH. . . . . . . . . . . .  C ADDR  07A6H
LEDWIDTH . . . . . . . . . . . . .  D ADDR  0059H
LEDWRITECHAR . . . . . . . . . . .  C ADDR  090BH
LEDWRITEENABLE . . . . . . . . . .  C ADDR  09DCH
LFCLKFLAG. . . . . . . . . . . . .  B ADDR  000CH
LOWERMSGLIMIT. . . . . . . . . . .    NUMB  0041H
MAIN . . . . . . . . . . . . . . .  C ADDR  004CH
MFCHECKSUM . . . . . . . . . . . .  D ADDR  0072H
MFEXTCMDFLAG . . . . . . . . . . .  B ADDR  0041H
MFRXWRTPTR . . . . . . . . . . . .  D ADDR  0071H
MFTASKFORMINGFLAG. . . . . . . . .  B ADDR  0040H
MSGENDBYTE . . . . . . . . . . . .    NUMB  007DH
MSGPARSER. . . . . . . . . . . . .  C ADDR  04EAH
MSGSTARTBYTE . . . . . . . . . . .    NUMB  007BH
NOCURSOROFF. . . . . . . . . . . .  C ADDR  0BFDH
NODONORMALSCAN . . . . . . . . . .  C ADDR  0B75H
NONOTACTIVECOLUMN. . . . . . . . .  C ADDR  0BFDH
OCTBROM. . . . . . . . . . . . . .  C ADDR  0011H
ODDADDRFLAG. . . . . . . . . . . .  B ADDR  001CH
ODDCYCLEFLAG . . . . . . . . . . .  B ADDR  001BH
ODDFLAG. . . . . . . . . . . . . .  B ADDR  002DH
OLDCLKFLAG . . . . . . . . . . . .  B ADDR  000DH
OLDSTATE0. . . . . . . . . . . . .  D ADDR  006DH
OLDSTATE1. . . . . . . . . . . . .  D ADDR  006EH
OLDSTATE2. . . . . . . . . . . . .  D ADDR  006FH
OLDSTATE3. . . . . . . . . . . . .  D ADDR  0070H
OPX4LINEFLAG . . . . . . . . . . .  B ADDR  0013H
OPXACTIVECURSOR. . . . . . . . . .  D ADDR  0032H
OPXACTIVEENABLEFLAG. . . . . . . .  B ADDR  0011H
OPXACTIVESOL . . . . . . . . . . .  D ADDR  0031H
OPXCLEAR . . . . . . . . . . . . .  C ADDR  0354H
OPXCURSORONOFF . . . . . . . . . .  C ADDR  039EH
OPXCURSORTYPE. . . . . . . . . . .  C ADDR  027CH
OPXCURSORTYPEFLAG. . . . . . . . .  B ADDR  0010H
OPXDIRECT. . . . . . . . . . . . .  C ADDR  036FH
OPXDLFLAG. . . . . . . . . . . . .  B ADDR  0018H
OPXDLINIT. . . . . . . . . . . . .  C ADDR  02A5H
OPXDOWNLOAD. . . . . . . . . . . .  C ADDR  02B3H
OPXEDITPARSER. . . . . . . . . . .  C ADDR  0584H
OPXINIT. . . . . . . . . . . . . .  C ADDR  01C3H
OPXINITPARSER. . . . . . . . . . .  C ADDR  0553H
OPXMAKEACTIVE. . . . . . . . . . .  C ADDR  02C8H
OPXMOVECURSOR. . . . . . . . . . .  C ADDR  03C8H
OPXMOVECURSORFLAG. . . . . . . . .  B ADDR  0012H
OPXSTATEFLAGS. . . . . . . . . . .    NUMB  0022H
OPXTEMP. . . . . . . . . . . . . .  D ADDR  0033H
OPXW16FLAG . . . . . . . . . . . .  B ADDR  0014H
OPXW20FLAG . . . . . . . . . . . .  B ADDR  0015H
OPXW24FLAG . . . . . . . . . . . .  B ADDR  0016H
OPXW40FLAG . . . . . . . . . . . .  B ADDR  0017H
OPXWRITE . . . . . . . . . . . . .  C ADDR  03F1H
OPXWRITECHAR . . . . . . . . . . .  C ADDR  03DDH
OPXWRITEENABLE . . . . . . . . . .  C ADDR  03E8H
OPX_TIMERENABLE. . . . . . . . . .  B ADDR  001AH
OPX_TIMERFLAG. . . . . . . . . . .  B ADDR  000FH
OUTPUTBUFFER . . . . . . . . . . .  D ADDR  007CH
OUTPUTTODISPLAY. . . . . . . . . .  C ADDR  0BFDH
OV . . . . . . . . . . . . . . . .  B ADDR  00D2H  NOT USED
```

β — Page 82

```
P. . . . . . . . . . . . . . . . .   B  ADDR  00D0H  NOT USED
P0 . . . . . . . . . . . . . . . .   D  ADDR  0080H
P1 . . . . . . . . . . . . . . . .   D  ADDR  0090H
P2 . . . . . . . . . . . . . . . .   D  ADDR  00A0H
P3 . . . . . . . . . . . . . . . .   D  ADDR  00B0H
PARSERFLAGS. . . . . . . . . . . .      NUMB  0028H
PCON . . . . . . . . . . . . . . .   D  ADDR  0087H
PERICLKFLAG. . . . . . . . . . . .   B  ADDR  0023H
PFLAG. . . . . . . . . . . . . . .   B  ADDR  0003H
PITCHCOUNTER . . . . . . . . . . .   D  ADDR  002DH
POSCLKFLAG . . . . . . . . . . . .   B  ADDR  0019H
PROCESSSWITCHES. . . . . . . . . .   C  ADDR  0DB1H
PROCESSTASKFLAG. . . . . . . . . .   B  ADDR  0006H
PRVCLKTHENDELAY. . . . . . . . . .   C  ADDR  024EH
PRVLEDALPHA. . . . . . . . . . . .   C  ADDR  0B0AH
PRVLEDNUMERIC. . . . . . . . . . .   C  ADDR  0AE1H
PRVLEDWRITECHAR. . . . . . . . . .   C  ADDR  09F2H
PRVSETWIDTHFLAGS . . . . . . . . .   C  ADDR  0263H
PRVWRITEOUTPUTBUFFER . . . . . . .   C  ADDR  0D84H
PS . . . . . . . . . . . . . . . .   B  ADDR  00BCH  NOT USED
PSMASKREG. . . . . . . . . . . . .   D  ADDR  0029H
PSSCANCODE . . . . . . . . . . . .   D  ADDR  002AH
PSW. . . . . . . . . . . . . . . .   D  ADDR  00D0H  NOT USED
PT0. . . . . . . . . . . . . . . .   B  ADDR  00B9H  NOT USED
PT1. . . . . . . . . . . . . . . .   B  ADDR  00BBH  NOT USED
PX0. . . . . . . . . . . . . . . .   B  ADDR  00B8H  NOT USED
PX1. . . . . . . . . . . . . . . .   B  ADDR  00BAH  NOT USED
QUADDECODE . . . . . . . . . . . .   C  ADDR  0D45H
RB8. . . . . . . . . . . . . . . .   B  ADDR  009AH  NOT USED
RD . . . . . . . . . . . . . . . .   B  ADDR  00B7H  NOT USED
READFPDATA . . . . . . . . . . . .   C  ADDR  0CA3H
READKBUFFER. . . . . . . . . . . .   C  ADDR  065BH
READYFORCHECKSUMFLAG . . . . . . .   B  ADDR  0042H
REN. . . . . . . . . . . . . . . .   B  ADDR  009CH  NOT USED
RESCAN . . . . . . . . . . . . . .      NUMB  0006H
RESCANFLAG . . . . . . . . . . . .   B  ADDR  0024H
RESERVED . . . . . . . . . . . . .   C  ADDR  0551H
REVLEVEL . . . . . . . . . . . . .   C  ADDR  0702H
REVMSG1. . . . . . . . . . . . . .   C  ADDR  0002H
REVMSG1LEN . . . . . . . . . . . .      NUMB  0010H
RFORMAT0FLAG . . . . . . . . . . .   B  ADDR  0028H  NOT USED
RFORMAT1FLAG . . . . . . . . . . .   B  ADDR  0029H  NOT USED
RFORMAT2FLAG . . . . . . . . . . .   B  ADDR  002AH  NOT USED
RFORMAT3FLAG . . . . . . . . . . .   B  ADDR  002BH  NOT USED
RFORMATFLAG. . . . . . . . . . . .   B  ADDR  002CH
RI . . . . . . . . . . . . . . . .   B  ADDR  0098H
ROMSTART . . . . . . . . . . . . .      NUMB  0000H
ROWREG0. . . . . . . . . . . . . .      NUMB  00BFH
ROWREG1. . . . . . . . . . . . . .      NUMB  00DFH
ROWREG2. . . . . . . . . . . . . .      NUMB  00EFH
ROWREG3. . . . . . . . . . . . . .      NUMB  00F7H
RS . . . . . . . . . . . . . . . .      NUMB  00B5H
RS0. . . . . . . . . . . . . . . .   B  ADDR  00D3H  NOT USED
RS1. . . . . . . . . . . . . . . .   B  ADDR  00D4H  NOT USED
RXBYTE . . . . . . . . . . . . . .   D  ADDR  002BH
RXBYTEFLAG . . . . . . . . . . . .   B  ADDR  0000H
RXD. . . . . . . . . . . . . . . .   B  ADDR  00B0H  NOT USED
RXFIFOEND. . . . . . . . . . . . .      NUMB  0078H
RXFIFOSTART. . . . . . . . . . . .   D  ADDR  0073H
```

B- Page 83

```
SBUF . . . . . . . . . . . . . .  D ADDR  0099H
SBUFFER. . . . . . . . . . . . .  D ADDR  0078H
SBUFPTR. . . . . . . . . . . . .  D ADDR  0040H
SCANLEDFLAG. . . . . . . . . . .  B ADDR  0007H
SCANOUT. . . . . . . . . . . . .  C ADDR  0C60H
SCON . . . . . . . . . . . . . .  D ADDR  0098H
SERIALIOHANDLER. . . . . . . . .  C ADDR  0023H  NOT USED
SERIALTX . . . . . . . . . . . .  C ADDR  0F63H
SEROUTACTIVEFLAG . . . . . . . .  B ADDR  0004H
SETACKFLAG . . . . . . . . . . .  C ADDR  0533H
SETERRORFLAG . . . . . . . . . .  C ADDR  0541H
SHIFTFLAG. . . . . . . . . . . .  B ADDR  0022H
SM0. . . . . . . . . . . . . . .  B ADDR  009FH  NOT USED
SM1. . . . . . . . . . . . . . .  B ADDR  009EH  NOT USED
SM2. . . . . . . . . . . . . . .  B ADDR  009DH  NOT USED
SOFTRESET. . . . . . . . . . . .  C ADDR  0712H
SOUNDDURATIONCOUNTER . . . . . .  D ADDR  002EH
SOUNDENABLEFLAG. . . . . . . . .  B ADDR  000BH
SOUNDOUTPIN. . . . . . . . . . .  NUMB    00B4H
SOUNDPARSER. . . . . . . . . . .  C ADDR  06E3H
SOUNDPITCH . . . . . . . . . . .  D ADDR  002CH
SP . . . . . . . . . . . . . . .  D ADDR  0081H
SPAREFLAG1 . . . . . . . . . . .  B ADDR  000EH  NOT USED
SROM0. . . . . . . . . . . . . .  D ADDR  0034H
SROM1. . . . . . . . . . . . . .  D ADDR  003AH
STACKSTART . . . . . . . . . . .  NUMB    000FH
STATUSPIN. . . . . . . . . . . .  NUMB    00B3H
SUBASCIITOHEX. . . . . . . . . .  C ADDR  00FEH
SUBBOUNDSCHECK . . . . . . . . .  C ADDR  0128H
SUBGETBYTE . . . . . . . . . . .  C ADDR  0714H
SUBGETLCDWIDTH . . . . . . . . .  C ADDR  0314H
SUBGETNEXTPARAM. . . . . . . . .  C ADDR  0142H
SUBMOVECURSORLEFT. . . . . . . .  C ADDR  0A9DH  NOT USED
SUBMOVECURSORRIGHT . . . . . . .  C ADDR  0A93H
SUBOCTALTOBITPOS . . . . . . . .  C ADDR  00F9H
SUBOPXDELAY. . . . . . . . . . .  C ADDR  0246H
SUBTXDATA. . . . . . . . . . . .  C ADDR  0F55H
SUBWAIT40US. . . . . . . . . . .  C ADDR  0329H
SUBWRTCHARTOLCD. . . . . . . . .  C ADDR  0330H
SWADDRDATA . . . . . . . . . . .  D ADDR  0064H
T0 . . . . . . . . . . . . . . .  B ADDR  00B4H  NOT USED
T1 . . . . . . . . . . . . . . .  B ADDR  00B5H  NOT USED
TASKREADER . . . . . . . . . . .  C ADDR  0448H
TB8. . . . . . . . . . . . . . .  B ADDR  009BH  NOT USED
TCON . . . . . . . . . . . . . .  D ADDR  0088H  NOT USED
TF0. . . . . . . . . . . . . . .  B ADDR  008DH  NOT USED
TF1. . . . . . . . . . . . . . .  B ADDR  008FH  NOT USED
TH0. . . . . . . . . . . . . . .  D ADDR  008CH  NOT USED
TH0FLAG. . . . . . . . . . . . .  B ADDR  0002H
TH0HANDLER . . . . . . . . . . .  C ADDR  0039H
TH1. . . . . . . . . . . . . . .  D ADDR  008DH
TI . . . . . . . . . . . . . . .  B ADDR  0099H
TL0. . . . . . . . . . . . . . .  D ADDR  008AH  NOT USED
TL1. . . . . . . . . . . . . . .  D ADDR  008BH  NOT USED
TMOD . . . . . . . . . . . . . .  D ADDR  0089H
TOS. . . . . . . . . . . . . . .  NUMB    001FH
TR0. . . . . . . . . . . . . . .  B ADDR  008CH
TR1. . . . . . . . . . . . . . .  B ADDR  008EH
TXACKFLAG. . . . . . . . . . . .  B ADDR  0046H
```

B- Page 84

```
TXBUFPTR . . . . . . . . . . . . .  D ADDR  005FH
TXCHECKSUM . . . . . . . . . . . .  D ADDR  0062H
TXD. . . . . . . . . . . . . . . .  B ADDR  00B1H   NOT USED
TXDATAENDCHAR. . . . . . . . . .    NUMB    005DH
TXDATASTARTCHAR. . . . . . . . .    NUMB    005BH
TXENDCHECKSUMFLAG. . . . . . . .    B ADDR  003AH
TXENDMSGFLAG . . . . . . . . . .    B ADDR  0037H
TXERRENDCHAR . . . . . . . . . .    NUMB    0029H
TXERRORMSGFLAG . . . . . . . . .    B ADDR  0038H
TXERRSTARTCHAR . . . . . . . . .    NUMB    0028H
TXFLAG . . . . . . . . . . . . .    B ADDR  0005H
TXLSBYTE . . . . . . . . . . . .    D ADDR  0061H
TXMSGLEN . . . . . . . . . . . .    D ADDR  0060H
TXNEXTDIGITFLAG. . . . . . . . .    B ADDR  0035H
TXSTARTMSGFLAG . . . . . . . . .    B ADDR  0036H
TXTEXTFLAG . . . . . . . . . . .    B ADDR  0039H
UPPERFLAG. . . . . . . . . . . .    B ADDR  0027H
UPPERMSGLIMIT. . . . . . . . . .    NUMB    005AH
UR0. . . . . . . . . . . . . . .    D ADDR  0008H
UR1. . . . . . . . . . . . . . .    D ADDR  0009H
UR2. . . . . . . . . . . . . . .    D ADDR  000AH
UR3. . . . . . . . . . . . . . .    D ADDR  000BH
UR4. . . . . . . . . . . . . . .    D ADDR  000CH
UR5. . . . . . . . . . . . . . .    D ADDR  000DH
UR6. . . . . . . . . . . . . . .    D ADDR  000EH
UR7. . . . . . . . . . . . . . .    D ADDR  000FH
WR . . . . . . . . . . . . . . .    B ADDR  00B6H   NOT USED
WRITEPIN . . . . . . . . . . . .    NUMB    00B6H
WRITEPOL . . . . . . . . . . . .    C ADDR  068BH
WRITEPORT. . . . . . . . . . . .    C ADDR  06B4H
_AROFF . . . . . . . . . . . . .    C ADDR  05FEH
_ATHERROR. . . . . . . . . . . .    C ADDR  011EH
_ATHZEROTHRONINE . . . . . . . .    C ADDR  0119H
_BCOUTOFBOUNDS . . . . . . . . .    C ADDR  0138H
_CAD1. . . . . . . . . . . . . .    C ADDR  0889H
_CAD3. . . . . . . . . . . . . .    C ADDR  0896H
_CADCLEARDIGITS. . . . . . . . .    C ADDR  0899H
_CADDECODED. . . . . . . . . . .    C ADDR  08B6H
_CADLBLB . . . . . . . . . . . .    C ADDR  08BDH
_CADLOOP . . . . . . . . . . . .    C ADDR  08BFH
_CADUPPER. . . . . . . . . . . .    C ADDR  088EH
_CADUPPER2 . . . . . . . . . . .    C ADDR  08AAH
_CTD1. . . . . . . . . . . . . .    C ADDR  025AH
_CTDUPPER. . . . . . . . . . . .    C ADDR  0257H
_DD1 . . . . . . . . . . . . . .    C ADDR  024CH
_DLILBLA . . . . . . . . . . . .    C ADDR  02AFH
_DLILOWER. . . . . . . . . . . .    C ADDR  02BCH
_DLISETUPPER . . . . . . . . . .    C ADDR  02ADH
_ECHECKHINEGDIR. . . . . . . . .    C ADDR  0D34H
_ECHECKHIPOSDIR. . . . . . . . .    C ADDR  0D2AH
_ECHECKNEGDIR. . . . . . . . . .    C ADDR  0CF9H
_ECHECKPOSDIR. . . . . . . . . .    C ADDR  0CEFH
_ECOL1 . . . . . . . . . . . . .    C ADDR  0CBBH
_ECOL3 . . . . . . . . . . . . .    C ADDR  0CCEH
_ECOLS23 . . . . . . . . . . . .    C ADDR  0CC3H
_EEXIT . . . . . . . . . . . . .    C ADDR  0D43H
_EHIGHADDRUPDATE . . . . . . . .    C ADDR  0D39H
_EIPSAT. . . . . . . . . . . . .    C ADDR  0624H
_EIPSETSAT . . . . . . . . . . .    C ADDR  062FH
```

B- Page 85

```
_ELOWADDRUPDATE. . . . . . . . . .    C ADDR    0CFEH
_ENCODERSRETURN. . . . . . . . .      C ADDR    0CAAH
_ERRORRETURN . . . . . . . . . .      C ADDR    0059H
_EUPPERENCODER . . . . . . . . .      C ADDR    0D07H
_EXIT2A. . . . . . . . . . . . .      C ADDR    0094H
_EXITTH0HANDLER. . . . . . . . .      C ADDR    004BH
_FLASHFROG . . . . . . . . . . .      C ADDR    0C51H
_GLW20 . . . . . . . . . . . . .      C ADDR    031AH
_GLW24 . . . . . . . . . . . . .      C ADDR    0320H
_GLW40 . . . . . . . . . . . . .      C ADDR    0326H
_GMLOOP. . . . . . . . . . . . .      C ADDR    004EH
_INCANDRECHECK . . . . . . . . .      C ADDR    0D9BH
_INIT1 . . . . . . . . . . . . .      C ADDR    014FH
_INIT24. . . . . . . . . . . . .      C ADDR    019DH
_INIT3 . . . . . . . . . . . . .      C ADDR    0168H
_INIT96. . . . . . . . . . . . .      C ADDR    01AAH
_INITCHECKON . . . . . . . . . .      C ADDR    018AH
_INITCOMMPORT. . . . . . . . . .      C ADDR    017AH    NOT USED
_INITHISPEED . . . . . . . . . .      C ADDR    01A2H
_INITLBL1. . . . . . . . . . . .      C ADDR    018CH
_INITLBL2. . . . . . . . . . . .      C ADDR    01ADH
_INITLOSPEED . . . . . . . . . .      C ADDR    0192H
_INITRETURN. . . . . . . . . . .      C ADDR    0059H
_KBAUTOREPKEY. . . . . . . . . .      C ADDR    0F18H
_KBCFAR1 . . . . . . . . . . . .      C ADDR    0F0AH
_KBCHECKDELAY. . . . . . . . . .      C ADDR    0F10H    NOT USED
_KBCHECKFORAUTOREP . . . . . . .      C ADDR    0EF6H
_KBEXIT. . . . . . . . . . . . .      C ADDR    0F2CH
_KBGOCHECK . . . . . . . . . . .      C ADDR    0EFDH
_KBKEYRELEASE. . . . . . . . . .      C ADDR    0EF2H
_KBLOOP. . . . . . . . . . . . .      C ADDR    0F01H
_KBMODKEY. . . . . . . . . . . .      C ADDR    0F3AH
_KBSTART . . . . . . . . . . . .      C ADDR    0ED1H    NOT USED
_KBWRTBYTE . . . . . . . . . . .      C ADDR    0F1EH
_KERNELSTART . . . . . . . . . .      C ADDR    0059H
_KIPJMPTABLE . . . . . . . . . .      C ADDR    05B0H
_KMK1. . . . . . . . . . . . . .      C ADDR    0F44H
_KMK2. . . . . . . . . . . . . .      C ADDR    0F4BH
_LA0 . . . . . . . . . . . . . .      C ADDR    0B15H
_LA1 . . . . . . . . . . . . . .      C ADDR    0B18H
_LA2 . . . . . . . . . . . . . .      C ADDR    0B2BH
_LA3 . . . . . . . . . . . . . .      C ADDR    0B2EH
_LABELA. . . . . . . . . . . . .      C ADDR    09B2H
_LAICLEAR. . . . . . . . . . . .      C ADDR    08DBH
_LBC1. . . . . . . . . . . . . .      C ADDR    0AC5H
_LBC2. . . . . . . . . . . . . .      C ADDR    0AD0H    NOT USED
_LBC3. . . . . . . . . . . . . .      C ADDR    0AD8H
_LBCEXIT . . . . . . . . . . . .      C ADDR    0ADEH
_LBCSTAYBRIGHT . . . . . . . . .      C ADDR    0AB4H
_LBCUPPER. . . . . . . . . . . .      C ADDR    0ACDH
_LBFFLASH. . . . . . . . . . . .      C ADDR    07C9H
_LCOCLEAR. . . . . . . . . . . .      C ADDR    08F3H
_LDMMODE1. . . . . . . . . . . .      C ADDR    0792H
_LDMMODE2. . . . . . . . . . . .      C ADDR    079BH
_LDMMODE3. . . . . . . . . . . .      C ADDR    07A2H
_LEDCHECKCOL . . . . . . . . . .      C ADDR    0C0AH
_LEDCHECKNUM . . . . . . . . . .      C ADDR    0932H
_LEDDISPLAYFLASHEXIT . . . . . .      C ADDR    0C29H
_LEDEDITRETURN . . . . . . . . .      C ADDR    0057H
```

₿ - Page 86

```
_LEDEXIT . . . . . . . . . . . .    C ADDR  0C5DH
_LEDFLASH1 . . . . . . . . . . .    C ADDR  0C26H
_LEDFLASHEXIT. . . . . . . . . .    C ADDR  0BFCH
_LEDINITRETURN . . . . . . . . .    C ADDR  0057H
_LEDINVLOOP. . . . . . . . . . .    C ADDR  0C04H
_LEDLBL1A. . . . . . . . . . . .    C ADDR  0BBBH
_LEDLBL1B. . . . . . . . . . . .    C ADDR  0BC4H
_LEDLBL1C. . . . . . . . . . . .    C ADDR  0BD1H
_LEDLBLA . . . . . . . . . . . .    C ADDR  0B8DH
_LEDLBLB . . . . . . . . . . . .    C ADDR  0B96H
_LEDLBLC . . . . . . . . . . . .    C ADDR  0BA3H
_LEDLOWERSTORE . . . . . . . . .    C ADDR  0BA5H
_LEDOUT. . . . . . . . . . . . .    C ADDR  0C16H
_LEDOUTDIGITS. . . . . . . . . .    C ADDR  0C10H
_LEDRETURN . . . . . . . . . . .    C ADDR  00D0H
_LEDSETSEGD. . . . . . . . . . .    C ADDR  0BFAH
_LEDUPDATEPTR. . . . . . . . . .    C ADDR  0C51H  NOT USED
_LEDUPPERDISPLAY . . . . . . . .    C ADDR  0BA9H
_LEDUPPEREXIT. . . . . . . . . .    C ADDR  0BD7H
_LEDUPPERSTORE . . . . . . . . .    C ADDR  0BD3H
_LEDWRITESTRING. . . . . . . . .    C ADDR  090DH
_LEPJUMPTABLE. . . . . . . . . .    C ADDR  0756H
_LF1 . . . . . . . . . . . . . .    C ADDR  0818H
_LFLBLA. . . . . . . . . . . . .    C ADDR  0801H
_LFLOWERDISPLAY. . . . . . . . .    C ADDR  0814H
_LFRIGHTFORMAT . . . . . . . . .    C ADDR  07F4H  NOT USED
_LFSETMODE . . . . . . . . . . .    C ADDR  07F9H
_LFUPPERDISPLAY. . . . . . . . .    C ADDR  0809H  NOT USED
_LHCLEAR . . . . . . . . . . . .    C ADDR  087EH
_LHRIGHT . . . . . . . . . . . .    C ADDR  0879H
_LIPJUMPTABLE. . . . . . . . . .    C ADDR  0736H
_LMALBLB . . . . . . . . . . . .    C ADDR  0838H
_LMALBLG . . . . . . . . . . . .    C ADDR  0856H
_LMASETRFORMATFLAG . . . . . . .    C ADDR  0854H
_LMASTDUPDATE. . . . . . . . . .    C ADDR  0832H
_LMSLBLC . . . . . . . . . . . .    C ADDR  085FH
_LMSLBLD . . . . . . . . . . . .    C ADDR  0865H
_LN1 . . . . . . . . . . . . . .    C ADDR  0AFDH
_LN2 . . . . . . . . . . . . . .    C ADDR  0B09H
_LSCLOOPSTART. . . . . . . . . .    C ADDR  09C0H
_LSCNIBBLE . . . . . . . . . . .    C ADDR  09ABH
_LSCSHIFTUPPERNIBBLE . . . . . .    C ADDR  09BCH
_LSCUPPERMODE. . . . . . . . . .    C ADDR  099FH
_LSFOFF. . . . . . . . . . . . .    C ADDR  07B7H
_LWCALPHADP. . . . . . . . . . .    C ADDR  0924H
_LWCALPHAMINUS . . . . . . . . .    C ADDR  092BH
_LWCALPHAPLUS. . . . . . . . . .    C ADDR  091DH
_LWCDP . . . . . . . . . . . . .    C ADDR  0951H
_LWCDP1. . . . . . . . . . . . .    C ADDR  096EH
_LWCEXIT . . . . . . . . . . . .    C ADDR  09D9H
_LWCLBLA . . . . . . . . . . . .    C ADDR  097DH
_LWCLETE . . . . . . . . . . . .    C ADDR  094AH
_LWCMINUS. . . . . . . . . . . .    C ADDR  0943H
_LWCPLUS . . . . . . . . . . . .    C ADDR  093CH
_LWCRIGHT. . . . . . . . . . . .    C ADDR  0989H
_LWCWRITE. . . . . . . . . . . .    C ADDR  09D7H
_LWELEFT . . . . . . . . . . . .    C ADDR  09EFH
_MAIN1 . . . . . . . . . . . . .    C ADDR  0070H
_MAIN2 . . . . . . . . . . . . .    C ADDR  0077H
```

β - Page 87

```
_MAIN2A . . . . . . . . . . . . . .    C ADDR  0082H
_MAIN3 . . . . . . . . . . . . . .     C ADDR  0094H
_MAIN4 . . . . . . . . . . . . . .     C ADDR  009BH
_MAIN5 . . . . . . . . . . . . . .     C ADDR  00D2H
_MCFEXIT . . . . . . . . . . . . .     C ADDR  00BAH
_MCLNODEC . . . . . . . . . . . . .    C ADDR  0AA3H
_MCRNOINC . . . . . . . . . . . . .    C ADDR  0A9CH
_MFCHECKADDR . . . . . . . . . .       C ADDR  046CH
_MFCHECKOUT . . . . . . . . . . . .    C ADDR  0441H
_MFCHECKSUMERROR . . . . . . . .       C ADDR  0407H
_MFDECODEADDR . . . . . . . . . .      C ADDR  0494H
_MFERRORINSTARTBYTE . . . . . . .      C ADDR  0412H
_MFEXIT . . . . . . . . . . . . . .    C ADDR  04E8H
_MFEXITNOPARSE . . . . . . . . .       C ADDR  042EH
_MFEXT2 . . . . . . . . . . . . . .    C ADDR  0426H
_MFEXT3 . . . . . . . . . . . . . .    C ADDR  042BH
_MFEXTCMD . . . . . . . . . . . . .    C ADDR  0421H
_MFFORMMSG . . . . . . . . . . . .     C ADDR  04AFH
_MFIGNORE . . . . . . . . . . . . .    C ADDR  0488H
_MFLCDDL . . . . . . . . . . . . .     C ADDR  041AH
_MFLCDJUMP . . . . . . . . . . . .     C ADDR  041FH
_MFLED . . . . . . . . . . . . . .     C ADDR  043EH
_MFLOOKFORENDMSG . . . . . . . .       C ADDR  048FH
_MFNULLMSG . . . . . . . . . . . .     C ADDR  04D0H
_MFPRECHECKOUT . . . . . . . . .       C ADDR  04CCH
_MFPROCESSMSG . . . . . . . . . .      C ADDR  04A5H   NOT USED
_MFSTDEXIT . . . . . . . . . . . .     C ADDR  04C5H
_MFSTEP . . . . . . . . . . . . . .    C ADDR  0439H
_MFUPDATEFIFO . . . . . . . . . .      C ADDR  04D5H
_MPMAINJUMPTABLE . . . . . . . .       C ADDR  04FFH
_OBFLBLA . . . . . . . . . . . . .     C ADDR  029FH
_OBFLINE . . . . . . . . . . . . .     C ADDR  029BH
_OBFLOWER . . . . . . . . . . . . .    C ADDR  0292H
_ODCLEARRS . . . . . . . . . . . .     C ADDR  0381H
_ODGETBYTE . . . . . . . . . . . .     C ADDR  0383H
_ODLOWER . . . . . . . . . . . . .     C ADDR  0398H
_OEPJUMPTABLE . . . . . . . . . .      C ADDR  0594H
_OHLOOP . . . . . . . . . . . . . .    C ADDR  0360H
_OINONFOURLINEDISPLAY . . . . . .      C ADDR  01FBH
_OIPJUMPTABLE . . . . . . . . . .      C ADDR  0578H
_OIPLBLA . . . . . . . . . . . . .     C ADDR  0569H
_OIPLBLB . . . . . . . . . . . . .     C ADDR  0564H
_OIPLBLC . . . . . . . . . . . . .     C ADDR  0572H
_OISETFLAGS . . . . . . . . . . .      C ADDR  0206H
_OISTARTINIT . . . . . . . . . .       C ADDR  0208H   NOT USED
_OIUPPERDISPLAY . . . . . . . . .      C ADDR  01EBH
_OIW20 . . . . . . . . . . . . . .     C ADDR  026DH
_OIW24 . . . . . . . . . . . . . .     C ADDR  0273H
_OIW40 . . . . . . . . . . . . . .     C ADDR  0279H
_OMA16X4LINE3 . . . . . . . . . .      C ADDR  02E2H
_OMA20X4 . . . . . . . . . . . . .     C ADDR  02E7H
_OMA20X4LINE3 . . . . . . . . . .      C ADDR  02F0H
_OMA2LINE . . . . . . . . . . . . .    C ADDR  02F5H
_OMADISPLAY01 . . . . . . . . . .      C ADDR  0305H
_OMADISPLAY1 . . . . . . . . . . .     C ADDR  030FH
_OMANX2LINE3 . . . . . . . . . . .     C ADDR  0300H
_OPOLOWER . . . . . . . . . . . . .    C ADDR  03B4H
_OPOOFF . . . . . . . . . . . . . .    C ADDR  03C0H
_OPXEDITRETURN . . . . . . . . .       C ADDR  0057H
```

C - Page 88

```
_OPXINITRETURN  . . . . . . . . . .   C ADDR  0057H
_OPXWRITE. . . . . . . . . . . . .    C ADDR  03C2H
_OWINC . . . . . . . . . . . . . .    C ADDR  0403H
_PARSERRETURN. . . . . . . . . . .    C ADDR  0057H
_PLW1. . . . . . . . . . . . . . .    C ADDR  0A2CH
_PLWA1 . . . . . . . . . . . . . .    C ADDR  0A6CH
_PLWA2 . . . . . . . . . . . . . .    C ADDR  0A70H
_PLWB1 . . . . . . . . . . . . . .    C ADDR  0A87H
_PLWB2 . . . . . . . . . . . . . .    C ADDR  0A8BH
_PLWCLRDP. . . . . . . . . . . . .    C ADDR  0A42H
_PLWDIRECTBYTE . . . . . . . . . .    C ADDR  0A09H
_PLWEXIT . . . . . . . . . . . . .    C ADDR  0A92H
_PLWLBLA . . . . . . . . . . . . .    C ADDR  09FBH
_PLWWRTALPHA0OR2 . . . . . . . . .    C ADDR  0A14H   NOT USED
_PLWWRTALPHA1OR3 . . . . . . . . .    C ADDR  0A20H
_PLWWRTALPHADIGIT. . . . . . . . .    C ADDR  0A3EH
_PLWWRTNIBBLE. . . . . . . . . . .    C ADDR  0A0DH
_PLWWRTNUM0OR2 . . . . . . . . . .    C ADDR  0A5AH   NOT USED
_PLWWRTNUM1OR3 . . . . . . . . . .    C ADDR  0A74H
_PLWWRTNUMERIC . . . . . . . . . .    C ADDR  0A56H
_PLWWRTNUMEXIT . . . . . . . . . .    C ADDR  0A8EH
_PORTRESTORE . . . . . . . . . . .    C ADDR  00F2H
_POSCLK. . . . . . . . . . . . . .    C ADDR  00EEH
_PROCESSENCODERS . . . . . . . . .    C ADDR  0CD4H
_PROCESSSWITCHESRETURN . . . . . .    C ADDR  0CAAH
_PS0 . . . . . . . . . . . . . . .    C ADDR  0DBEH
_PS0A. . . . . . . . . . . . . . .    C ADDR  0DC6H
_PS0B. . . . . . . . . . . . . . .    C ADDR  0DCEH
_PS0BITIS1 . . . . . . . . . . . .    C ADDR  0EA1H
_PS0NEXTBIT. . . . . . . . . . . .    C ADDR  0EBBH
_PS0WRTKBUF. . . . . . . . . . . .    C ADDR  0EAFH
_PS0WRTSBUF. . . . . . . . . . . .    C ADDR  0EA9H
_PS1 . . . . . . . . . . . . . . .    C ADDR  0DE4H
_PS1BITIS1 . . . . . . . . . . . .    C ADDR  0E76H
_PS1NEXTBIT. . . . . . . . . . . .    C ADDR  0E90H
_PS1WRTKBUF. . . . . . . . . . . .    C ADDR  0E84H
_PS1WRTSBUF. . . . . . . . . . . .    C ADDR  0E7EH
_PS2 . . . . . . . . . . . . . . .    C ADDR  0DF0H
_PS2BITIS1 . . . . . . . . . . . .    C ADDR  0E49H
_PS2NEXTBIT. . . . . . . . . . . .    C ADDR  0E63H
_PS2WRTKBUF. . . . . . . . . . . .    C ADDR  0E57H
_PS2WRTSBUF. . . . . . . . . . . .    C ADDR  0E51H
_PS3 . . . . . . . . . . . . . . .    C ADDR  0DF9H
_PS3BITIS1 . . . . . . . . . . . .    C ADDR  0E1CH
_PS3NEXTBIT. . . . . . . . . . . .    C ADDR  0E36H
_PS3WRTKBUF. . . . . . . . . . . .    C ADDR  0E2AH
_PS3WRTSBUF. . . . . . . . . . . .    C ADDR  0E24H
_PS5 . . . . . . . . . . . . . . .    C ADDR  0EBBH   NOT USED
_PS6 . . . . . . . . . . . . . . .    C ADDR  0EC9H
_PS7 . . . . . . . . . . . . . . .    C ADDR  0ECEH
_PSEXIT. . . . . . . . . . . . . .    C ADDR  0F52H
_QDACW . . . . . . . . . . . . . .    C ADDR  0D7EH
_QDACW0. . . . . . . . . . . . . .    C ADDR  0D5DH
_QDACW1. . . . . . . . . . . . . .    C ADDR  0D76H
_QDACW2. . . . . . . . . . . . . .    C ADDR  0D4FH
_QDACW3. . . . . . . . . . . . . .    C ADDR  0D6BH
_QDCW. . . . . . . . . . . . . . .    C ADDR  0D7BH
_QDRESYNC. . . . . . . . . . . . .    C ADDR  0D81H
_QDSTATE3. . . . . . . . . . . . .    C ADDR  0D70H
```

𝒞 - Page 89

```
_QDTESTSTATE1. . . . . . . . . .    C ADDR   0D54H
_QDTESTSTATE2. . . . . . . . . .    C ADDR   0D62H
_READFPDATARETURN. . . . . . . .    C ADDR   00CDH
_REEXIT. . . . . . . . . . . . .    C ADDR   0659H
_RKBLOOP . . . . . . . . . . . .    C ADDR   0669H
_RKBNODATA . . . . . . . . . . .    C ADDR   067DH
_SAFCLEAR. . . . . . . . . . . .    C ADDR   053DH
_SCANMAIN. . . . . . . . . . . .    C ADDR   00C8H
_SCANOUTRETURN . . . . . . . . .    C ADDR   00D0H
_SDEXIT. . . . . . . . . . . . .    C ADDR   00ACH
_SEFCLEAR. . . . . . . . . . . .    C ADDR   054DH
_SERIALTXRETURN. . . . . . . . .    C ADDR   0082H
_SIOHRXINTERRUPT . . . . . . . .    C ADDR   0033H
_SIOHT2. . . . . . . . . . . . .    C ADDR   0030H
_SOOUTADDR . . . . . . . . . . .    C ADDR   0C9CH
_SOOUTENCADDR. . . . . . . . . .    C ADDR   0C97H
_SOOUTSWADDR . . . . . . . . . .    C ADDR   0C90H
_STDEXIT . . . . . . . . . . . .    C ADDR   0F62H
_SWLOOP. . . . . . . . . . . . .    C ADDR   032CH
_TASKREADERRETURN. . . . . . . .    C ADDR   0077H
_TH0LBL1 . . . . . . . . . . . .    C ADDR   0046H
_TX0 . . . . . . . . . . . . . .    C ADDR   0F7CH
_TX1 . . . . . . . . . . . . . .    C ADDR   0F8BH
_TXALPHADIGIT. . . . . . . . . .    C ADDR   0FBAH
_TXASCIILETTER . . . . . . . . .    C ADDR   0FC5H
_TXDATAEND . . . . . . . . . . .    C ADDR   0FE2H
_TXDATASTART . . . . . . . . . .    C ADDR   0F73H
_TXENDMSG. . . . . . . . . . . .    C ADDR   0FF0H
_TXEXIT. . . . . . . . . . . . .    C ADDR   0FD6H
_TXFLAGEND . . . . . . . . . . .    C ADDR   0FEBH
_TXHEXDIGIT. . . . . . . . . . .    C ADDR   0F9BH
_TXOUTLSDIGIT. . . . . . . . . .    C ADDR   0FBFH
_TXREPROCESS . . . . . . . . . .    C ADDR   0FABH
_TXSTDEXIT . . . . . . . . . . .    C ADDR   0FCEH
_TXTERMCHAR. . . . . . . . . . .    C ADDR   0FD9H
_WCTLOWER. . . . . . . . . . . .    C ADDR   033FH
_WCTWRITECHAR. . . . . . . . . .    C ADDR   034BH
_WOB1. . . . . . . . . . . . . .    C ADDR   0DAEH
_WOBENTERBYTEINBUFFER. . . . . .    C ADDR   0D9EH
_WOBINCPTR . . . . . . . . . . .    C ADDR   0DACH
_WOBLOOP . . . . . . . . . . . .    C ADDR   0D8FH
_WOBMOREDATA . . . . . . . . . .    C ADDR   0DA3H
_WOBTEST . . . . . . . . . . . .    C ADDR   0D95H
_WPAUXPORT . . . . . . . . . . .    C ADDR   06DFH
_WPLACTIVELOW. . . . . . . . . .    C ADDR   06A9H
_WPLPERILOWWRT . . . . . . . . .    C ADDR   06B0H
_WPLPERIWRT. . . . . . . . . . .    C ADDR   06A5H
_WPPOSCLK. . . . . . . . . . . .    C ADDR   06D9H
```

APPENDIX B

B- Page 1

```
                    1     $debug
                    2     $nopaging
                    3     ;Genesis:     BIOS
                    4     ;Version:     0.1
                    5     ;Original Date: Fri Aug 5th 1994
                    6     ;Author:      Jeff Robinson
                    7     ;Target:      8051
                    8
                    9     ;Last Update:Thu  04-13-95
                   10
                   11     $nolist
                  941     $list
                  942
                                                                              943
;*******************************************************************
                  944    ;*                      Interrupt Vector Map
*
                                                                              945
;*******************************************************************
                  946
0000              947     org 0+romStart
0000 014C         948         ajmp main
                  949
0002 49514338     950     revMsg1: DB 'IQC826 rev 1.00'
0006 32362072
000A 65762031
000E 2E3030
  0010           951     revMsg1Len EQU ($-revMsg1)+1
                  952
                     953    ;This ROM is used by the routine subOctToBitPos in
"utils.asm"
0011 01020408     954     octbROM:   DB  01,02,04,08,10h,20h,40h,80h
0015 10204080
                  955
                                                                              956
;*******************************************************************
                  957    ;*                        Interrupt Handlers
*
                                                                              958
;*******************************************************************
                  959    ;org romStart+ 03h
                  960    ;IE0 interrupt vector
                  961
                  962    ;org romStart+ 0Bh
                  963    ;Interrupt vector for timer0
                  964    ;jmp TL0Handler
                  965    ;reti
                  966
                  967    ;org romStart + 013h
                  968    ;IE1 interrupt vector
                  969    ;reti
                  970
001B              971     org romStart + 01Bh
001B 0139         972     ajmp TH0Handler
                  973    ;Interrupt vector for timer1
                  974    ;reti
                  975
0023              976     org romStart + 023h
                  977    ;RI & TI interrupt vector
```

ß- Page 2

```
                            978      ;***************
0023                        979      serialIOHandler:
                            980      ;***************
                            981      ;The routine outputs code from the printf debug function
contained
                            982      ;elsewhere in the software.
                            983
0023 10980D                 984              jbc RI,_siohRxInterrupt
                            985
                            986      ;tx interrupt
0026 C299                   987          clr TI
0028 304605                 988          jnb txAckFlag,_siohT2
002B C246                   989              clr txAckFLag
002D C204                   990              clr serOutActiveFlag
002F 32                     991              reti
0030                        992      _siohT2:
0030 D205                   993          setb txFlag
0032 32                     994          reti
                            995
0033                        996      _siohRxInterrupt:
0033 D200                   997          setb rxByteFlag
0035 85992B                 998          mov rxByte,SBUF
0038 32                     999      reti
                            1000
                            1001     ;**********
0039                        1002     TH0Handler:
                            1003     ;**********
                            1004     ;This timer is used to time keyboard scans.
0039 D202                   1005         setb th0Flag                          ;used for task
despatching by main.
003B D52D08                 1006         djnz pitchCounter,_th0Lbl1
003E 300B05                 1007             jnb soundEnableFlag,_th0Lbl1
0041 B2B4                   1008                 cpl SOUNDOUTPIN
0043 852C2D                 1009                 mov pitchCounter,soundPitch
0046                        1010     _th0Lbl1:
0046 301A02                 1011         jnb opx_TimerEnable,_exitTH0Handler
0049 D20F                   1012         setb opx_TimerFlag           ;private to display.asm
004B                        1013     _exitTH0Handler:
004B 32                     1014     reti
                            1015
                            1016
                            1017
                                                                                          1018
;********************************************************************
                            1019    ;*                                                    Main
*
                                                                                          1020
;********************************************************************
004C                        1021    main: ;()
                            1022    ;Main for the universal front panel controller (genesis)
is a loop that
                            1023    ;tests the state of a variety of service flags.
                            1024
                            1025        ;Before we start zero everything.
                            1026        ;----------------------------------
004C 787F                   1027        mov R0,#07Fh
004E                        1028    _gmLoop:
004E 7600                   1029        mov @R0,#0
0050 D8FC                   1030    djnz R0,_gmLoop
```

ß- Page 3

```
                        1031
0052 75810F            1032          mov SP,#STACKSTART
                        1033
0055 214B              1034          ajmp initialization
                        1035
0057                   1036    _opxInitReturn:
0057                   1037    _opxEditReturn:
0057                   1038    _parserReturn:
0057                   1039    _ledInitReturn:
0057                   1040    _ledEditReturn:
                        1041
0057 D208              1042          setb ackFlag        ;registers that 'ack' is a pending event.
                        1043
0059                   1044    _initReturn:
0059                   1045    _kernelStart:
0059                   1046    _errorReturn:
                        1047
                        1048    ;NOTE:
                        1049    ;The error code is stored in the output buffer. If an error occurs
                        1050    ;then the device will immediately jump to this location at the top
                        1051    ;of the main scheduler and start transmission. If there are additional
                        1052    ;errors then the due to the nature of scheduling these will also be
                        1053    ;serviced prior to any other transmission back to the host.
                        1054
0059 303214            1055          jnb errEnableFlag,_main1
005C 300111            1056          jnb errorFlag,_main1
005F 20040E            1057              jb serOutActiveFlag,_main1  ;Fri  05-05-95
0062 C201              1058              clr errorFlag
0064 C206              1059                  clr processTaskFlag   ;If an error occurred abandon the task
0066 D238              1060                  setb txErrorMsgFlag   ;Ensure we send the correct msg start/stop chars
0068 756002            1061                  mov txMsgLen,#2       ;'sBuffer' + 4 - its the output half of the
                        1062                                        ;double buffered serial port tx memory system.
006B 747C              1063                  mov A,#outputBuffer
006D 120F55            1064                  call subTxData
                        1065
0070                   1066    _main1:
0070 300004            1067          jnb rxByteFlag,_main2
0073 C200              1068          clr rxByteFlag
0075 8148              1069          ajmp taskReader
0077                   1070    _taskReaderReturn:
                        1071
0077                   1072    _main2:
                        1073    ;This slot looks for any pending serial Tx requests.
0077 A204              1074          mov C,serOutActiveFlag
0079 8205              1075          anl C,txFlag
007B 5005              1076          jnc _main2a
007D C205              1077              clr txFlag
007F 020F63            1078              jmp serialTx
0082                   1079              _serialTxReturn:
```

B- Page 4

```
                        1080
0082                    1081    _main2a:
                        1082    ;This slot sends an ack if enabled.
0082 30470F             1083    jnb ackEnableFlag,_main3
0085 30080C             1084    jnb ackFlag,_main3
0088 200409             1085        jb serOutActiveFlag,_exit2a
008B C208               1086        clr ackFlag
008D D246               1087        setb txAckFlag
008F D204               1088        setb serOutActiveFlag
0091 75995E             1089        mov SBUF,#'^'
0094                    1090    _exit2a:
                        1091
0094                    1092    _main3:
0094 300604             1093    jnb processTaskFlag,_main4
0097 C206               1094        clr processTaskFlag
0099 81EA               1095        ajmp msgParser
                        1096
009B                    1097    _main4:
                        1098        ;TH0 ensures that this group of functions is not
accessed more
                        1099    ;frequently than once every 256*1us = 256us it could
easily be
                        1100    ;longer than this depends on the traffic.
009B 300234             1101    jnb th0Flag,_main5
                        1102 +1     macTestForSound        ;defn in sound.h
                        1103 +1
009E 300B0B             1104 +1 jnb soundEnableFlag,_sdExit
00A1 A20C               1105 +1     mov C,1fCLkFlag
00A3 B00D               1106 +1     anl C,/oldClkFlag
00A5 5005               1107 +1     jnc _sdExit
00A7 D52E02             1108 +1         djnz soundDurationCounter,_sdExit
00AA C20B               1109 +1             clr soundEnableFlag
00AC                    1110 +1 _sdExit:
00AC A20C               1111 +1 mov C,1fClkFlag
00AE 920D               1112 +1 mov oldClkFlag,C
00B0 C202               1114        clr th0Flag
00B2 200713             1115        jb scanLedflag,_scanMain
                        1116 +1         macClk4HzOsc
                        1117 +1
00B5 D52F02             1118 +1 djnz fourHzOsc,_mcfExit
00B8 B20C               1119 +1         cpl 1fClkFlag
00BA                    1120 +1 _mcfExit:
00BA D207               1122            setb scanLedFlag
00BC 200A11             1123                jb disableLEDFlag,_ledReturn ;If no LED
display then skip.
00BF D51B0E             1124            djnz ledScanCount,_ledReturn
00C2 751B02 .           1125                mov 01Bh,#2
00C5 020B70             1126                ljmp ledDisplay
                        1127
00C8                    1128    _scanMain:
00C8 C207               1129    clr scanLedFlag
00CA 020CA3             1130    ljmp readFpData
00CD                    1131    _readFpDataReturn:
00CD 020C60             1132    ljmp scanOut           ;having read FP data excite
with next addr.
00D0                    1133    _scanOutReturn:
00D0                    1134    _ledReturn:
00D0 D28C               1135    setb TR0                        ;re-start TH0
                        1136
```

B- Page 5

```
00D2                    1137        _main5:
                        1138            ;This is the initialization delay slot
                        1139            ;-its operation is different to
                        1140        ;the other routines here.
00D2 300F84             1141            jnb opx_TimerFlag,_kernelStart  ;_main6
00D5 C20F               1142            clr opx_TimerFlag
00D7 4146               1143            ajmp subOpxDelay
                        1144
                                                                                        1145
;**********************************************************************
                   1146      ;*                                              Subroutines
*
                                                                                        1147
;**********************************************************************
                        1148
                =1      1149        $include(utils.asm)
                =1      1150        ;(10U&k2S(s#8&18D
                    =1     1151        ;>>>>>>>>>>>>>>>>>>> Various Utilities
<<<<<<<<<<<<<<<<<<<<<<<<<<<<
                =1      1152
                =1      1153        ;****
00D9            =1      1154        clock:
                =1      1155        ;****
00D9 85800E     =1      1156            mov UR6,P0      ;Save port.
00DC 85A00F     =1      1157            mov UR7,P2
00DF 8583A0     =1      1158            mov P2,DPH      ;Output the address
00E2 858280     =1      1159            mov P0,DPL
00E5 201906     =1      1160            jb posClkFlag,_posCLk
00E8 C2B6       =1      1161                clr writePin
00EA D2B6       =1      1162                setb writePin
00EC 01F2       =1      1163                ajmp _portRestore
00EE            =1      1164        _posClk:
00EE D2B6       =1      1165                setb writePin
00F0 C2B6       =1      1166                clr writePin
00F2            =1      1167        _portRestore:
00F2 850E80     =1      1168            mov P0,UR6      ;Restore port.
00F5 850FA0     =1      1169            mov P2,UR7
00F8 22         =1      1170        ret
                =1      1171
                =1      1172
                =1      1173        ;*************
00F9            =1      1174        subOctalToBitPos:;(A;A)
                =1      1175        ;*************
                =1      1176        ;This routine converts the octal number in ACC to a 1 in
the corresponding
                =1      1177        ;bit position. It does this using a jump table.
   000F         =1      1178            ?otbpTemp EQU UR7
00F9 900011     =1      1179                mov DPTR,#octbROM
00FC 93         =1      1180            movc A,@A+DPTR
00FD 22         =1      1181          ret
                =1      1182
                    =1    1183        ;                       octbROM:                  DB
01,02,04,08,10h,20h,40h,80h ;This was moved to
                =1      1184        ;
genmain to save space.
                =1      1185        ;END(octalToBitPos)
                =1      1186
                =1      1187        ;**********
```

B - Page 6

```
00FE                =1  1188      subAsciiToHex: ;(A, ?athError=UR6;A)
                    =1  1189      ;**********
                    =1  1190      ;Convert the ascii coded byte in the Acc to a hex digit
(returned in the Acc)
                    =1  1191      ;set errorFlag if an error occurs
                    =1  1192
  000F              =1  1193          ?athTemp  EQU  UR7
  000E              =1  1194          ?athError EQU  UR6          ;Error number assigned by
calling routine.
                    =1  1195
00FE F50F           =1  1196          mov ?athTemp,A
0100 24D0           =1  1197          add A,#-'0'
0102 20E719         =1  1198          jb ACC.7,_athError
0105 24F6           =1  1199          add A,#-10
0107 20E70F         =1  1200          jb ACC.7,_athZeroThroNine
010A 24F9           =1  1201          add A,#-('A'-'9'-1)
010C 20E70F         =1  1202          jb ACC.7,_athError
010F 24FA           =1  1203          add A,#-('G'-'A')
0111 30E70A         =1  1204          jnb ACC.7,_athError
                    =1  1205
                    =1  1206          ;OK so input digit lies between 'A' and 'F'
0114 E50F           =1  1207          mov A,?athTemp
0116 24C9           =1  1208              add A,#-('A'-10)
0118 22             =1  1209      ret
0119                =1  1210          _athZeroThroNine:
0119 E50F           =1  1211          mov A,?athTemp
011B 24D0           =1  1212          add A,#-'0'
011D 22             =1  1213      ret
011E                =1  1214          _athError:
011E 75810F         =1  1215              mov SP,#STACKSTART
0121 850E7C         =1  1216          mov outputBuffer,?athError
0124 D201           =1  1217          setb errorFlag
0126 0159           =1  1218      jmp _errorReturn
                    =1  1219
                    =1  1220
                    =1  1221      ;**********
0128                =1  1222      subBoundsCheck: ;(?bcLower=UR4,?bcUpper=UR5,?bcErr=UR6;
A)
                    =1  1223      ;**********
                    =1  1224      ;This routine takes the hex digit in A and checks
whether or not it is
                    =1  1225      ;within the range of lower limit (in R6) to upper limit
(in R7). Note
                    =1  1226      ;that the limits themselves are part of the allowable
range,ie R6<=ACC<=R7.
                    =1  1227
                    =1  1228      ;LOCALS
  000C              =1  1229          ?bcLower  EQU      UR4
  000D              =1  1230          ?bcUpper  EQU      UR5
  000E              =1  1231          ?bcErr    EQU      UR6
  000F              =1  1232          ?bcTemp   EQU      UR7
                    =1  1233
0128 F50F           =1  1234          mov ?bcTemp,A
012A C3             =1  1235          clr C
012B 950C           =1  1236          subb A,?bcLower
012D 4009           =1  1237          jc _bcOutOfBounds
                    =1  1238
012F E50D           =1  1239          mov A,?bcUpper           ;check the upper limit.
0131 950F           =1  1240          subb A,?bcTemp
```

*B* - Page 7

```
0133 4003       =1  1241        jc _bcOutOfBounds
                =1  1242
0135 E50F       =1  1243        mov A,?bcTemp       ;restore the value being tested to the ACC.
0137 22         =1  1244    ret ;(normal return)
                =1  1245
0138            =1  1246        _bcOutOfBounds:
0138 75810F     =1  1247            mov SP,#STACKSTART
013B 850E7C        =1   1248            mov outputBuffer,?bcErr ;Return error number assigned by calling routine.
013E D201       =1  1249        setb errorFlag
0140 0159       =1  1250    jmp _errorReturn
                =1  1251    ;(END boundsCheck)
                =1  1252
                =1  1253    ;***************
0142            =1  1254    subGetNextParam:;(ptr=R0,lower=UR4,upper=UR5,gnpErr=UR6;nextParam=A)
                =1  1255    ;***************
                   =1   1256     ;Routine that gets the next parameter from the readFifoBuffer
                   =1   1257     ;If the PFLAG is set then a ascii conversion error happened
                =1  1258     ;If the CARRY is set then an out of bounds error occured
                   =1   1259     ;The routines asciiToHex and OutOfBounds have been incorparated directly
                   =1   1260     ;into this routine to save on stack and modify error flags.
                =1  1261
                =1  1262        ?gnpFifoPtr EQU R0
  000C          =1  1263        ?gnpLower   EQU UR4
  000D          =1  1264        ?gnpUpper   EQU UR5
  000E          =1  1265        ?gnpErr     EQU UR6
                =1  1266
0142 08         =1  1267        inc ?gnpFifoPtr
0143 E6         =1  1268        mov A,@?gnpFifoPtr
0144 11FE       =1  1269        call subAsciiToHex   ;This returns hex value in ACC
0146 150E       =1  1270        dec ?gnpErr
0148 3128       =1  1271        call subBoundsCheck ;Takes hex value and ensures within limits.
014A 22         =1  1272    ret
                =1  1273    $include(init.asm)
014B            =1  1274    initialization: ;()
                =1  1275            ?initPtr  EQU R0
                =1  1276        ?initLoop EQU R2
                =1  1277        ?initTemp EQU R3
                =1  1278
                                                              =1      1279
;>>>>>>>>>>>>>>>>>>>>>>>>>>>>>><<<<<<<<<<<<<<<<<<<<<<<<<<<<<<<<
                =1  1280    ;init the parser functions
                                                              =1      1281
;>>>>>>>>>>>>>>>>>>>>>>>>>>>>>><<<<<<<<<<<<<<<<<<<<<<<<<<<<<<<<
                =1  1282            ;none - flags already initialized, data internally initialized.
                =1  1283
                                                              =1      1284
;>>>>>>>>>>>>>>>>>>>>>>>>>>>>>><<<<<<<<<<<<<<<<<<<<<<<<<<<<<<<<
                =1  1285    ;init the keyboard functions
                                                              =1      1286
;>>>>>>>>>>>>>>>>>>>>>>>>>>>>>><<<<<<<<<<<<<<<<<<<<<<<<<<<<<<<<
```

B - Page 8

```
014B 7834      =1   1287           mov  ?initPtr,#SROM0
014D 7A0C      =1   1288           mov  ?initLoop,#12
014F           =1   1289              _init1:                ;Fill the SROM0/1 debounce arrays with 1s.
014F 76FF      =1   1290           mov  @?initPtr,#0FFh
0151 08        =1   1291           inc  ?initPtr
0152 DAFB      =1   1292           djnz ?initLoop,_init1
               =1   1293
0154 754078    =1   1294              mov  sBufPtr,#sBuffer
0157 75191E    =1   1295           mov  kTmpPtr,#kTmpBuf
               =1   1296
               =1   1297              ;Default to max system
015A 756330    =1   1298           mov  encAddrData,#30h    ;[encEnd][encColAddr]
015D 7564F4    =1   1299           mov  swAddrData,#0F4h    ;[swEnd][swColAddr]
               =1   1300
0160 754338    =1   1301           mov  keyboardEnd,#38h    ;Format [encEnc][kbEnd] thus this sets
               =1   1302                                    ;encoderEnd to addr 3 and keyboardEnd to addr 8.
               =1   1303
                                                                        =1      1304
;>>>>>>>>>>>>>>>>>>>>>>>>>>>>>>>>>><<<<<<<<<<<<<<<<<<<<<<<<<<<<<<<<
               =1   1305   ;init the LED display functions
                                                                        =1      1306
;>>>>>>>>>>>>>>>>>>>>>>>>>>>>>>>>>><<<<<<<<<<<<<<<<<<<<<<<<<<<<<<<<
0163 7A10      =1   1307           mov  ?initLoop,#16
0165 7844      =1   1308           mov  ?initPtr,#ledBuffer
0167 E4        =1   1309              clr  A
               =1   1310
0168           =1   1311              _init3:
0168 F6        =1   1312                    mov  @?initPtr,A
0169 2411      =1   1313                    add  A,#011h
016B 08        =1   1314              inc  ?initPtr
016C DAFA      =1   1315           djnz ?initLoop,_init3
               =1   1316
016E 75580F    =1   1317           mov  ledMode,#0Fh    ;Puts both upper and lower into alpha mode
0171 755908    =1   1318           mov  ledWidth,#08h   ;Set width to 8.
0174 755A44    =1   1319           mov  ledBufPtr,#ledBuffer
               =1   1320
               =1   1321           ;Ledinit stuff
0177 755C04    =1   1322              mov  ledActiveDisplay,#4 ;An illegal display number used to indicate
               =1   1323                                       ;need for an update.
                                                                        =1      1324
;>>>>>>>>>>>>>>>>>>>>>>>>>>>>>>>>>><<<<<<<<<<<<<<<<<<<<<<<<<<<<<<<<
         .     =1   1325   ;init the optrex functions
                                                                        =1      1326
;>>>>>>>>>>>>>>>>>>>>>>>>>>>>>>>>>><<<<<<<<<<<<<<<<<<<<<<<<<<<<<<<<
               =1   1327   ; NO initialization required.
               =1   1328
                                                                        =1      1329
;>>>>>>>>>>>>>>>>>>>>>>>>>>>>>>>>>><<<<<<<<<<<<<<<<<<<<<<<<<<<<<<<<
               =1   1330   ;init the serialTX functions
                                                                        =1      1331
;>>>>>>>>>>>>>>>>>>>>>>>>>>>>>>>>>><<<<<<<<<<<<<<<<<<<<<<<<<<<<<<<<
               =1   1332   ;    mov  txBufPtr,#sBuffer    ;Init to any valid buffer address.
               =1   1333   ;    mov  txMsgLen,#1          ;+1 on actual msg
```

B - Page 9

```
length.
                =1   1334
                                                                     =1      1335
;>>>>>>>>>>>>>>>>>>>>>>>>>>>>>>>><<<<<<<<<<<<<<<<<<<<<<<<<<<<<<<<
                =1   1336    ;init the scan/encoder functions
                                                                     =1      1337
;>>>>>>>>>>>>>>>>>>>>>>>>>>>>>>>><<<<<<<<<<<<<<<<<<<<<<<<<<<<<<<<
                =1   1338    ;         mov  ?initPtr,#counter0         ;This is will
init the
                =1   1339    ;                                         mov  ?initLoop,#8
;encoder counters to zero.
                =1   1340    ;     _init2:
                             =1   1341    ;                             mov  @?initPtr,#0
;ALREADY DONE WITH MAIN
                             =1   1342    ;                           inc  ?initPtr
;ZEROING INIT LOOP.
                =1   1343    ;         djnz ?initLoop,_init2
                =1   1344
017A            =1   1345    _initCommPort:
                =1   1346       ;Read the external comms initialization
                =1   1347       ;Extended to include chip address (Tue  05-23-95)
017A 7580FF     =1   1348           mov  P0,#0FFh            ;make port 0 all inputs.
017D C2B2       =1   1349       clr P3.2                ;!enable 74365
017F E580       =1   1350       mov A,P0                ;read the data
0181 D2B2       =1   1351           setb P3.2                             ;disable 74365.
                =1   1352
                =1   1353       ;Decode the comms and checksum data.
0183 20E304     =1   1354       jb ACC.3,_initCheckOn;
0186 D209       =1   1355           setb checksumFlag
0188 218C       =1   1356           ajmp _initLb11
018A            =1   1357    _initCheckOn:
018A C209       =1   1358       clr  checksumFlag
                =1   1359
018C            =1   1360    _initLb11:
018C 20E203     =1   1361    jb ACC.2,_initLoSpeed
018F 758780     =1   1362           mov  PCON,#80h           ;3/10/95 - mod to provide
for the setting
0192            =1   1363    _initLoSpeed:            ;          of the SMOD bit
in the PCON reg.
0192 20E10D     =1   1364       jb ACC.1,_initHiSpeed
0195 20E005     =1   1365          jb ACC.0,_init24
0198 758DE8     =1   1366             mov TH1,#0E8h         ;value for 1200 baud
019B 21AD       =1   1367             ajmp _initLb12
019D            =1   1368       _init24:
019D 758DF4     =1   1369             mov TH1,#0F4h         ;value for 2400 baud
01A0 21AD       =1   1370             ajmp _initLb12
01A2            =1   1371    _initHiSpeed:
01A2 20E005     =1   1372          jb ACC.0,_init96
01A5 758DFA     =1   1373             mov TH1,#0FAh         ;value for 4800 baud
01A8 21AD       =1   1374             ajmp _initLb12
01AA            =1   1375       _init96:
01AA 758DFD     =1   1376             mov TH1,#0FDh         ;this is the default value.
                =1   1377
01AD            =1   1378    _initLb12:
01AD C4         =1   1379       swap A                   ;Get the device addr from
upper nibble.
01AE F4         =1   1380       cpl  A                   ;invert so default addr is
zero.
01AF 540F       =1   1381       anl A,#0Fh
```

*B* – Page 10

```
01B1 F51A       =1 1382       mov deviceAddr,A
                =1 1383
01B3 759850     =1 1384       mov SCON,#01010000b ;ser port mode 1. Clear
rx/tx interrupt flags SCON.1&0.
01B6 758923     =1 1385       mov TMOD,#00100011b ;put timer 1 in mode 2, timer 0
into mode 3.
01B9 75B808     =1 1386       mov IP  ,#00001000b ;put timer1 at highest priority
01BC 75A898     =1 1387       mov IE  ,#10011000b ;Enable serial port and TH0
interrupts.
                =1 1388
01BF D28E       =1 1389       setb TR1                        ;start TH0
01C1 0159       =1 1390       ajmp _initReturn
                =1 1391       $include(opx2init.asm)
                =1 1392       ;(10U&k4S(s#8&18D
                =1 1393
                =1 1394       ;LCD0ENABLE EQU 0FDFFh
                =1 1395       ;LCD1ENABLE EQU 0FBFFh
00FD            =1 1396       LCD0ENABLE EQU 0FDh
00FB            =1 1397       LCD1ENABLE EQU 0FBh
                =1 1398
00B5            =1 1399       RS         EQU P3.5
                =1 1400
                =1 1401       ;*******
01C3            =1 1402       opxInit:
                =1 1403       ;*******
                =1 1404       ;Mon  12-26-1994  15:08:04
                =1 1405       ;Syntax: {C0npq}
                =1 1406       ;where: n=display enab line, p=number of lines, q =
width.
                =1 1407       ;On entry R2 contains the display enab line 'n'.
                =1 1408
                =1 1409       ?oiEnabLine EQU     R2    ;(this already 'decoded' by
parser)
                =1 1410       ?oiLines    EQU     R3
                =1 1411       ?oiWidth    EQU     R4
                =1 1412
                =1 1413       ;First get the number of lines.
01C3 750EEB     =1 1414       mov ?gnpErr, #0EBh
01C6 750C01     =1 1415       mov ?gnpLower, #1
01C9 750D04     =1 1416       mov ?gnpUpper, #4
01CC 3142       =1 1417       acall subGetNextParam
01CE FB         =1 1418       mov ?oiLines, A
                =1 1419
                =1 1420       ;Now get the display width on this LCD enable line.
01CF 750EE9     =1 1421       mov ?gnpErr, #0E9h
                =1 1422    ;    mov ?gnpLower,#1
                =1 1423    ;    mov ?gnpUpper,#4
01D2 3142       =1 1424       acall subGetNextParam
01D4 FC         =1 1425       mov ?oiWidth, A
                =1 1426
                =1 1427       ;opxTemp is a var that only opx routines can use.
01D5 75333C     =1 1428       mov opxTemp,#03Ch        ;this is the two and four
line init word.
01D8 EA         =1 1429       mov A,?oiEnabLine        ;is this the lower or upper
display
01D9 24FF       =1 1430       add A,#-1
01DB 30E70D     =1 1431       jnb ACC.7, _oiUpperDisplay
                =1 1432       ;OK we must be dealing with the lower enab line.
                =1 1433       ;Check to see if this is a 4 line display
```

𝛽 - Page 13

```
0246 D53003    =1  1530        djnz ddMult,_dd1
0249 C21A      =1  1531        clr opx_TimerEnable
024B 22        =1  1532    ret
024C                            _dd1:
024C 0159      =1  1534        jmp _kernelStart    ;Envoke main task handler while we wait
               =1  1535    ;(END subOpxDelay)
               =1  1536
               =1  1537
               =1  1538    ;***************
024E           =1  1539    prvClkThenDelay:
               =1  1540    ;***************
024E 201106    =1  1541        jb opxActiveEnableFlag,_ctdUpper
0251 7583FD    =1  1542        mov DPH,#LCD0ENABLE  ;mov DPTR,#LCD0ENABLE ;will take A1 low.
0254 02025A    =1  1543        jmp _ctd1
0257           =1  1544    _ctdUpper:
0257 7583FB    =1  1545        mov DPH,#LCD1ENABLE  ;mov DPTR,#LCD1ENABLE ;will take A2 low.
025A           =1  1546    _ctd1:
025A F582      =1  1547        mov DPL,A        ;mov UR0,P0           ;store port0
025C 11D9      =1  1548        acall clock      ;movx @DPTR,A
               =1  1549                         ;mov P0,UR0           ;restore port0
025E D21A      =1  1550        setb opx_TimerEnable
0260 5146      =1  1551        acall subOpxDelay
0262 22        =1  1552    ret
               =1  1553
               =1  1554    ;****************
0263           =1  1555    prvSetWidthFlags:
               =1  1556    ;****************
0263 53220F    =1  1557        anl OPXSTATEFLAGS,#0Fh   ;clear all width flags
               =1  1558
0266 EC        =1  1559        mov A,?oiWidth
0267 B40103    =1  1560        cjne A,#1,_oiw20
               =1  1561                         ;WIDTH=16
026A D214      =1  1562        setb opxW16Flag
026C 22        =1  1563        ret
026D           =1  1564    _oiw20:
026D B40203    =1  1565        cjne A,#2,_oiw24
               =1  1566                         ;WIDTH=20
0270 D215      =1  1567        setb opxW20Flag
0272 22        =1  1568        ret
0273           =1  1569    _oiw24:
0273 B40303    =1  1570        cjne A,#3,_oiw40
               =1  1571                         ;WIDTH=24
0276 D216      =1  1572        setb opxW24Flag
0278 22        =1  1573        ret
0279           =1  1574    _oiw40:
               =1  1575                         ;WIDTH=40
0279 D217      =1  1576        setb opxW40Flag
027B 22        =1  1577        ret
               =1  1578    ;END prvCheckWidth
               =1  1579
               =1  1580
               =1  1581    ;*************
027C           =1  1582    opxCursorType:
               =1  1583    ;*************
```

6 - Page 14

```
                    =1  1584    ;Define the cursor type.
                    =1  1585    ;Syntax (C2nx}
                    =1  1586    ;    n : LCD Enable line
                    =1  1587    ;    x : 0=underbar 1=flashingDigit
                    =1  1588
027C C2B5           =1  1589        clr RS
027E 750EE7         =1  1590        mov ?gnpErr,#0E7h
0281 750C00         =1  1591        mov ?gnpLower,#0
0284 750D01         =1  1592        mov ?gnpUpper,#1           ;Get the X parameter (0
= line)
0287 3142           =1  1593        acall subGetNextParam      ;                    (1
= digit)
0289 7583FD         =1  1594        mov DPH,#LCD0ENABLE        ;mov DPTR,#LCD0ENABLE
028C BA0103         =1  1595        cjne R2,#1,_obfLower
                    =1  1596            ;OK so we will define the upper display cursor.
028F 7583FB         =1  1597            mov DPH,#LCD1ENABLE    ;mov DPTR,#LCD1ENABLE
0292                =1  1598        _obfLower:
                    =1  1599        ;mov UR0,P0                ;Store port.
0292 6007           =1  1600        jz _obfLine
0294 D210           =1  1601            setb opxCursorTypeFlag
0296 740F           =1  1602            mov A,#0Fh
0298 02029F         =1  1603                jmp _obfLblA
                    =1  1604
029B                =1  1605        _obfLine:
029B C210           =1  1606            clr opxCursorTypeFlag
029D 740E           =1  1607            mov A,#0Eh
                    =1  1608
029F                =1  1609            _obfLblA:
029F F582           =1  1610        mov DPL,A        ;movx @DPTR,A
02A1 11D9           =1  1611        acall clock                ;mov P0,UR0
;Restore port.
02A3 0157           =1  1612    jmp _opxInitReturn
                    =1  1613
                    =1  1614
                    =1  1615    ;*********
02A5                =1  1616    opxDLInit:
                    =1  1617    ;*********
                    =1  1618    ;Display in R2
02A5 BA0005         =1  1619        cjne R2,#0,_dliSetUpper
02A8 C211           =1  1620            clr opxActiveEnableFlag
02AA 0202AF         =1  1621            jmp _dliLblA
02AD                =1  1622        _dliSetUpper:
02AD D211           =1  1623            setb opxActiveEnableFlag
02AF                =1  1624        _dliLblA:
02AF C2B5           =1  1625        clr RS
02B1 7440           =1  1626        mov A,#40h                 ;define start of CG RAM
02B3                =1  1627    opxDownLoad:
02B3 7583FD         =1  1628        mov DPH,#LCD0ENABLE        ;mov DPTR,#LCD0ENABLE
02B6 301103         =1  1629        jnb opxActiveEnableFlag,_dliLower
02B9 7583FB         =1  1630            mov DPH,#LCD1ENABLE    ;mov DPTR,#LCD1ENABLE
02BC                =1  1631        _dliLower:
                    =1  1632                                   ;mov UR0,P0
02BC F582           =1  1633        mov DPL,A                  ;movx @DPTR,A
02BE 11D9           =1  1634        acall clock                ;mov P0,UR0
02C0 7129           =1  1635        acall subWait40us
02C2 D218           =1  1636            setb opxDLFlag
02C4 D2B5           =1  1637            setb RS
02C6 0157           =1  1638    jmp _opxInitReturn
                    =1  1639
```

β - Page 15

```
                    =1  1640    ;***********
02C8                =1  1641    opxMakeActive:
                    =1  1642    ;***********
                    =1  1643    ;Syntax: {C5p}
                    =1  1644    ;   p : the new active display (0 -> 3)
                    =1  1645
                    =1  1646    ;   This routine initializes the following vars
                    =1  1647    ;     opxActiveSOL       -   The start address of the line being written to.
                    =1  1648    ;                            This address is derived from the number of lines
                    =1  1649    ;                            and the display width - see table in opx.h.
                    =1  1650    ;     opxActiveEnableFlag This is zero if the active display is on the lower
                    =1  1651    ;                         enable and high is on the upper.
                    =1  1652    ;     opxActiveCursor  -  This is reset to zero.
                    =1  1653
                    =1  1654    ;   The new active display is stored in R2.
                    =1  1655
                    =1  1656    ?omaDisplay EQU R2
                    =1  1657
                    =1  1658    ;The width and lines info are contained in flags (SOL)
                    =1  1659        ;If the display is 0 or 1 then std start of lines
                    =1  1660
02C8  753200        =1  1661         mov opxActiveCursor,#0       ;reset the active cursor.
02CB  EA            =1  1662         mov A,?omaDisplay
02CC  24FE          =1  1663         add A,#-2
02CE  20E734        =1  1664         jb ACC.7,_omaDisplay01
                    =1  1665             ;DISPLAYS 2/3
                    =1  1666             ;Need to know width before we can assign SOL and other state.
02D1  301321        =1  1667             jnb opx4LineFlag,_oma2Line
                    =1  1668                 ;All 4 line displays on LCD0Enable
02D4  C211          =1  1669                 clr opxActiveEnableFlag
02D6  30140E        =1  1670                 jnb opxW16Flag,_oma20x4
                    =1  1671                     ;16x4 display
02D9  EA            =1  1672                     mov A,?omaDisplay
02DA  20E005        =1  1673                     jb ACC.0,_oma16x4Line3
                    =1  1674                         ;Line 2 on 16x4
02DD  753190        =1  1675                         mov opxActiveSOL,#090h
02E0  0157          =1  1676                         jmp _opxInitReturn
02E2                =1  1677                     _oma16x4Line3:
                    =1  1678                         ;Line 3 on 16x4
02E2  7531D0        =1  1679                         mov opxActiveSOL,#0D0h
02E5  0157          =1  1680                         jmp _opxInitReturn
                    =1  1681
02E7                =1  1682                 _oma20x4:
                    =1  1683                     ;20x4 display
02E7  EA            =1  1684                     mov A,?omaDisplay
02E8  20E005        =1  1685                     jb ACC.0,_oma20x4Line3
                    =1  1686                         ;Line 2 on 20x4
02EB  753194        =1  1687                         mov opxActiveSOL,#094h
02EE  0157          =1  1688                         jmp _opxInitReturn
```

B- Page 16

```
02F0            =1  1689         _oma20x4Line3:
                =1  1690             ;Line 3 on 20x4
02F0 7531D4     =1  1691                                                     mov opxActiveSOL,#0D4h
02F3 0157       =1  1692                 jmp _opxInitReturn
                =1  1693
                =1  1694             ;There are no other 4 line displays supported
                =1  1695             ;thus no point in testing for them.
                =1  1696
02F5            =1  1697         _oma2Line:
                =1  1698             ;All non 4 line displays have the same state for lines 2/3
02F5 D211       =1  1699                 setb opxActiveEnableFlag    ;All these displays will be on enabl
02F7 EA         =1  1700             mov A,?omaDisplay
02F8 20E005     =1  1701             jb ACC.0,_omaNX2Line3
                =1  1702                 ;Line 2 on an NX2 or NX1 display
02FB 753180     =1  1703                 mov opxActiveSOL,#080h
02FE 0157       =1  1704                 jmp _opxInitReturn
0300            =1  1705         _omaNX2Line3:
                =1  1706             ;Line 3 on a NX2 display
0300 7531C0     =1  1707                 mov opxActiveSOL,#0C0h
0303 0157       =1  1708                 jmp _opxInitReturn
                =1  1709
0305            =1  1710         _omaDisplay01:
0305 C211       =1  1711             clr opxActiveEnableFlag         ;both display 0 & 1 use lower enable
0307 BA0005     =1  1712             cjne ?omaDisplay,#0,_omaDisplay1
                =1  1713                 ;DISPLAY0
030A 753180     =1  1714                 mov opxActiveSOL,#080h
030D 0157       =1  1715                 jmp _opxInitReturn
030F            =1  1716         _omaDisplay1:
                =1  1717             ;DISPLAY1
030F 7531C0     =1  1718                 mov opxActiveSOL,#0C0h
0312 0157       =1  1719                 jmp _opxInitReturn
                =1  1720         ;END opxMakeActive
                =1  1721         $include(opx2edit.asm)
                                                                             =1    1722
;----------------------------------------------------------------------------
                =1  1723         ;GLOBALS
                =1  1724         ;-------
                =1  1725             ?opxBoolParam    EQU R3
                =1  1726
                =1  1727         ;**************
0314            =1  1728         subGetLCDWidth:
                =1  1729         ;**************
                =1  1730         ;Return the width of the LCD in the ACC
0314 301403     =1  1731             jnb opxW16Flag,_glw20
0317 7410       =1  1732                     mov A,#16
0319 22         =1  1733                 ret
031A            =1  1734         _glw20:
031A 301503     =1  1735             jnb opxW20Flag,_glw24
031D 7414       =1  1736                     mov A,#20
031F 22         =1  1737                 ret
0320            =1  1738         _glw24:
0320 301603     =1  1739             jnb opxW24Flag,_glw40
0323 7418       =1  1740                     mov A,#24
0325 22         =1  1741                 ret
```

β - Page 17

```
0326              =1 1742         _glw40:
0326 7428         =1 1743              mov A,#40
0328 22           =1 1744              ret
                  =1 1745         ;END subGetLCDWidth
                  =1 1746
                  =1 1747         ;**********
0329              =1 1748         subWait40us:
                  =1 1749         ;**********
                  =1 1750         ;At 11.059MHz this is 36 instruction cycles
                  =1 1751         ;LCALL(this routine) = 2
                  =1 1752         ;mov B,immed         = 1
                  =1 1753         ;ret                 = 2
                  =1 1754         ;                      ---
                  =1 1755         ; Sub total          = 5
                  =1 1756         ;Thus loop itself    = 30 round down
                  =1 1757         ;djnz                = 2
                  =1 1758         ;Thus loop           =30/2=15dec
                  =1 1759
                  =1 1760         ;Sat  11-05-1994  Changed to 60us
0329 75F01E       =1 1761              mov B,#30              ;djnz is 2 cycles ie circa 2us
032C              =1 1762         _swLoop:
032C D5F0FD       =1 1763              djnz B,_swLoop
032F 22           =1 1764         ret
                  =1 1765
                  =1 1766         ;***************
0330              =1 1767         subWrtCharToLCD:
                  =1 1768         ;***************
                  =1 1769         ;Exec time 120us
                  =1 1770              ;This routine writes the char contained in R2 to the active display.
                  =1 1771         ;If the opxMoveCursorFlag is set then this routine just moves the
                  =1 1772         ;cursor to the opxActiveCursor location.
0008              =1 1773              ?wctTemp EQU UR0
0009              =1 1774              ?wctP2   EQU UR1
                  =1 1775              ?wctChar EQU R2          ;Calling routine has put char here.
                  =1 1776
0330 E532         =1 1777              mov A,opxActiveCursor
0332 2531         =1 1778              add A,opxActiveSOL       ;Now have the address of where to write
0334 C2B5         =1 1779              clr RS                   ;reg select line of the display(s)
                  =1 1780              ;mov ?wctP2,P2
0336 7583FD       =1 1781         mov DPH,#LCD0ENABLE      ;mov DPTR,#LCD0ENABLE
0339 301103       =1 1782         jnb opxActiveEnableFlag,_wctLower
033C 7583FB       =1 1783              mov DPH,#LCD1ENABLE   ;mov DPTR,#LCD1ENABLE
033F              =1 1784         _wctLower:
                  =1 1785         ;mov ?wctTemp,P0          ;Store port.
033F F582         =1 1786              mov DPL,A             ;movx @DPTR,A           ;This write determines the address
0341 11D9         =1 1787              call clock
0343 7129         =1 1788              call subWait40us      ;in DDRAM for the character.
0345 301203       =1 1789              jnb opxMoveCursorFlag,_wctWriteChar
0348 C212         =1 1790                  clr opxMoveCursorFlag ;default state is reset.
                  =1 1791                  ;mov P0,?wctTemp
                  =1 1792                  ;mov P2,?wctP2
034A 22           =1 1793                  ret                    ;exit here as cursor now moved.
```

β- Page 18

```
                        =1   1794
034B                    =1   1795        _wctWriteChar:
034B D2B5               =1   1796             setb RS
034D 8A82               =1   1797             mov DPL,?wctChar      ;mov A,?wctChar
034F 11D9               =1   1798             call clock            ;movx @DPTR,A           ;This
is the actual char write.
                        =1   1799             ;mov P0,?wctTemp      ;Restore port.
                        =1   1800             ;mov P2,?wctP2
0351 7129               =1   1801             call subWait40us
0353 22                 =1   1802        ret
                        =1   1803
                        =1   1804        ;*******
0354                    =1   1805        opxClear:
                        =1   1806        ;*******
                        =1   1807        ;Syntax {D0}
                        =1   1808        ;Clear the active display.
                        =1   1809
                        =1   1810             ?ohLoop EQU R2
                        =1   1811             ?ohTemp EQU R7
                        =1   1812
                        =1   1813             ;OK move cursor to home position
0354 753200             =1   1814             mov opxActiveCursor,#0
0357 D212               =1   1815             setb opxMoveCursorFlag
0359 7130               =1   1816             call subWrtCharToLCD      ;this performs a move
cursor function
                                                                        =1   1817
;with opxMoveCursorFlag set 035B D2B5               =1   1818             setb RS                   ;All prep'ed for the
write
035D 7114               =1   1819             call subGetLCDWidth       ;of a 'display widths'
worth
                        =1   1820             ;mov ?ohTemp,P0
                        =1   1821             ;mov ?ohP2,P2
035F FA                 =1   1822             mov ?ohLoop,A                                   ;of
spaces.
0360                    =1   1823        _ohLoop:
0360 758220             =1   1824             mov DPL,#' '
0363 11D9               =1   1825             call clock                ;movx @DPTR,A
0365 7129               =1   1826             call subWait40us          ;EXEC = 60us*width
(1.2ms for 20line)
0367 DAF7               =1   1827             djnz ?ohLoop,_ohLoop
                        =1   1828
                        =1   1829             ;mov P0,?ohTemp           ;Restore port.
0369 D212               =1   1830             setb opxMoveCursorFlag
036B 7130               =1   1831             call subWrtCharToLCD      ;bring the cursor home -
opxActiveCursor
                        =1   1832                                       ;still set to zero.
036D 0157               =1   1833        jmp _opxEditReturn
                        =1   1834
                        =1   1835        ;*********
036F                    =1   1836        opxDirect:
                        =1   1837        ;*********
                        =1   1838        ;Syntax:        {D1xpq}
                        =1   1839             ;Transmit the byte 'pq' to the display with RS a the
state defined by 'x'.
                        =1   1840
036F 750EE1             =1   1841             mov ?gnpErr,#0E1h
0372 750C00             =1   1842             mov ?gnpLower,#0
```

β — Page 19

```
0375 750D01    =1 1843           mov ?gnpUpper,#1
0378 3142      =1 1844           call subGetNextParam
037A 6005      =1 1845           jz _odClearRS
037C D2B5      =1 1846                   setb RS
037E 020383    =1 1847                   jmp _odGetByte
0381           =1 1848       _odClearRS:
0381 C2B5      =1 1849                   clr RS
               =1 1850
0383           =1 1851       _odGetByte:
0383 750EDF    =1 1852           mov ?gbErr,#0DFh
0386 750C00    =1 1853           mov ?gbLower,#0
0389 750DFF    =1 1854           mov ?gbUpper,#0FFh
038C 120714    =1 1855           call subGetByte
               =1 1856
038F 7583FD    =1 1857           mov DPH,#LCD0ENABLE       ;mov DPTR,#LCD0ENABLE
0392 301103    =1 1858           jnb opxActiveEnableFlag,_odLower
0395 7583FB    =1 1859           mov DPH,#LCD1ENABLE       ;mov DPTR,#LCD1ENABLE
0398           =1 1860       _odLower:
               =1 1861           ;mov UR0,P0
0398 F582      =1 1862           mov DPL,A                 ;movx @DPTR,A
039A 11D9      =1 1863           call clock                ;mov P0,UR0
039C 0157      =1 1864       jmp _opxEditReturn
               =1 1865
               =1 1866       ;**************
039E           =1 1867       opxCursorOnOff:
               =1 1868       ;**************
               =1 1869       ;Syntax:   {D2x}
               =1 1870       ;    x=0 cursor off, x=1 cursor on
               =1 1871
039E 750EDE    =1 1872              mov ?gnpErr,#0DEh
03A1 750C00    =1 1873           mov ?gnpLower,#0
03A4 750D01    =1 1874           mov ?gnpUpper,#1
03A7 3142      =1 1875           call subGetNextParam
               =1 1876
03A9 C2B5      =1 1877           clr RS                    ;Ensure display in command mode.
               =1 1878
03AB 7583FD    =1 1879           mov DPH,#LCD0ENABLE       ;mov DPTR,#LCD0ENABLE
03AE 301103    =1 1880           jnb opxActiveEnableFlag,_opoLower
03B1 7583FB    =1 1881           mov DPH,#LCD1ENABLE       ;mov DPTR,#LCD1ENABLE
03B4           =1 1882       _opoLower:
               =1 1883
03B4 600A      =1 1884           jz _opoOff                ;Test the 'x' param
               =1 1885       ;Cursor ON
               =1 1886       ;----------
03B6 740E      =1 1887           mov A,#0Eh
03B8 301007    =1 1888           jnb opxCursorTypeFlag,_opxWrite    ;0=underBar,
1=wholeDigit.
03BB D2E0      =1 1889           setb ACC.0
03BD 0203C2    =1 1890           jmp _opxWrite
               =1 1891
03C0           =1 1892       _opoOff:
               =1 1893       ;Cursor OFF
               =1 1894       ;----------
03C0 740C      =1 1895           mov A,#0Ch
               =1 1896
03C2           =1 1897       _opxWrite:
               =1 1898                                     ;mov ?ohTemp,P0
03C2 F582      =1 1899           mov DPL,A                 ;movx @DPTR,A
03C4 11D9      =1 1900           call clock                ;mov P0,?ohTemp
```

β - Page 20

```
03C6 0157        =1 1901        jmp _opxEditReturn
                 =1 1902
                 =1 1903        ;*************
03C8             =1 1904        opxMoveCursor:
                 =1 1905        ;*************
                 =1 1906        ;REV Sat   12-31-1994
                 =1 1907        ;Syntax:        {D3pq}
                 =1 1908        ;            Move to char pos YXh on the current display.
                 =1 1909        ;            Flag an error if this is outside the display
width.
                 =1 1910
                 =1 1911            ?omcTemp EQU R7
                 =1 1912
03C8 7114        =1 1913            call subGetLCDWidth
03CA F50D        =1 1914            mov ?gbUpper,A
03CC 750EDC      =1 1915            mov ?gbErr,#0DCh
03CF 750C00      =1 1916            mov ?gbLower,#0
03D2 120714      =1 1917            call subGetByte         ;get the position byte.
03D5 F532        =1 1918            mov opxActiveCursor,A
03D7 D212        =1 1919            setb opxMoveCursorFlag
03D9 7130        =1 1920            call subWrtCharToLCD
03DB 0157        =1 1921        jmp _opxEditReturn
                 =1 1922
                 =1 1923        ;************
03DD             =1 1924        opxWriteChar:
                 =1 1925        ;************
                 =1 1926        ;Syntax: {D4c}
                 =1 1927        ;This routine writes the char 'c' to the display.
                 =1 1928        ;Param checks performed thro' here but we will now allow
any char
                 =1 1929        ;to be transmitted to the display;
03DD 08          =1 1930            inc R0                  ;R0 is the buffer read ptr.
03DE 8602        =1 1931            mov AR2,@R0
03E0 7130        =1 1932            call subWrtCharToLCD
03E2 D212        =1 1933                setb opxMoveCursorFlag  ;Now we need to 'undo'
the automatic
03E4 7130        =1 1934                call subWrtCharToLCD    ;inc of the display amd
move the cursor back.
03E6 0157        =1 1935        jmp _opxEditReturn
                 =1 1936
                 =1 1937        ;*************
03E8             =1 1938        opxWriteEnable:
                 =1 1939        ;**************
                 =1 1940        ;Set the optrex write enable flags
03E8 D241        =1 1941            setb mfExtCmdFlag
03EA C230        =1 1942            clr ledExtCmdFlag
03EC 753200      =1 1943              mov opxActiveCursor,#0
03EF 0157        =1 1944        jmp _opxEditReturn
                 =1 1945
                 =1 1946        ;********
03F1             =1 1947        opxWrite:
                 =1 1948        ;********
                 =1 1949        ;Syntax {D5}<char string>/n
                 =1 1950            ;Writes char to display and increments the active
cursor.
                 =1 1951
                 =1 1952            ?opwChar    EQU R2
                 =1 1953            ?opwWidth   EQU R3
                 =1 1954
```

β- Page 21

```
03F1 FA         =1  1955        mov  ?opwChar,A
03F2 7130       =1  1956        call subWrtCharToLCD
03F4 7114       =1  1957           call subGetLCDWidth
03F6 FB         =1  1958        mov  ?opwWidth,A
03F7 E532       =1  1959        mov  A,opxActiveCursor
03F9 04         =1  1960           inc  A                              ;To be compatable with width.
03FA B50306     =1  1961        cjne A,AR3,_owInc
03FD D212       =1  1962              setb opxMoveCursorFlag  ;Now we need to 'undo' the automatic
03FF 7130       =1  1963              call subWrtCharToLCD   ;inc of the display amd move the cursor back.
0401 0157       =1  1964              jmp  _opxEditReturn    ;if at end of line don't increment.
0403            =1  1965        _owInc:
0403 0532       =1  1966        inc  opxActiveCursor
0405 0157       =1  1967        jmp  _opxEditReturn
                =1  1968        $include(parser.asm)
                =1  1969        ;(10U&k2S(s#8&l12D
                =1  1970        ;---------------------------------------------------------------
                =1  1971        ;TASKREADER Error and other routines placed here so that
                =1  1972        ;they can be reached by the 'jb' instruction
                =1  1973        ;---------------------------------------------------------------
0407            =1  1974        _mfCheckSumError:
                =1  1975        ;mov PARSERFLAGS,#0
0407 5328C0     =1  1976        anl PARSERFLAGS,#0C0h
                =1  1977 +1     errorNumber 0FFh
                =1  1978 +1
                =1  1979 +1
                =1  1980 +1
                =1  1981 +1
040A 757CFF     =1  1982 +1     mov  outputBuffer,#0FFh   ;Fri  05-05-95
040D D201       =1  1983 +1     setb errorFlag
040F 020059     =1  1984 +1     ljmp _errorReturn
                =1  1986
0412            =1  1987        _mfErrorInStartByte:
                =1  1988 +1     errorNumber 0FEh    ;This error report disabled Wed 05-24-95
                =1  1989 +1
                =1  1990 +1
                =1  1991 +1
                =1  1992 +1
0412 757CFE     =1  1993 +1     mov  outputBuffer,#0FEh   ;Fri  05-05-95
0415 D201       =1  1994 +1     setb errorFlag
0417 020059     =1  1995 +1     ljmp _errorReturn
                =1  1997        ;ajmp _mfExit
                =1  1998
041A            =1  1999        _mfLCDDL:
                =1  2000        ;This segment of code provides for the download of user defined
                =1  2001        ;chars to the LCD display.
041A B47D02     =1  2002        cjne A,#MSGENDBYTE,_mfLCDJUMP
041D 812E       =1  2003           ajmp _mfExitNoParse
041F            =1  2004        _mfLCDJUMP:
041F 41B3       =1  2005           ajmp opxDownLoad
                =1  2006
0421            =1  2007        _mfExtCmd:
                =1  2008              ;check that its not the end of extended command byte. This
```

*B* - Page 22

```
                                    ;can be anyone of the following '0', '\n', or
                   =1   2009
'\r'.
0421 B40002        =1   2010        cjne A,#ENDEXTCMD1,_mfExt2
0424 812E          =1   2011            ajmp _mfExitNoParse
0426               =1   2012        _mfExt2:
0426 B40A02        =1   2013        cjne A,#ENDEXTCMD2,_mfExt3
0429 812E          =1   2014            ajmp _mfExitNoParse
042B               =1   2015        _mfExt3:
042B B40D0B        =1   2016        cjne A,#ENDEXTCMD3,_mfStep
                   =1   2017
042E               =1   2018        _mfExitNoParse:
                   =1   2019        ;mov PARSERFLAGS,#0
042E 5328C0        =1   2020        anl PARSERFLAGS,#0C0h
0431 C230          =1   2021        clr ledExtCmdFlag
0433 C226          =1   2022        clr ledCursorEnableFlag
0435 C218          =1   2023        clr opxDLFlag
0437 0177          =1   2024        ajmp _taskReaderReturn
                   =1   2025
0439               =1   2026        _mfStep:
0439 203002        =1   2027            jb ledExtCmdFlag,_mfLed
043C 61F1          =1   2028            ajmp opxWrite    ;need FAR jump
043E               =1   2029        _mfLed:
043E 02090D        =1   2030            ljmp _ledWriteString
                   =1   2031
0441               =1   2032        _mfCheckOut:
                   =1   2033        ;clr readyForCheckSumFlag
0441 E572          =1   2034        mov A,mfCheckSum
0443 B52BC1        =1   2035        cjne A,rxByte,_mfCheckSumError
                   =1   2036            ;check sum OK
                   =1   2037            ajmp _mfStdExit
                   =1   2038
                   =1   2039
                   =1   2040        ;**********
0448               =1   2041        TaskReader:
                   =1   2042        ;**********
                   =1   2043        ;LOCAL VARS
                   =1   2044            ?mfWrtPtr    EQU    R0
                   =1   2045
0448 E52B          =1   2046        mov A,rxByte
                   =1   2047
044A 2042F4        =1   2048        jb readyForCheckSumFlag,_mfCheckOut
044D 2041D1        =1   2049        jb mfExtCmdFlag,_mfExtCmd
0450 2018C7        =1   2050            jb opxDLFlag,_mfLCDDL
0453 204059        =1   2051        jb mfTaskFormingFlag,_mfFormMsg
0456 20453B        =1   2052        jb addrFormingFlag,_mfDecodeAddr
0459 204410        =1   2053        jb checkAddrFlag,_mfCheckAddr
045C 204330        =1   2054        jb ignoreFlag,_mfLookForEndMsg
                   =1   2055
                   =1   2056        ;CHECK START CHAR
                   =1   2057        ;----------------
                   =1   2058            ;if we are here then this is the begining of a new
msg. Ensure
                   =1   2059        ;that the rx byte is a msgSTartByte otherwise ignore
the data.
045F B47BB0        =1   2060        cjne A,#MSGSTARTBYTE,_mfErrorInStartByte
                   =1   2061            ;OK found the MSGSTARTBYTE - reset buffer, set
mfTaskFormingFlag,
                   =1   2062        ;aim the mfRxWrtPtr to FIFO start and exit.
0462 D244          =1   2063        setb checkAddrFlag
```

β - Page 23

```
0464 757173      =1  2064         mov mfRxWrtPtr,#RXFIFOSTART
0467 75727B      =1  2065         mov mfCheckSum,#MSGSTARTBYTE
046A 81E8        =1  2066         ajmp _mfExit
                 =1  2067
                 =1  2068    ;CHECK FOR A MSG ADDRESS
                 =1  2069    ;------------------------
046C             =1  2070    _mfCheckAddr:
                 =1  2071       ;First check to see if this is a global or specific message.
                 =1  2072       ;If the chacter is not decimal numeric then assume this is
                 =1  2073       ;a global message.
046C 24C6        =1  2074         add A,#-('9'+1)      ;if less than or equal '9' possible numeric.
046E 30E73E      =1  2075         jnb ACC.7,_mfFormMsg ;if char is not dec digit then must
                 =1  2076       ;jnb ACC.7,_mfIgnore   ;if no addr ignore
0471 E52B        =1  2077         mov A,rxByte
0473 24D0        =1  2078         add A,#-'0'
0475 20E710      =1  2079         jb ACC.7,_mfIgnore
                 =1  2080           ;If here then first char is decimal digit
0478 D245        =1  2081           setb addrFormingFlag
047A 75F00A      =1  2082           mov B,#10
047D A4          =1  2083           mul AB           ;A contains first digit - '0' already.
047E F573        =1  2084           mov addrMSD,A    ;The result must be 0 or 10 for the 816.
                 =1  2085 +1        macUpdateChecksum rxByte
                 =1  2086 +1 ;##########################
0480 E572        =1  2087 +1  mov A,mfChecksum
0482 252B        =1  2088 +1  add A,rxByte
0484 F572        =1  2089 +1  mov mfChecksum,A
0486 81E8        =1  2091            ajmp _mfExit
                 =1  2092
0488             =1  2093        _mfIgnore:
                 =1  2094            ;mov PARSERFLAGS,#0
0488 5328C0      =1  2095            anl PARSERFLAGS,#0C0h
048B D243        =1  2096            setb ignoreFlag
048D 81E8        =1  2097            ajmp _mfExit
                 =1  2098
048F             =1  2099    _mfLookForEndMsg:
048F B47D56      =1  2100    cjne A,#MSGENDBYTE,_mfExit
0492 812E        =1  2101        ajmp _mfExitNoParse    ;if command closed reset state.
                 =1  2102
                 =1  2103    ;DECODE ADDR IF ONE FOUND
                 =1  2104    ;------------------------
0494             =1  2105    _mfDecodeAddr:
                 =1  2106        ;If here then we already have the first decimal digit stored in
                 =1  2107    ;the first byte of the rxFifo
0494 24C6        =1  2108        add A,#-('9'+1)
0496 30E7EF      =1  2109        jnb ACC.7,_mfIgnore
0499 E52B        =1  2110          mov A,rxByte
049B 24D0        =1  2111          add A,#-'0'
049D 20E7E8      =1  2112          jb ACC.7,_mfIgnore
04A0 2573        =1  2113            add A,addrMSD
04A2 B51AE3      =1  2114            cjne A,deviceAddr,_mfIgnore
                 =1  2115              ;If the address are equal then this is a
```

β- Page 24

```
                        =1  2116              ;message for us - go form and parse.
04A5                    =1  2117              _mfProcessMsg:
                        =1  2118 +1              macUpdateChecksum rxByte
                        =1  2119 +1  ;###########################
04A5 E572               =1  2120 +1    mov A,mfChecksum
04A7 252B               =1  2121 +1    add A,rxByte
04A9 F572               =1  2122 +1    mov mfChecksum,A
04AB D240               =1  2124              setb mfTaskFormingFlag
04AD 81E8               =1  2125              ajmp _mfExit
                        =1  2126
                        =1  2127
                        =1  2128     ;FORM THE MSG FOR SUBSEQUENT PARSING
                        =1  2129     ;------------------------------------
04AF                    =1  2130     _mfFormMsg:
04AF D240               =1  2131     setb mfTaskFormingFlag
04B1 E52B               =1  2132     mov A,rxByte
04B3 B47D1F             =1  2133     cjne A,#MSGENDBYTE, _mfUpdateFifo
                        =1  2134     ;OK so this is the message terminating byte
                        =1  2135        ;Check that this was not a NULL msg ie startByte
followed by stopByte
04B6 E571               =1  2136     mov A,mfRxWrtPtr
04B8 248D               =1  2137     add A,#-RXFIFOSTART
04BA 6014               =1  2138     jz _mfNullMsg
                        =1  2139       ;We have received a completed task definition.
Flag the task
                        =1  2140       ;handler and exit.
                        =1  2141 +1     macUpdateChecksum #MSGENDBYTE
                        =1  2142 +1 ;###########################
04BC E572               =1  2143 +1    mov A,mfChecksum
04BE 247D               =1  2144 +1    add A,#MSGENDBYTE
04C0 F572               =1  2145 +1    mov mfChecksum,A
04C2 200907             =1  2147              jb checksumFlag,_mfPreCheckOut
04C5                    =1  2148              _mfStdExit:
                        =1  2149              ;mov PARSERFLAGS,#0   ;clear all flags
04C5 5328C0             =1  2150              anl PARSERFLAGS,#0C0h
04C8 D206               =1  2151              setb processTaskFlag
04CA 81E8               =1  2152              ajmp _mfExit
04CC                    =1  2153              _mfPreCheckout:
04CC D242               =1  2154              setb readyForCheckSumFlag
04CE 81E8               =1  2155              ajmp _mfExit
                        =1  2156
04D0                    =1  2157     _mfNullMsg:
                        =1  2158     ;If here then we have a null msg.
                        =1  2159        ;Reset flags and pointers and tx rev level.
                        =1  2160     ;mov PARSERFLAGS,#0
04D0 5328C0             =1  2161     anl PARSERFLAGS,#0C0h
04D3 E102               =1  2162     ajmp revLevel
                        =1  2163
04D5                    =1  2164     _mfUpdateFifo:
04D5 E571               =1  2165     mov A,mfRxWrtPtr
04D7 2488               =1  2166     add A,#-RXFIFOEND            ;!!! Should we flag an
error for fifo overun?
04D9 30E70C             =1  2167     jnb ACC.7,_mfExit            ;if zero or +ve beyond
buffer.
04DC A871               =1  2168     mov ?mfWrtPtr,mfRxWrtPtr     ;otherwise write rxByte
to buffer.
04DE A62B               =1  2169     mov @?mfWrtPtr,rxByte
04E0 0571               =1  2170     inc mfRxWrtPtr
                        =1  2171 +1     macUpdateChecksum rxByte   ;checksum is always
```

β- Page 25

```
        computed whether
                    =1  2172 +1 ;#########################
04E2 E572           =1  2173 +1     mov A,mfChecksum
04E4 252B           =1  2174 +1     add A,rxByte
04E6 F572           =1  2175 +1     mov mfChecksum,A
                    =1  2177                                 ;turned on or not.
                    =1  2178
                    =1  2179         ;EXIT
                    =1  2180         ;----
04E8                =1  2181     _mfExit:
04E8 0177           =1  2182     ajmp _taskReaderReturn
                    =1  2183
                                                                =1      2184
;------------------------------------------------------------------------
                    =1  2185
                    =1  2186     ;*********
04EA                =1  2187     msgParser::()
                    =1  2188     ;*********
                    =1  2189         ;The message parser is activated whenever the
processTaskFlag is high. The
                    =1  2190         ;parser will then read the rxFifo and determine the
task. All tasks can be
                    =1  2191         ;interpretted in a single parse.
                    =1  2192
                    =1  2193         ;DEFINES
  0041              =1  2194             lowerMsgLimit      EQU    'A'
  005A              =1  2195             upperMsgLimit      EQU    'Z'
                    =1  2196
                    =1  2197         ;LOCAL VARS
                    =1  2198             ?fifoRdPtr         EQU    R0
                    =1  2199
                    =1  2200         ;CODE
                    =1  2201         ;Need to compare the task msg in the rxFiFo with the
msg list
04EA 7873           =1  2202             mov ?fifoRdPtr,#RXFIFOSTART
04EC E6             =1  2203             mov A,@?fifoRdPtr
04ED 750C41         =1  2204             mov ?bcLower,#lowerMsgLimit
04F0 750D5A         =1  2205             mov ?bcUpper,#upperMsgLimit
04F3 750EFD         =1  2206             mov ?bcErr,#0FDh             ;Primary msg OOB
04F6 3128           =1  2207             acall subBoundsCheck
04F8 24BF           =1  2208             add A,#-'A'
04FA 23             =1  2209             rl A
04FB 9004FF         =1  2210             mov DPTR,#_mpMainJumpTable
04FE 73             =1  2211             jmp @A+DPTR
04FF                =1  2212         _mpMainJumpTable:
04FF A133           =1  2213             ajmp setAckFlag              ;A
0501 A141           =1  2214             ajmp setErrorFlag            ;B
0503 A153           =1  2215             ajmp opxInitParser           ;C
0505 A184           =1  2216             ajmp opxEditParser           ;D
0507 E126           =1  2217             ajmp ledInitParser           ;E
0509 E145           =1  2218             ajmp ledEditParser           ;F
050B A151           =1  2219             ajmp reserved                ;G
050D A151           =1  2220             ajmp reserved                ;H
050F A151           =1  2221             ajmp reserved                ;I
0511 A151           =1  2222             ajmp reserved                ;J
0513 A1A0           =1  2223             ajmp kbInitParser            ;K
0515 A151           =1  2224             ajmp reserved                ;L
0517 C102           =1  2225             ajmp encoderInitParser       ;M
0519 C133           =1  2226             ajmp encoderRead             ;N
```

*B* - Page 26

```
051B C15B       =1 2227      ajmp readKbuffer         ;O
051D C18B       =1 2228      ajmp writePol            ;P
051F A151       =1 2229      ajmp reserved            ;Q
0521 A151       =1 2230      ajmp reserved            ;R
0523 C1E3       =1 2231      ajmp soundParser         ;S
0525 A151       =1 2232      ajmp reserved            ;T
0527 A151       =1 2233      ajmp reserved            ;U
0529 A151       =1 2234      ajmp reserved            ;V
052B C1B4       =1 2235      ajmp writePort           ;W
052D A151       =1 2236      ajmp reserved            ;X
052F A151       =1 2237      ajmp reserved            ;Y
0531 E112       =1 2238      ajmp softReset           ;Z
                =1 2239
                =1 2240   ;END msgParser
                =1 2241
                =1 2242   ;**********
0533            =1 2243   setAckFlag:
                =1 2244   ;**********
                =1 2245      ;The return to kernelStart misses out the return of an
acknowledge for
                =1 2246   ;this command itself.
0533 08         =1 2247       inc ?fifoRdPtr
0534 E6         =1 2248       mov A,@?fifoRdPtr
0535 24D0       =1 2249       add A,#-'0'
0537 6004       =1 2250       jz _safClear
0539 D247       =1 2251           setb ackEnableFlag
                =1 2252   ;ajmp _kernelStart
053B 0157       =1 2253   ajmp _parserReturn
053D            =1 2254       _safClear:
053D C247       =1 2255           clr ackEnableFlag
                =1 2256   ;ajmp _kernelStart
053F 0157       =1 2257   ajmp _parserReturn
                =1 2258
                =1 2259
                =1 2260   ;************
0541            =1 2261   setErrorFlag:
                =1 2262   ;************
                =1 2263   ;Routine to turn on/off the enable error reporting flag.
0541 08         =1 2264       inc ?fifoRdPtr
0542 E6         =1 2265       mov A,@?fifoRdPtr
0543 24D0       =1 2266       add A,#-'0'
0545 6006       =1 2267       jz _sefClear
0547 D232       =1 2268           setb errEnableFlag
0549 C201       =1 2269           clr errorFlag
                =1 2270   ;ajmp _kernelStart
054B 0157       =1 2271   ajmp _parserReturn
054D            =1 2272       _sefClear:
054D C232       =1 2273           clr errEnableFlag
                =1 2274   ;ajmp _kernelStart
054F 0157       =1 2275   ajmp _parserReturn
                =1 2276
                =1 2277
                =1 2278   ;********
0551            =1 2279   reserved:
                =1 2280   ;********
                =1 2281      ;errorNumber 0FCh ;removed Tue  04-11-95 to avoid
conflict with other
                =1 2282                        ;possible SIOPs.
0551 0159       =1 2283   ajmp _kernelStart
```

B - Page 27

```
              =1  2284
                                                                       =1      2285
;-----------------------------------------------------------------
              =1  2286    ;****************
0553          =1  2287    opxInitParser:
              =1  2288    ;****************
              =1  2289    ;Routine parses the sub-function and the display number. The display number
              =1  2290    ;is in turn passed to the opx function in R2.
              =1  2291
              =1  2292         ?oipSubFunc EQU R3
              =1  2293
0553 750C00   =1  2294         mov ?gnpLower,#0
0556 750D05   =1  2295         mov ?gnpUpper,#5
0559 750EEF   =1  2296         mov ?gnpErr,#0EFh
055C 3142     =1  2297         acall subGetNextParam    ;get the X parameter - the Optrex subFunction.
055E FB       =1  2298         mov ?oipSubFunc,A
              =1  2299
055F B40102   =1  2300             cjne A,#1,_oipLblB        ;Sub-functions 1 & 2 do not have a display
0562 A172     =1  2301             ajmp _oipLblC      ;parameter and thus we must jump.
0564          =1  2302    _oipLblB:
0564 B40202   =1  2303             cjne A,#2,_oipLblA
0567 A172     =1  2304             ajmp _oipLblC
              =1  2305
0569          =1  2306    _oipLblA:
0569 750D03   =1  2307         mov ?gnpUpper,#3
056C 750EED   =1  2308         mov ?gnpErr,#0EDh
056F 3142     =1  2309         acall subGetNextParam
0571 FA       =1  2310         mov R2,A
              =1  2311
0572          =1  2312    _oipLblC:
0572 EB       =1  2313         mov A,?oipSubFunc
0573 23       =1  2314         rl A                     ;spacing of two in the ajmp table.
0574 900578   =1  2315         mov DPTR,#_oipJumpTable
0577 73       =1  2316         jmp @A+DPTR
0578          =1  2317    _oipJumpTable:
0578 21C3     =1  2318         ajmp opxInit
057A A151     =1  2319         ajmp reserved
057C 417C     =1  2320         ajmp opxCursorType
057E A151     =1  2321         ajmp reserved
0580 41A5     =1  2322         ajmp opxDLInit
0582 41C8     =1  2323         ajmp opxMakeActive
              =1  2324
              =1  2325    ;END (opxDisplayParser)
              =1  2326
              =1  2327
              =1  2328    ;*************
0584          =1  2329    opxEditParser:
              =1  2330    ;*************
              =1  2331    ;Parse the various opx edit functions.
              =1  2332
0584 750C00   =1  2333         mov ?gnpLower,#0
0587 750D05   =1  2334         mov ?gnpUpper,#5
058A 750EE3   =1  2335         mov ?gnpErr,#0E3h
058D 3142     =1  2336         acall subGetNextParam    ;get the X parameter - the
```

β- Page 28

```
Optrex subFunction.
058F 23        =1 2337       rl A
0590 900594    =1 2338       mov  DPTR,#_oepJumpTable
0593 73        =1 2339       jmp  @A+DPTR
0594           =1 2340       _oepJumpTable:
0594 6154      =1 2341           ajmp opxClear
0596 616F      =1 2342           ajmp opxDirect
0598 619E      =1 2343           ajmp opxCursorOnOff
059A 61C8      =1 2344           ajmp opxMoveCursor
059C 61DD      =1 2345           ajmp opxWriteChar
059E 61E8      =1 2346           ajmp opxWriteEnable
               =1 2347
               =1 2348       ;END (opxEditParser)
               =1 2349
               =1 2350
               =1 2351       ;************
05A0           =1 2352       kbInitParser:
               =1 2353       ;************
               =1 2354       ;Jump table used incase we want to add more functions later.
05A0 750C00    =1 2355           mov  ?gnpLower,#0
05A3 750D02    =1 2356           mov  ?gnpUpper,#2
05A6 750EAF    =1 2357           mov  ?gnpErr,#0AFh
05A9 3142      =1 2358           acall subGetNextParam
05AB 23        =1 2359           rl A                    ;Mult A by 2 for jump table.
05AC 9005B0    =1 2360           mov  DPTR,#_kipJmpTable
05AF 73        =1 2361           jmp  @A+DPTR
05B0           =1 2362       _kipJmpTable:
05B0 A1B6      =1 2363           ajmp defKeyboardEnd
05B2 A1C5      =1 2364           ajmp defSwitchEnd
05B4 A1DD      =1 2365           ajmp autoRepeat
               =1 2366
               =1 2367       ;END kbInitParser
               =1 2368
               =1 2369       ;**************
05B6           =1 2370       defKeyboardEnd:
               =1 2371       ;**************
               =1 2372         ;Read 'X' parameter, check range and if valid write to keyboardEnd
05B6 750C03    =1 2373           mov  ?gnpLower,#3
05B9 750D0F    =1 2374           mov  ?gnpUpper,#0Fh
05BC 750EAD    =1 2375           mov  ?gnpErr,#0ADh
05BF 3142      =1 2376           acall subGetNextParam
05C1 F543      =1 2377           mov  keyboardEnd,A
05C3 0157      =1 2378         ajmp _parserReturn
               =1 2379       ;END(defKeyBoardEnd)
               =1 2380
               =1 2381       ;************
05C5           =1 2382       defSwitchEnd:
               =1 2383       ;************
               =1 2384           ;pre-fetch the comp data and zero the MSN locally
05C5 E564      =1 2385           mov  A,swAddrData
05C7 540F      =1 2386           anl  A,#0Fh
05C9 F5F0      =1 2387           mov  B,A
               =1 2388
               =1 2389           ;get the user data.
05CB 750C04    =1 2390           mov  ?gnpLower,#4
05CE 750D0F    =1 2391           mov  ?gnpUpper,#0Fh
05D1 750EAB    =1 2392           mov  ?gnpErr,#0ABh
```

ℓ - Page 29

```
05D4 3142       =1  2393           acall subGetNextParam
05D6 C4         =1  2394           swap A
05D7 45F0       =1  2395           orl A,B
05D9 F564       =1  2396           mov swAddrData,A
05DB 0157       =1  2397       ajmp _parserReturn
                =1  2398
                =1  2399       ;**********
05DD            =1  2400       autoRepeat:
                =1  2401       ;**********
                =1  2402               ?arDelayPeriod EQU R3
                =1  2403
05DD 750C00     =1  2404           mov ?gnpLower,#0
05E0 750D0F     =1  2405             mov ?gnpUpper,#0Fh
05E3 750EA9     =1  2406           mov ?gnpErr,#0A9h
05E6 3142       =1  2407           acall subGetNextParam   ;get the X parameter (delay)
05E8 23         =1  2408           rl A
05E9 23         =1  2409             rl A                              ;mult delay by 8 so now in intervals of 250ms.
05EA 23         =1  2410             rl A
05EB FB         =1  2411             mov ?arDelayPeriod,A
05EC 750EA8     =1  2412           mov ?gnpErr,#0A8h
05EF 3142       =1  2413             acall subGetNextParam   ;get the Y parameter (autoRep period)
05F1 600B       =1  2414           jz _arOff
05F3 F51C       =1  2415               mov autoRepPeriod,A    ;Now everything OK store new settings.
05F5 EB         =1  2416               mov A,?arDelayPeriod
05F6 6006       =1  2417               jz _arOff
05F8 F542       =1  2418           mov delayPeriod,A
05FA D21E       =1  2419               setb autoRepFlag
                =1  2420
05FC 0157       =1  2421           ajmp _parserReturn
                =1  2422
05FE            =1  2423           _arOff:
05FE C21E       =1  2424           clr autoRepFlag
                =1  2425
0600 0157       =1  2426       ajmp _parserReturn
                =1  2427
                =1  2428       ;*****************
0602            =1  2429       encoderInitParser:
                =1  2430       ;*****************
                =1  2431       ;This routine parses the {M.. commands and provides for the setting of:
                =1  2432       ;   1.  encodersEnd
                =1  2433       ;   2.  encoder saturation on/off.
                =1  2434
0602 750C00     =1  2435           mov ?gnpLower,#0
0605 750D01     =1  2436           mov ?gnpUpper,#1
0608 750E8A     =1  2437             mov ?gnpErr,#08Ah
060B 3142       =1  2438           acall subGetNextParam
060D 7015       =1  2439           jnz _eipSat
060F 750D03     =1  2440             mov ?gnpUpper,#3
0612 750E88     =1  2441                 mov ?gnpErr,#088h
0615 3142       =1  2442           acall subGetNextParam
0617 C4         =1  2443           swap A
0618 F5F0       =1  2444           mov B,A
061A E563       =1  2445               mov A,encAddrData         ;reminder of format [encEnd][encCol]
061C 540F       =1  2446                 anl A,#0Fh              ;
```

B - Page 30

```
MSN    LSN
061E  45F0       =1  2447          orl  A,B
0620  F563       =1  2448          mov  encAddrData,A
0622  0157       =1  2449      ajmp _parserReturn
                 =1  2450
0624             =1  2451          _eipSat:
0624  750E86     =1  2452              mov  ?gnpErr,#086h
0627  3142       =1  2453          acall subGetNextParam
0629  7004       =1  2454          jnz  _eipSetSat
062B  C23C       =1  2455              clr  encSatFlag
062D  0157       =1  2456      ajmp _parserReturn
                 =1  2457
062F             =1  2458          _eipSetSat:
062F  D23C       =1  2459              setb encSatFlag
0631  0157       =1  2460      ajmp _parserReturn
                 =1  2461
                 =1  2462      ;***********
0633             =1  2463      encoderRead:
                 =1  2464      ;***********
                 =1  2465          ?rePtr       EQU    R1
                 =1  2466          ?reResetFlag EQU    R2
                 =1  2467
0633  750C00     =1  2468          mov  ?gnpLower,#0
0636  750D01     =1  2469          mov  ?gnpUpper,#1
0639  750E84     =1  2470              mov  ?gnpErr,#084h
063C  3142       =1  2471          acall subGetNextParam
063E  FA         =1  2472          mov  ?reResetFlag,A
                 =1  2473
063F  750D07     =1  2474          mov  ?gnpUpper,#7
0642  750E82     =1  2475              mov  ?gnpErr,#082h
0645  3142       =1  2476          acall subGetNextParam
                 =1  2477
                 =1  2478          ;OK now read the encoder.
0647  2465       =1  2479          add  A,#counter0
0649  F9         =1  2480          mov  ?rePtr,A
064A  877C       =1  2481          mov  outputBuffer,@?rePtr
064C  756002     =1  2482          mov  txMsgLen,#2              ;msg length + 1 req
by routine.
064F  747C       =1  2483          mov  A,#outputBuffer
0651  120F55     =1  2484          lcall subTxData
                 =1  2485
                 =1  2486          ;Finally check to see if we reset
0654  EA         =1  2487          mov  A,?reResetFlag
0655  6002       =1  2488          jz   _reExit
0657  E4         =1  2489              clr  A
0658  F7            =1  2490              mov  @?rePtr,A          ;reset the encoder's
counter.
0659             =1  2491          _reExit:
0659  0157       =1  2492      ajmp _parserReturn
                 =1  2493      ;END(readNoResetEncoder)
                 =1  2494
                                                                  =1      2495
;--------------------------------------------------------------------
                 =1  2496      ;***********
065B             =1  2497      readKbuffer:
                 =1  2498      ;***********
                 =1  2499      ;Fri 11-11-1994
                    =1  2500      ;Routine revamped so that it is double buffered. The
previous 8 bytes
```

β - Page 31

```
                 =1  2501    ;now divided into two 4 byte buffers. On receipt of the (E) command the
                 =1  2502    ;routine copies the internal data to the external data and then transmits
                 =1  2503    ;from this external buffer.
                 =1  2504        ?rkbFmPtr     EQU     R0
                 =1  2505        ?rkbToPtr     EQU     R1
                 =1  2506        ?rkbLoop      EQU     R2
                 =1  2507        ?rkbNumBytes  EQU R3
                 =1  2508
065B D2B3        =1  2509        setb statusPin    ;Wed  06-07-95 invert sense.
065D E540        =1  2510        mov A,sBufPtr
065F 2488        =1  2511        add A,#-sBuffer
0661 601A        =1  2512        jz _rkbNoData
                 =1  2513            ;OK data present copy to the output buffer
0663 FB          =1  2514            mov ?rkbNumBytes,A  ;save the number of bytes info
0664 FA          =1  2515            mov ?rkbLoop,A
0665 7878        =1  2516            mov ?rkbFmPtr,#sBuffer
0667 797C        =1  2517            mov ?rkbToPtr,#sBuffer+4
0669             =1  2518        _rkbLoop:
0669 E6          =1  2519            mov A,@?rkbFmPtr
066A F7          =1  2520            mov @?rkbToPtr,A
066B 08          =1  2521            inc ?rkbFmPtr
066C 09          =1  2522            inc ?rkbToPtr
066D DAFA        =1  2523            djnz ?rkbLoop,_rkbLoop
                 =1  2524
066F EB          =1  2525            mov A,?rkbNumBytes
0670 04          =1  2526            inc A                  ;need message length + 1
0671 F560        =1  2527            mov txMsgLen,A
0673 747C        =1  2528            mov A,#sBuffer+4
0675 120F55      =1  2529            lcall subTxData
0678 754078      =1  2530            mov sBufPtr,#sBuffer    ;reset the internal buffer ptr.
067B 0157        =1  2531    ajmp _parserReturn
                 =1  2532
067D             =1  2533        _rkbNoData:
                 =1  2534            ;Send an empty message ie "[]"
067D 7401        =1  2535            mov A,#1             ;need msg length (0) + 1
067F F560        =1  2536            mov txMsgLen,A
0681 757C00      =1  2537            mov (sBuffer+4),#0
0684 747C        =1  2538            mov A,#sBuffer+4
0686 120F55      =1  2539            lcall subTxData
0689 0157        =1  2540    ajmp _parserReturn
                 =1  2541
                 =1  2542    ;********
068B             =1  2543    writePol:
                 =1  2544    ;********
                 =1  2545        ?wplWrtLine EQU R3
                 =1  2546
068B 750C00      =1  2547        mov ?gnpLower,#0
068E 750D01      =1  2548        mov ?gnpUpper,#01h
0691 750E99      =1  2549        mov ?gnpErr,#099h
                 =1  2550
0694 3142        =1  2551        acall subGetNextParam   ;0=display write, 1=peri write
0696 FB          =1  2552        mov ?wplWrtLine,A
                 =1  2553
0697 750E97      =1  2554        mov ?gnpErr,#097h
```

B - Page 32

```
069A 3142      =1  2555         acall subGetNextParam      ;0=active low , 1=active high
069C 600B      =1  2556         jz _wplActiveLow
               =1  2557
               =1  2558         ;Active high defn
069E BB0004    =1  2559         cjne ?wplWrtLine,#0,_wplPeriWrt
               =1  2560                 ;Define display write to be active high
06A1 D219      =1  2561              setb posClkFlag
06A3 0157      =1  2562              ajmp _parserReturn
06A5           =1  2563         _wplPeriwrt:
06A5 D223      =1  2564              setb periClkFlag
06A7 0157      =1  2565              ajmp _parserReturn
               =1  2566
               =1  2567         ;Active low definition
06A9           =1  2568         _wplActiveLow:
06A9 BB0004    =1  2569         cjne ?wplWrtLine,#0,_wplPeriLowWrt
               =1  2570                 ;Define display write to be active high
06AC C219      =1  2571              clr posClkFlag
06AE 0157      =1  2572              ajmp _parserReturn
06B0           =1  2573         _wplPeriLowWrt:
06B0 C223      =1  2574              clr periClkFlag
06B2 0157      =1  2575              ajmp _parserReturn
               =1  2576         ;(END writePol)
               =1  2577
               =1  2578         ;**********
06B4           =1  2579         writePort:
               =1  2580         ;**********
               =1  2581         ;    Thu  04-13-95 Modified to output a write pulse on write to data port.
               =1  2582         ;    Syntax: {Wxpq}
               =1  2583         ;        x = 0,1 or 'P'
               =1  2584         ;        if(x==0)||(x==1) then pq=byte
               =1  2585         ;        else if x='P'
               =1  2586         ;           p=display polarity write signal
               =1  2587         ;           q=peri polarity write signal.
               =1  2588
               =1  2589         ?wpPort EQU R2
               =1  2590
06B4 750C00    =1  2591         mov ?gnpLower,#0
06B7 750D01    =1  2592         mov ?gnpUpper,#1
06BA 750E9D    =1  2593         mov ?gnpErr,#9Dh
06BD 3142      =1  2594         acall subGetNextParam
06BF FA        =1  2595         mov ?wpPort,A
               =1  2596
               =1  2597         ;Now get the byte
06C0 750C00    =1  2598         mov ?gbLower,#0
06C3 750DFF    =1  2599         mov ?gbUpper,#0FFh
06C6 750E9B    =1  2600         mov ?gbErr,#09Bh
06C9 F114      =1  2601         acall subGetByte
               =1  2602
06CB BA0011    =1  2603         cjne ?wpPort,#0,_wpAuxPort
06CE F580      =1  2604              mov P0,A
06D0 202306    =1  2605              jb periClkFlag,_wpPosClk
06D3 C2B7      =1  2606                   clr P3.7
06D5 D2B7      =1  2607                   setb P3.7
06D7 0157      =1  2608         ajmp _parserReturn
06D9           =1  2609              _wpPosClk:
06D9 D2B7      =1  2610                   setb P3.7
06DB C2B7      =1  2611                   clr P3.7
```

β— Page 33

```
06DD 0157       =1 2612     ajmp _parserReturn
                =1 2613
06DF            =1 2614         _wpAuxPort:
06DF F5A0       =1 2615             mov P2,A
06E1 0157       =1 2616     ajmp _parserReturn
                =1 2617
                =1 2618     ;***********
06E3            =1 2619     soundParser:
                =1 2620     ;***********
                =1 2621     ;Syntax HPD
                =1 2622     ;    where P - pitch period in tenths of millisecs
(1->F)
                =1 2623     ;          D - duration 1->F in quarter secs.
06E3 750C01     =1 2624         mov ?gnpLower,#1
06E6 750D0F     =1 2625         mov ?gnpUpper,#0Fh
06E9 750E9F     =1 2626         mov ?gnpErr,#09Fh
06EC 3142       =1 2627         acall subGetNextParam
06EE F52C       =1 2628         mov soundPitch,A
06F0 750E9E     =1 2629         mov ?gnpErr,#09Eh
06F3 3142       =1 2630         acall subGetNextParam    ;limits already set up
06F5 F52E       =1 2631         mov soundDurationCounter,A
06F7 D20B       =1 2632         setb soundEnableFlag
06F9 752FFF     =1 2633             mov fourHzOsc,#0FFh    ;used to determine
duration
06FC C20C       =1 2634             clr 1fClkFlag
06FE C20D       =1 2635             clr oldClkFlag
0700 0157       =1 2636     ajmp _parserReturn
                =1 2637
                =1 2638     ;********
0702            =1 2639     revLevel:
                =1 2640     ;********
                =1 2641     ;Because the serial Tx is only able to send messages
                =1 2642     ;of a max of 15 chars (msgLength is only 4 bits) the
                =1 2643     ;msg must be divided into two messages.
0702 D239       =1 2644         setb txTextFlag
0704 756010     =1 2645         mov txMsgLen,#revMsg1Len
0707 755F02     =1 2646         mov txBufPtr,#revMsg1
070A D204       =1 2647         setb serOutActiveFlag
070C D205       =1 2648         setb txFlag
070E D236       =1 2649         setb txStartMsgFlag
0710 0157       =1 2650     ajmp _parserReturn
                =1 2651
                =1 2652     ;*********
0712            =1 2653     softReset:
                =1 2654     ;*********
                =1 2655     ;This routine jumps back to MAIN and soft restarts the
                =1 2656     ;whole system.
0712 014C       =1 2657         ajmp main
                =1 2658
                =1 2659     ;**********
0714            =1 2660     subGetByte:
                =1 2661     ;**********
                =1 2662     ;Routine reads an ASCII coded byte from the rxBuffer
                =1 2663     ;result returned in ACC. Example '7B' in buffer is
                =1 2664     ;decoded to put 07Bh in ACC.
                =1 2665
000C            =1 2666         ?gbLower EQU UR4
000D            =1 2667         ?gbUpper EQU UR5
000E            =1 2668         ?gbErr   EQU UR6
```

ℬ − Page 34

```
                  =1    2669
0714 08           =1    2670        inc R0
0715 E6           =1    2671        mov A,@R0              ;get the first of the hex digits
0716 11FE         =1    2672        acall subAsciiToHex    ;from the rx buffer and convert to
0718 C4           =1    2673        swap A                 ;a number.
0719 F5F0         =1    2674        mov B,A
                  =1    2675        ;Next hex digit.
071B 08           =1    2676        inc R0
071C E6           =1    2677        mov A,@R0
071D 11FE         =1    2678        acall subAsciiToHex
071F 45F0         =1    2679        orl A,B
                  =1    2680
                  =1    2681        ;Compare against limits.
0721 150E         =1    2682        dec ?gbErr
0723 3128         =1    2683        acall subBoundsCheck
                  =1    2684
0725 22           =1    2685  ret
                  =1    2686
                                                                              =1        2687
;-----------------------------------------------------------------------------
                  =1    2688        ;Thu  04-13-95 Both led sub-parsers moved so that ajmp can be used.
                  =1    2689        ;****************
0726              =1    2690        ledInitParser:
                  =1    2691        ;****************
                  =1    2692        ;Routine parses the sub-function.
                  =1    2693
0726 750C00       =1    2694            mov ?gnpLower,#0
0729 750D05       =1    2695            mov ?gnpUpper,#5
072C 750ECF       =1    2696            mov ?gnpErr,#0CFh
072F 3142         =1    2697            acall subGetNextParam  ;get the X parameter - the Optrex subFunction.
0731 23           =1    2698            rl A                   ;spacing of four in the ajmp table.
                  =1    2699            ;rl A
0732 900736       =1    2700            mov DPTR,#_lipJumpTable
0735 73           =1    2701            jmp @A+DPTR
0736              =1    2702        _lipJumpTable:
0736 E16F         =1    2703            ajmp ledDefMode
                  =1    2704            ;nop
0738 E1A6         =1    2705            ajmp ledSetFlash
                  =1    2706            ;nop
073A E1BB         =1    2707            ajmp ledCursorType
                  =1    2708            ;nop
073C E1CD         =1    2709            ajmp ledFormat
                  =1    2710            ;nop
073E A151         =1    2711            ajmp reserved
                  =1    2712            ;nop
0740 02081E       =1    2713            ljmp ledMakeActive
0743 0157         =1    2714        ajmp _parserReturn
                  =1    2715
                  =1    2716        ;END (ledInitParser)
                  =1    2717
                                                                              =1        2718
;-----------------------------------------------------------------------------
                  =1    2719
                  =1    2720        ;****************
```

B - Page 35

```
0745                =1  2721    ledEditParser:
                    =1  2722    ;***************
                    =1  2723        ?lepSubFunc EQU R2
                    =1  2724        ?lepParam   EQU R3
                    =1  2725
0745 750C00         =1  2726        mov ?gnpLower,#0
0748 750D05         =1  2727        mov ?gnpUpper,#5
074B 750EBD         =1  2728        mov ?gnpErr,#0BDh
074E 3142           =1  2729        acall subGetNextParam    ;get the subFunction.
0750 23             =1  2730        rl A
0751 23             =1  2731        rl A
0752 900756         =1  2732        mov DPTR,#_lepJumpTable
0755 73             =1  2733        jmp @A+DPTR
0756                =1  2734    _lepJumpTable:
0756 020871         =1  2735        ljmp ledClear
0759 00             =1  2736        nop
075A 0208C8         =1  2737        ljmp ledAutoInc
075D 00             =1  2738        nop
075E 0208E0         =1  2739        ljmp ledCursorOnOff
0761 00             =1  2740        nop
0762 0208F8         =1  2741        ljmp ledMoveCursor
0765 00             =1  2742        nop
0766 02090B         =1  2743        ljmp ledWriteChar
0769 00             =1  2744        nop
076A 0209DC         =1  2745        ljmp ledWriteEnable
076D 0157           =1  2746    ajmp _parserReturn
                    =1  2747
                    =1  2748    ;END (ledDisplayParser)
                    =1  2749
                    =1  2750    $include(led2init.asm)
                    =1  2751    ;(10U&k2S(s#8&18D
                    =1  2752
                    =1  2753    ;*******
076F                =1  2754    ledDefMode:
                    =1  2755    ;*******
                    =1  2756    ;Syntax:    {E0xp}
                    =1  2757    ;   where   x : 0=common anode , 1=common cathode.//Modes 2&3 added 04-11-95
                    =1  2758    ;                p : width
                    =1  2759        ?ldmWidth    EQU R2
                    =1  2760        ?ldmData     EQU R3
                    =1  2761
076F 750ECD         =1  2762        mov ?gnpErr,#0CDh
0772 750C00         =1  2763        mov ?gnpLower,#0
0775 750D03         =1  2764        mov ?gnpUpper,#3
0778 3142           =1  2765        acall subGetNextParam    ;get the anode/cathode data.
077A FB             =1  2766        mov ?ldmData,A
                    =1  2767
077B 750ECB         =1  2768        mov ?gnpErr,#0CBh
077E 750C01         =1  2769        mov ?gnpLower,#1
0781 750D08         =1  2770        mov ?gnpUpper,#8
0784 3142           =1  2771        acall subGetNextParam    ;get the width 1->8.
0786 F559           =1  2772        mov ledWidth,A           ;update the display width.
                    =1  2773
                    =1  2774        ;Now set the LED mode via the row/col flags
0788 EB             =1  2775        mov A,?ldmData
0789 C22F           =1  2776        clr invertColFlag
078B C22E           =1  2777        clr invertRowFlag
```

*B* - Page 36

```
                       =1  2778
078D B40002            =1  2779          cjne A,#0,_ldmMode1
0790 0157              =1  2780      jmp _ledInitReturn
                       =1  2781
0792                   =1  2782      _ldmMode1:
0792 B40106            =1  2783          cjne A,#1,_ldmMode2
0795 D22F              =1  2784              setb invertColFlag
0797 D22E              =1  2785              setb invertRowFlag
0799 0157              =1  2786      jmp _ledInitReturn
                       =1  2787
079B                   =1  2788      _ldmMode2:
079B B40204            =1  2789          cjne A,#2,_ldmMode3
079E D22F              =1  2790              setb invertColFlag
07A0 0157              =1  2791      jmp _ledInitReturn
                       =1  2792
07A2                   =1  2793      _ldmMode3:
07A2 D22E              =1  2794              setb invertRowFlag
07A4 0157              =1  2795      jmp _ledInitReturn
                       =1  2796
                       =1  2797
                       =1  2798      ;***********
07A6                   =1  2799      ledSetFlash:
                       =1  2800      ;***********
07A6 750EC9            =1  2801          mov ?gnpErr,#0C9h
07A9 750C00            =1  2802            mov ?gnpLower,#0
07AC 750D01            =1  2803            mov ?gnpUpper,#1
07AF 3142              =1  2804            acall subGetNextParam      ;get the anode/cathode data.
                       =1  2805
07B1 6004              =1  2806          jz _lsfOff
07B3 D233              =1  2807              setb flashFlag
07B5 0157              =1  2808      jmp _ledInitReturn
07B7                   =1  2809      _lsfOff:
07B7 C233              =1  2810              clr flashFlag
07B9 0157              =1  2811      jmp _ledInitReturn
                       =1  2812
                       =1  2813
                       =1  2814      ;*************
07BB                   =1  2815      ledCursorType:
                       =1  2816      ;*************
07BB 750EC7            =1  2817          mov ?gnpErr,#0C7h
07BE 750D01            =1  2818            mov ?gnpUpper,#1          ;Get the X parameter (0 = blink)
07C1 3142              =1  2819            acall subGetNextParam     ;                    (1 = flash)
                       =1  2820
07C3 6004              =1  2821          jz _lbfFlash
07C5 D225              =1  2822              setb cursorTypeFlag
07C7 0157              =1  2823      jmp _ledInitReturn
07C9                   =1  2824      _lbfFlash:
07C9 C225              =1  2825              clr cursorTypeFlag
07CB 0157              =1  2826      jmp _ledInitReturn
                       =1  2827
                       =1  2828      ;*********
07CD                   =1  2829      ledFormat:
                       =1  2830      ;*********
                       =1  2831      ;Syntax: (E3nxp)
                       =1  2832      ;    n : display
                       =1  2833      ;    x : x=0 left format , x=1 right format
```

B- Page 37

```
                    =1   2834      ;         p : 0=scan disabled, 1=undecoded , 2=numeric ,
3=alpha
                    =1   2835
                    =1   2836             ?lfDisplayNum    EQU         R2
                    =1   2837                 ?lfLeftRight    EQU     R3
                    =1   2838                 ?lfMode                  EQU      R4
                    =1   2839
07CD 750EC5         =1   2840             mov ?gnpErr,#0C5h
07D0 750C00         =1   2841             mov ?gnpLower,#0
07D3 750D03         =1   2842             mov ?gnpUpper,#3
07D6 3142           =1   2843             acall subGetNextParam          ;Get the display 'n'
07D8 FA             =1   2844             mov ?lfDisplayNum,A
                    =1   2845
07D9 750EC3         =1   2846             mov ?gnpErr,#0C3h
07DC 750D01         =1   2847         mov ?gnpUpper,#1               ;Get the X parameter (0
= left format)
07DF 3142           =1   2848          acall subGetNextParam          ;                    (1
= right format)
07E1 FB             =1   2849                mov ?lfLeftRight,A                            ;
disp
                                                                                       lay 0
or 1.
                    =1   2850
07E2 750D03         =1   2851             mov ?gnpUpper,#3
07E5 750EC1         =1   2852             mov ?gnpErr,#0C1h
07E8 3142           =1   2853          acall subGetNextParam           ;Get the mode 'p'
07EA FC             =1   2854                mov ?lfMode,A
                    =1   2855
                    =1   2856          ;Left Format
                    =1   2857          ;-----------
                    =1   2858          ;Decode the display number.
07EB EA             =1   2859          mov A,?lfDisplayNum
07EC 11F9           =1   2860          acall subOctalToBitPos
07EE F4             =1   2861          cpl A
                    =1   2862          ;Write a zero to the addressed flag
07EF 5225           =1   2863          anl LEDFORMATFLAGSBYTEADDR,A      ;Flags arranged on a
zero boundry.
                                                                           =1       2864
;ie rFormat0Flag is
                                                                                    bit0,
...
                    =1   2865
07F1 BB0105         =1   2866             cjne ?lfLeftRight,#1,_lfSetMode ;Set format flag
to one if right format
                    =1   2867
07F4                =1   2868          _lfRightFormat:
           .        =1   2869          ;---------------
                    =1   2870          ;Decode the display number.
07F4 EA             =1   2871          mov A,?lfDisplayNum
07F5 11F9           =1   2872          acall subOctalToBitPos
07F7 4225           =1   2873          orl LEDFORMATFLAGSBYTEADDR,A    ;see above notes on
flags addrs.
                    =1   2874
                    =1   2875             ;Set Mode (Numeric, Alpha etc..)
                    =1   2876             ;--------------------------------
07F9                =1   2877           _lfSetMode:
07F9 EC             =1   2878             mov A,?lfMode                 ;get the mode data
07FA 7005           =1   2879             jnz _lfLb1A
07FC D20A           =1   2880          setb disableLEDFlag ;disable the LED scan
```

B — Page 38

```
07FE 020057    =1  2881       jmp _ledInitReturn
               =1  2882
0801           =1  2883          _lfLb1A:
0801 C20A      =1  2884          clr disableLEDFlag       ;ensure scan active.
0803 EA        =1  2885          mov A,?lfDisplayNum
0804 24FE      =1  2886          add A,#-2
0806 20E70B    =1  2887          jb ACC.7,_lfLowerDisplay
               =1  2888
0809           =1  2889          _lfUpperDisplay:                      ;remember that ledMode is formatted so,
0809 EC        =1  2890          mov A,?lfMode           ;          [upper mode][lower mode]
               =1  2891          ;clr C                  ;          2 bits      2 bits
080A 23        =1  2892          rl A                    ;thus here we are ensuring that the mode
080B 23        =1  2893          rl A                    ;gets stored in the upper 2 bits of the
080C FC        =1  2894          mov ?lfMode ,A          ;lower nibble.
080D E558      =1  2895          mov A,ledMode
080F 54F3      =1  2896          anl A,#0F3h
0811 020818    =1  2897          ljmp _lf1
               =1  2898
0814           =1  2899          _lfLowerDisplay:
0814 E558      =1  2900          mov A,ledMode
0816 54FC      =1  2901          anl A,#0FCh             ;zero the 2 lsb.
               =1  2902
0818           =1  2903          _lf1:
0818 4C        =1  2904          orl A,?lfMode
0819 F558      =1  2905          mov ledMode,A
               =1  2906
081B 020057    =1  2907       jmp _ledInitReturn
               =1  2908
               =1  2909       ;***********
081E           =1  2910       ledMakeActive:
               =1  2911       ;***********
               =1  2912       ;In this routine the current value of ledActiveCursor is copied
               =1  2913       ;to ledActiveDisplay - then
               =1  2914       ;   - copy the new dsiplays format flag to rFormatFlag
               =1  2915       ;   - move the new display to the active display
               =1  2916       ;   - set/reset the upper and odd flags
               =1  2917       ;   - mov in the new mode info
               =1  2918
               =1  2919          ?lmaPtr       EQU    R0
               =1  2920          ?lmaDisplay   EQU    R2
               =1  2921
081E 750EBF    =1  2922          mov ?gnpErr,#0BFh
0821 750C00    =1  2923          mov ?gnpLower,#0
0824 750D03    =1  2924          mov ?gnpUpper,#3
0827 120142    =1  2925          lcall subGetNextParam   ;Get the display 'n'
082A FA        =1  2926          mov ?lmaDisplay,A
               =1  2927
082B E55C      =1  2928          mov A,ledActiveDisplay
082D B40402    =1  2929          cjne A,#4,_lmaStdUpdate
0830 0138      =1  2930             ajmp _lmaLb1B        ;skip the update exisiting display data.
               =1  2931
0832           =1  2932          _lmaStdUpdate:
```

G - Page 39

```
0832 B50203    =1 2933         cjne A,AR2,_lmaLb1B
0835 020057    =1 2934              jmp _ledInitReturn       ;Nothing to do - no
change in display
               =1 2935
0838           =1 2936         _lmaLb1B:
               =1 2937         ;Set the ledActiveDisplay, oddFlag and upperFlag
               =1 2938         ;------------------------------------------------
0838 E525      =1 2939              mov A,LEDFORMATFLAGSBYTEADDR  ;Get the current
flags and zero
083A 540F      =1 2940              anl A,#0Fh               ;the top nibble -
irrelevent data.
083C F5F0      =1 2941              mov B,A                  ;Need this value in
set active format flag
               =1 2942
083E EA        =1 2943              mov A,?lmaDisplay        ;Get the users new active
display
083F F55C      =1 2944              mov ledActiveDisplay,A   ;Write the new Active
display info
0841 A2E0      =1 2945              mov C,ACC.0              ;The Active display is ALSO
stored
0843 922D      =1 2946              mov oddFlag,C            ;in these flags. This double
storage
0845 A2E1      =1 2947              mov C,ACC.1              ;of the data is justified by
speeding
0847 9227      =1 2948              mov upperFlag,C          ;up program execution.
               =1 2949
               =1 2950         ;Now set the active format flag (rFormatlag)
               =1 2951         ;------------------------------------------------
0849 1200F9    =1 2952              lcall subOctalToBitPos   ;This test relies on the
fact that
               =1 2953                                       ;rFormat0Flag is at byte.0
etc
084C 55F0      =1 2954              anl A,B                  ;This test to see if
relevent rFormatFlag
084E 7004      =1 2955              jnz _lmaSetRformatFlag   ;is set.
0850 C22C      =1 2956              clr rFormatFlag
0852 0156      =1 2957              ajmp _lmaLb1G
0854           =1 2958         _lmaSetRformatFlag:
0854 D22C      =1 2959              setb rFormatFlag
               =1 2960
0856           =1 2961         _lmaLb1G:
               =1 2962         ;Now set the active mode
               =1 2963         ;------------------------
0856 202706    =1 2964              jb upperFlag,_lmsLb1C
               =1 2965 +1           macGetLowerMode
               =1 2966 +1
0859 E558      =1 2967 +1      mov A,ledMode
085B 5403      =1 2968 +1      anl A,#03h
085D 0165      =1 2970              ajmp _lmsLb1D
               =1 2971
085F           =1 2972         _lmsLb1C:
               =1 2973 +1           macGetUpperMode
               =1 2974 +1
085F E558      =1 2975 +1      mov A,ledMode
0861 540C      =1 2976 +1      anl A,#0Ch
0863 03        =1 2977 +1      rr A
0864 03        =1 2978 +1      rr A
               =1 2980
0865           =1 2981         _lmsLb1D:                     ;B contains the new mode
```

```
info.
0865 C4         =1  2982        swap A
0866 F5F0       =1  2983        mov B,A
0868 E55C       =1  2984        mov A,ledActiveDisplay
086A 45F0       =1  2985        orl A,B
086C F55C       =1  2986        mov ledActiveDisplay,A
                =1  2987
086E 020057     =1  2988        jmp _ledInitReturn
                =1  2989        $include(led2edit.asm)
                =1  2990        ;(10U&k2S(s#8&18D
                =1  2991
                =1  2992        ;*******
0871            =1  2993        ledClear:
                =1  2994        ;*******
                =1  2995        ;Syntax: {F0}
                =1  2996        ;Clear the sctive display.
                =1  2997        ;Remember that left formatted displays need the cursor returning to the
                =1  2998        ;LHS and right formated displays need returning to the RHS - this will be
                =1  2999        ;represented by the value of displayEnd.
                =1  3000
0871 202C05     =1  3001            jb rFormatFlag, _lhRight
                =1  3002        ;Must be left format
0874 755D00     =1  3003            mov ledActiveCursor,#0
0877 017E       =1  3004            ajmp _lhClear
                =1  3005
                =1  3006        ;right format
0879            =1  3007        _lhRight:
                =1  3008 +1         macGetEndOfDisplay
                =1  3009 +1
0879 E559       =1  3010 +1     mov A,ledWidth
087B 14         =1  3012            dec A              ;remember EOD is +1 on col address.
087C F55D       =1  3013            mov ledActiveCursor,A   ;see notes in led.asm.
                =1  3014
087E            =1  3015        _lhClear:
                =1  3016 +1         macClearActiveDisplay
                =1  3017 +1
                =1  3018 +1 ;Remember that a CLEAR buffer is all 1s.
                =1  3019 +1
                =1  3020 +1         ?cadDigitPtr      EQU R0
                =1  3021 +1         ?cadDpPtr         EQU R1
                =1  3022 +1         ?cadRst           EQU R3
                =1  3023 +1         ?cadLoop          EQU R4
                =1  3024 +1         ?cadMode                    EQU R5
    0005    .   =1  3025 +1         ?AcadMode                   EQU AR5
                =1  3026 +1
087E 20270D     =1  3027 +1     jb upperFlag,_cadUpper
0881 202D05     =1  3028 +1     jb oddFlag,_cad1
0884 7554FF     =1  3029 +1     mov ledDpReg0,#0FFh
0887 0199       =1  3030 +1     ajmp _cadClearDigits
                =1  3031 +1
0889            =1  3032 +1     _cad1:
0889 7555FF     =1  3033 +1     mov ledDpReg1,#0FFh
088C 0199       =1  3034 +1     ajmp _cadClearDigits
                =1  3035 +1
088E            =1  3036 +1     _cadUpper:
088E 202D05     =1  3037 +1     jb oddFlag,_cad3
```

B — Page 41

```
0891 7556FF    =1  3038 +1      mov  ledDpReg2,#0FFh
0894 0199      =1  3039 +1      ajmp _cadClearDigits
               =1  3040 +1
0896           =1  3041 +1   _cad3:
0896 7557FF    =1  3042 +1      mov  ledDpReg3,#0FFh
               =1  3043 +1
0899           =1  3044 +1   _cadClearDigits:
0899 AD58      =1  3045 +1      mov  ?cadMode,ledMode
               =1  3046 +1   ;anl ?AcadMode,#0Fh ;;!!!!!
089B 20270C    =1  3047 +1      jb   upperFlag,_cadUpper2
               =1  3048 +1   ;lower display need mode to know what to clear.
089E 7844      =1  3049 +1           mov  ?cadDigitPtr,#ledBuffer
08A0 530503    =1  3050 +1           anl  ?AcadMode,#3
08A3 BD0110    =1  3051 +1           cjne ?cadMode,#1,_cadDecoded
               =1  3052 +1                      ;Undecoded lower display.
08A6 7BFF      =1  3053 +1                mov  ?cadRst,#0FFh
08A8 01BD      =1  3054 +1           ajmp _cadLblB
               =1  3055 +1
08AA           =1  3056 +1   _cadUpper2:
08AA 784C      =1  3057 +1           mov  ?cadDigitPtr,#(ledBuffer+8)
08AC 53050C    =1  3058 +1           anl  ?AcadMode,#0Ch
08AF BD0404    =1  3059 +1           cjne ?cadMode,#4,_cadDecoded
               =1  3060 +1                      ;Undecoded Upper display
08B2 7BFF      =1  3061 +1                mov  ?cadRst,#0FFh
08B4 01BD      =1  3062 +1           ajmp _cadLblB
08B6           =1  3063 +1   _cadDecoded:
08B6 7B0F      =1  3064 +1                mov  ?cadRst,#0Fh
08B8 302D02    =1  3065 +1                jnb  oddFlag,_cadLblB
08BB 7BF0      =1  3066 +1                     mov  ?cadRst,#0F0h
               =1  3067 +1
08BD           =1  3068 +1   _cadLblB:
08BD 7C08      =1  3069 +1      mov  ?cadLoop,#8
               =1  3070 +1
08BF           =1  3071 +1   _cadLoop:              ;if here operate on either 0 or 2.
08BF E6        =1  3072 +1      mov  A,@?cadDigitPtr
08C0 4B        =1  3073 +1      orl  A,?cadRst     ;Set to ones the approp nibble.
08C1 F6        =1  3074 +1      mov  @?cadDigitPtr,A
08C2 08        =1  3075 +1      inc  ?cadDigitPtr
08C3 DCFA      =1  3076 +1      djnz ?cadLoop,_cadLoop
08C5 020057    =1  3078         jmp  _ledEditReturn
               =1  3079
               =1  3080        ;**********
08C8           =1  3081        ledAutoInc:
               =1  3082        ;**********
               =1  3083        ;Syntax: {Flx}
               =1  3084        ;       x: 0=Off , 1=On
               =1  3085
08C8 750EB7    =1  3086            mov  ?gnpErr,#0B7h
08CB 750C00    =1  3087            mov  ?gnpLower,#0
08CE 750D01    =1  3088            mov  ?gnpUpper,#1
08D1 120142    =1  3089            lcall subGetNextParam   ;get the X param
08D4 6005      =1  3090            jz   _laiClear
08D6 D231      =1  3091                 setb ledAutoIncFlag
08D8 020057    =1  3092        jmp  _ledEditReturn
               =1  3093
08DB           =1  3094            _laiClear:
08DB C231      =1  3095                 clr  ledAutoIncFlag
```

β- Page 42

```
08DD 020057      =1  3096      jmp _ledEditReturn
                 =1  3097
                 =1  3098
                 =1  3099      ;**************
08E0             =1  3100      ledCursorOnOff:
                 =1  3101      ;**************
                 =1  3102      ;Syntax:         {F2X}
                 =1  3103      ;           X=mode (0=off, 1=on)
                 =1  3104
08E0 750EBB      =1  3105           mov ?gnpErr,#0BBh
08E3 750C00      =1  3106           mov ?gnpLower,#0
08E6 750D01      =1  3107           mov ?gnpUpper,#1
08E9 120142      =1  3108           lcall subGetNextParam    ;get X param.
08EC 6005        =1  3109           jz _lcoClear
                 =1  3110
                 =1  3111      ;set Bright Up on
                 =1  3112      ;----------------
08EE D226        =1  3113           setb ledCursorEnableFlag
08F0 020057      =1  3114      jmp _ledEditReturn
                 =1  3115
                 =1  3116      ;Clear Bight Up
                 =1  3117      ;--------------
08F3             =1  3118      _lcoClear:
08F3 C226        =1  3119           clr ledCursorEnableFlag
08F5 020057      =1  3120      jmp _ledEditReturn
                 =1  3121      ;END (ledCursorOnOff)
                 =1  3122
                 =1  3123      ;*************
08F8             =1  3124      ledMoveCursor:
                 =1  3125      ;*************
                 =1  3126      ;Syntax F3p - where p represents the cursor position.
                 =1  3127
                 =1  3128           ?lmcDisplayEnd   EQU     R3
                 =1  3129
08F8 750EB9      =1  3130           mov ?gnpErr,#0B9h
08FB 750C00      =1  3131           mov ?gnpLower,#0
08FE E559        =1  3132           mov A,ledWidth    ;Get the LED display width
0900 14          =1  3133             dec A                      ;sub 1 as display starts from zero.
0901 F50D        =1  3134           mov ?gnpUpper,A   ;Max display width
0903 120142      =1  3135           lcall subGetNextParam
                 =1  3136
0906 F55D        =1  3137           mov ledActiveCursor,A
0908 020057      =1  3138      jmp _ledEditReturn
                 =1  3139      ;END (ledMoveCursor)
                 =1  3140
                 =1  3141      ;************
090B             =1  3142      ledWriteChar:
                 =1  3143      ;************
                 =1  3144      ;Syntax: {F4c}
                 =1  3145      ;     where 'c' is the char to be written.
                 =1  3146
                 =1  3147      ;NOTE:
                 =1  3148        ;When writing to a left formated display the cursor increments, moving
                 =1  3149      ;from left to right.
                 =1  3150      ;When writing to a right formated display the cursor is stationary at
                 =1  3151      ;the current cursor position (usually the RHS extreme of
```

APPENDIX C

COMM51C     C - PAGE 1

```c
#include "\iq51\comm51.h"

/*********************/
/*ROM based messages */
/*********************/
code char getOutBuffStr[]="{O}";
code char hello816Str[]="\n}";

/***************************************************/
/*Globals used by the serial port I/O routines.*/
/***************************************************/
extern bit intFlag,ackFlag,serOutBusyFlag,endRxBuffFlag;
extern bit dataFormingFlag,processDataFlag;
extern bit errorFormingFlag,processErrorFlag;
extern bit encoder0Flag,encoder1Flag,encoder2Flag,encoder3Flag;
extern bit encoder4Flag,encoder5Flag,encoder6Flag,encoder7Flag;

extern char xdata txBuff[12];//This is typ for LED displays
extern char xdata txBuff[50];//This is typ for LCD displays extern char xdata rxBuff[8],swBuff[4];
extern uchar data txIndex;
extern uchar data rxWriteIndex,rxReadIndex;
extern uchar data swWriteIndex,swReadIndex;

/*******************************************/
void serialInt() small interrupt 4 using 1
/*******************************************/
{
    char _siTemp1;

if(RI)
    {
        RI=0;
        _siTemp1=SBUF;

switch(_siTemp1){
            case '!': intFlag=1;rxWriteIndex=0;break;
            case '^': ackFlag=1;rxWriteIndex=0;break;
            case '[':
                dataFormingFlag=1;
                processDataFlag=0;
                rxWriteIndex=0;
                break;
            case ']':
                dataFormingFlag=0;
                processDataFlag=1;
                rxReadIndex=0;
                break;
            case '(':
                errorFormingFlag=1;
```

COMM51C                                                    C - PAGE 2

```
                    processErrorFlag=0;
                    rxWriteIndex=0;
                    break;
                case ')':
                    errorFormingFlag=0;
                    processErrorFlag=1;
                    rxReadIndex=0;
                    break;
                default:
                    if(dataFormingFlag|errorFormingFlag)
                        rxBuff[rxWriteIndex++]=_siTemp1;
        }
    }
    else
    {
        /* Must be a transmit interrupt - check to see if we are*/
        /* at the end of the message, if not write to the UART  */
        TI=0;
        if(txBuff[++txIndex])
            SBUF=txBuff[txIndex];
        else
            serOutBusyFlag=0;    //Clear the busy flag.
    }
}

/*****************/
void waitForData()small
/*****************/
{
    processDataFlag=0;
    while(!processDataFlag);
}

/*****************/
void waitForAck()small
/*****************/
{
    ackFlag=0;
    while(!ackFlag);
}

/************************/
void transmit(char *msg)small
/************************/
{
        //Write the first char to the tx to get things going.
        strcpy(txBuff,msg);
    txIndex=0;
      serOutBusyFlag=1;
    SBUF = *txBuff;         //Start the transmission.
    while(serOutBusyFlag);  //Wait until msg transmitted. Still receptive
```

COMM51C                                                              C - PAGE 3
                            //to incoming data via rx interrupt.
}

/**********/
void send()small
/**********/
{
        //Write the first char to the tx to get things going.
    txIndex=0;
      serOutBusyFlag=1;
    SBUF = *txBuff;         //Start the transmission.
    while(serOutBusyFlag);  //Wait until msg transmitted. Still receptive
                            //to incoming data via rx interrupt.
}

/*****************/
uchar readRxByte() small
/*****************/
{
    //Routine reads the next two ASCII coded hex digits from
    //the receive buffer and return a byte.

uchar _rbLsn, _rbMsn;

endRxBuffFlag=0;
    if(rxReadIndex<rxWriteIndex)
    {
        _rbMsn = asciiToHex(rxBuff[rxReadIndex++]);
        _rbLsn = asciiToHex(rxBuff[rxReadIndex++]);
        return(_rbMsn*16|_rbLsn);
    }
    else
    {
        endRxBuffFlag=1;
        return(0);
    }
}

/************/
void poll816()small
/************/
{
    char k;
    int i;

//rxReadIndex=0;   //rxWriteIndex reset by interrupt handler
    swWriteIndex=swReadIndex=0;

//Get the output buffer from the 816.
```

COMM51C                                                          C - PAGE 4

```
    processDataFlag=0;

i=0;
    transmit(getOutBuffStr);
    while(!processDataFlag);
ifdef STD
    while(!processDataFlag){
        if(i)
            --i;
        else
        {
            i=0x7FFF;
            transmit(getOutBuffStr);
        }
    }
endif //Now we'll sift through the received data and interpret it.
    do{
        k = readRxByte();
        if(!endRxBuffFlag){
            //Determine whether the received scan code
            //is an encoder or a switch.
            if(k>=0 && k<8)
            {
                //Scan code less then 8 means this is an encoder.
                switch(k){
                    case 0: encoder0Flag=1;break;
                    case 1: encoder1Flag=1;break;
                    case 2: encoder2Flag=1;break;
                    case 3: encoder3Flag=1;break;
                    case 4: encoder4Flag=1;break;
                    case 5: encoder5Flag=1;break;
                    case 6: encoder6Flag=1;break;
                    case 7: encoder7Flag=1;break;
                }
            }
            else
                //Scan code >=8 meabs this is a switch closure/release.
                //Push its scan code onto the switch stack.
                swBuff[swWriteIndex++]=k;
        }
    } while(!endRxBuffFlag);
}

/*************/
void hello816()small
/*************/
{
    int _h8i;
```

COMM51C                                                C - PAGE 5

```c
    processErrorFlag=0;
    do
    {
        transmit(hello816Str);
        transmit("{B1}");                //turn ON error reporting.
        transmit(hello816Str);
        for(_h8i=0;_h8i<0x7FFF;_h8i-+);  //wait for 816 initialization.
    }while(!processErrorFlag);
}

/***************/
uchar popSwitch()small
/***************/
{
      if(swReadIndex<swWriteIndex)
      return(swBuff[swReadIndex++]);
    else
      return(0);
}

/**************************/
void pushSwitch(char swVal)small
/**************************/
{
    swBuff[swWriteIndex++]=swVal;
}
```

COMM51.H

```
ifndef __COMM51
define __COMM51
    #include <string.h>
    #include <stdio.h>
    #include <string.h>
    #include <stdtypes.h> include "\iq51\utils.h"

void     hello816()small;
    uchar    popSwitch()small;
    void     pushSwitch(char swVal)small;
    void     poll816()small;
    uchar    readRxByte()small;
    void     send()small;
    void     serialInt()small; //interrupt 4 using 1;
    void     transmit(char *msg)small;
    void     waitForData()small;
    void     waitForAck()small;
endif
```

INTF51.C                                                      C- Page 7

```c
include"\iq51\intf51.h"

//External Globals
extern char txBuff[];

ifdef LCD
    /**************************************/
    void lcdInit(lcdEnableLine enableLine,lcdLines lines, lcdWidth width)small
    /**************************************/
    {
        char code cmdText[]="{A1}{C0";
        strcpy(txBuff,cmdText);
        txBuff[7]=enableLine;
        txBuff[8]=lines;
        txBuff[9]=width;
        txBuff[10]='}';
        txBuff[11]=0;
        send();
        waitForAck();
    }

/**************************************/
    void lcdMakeActive(lcdDisplay display)small
    /**************************************/
    {
        char code cmdText[]="{C5";
        strcpy(txBuff,cmdText);
        txBuff[3]=display;
        txBuff[4]='}';
        txBuff[5]=0;
        send();
    }

/*********************/
    void lcdWriteChar(char c)small
    /*********************/
    {
    /* Write char 'c' to the cursor on the active LCD display */
        char code cmdText[10]="{D4";
        strcpy(txBuff,cmdText);
        txBuff[3]=c;
        txBuff[4]='}';
        txBuff[5]=0;
        send();
    }

/*******************/
    void lcdWriteStr(lcdDisplay display,char *s)small
```

INTF51.C                                                C- Page 8

```c
/******************/
{
/* Write string 's' to 'display' */
    char code cmdText[]="{D5}"; //Could be a 40 char display
    lcdMakeActive(display);
    strcpy(txBuff,cmdText);
    strcat(txBuff,s);
    send();
}

/*******************************/
void lcdClear(lcdDisplay display)small
/*******************************/
{
    char code cmdText[]="{C5";
    strcpy(txBuff,cmdText);
    txBuff[3]=display;
    txBuff[4]=0;
    strcat(txBuff,"}{A1}{D0}");
    send();
    waitForAck();
}

/****************/
void lcdClearAll()small
/****************/
{
    char code cmdText[]="{D1001}";   //Use the durect byte mode for the
    transmit(cmdText);               //LCD display to write reset cmd.
}

/********************************/
void lcdCursor(action lcdact)small
/********************************/
{
    switch (lcdact)
    {
        case OFF:   transmit("{D20}");break;
        case ON:    transmit("{D21}");break;
        case LINE:  transmit("{C20}");break;
        case DIGIT: transmit("{C21}");break;
        case HOME:  transmit("{D300}");break;
        #ifdef TERMDEBUG
        default: printf("\nWarning - drop thro' in lcdCursor");
        #endif
    }
}

/*****************************/
void lcdMoveCursor(uchar column)small
/*****************************/
```

INTF51.C                                                 C - Page 9

```c
    {
        /* Currently this only moves the cursor over the range 0 -> 19 */ char code cmdText[10] = "{D3";
        strcpy(txBuff,cmdText);

if(column<0x10)
        {
            txBuff[3]='0';
            txBuff[4]=intToHex(column)+'0';
        }
        else
        {
            txBuff[3]='1';
            txBuff[4]=intToHex(column-0x10);
        } txBuff[5]='}';
        txBuff[6]=0;
        send();

} endif ifdef LED
    /**************************************/
    void ledInit(ledType type, ledWidth width)small
    /**************************************/
    {
        char code cmdText[]="{E0";
        strcpy(txBuff,cmdText);
        txBuff[3]=type;
        txBuff[4]=width;
        txBuff[5]='}';
        txBuff[6]=0;
        send();
    }

/**************************************/
    void ledMakeActive(ledDisplay display)small
    /**************************************/
    {
        char code cmdText[]="{E5";
        strcpy(txBuff,cmdText);
        txBuff[3]=display;
        txBuff[4]='}';
        txBuff[5]=0;
```

INTF51.C

```c
    send();
}
/*********************/
void ledWriteChar(char c)small
/*********************/
{
/* Write char 'c' to the cursor on the active LED display */
    char code cmdText[]="{F4";
    strcpy(txBuff,cmdText);
    txBuff[3]=c;
    txBuff[4]='}';
    txBuff[5]=0;
    send();
}

/*******************/
void ledWriteStr(ledDisplay display,char *s)small
/*******************/
{
/* Write string 's' to the cursor to 'display' */ char code cmdText[]="{F5}";
    ledMakeActive(display);
    strcpy(txBuff,cmdText);
    strcat(txBuff,s);
    send();
}

/*******************/
void ledClrWriteStr(ledDisplay display,char *s)small
/*******************/
{
/* Write string 's' to the cursor to 'display' */ char code cmdText[]="{F0}{F5}";
    ledMakeActive(display);
    strcpy(txBuff,cmdText);
    strcat(txBuff,s);
    send();
}

/***********************/
void ledClear(ledDisplay display)small
/***********************/
{
    char code cmdText[]="{E5";
    strcpy(txBuff,cmdText);
    txBuff[3]=display;
    txBuff[4]=0;
```

INTF51.C                                                    C - Page 11

```c
    strcat(txBuff,"}(F0)");
    send();
}

/********************************/
void ledCursor(action ledact)small
/********************************/
{
    switch (ledact)
    {
        case OFF:   transmit("{F20}");break;
        case ON:    transmit("{F21}");break;
        case LINE:  transmit("{E20}");break;
        case DIGIT: transmit("{E21}");break;
        case HOME:  transmit("{F30}");break;
        #ifdef TERMDEBUG
        default: printf("\nWarning - drop thro' in ledCursor");
        #endif
    }
}

/****************************/
void ledMoveCursor(uchar column)small
/****************************/
{
    char code cmdText[10] ="{F3";
    strcpy(txBuff,cmdText);
    txBuff[3]=column;
    txBuff[4]=')';
    txBuff[5]=0;
    send();
}

/****************************/
void ledAutoInc(action state)small
/****************************/
{
    char code cmdText[10] ="{F1";
    strcpy(txBuff,cmdText);
    if(state==OFF)
        txBuff[3]='0';
    else if(state==ON)
            txBuff[3]='1';
        else
            while(1);//if error trap it right here.
    txBuff[4]=')';
    txBuff[5]=0;
    send();
```

INTF51.C

```c
    }
    /****************************/
    void ledFlash(action state)small
    /****************************/
    {
        char code cmdText[10] ="{E1";
        strcpy(txBuff,cmdText);
        if(state==OFF)
            txBuff[3]='0';
        else if(state==ON)
                txBuff[3]='1';
            else
                while(1);//if error trap it right here.
        txBuff[4]='}';
        txBuff[5]=0;
        send();
    }

/**********************************************************************/
    void ledFormat(ledDisplay display, displayFormat format, ledMode
mode)small
    /**********************************************************************/
    {
        char code cmdText[10]="{E3";
        strcpy(txBuff,cmdText);
        txBuff[3]=display;
        txBuff[4]=format;
        txBuff[5]=mode;
        txBuff[6]='}';
        txBuff[7]=0;
        send();
    }
endif /***************************/
char readEncoder(uchar encNum)small
/***************************/
{
    char code cmdText[10]="{N0";

strcpy(txBuff,cmdText);
    txBuff[3]=encNum;
    txBuff[4]='}';
    txBuff[5]=0;

send();
      waitForData();
    return(readRxByte());
```

INTF51.C                                                        C - Page 13

```c
}

/***********************************/
char readResetEncoder(uchar encNum)small
/***********************************/
{
    char code cmdText[10]="{N1";

strcpy(txBuff,cmdText);
    txBuff[3]=encNum;
    txBuff[4]='}';
    txBuff[5]=0;

send();
      waitForData();
    return(readRxByte());
}

/**********************/
void setKbEnd(uchar addr)small
/**********************/
{
    char code cmdText[10]="{K0";

strcpy(txBuff,cmdText);
    txBuff[3]= addr;
    txBuff[4]= '}';
    txBuff[5]= 0;
    send();
}

/*******************************************/
void makeSound(uchar pitch, uchar duration)small
/*******************************************/
{
    char code cmdText[]="{S";
    strcpy(txBuff,cmdText);
    txBuff[2]=pitch;
    txBuff[3]=duration;
    txBuff[4]='}';
    txBuff[5]=0;
    send();
}

/******************************************/
void writePort(portType port, uchar intValue)small
/******************************************/
{
    char code cmdText[]="{W";
```

INTF51.C

```
    uchar msn,lsn;

strcpy(txBuff,cmdText);
    lsn=intValue%16;
    msn=intValue/16;
    txBuff[2]=port;
    txBuff[3]=intToHex(msn);
    txBuff[4]=intToHex(lsn);
    txBuff[5]=')';
    txBuff[6]=0;
    send();
}
```

C - Page 14

INTF51.H                                                          C - Page 15

```
/******************************************************************
 *  These routines are provided "as is" and without any            *
 *  warranties as to the performance, merchantability, non-infringe*
 *  ment, design or operation of the product. No warranty of fitness*
 *  for a particular purpose is offered. All warranties express and *
 *  implied are hereby disclaimed.                                 *
 *                                                                 *
 *     Under no circumstances will IQ Systems, Inc its licensors or its*
 *  related persons be liable for any consequential, indirect,     *
 *  special, punitive or incidental damages, whether foreseeable or *
 *  unforseeable, for any claims (including, but not limited to,   *
 *  claims for loss of data, goodwill, profits, use of money or use *
 *  of the products, interruption in use or availability of data,  *
 *  stoppage of other work or impairment of other assets), arising *
 *  out of breach of express or implied warranty.                  *
 ******************************************************************/
ifndef _INTF51
define _INTF51
    #include <stdio.h>
    #include <string.h>
    #include <stdtypes.h> include "\iq51\utils.h"
    #include "\iq51\comm51.h"

define LED
    #define LCD typedef enum {OFF, ON, LINE, DIGIT, HOME} action;
    typedef enum {LEFT='0',RIGHT} displayFormat;
      typedef enum {BLANK='0',BYTE,NUMERIC,ALPHA}ledMode;
      typedef enum {COMMONANODE='0',COMMONCATHODE} ledType;
      typedef enum {LCDENABLE0='0', LCDENABLE1} lcdEnableLine;
      typedef enum {LCDDISPLAY0='0',LCDDISPLAY1,\
                    LCDDISPLAY2,LCDDISPLAY3}lcdDisplay;
      typedef enum {LEDDISPLAY0='0',LEDDISPLAY1,\
                    LEDDISPLAY2,LEDDISPLAY3}ledDisplay;
      typedef enum {LCDLINES1='1',LCDLINES2='2',LCDLINES4='4'}lcdLines;
      typedef enum {LCDWIDTH16='1', LCDWIDTH20, LCDWIDTH24, \
                    LCDWIDTH40} lcdWidth;
      typedef enum {LEDWIDTH1='1',LEDWIDTH2,LEDWIDTH3,LEDWIDTH4,\
                    LEDWIDTH5,LEDWIDTH6,LEDWIDTH7,LEDWIDTH8} ledWidth;
      typedef enum {DATA='0',AUX='1'}portType;

enum boolean {FALSE, TRUE};

/*DISPLAY INIT*/
    #ifdef LCD
    void lcdInit(lcdEnableLine enableLine,lcdLines lines, lcdWidth
width)small;
    void lcdMakeActive(lcdDisplay)small;
```

INTF51.H

```
    void lcdWriteChar(char c)small;
    void lcdWriteStr(lcdDisplay display,char *s)small;
    void lcdClear(lcdDisplay display)small;
    void lcdClearAll()small;
    void lcdCursor(action action)small;
    void lcdMoveCursor(uchar column)small;
    void lcdMoveCursor(uchar column)small;
    #endif ifdef LED
    void ledInit(ledType ledDisplayType, ledWidth width)small;
    void ledMakeActive(ledDisplay)small;
    void ledWriteChar(char c)small;
    void ledWriteStr(ledDisplay display,char *s)small;
    void ledClrWriteStr(ledDisplay display,char *s)small;
    void ledAutoInc(action state)small;
    void ledFlash(action state)small;
    void ledClear(ledDisplay display)small;
    void ledCursor(action action)small;
    void ledMoveCursor(uchar column)small;
    void ledFormat(ledDisplay display, displayFormat format, ledMode
mode)small;
    void ledClear(ledDisplay display)small;
    #endif /*KEYBOARD & SWITCH FUNCTIONS*/
    void setKbEnd(uchar addr)small;
    void writePort(portType port, uchar intValue)small;
    char readEncoder(uchar encNum)small;
    char readResetEncoder(uchar encNum)small;

/*SOFT RESET*/
      //The '/n' terminates any unfinished string writes
      //The '}' terminates any unfinished commands
      //These will produce error responses from an 816
      //in the 'normal' state - these errors can be ignored.
      #define RESET816    transmit("\n){Z}")

/* HANDSHAKE */
      #define INTERRUPTSON  transmit("{I1)")
      #define INTERRUPTSOFF transmit("{I0)")

/*SOUND*/
    void makeSound(uchar pitch, uchar duration)small;

endif
```

GLOBASL.C                                                    C - PAGE 17

```
/*************************************************/
/*Globals used by the serial port I/O routines.*/
/*************************************************/
bit intFlag,ackFlag,serOutBusyFlag,endRxBuffFlag;
bit dataFormingFlag,processDataFlag;
bit errorFormingFlag,processErrorFlag;
bit encoder0Flag,encoder1Flag,encoder2Flag,encoder3Flag;
bit encoder4Flag,encoder5Flag,encoder6Flag,encoder7Flag;

char xdata txBuff[20]; //typ for LED displays
char xdata rxBuff[12],swBuff[10];
uchar data txIndex;
uchar data rxWriteIndex,rxReadIndex;
uchar data swWriteIndex,swReadIndex;
```

UTILS.C  C – PAGE 18

```c
include "\iq51\utils.h"

/*********************/
void strupr(char *str)small
/*********************/
{
    char c;

c=0;
    while(str[c])
        str[c++]&=0xDF;
}

/***********************/
void prepLEDStr(char *str)small
/***********************/
{
/* This routine takes the input string and substitutes    */
/* the necessary substituion letters for the 816 ALPHA mode */ uchar i;
      char c;

//First we will look for any lower case letters
        //that have both upper ans lower case chars on the 816
        //these letters are h,i,o,l,u.

i=0;
        while(c=str[i])
        {
            switch(c)
            {
            case 'h':
                str[i]='K';break;
            case 'I':
                str[i]='1';break;
            case 'O':
                str[i]='0';break;
            case 'l':
                str[i]='1';break;
            case '-':
                str[i]='M';break;
            case ':':
                str[i]='M';break;
            case ' ':
                str[i]='V';break;
            case '+':
                str[i]='V';break;
            case 'S':
            case 's':
                str[i]='5';break;
```

UTILS.C                                                          C— PAGE 19

```c
                case 'U':
                    str[i]='S';break;
                case 'Y':
                case 'y':
                    str[i]='Q';break;
                }
                i++;
        }

//OK now convert everything to upper case.
        strupr(str);
}

/*******************/
char intToHex(uchar i)small
/*******************/
{
        /* Function returns a hex digit (0->F) */
        /* from integer decimal (0->15) input  */
        if(!((i>=0)&&(i<=15)))
                return(-1);
        if(i<=9)
                return(i+'0');
        else
                return(i-10+'A');
}

/*************************/
char hexToInt(uchar *hexStr)small
/*************************/
{
        //Convert ascii coded byte to integer.
        //hexStr assumed to be of length 2.
    char num;

ifdef TERMDEBUG
    if(strlen(hexStr)>2)
       {
            printf("\nWarning - hexStr longer than 2");
            return(0);
       }
    #endif num=asciiToHex(hexStr[0])*16;
    num+=asciiToHex(hexStr[1]);
      if(num>127) num-=256;
      return(num);
}
```

UTILS.C

C — PAGE 20

```c
/**********************/
char asciiToHex(char c)small
/**********************/
{
    //Routine converts frm ASCII 0->9 and A->F to binary.
    //The PSW flag F0 is set is there is an error F0=0;                          //Clear the error flag.
    if((c>='0') && (c<='9'))
        return(c-'0');
    if((c>='A') && (c<='F'))
        return(c-'A'+10);
    else
    {
        F0=1;
        return(255);
    }
}
```

UTILS.H

```
ifndef __UTILS51
define __UTILS51 include <stdtypes.h>
    #include <reg51.h> void strupr(char *str)small;
    void prepLEDStr(char *str)small;
    char intToHex(uchar i)small;
    char hexToInt(char *hexStr)small;
    char asciiToHex(char c)small;

endif
```

APPENDIX D  D- Page 1

Command Set to the Analog Interface Object x = boolean value, h = hex digit

| Command | Syntax | Examples |
|---|---|---|
| Set channel A mode:<br>0 = open loop<br>1 = closed loop | AMx | AM0<br>Set open loop mode |
| Set G1<br>Gain expressed as a Q14 sixteen bit number. | AGhhhh | AG34AF<br>Set gain1 = 0.3452 |
| Set G2 (if mode=1) | AHhhhh | AH7623<br>Set gain2 = 0.7850 |
| Enable signal rectification<br>(if mode = 0)<br>x=0 rect off<br>x=1 rect on | ARx | AR1<br>Turn rect on for channel A |
| Define block size for RMS or signal avg (if mode=0) | ABhh | AB10<br>Set block size to 10h or 16 dec samples. |
| Read pos peak with optional reset (if mode=0)<br>x=0 no reset<br>x=1 reset | APx | AP1<br>Read chan A pos pk and reset. |
| Read neg peak with optional reset (if mode=0)<br>x=0 no reset<br>x=1 reset | ANx | AN0<br>Read chan A neg pk and do not reset. |
| Read output buffer | AO | AO |
| Def limiter pos value<br>(if mode=1) | AJhh | AJ80<br>pos limit set to 80h |
| Def limiter neg value<br>(if mode=1) | AKhh | AK10<br>neg limit set to 10h |
| Write signal register<br>(if mode=1) | AShhhh | AS4532 |
| Other channels B,C D,E,F | have same syntax with | approp first letter |
| Write PWM open loop value (acq chan must be in mode 0) | AVhh | AV56<br>Set the mark space ratio of PWM A to be 56h/FFh is 34% |
| Write par port | Whh | W67<br>Write parallel port with 56h |
| Read par port | R | R<br>Read parallel port value. |
| Read comparator | C | C<br>Read comp status |

APPENDIX E

"C" Code Listing for the IQC816 Demo Box

```c
/* A program to demonstate most of the capabilities of the 816 */ include <reg51.h>
include <stdtype.h>
include <stdlib.h> include "\iq\globals.c"
include "\iq\comm51.h"
include "\iq\intf51.h"

define KEY1 0x14
define KEY2 0x18
define KEY3 0x1C
define KEY4 0x15
define ENTERKEY 0x23 define WaitForEnter    do {poll816();}while(popSwitch()!=ENTERKEY);

/* Function Prototypes */
void initSelf()small;
void init816()small;
void ledDemo();
void lcdDemo();
void kbDemo();
void makeErrorSound()small;
void appDemo();
void delay(uint);

//Macro def to start the timer
define msDelay(t)  msPeriod=t;msPeriod*=4;timerDone=0;TF0=0;TR0=1;

/*********************** FUNCTION HEADERS **************************/
//These are the function header for teh synthesizer example.
void displayMenu()small;
void editFreq(uchar position, char *asciiFreq)small;
void editRange(char *faEdit)small;
void freqSweep();
void reinit816()small;
void incMenu(uchar *state)small;
void makeErrorSound()small;
void periodMenu(uchar *state)small;
void startMenu(uchar *state)small;
void stopMenu(uchar *state)small;
void writeAsciiSynth(char *asciiFreq)small;
void writeFreqDisplay(char *fascii)small;
void writeEncoderFreq(char fDelta,char *fcEncEdit)small;
void writeSynth(uint freq);
```

"C" Code Listing for the IQC816 Demo Box

```c
/******************** Interrupt Handlers ********************/ void timer0() interrupt 1 using 2
{
    if(--msPeriod==0){
        timerDone=1;
        TR0=0;
    }
}

//remember comm51.c contains an interrupt handler for the serial port.

/**********/
void main()
/**********/
{
    uchar sw,k;

initSelf();
    init816();

//Put up main menu.
    poll816();  //Clear out any unwanted key presses.

do {
        poll816();
        if(sw=popSwitch()){
            switch(sw){
                case KEY1:
                    ledDemo();
                    break;
                case KEY2:
                    lcdDemo();
                    break;
                case KEY3:
                    kbDemo();
                    break;
                case KEY4:
                    appDemo();
                    break;
                default:
                    makeErrorSound();
            }
            ledInit(COMMONANODE,LEDWIDTH8);
            ledWriteStr(LEDDISPLAY0,"--------\n");
            ledWriteStr(LEDDISPLAY1,"--------\n");
            ledWriteStr(LEDDISPLAY2,"--------\n");
            ledWriteStr(LEDDISPLAY3,"--------\n");

lcdClearAll();
            lcdWriteStr(LCDDISPLAY0,"1 Demo LED Display\n");
            lcdWriteStr(LCDDISPLAY1,"2 Demo LCD Display\n");
            lcdWriteStr(LCDDISPLAY2,"3 Demo Keypad & Enc\n");
            lcdWriteStr(LCDDISPLAY3,"4 Demo Application\n");
        }
    }while(1);
```

"C" Code Listing for the IQC816 Demo Box

```c
}
/******************/
void initSelf() small
/******************/
{
    //Initialize the serial port, etc
    //PCON = 0x80;    /* double to 19200 */
    PCON = 0x0;     /* Std 9600 */
    TH1  = 0x0FD;   /* this is the default value (9600) */
    SCON = 0x50;    /* ser port mode 1. Clear rx/tx interrupt flags SCON.1&0. */
    TMOD = 0x23;    /* put timer 1 in mode 2, timer 0 into mode 3. */
    IP   = 0x10;    /* Put the serial port at highest priority*/
    IE   = 0x92;    /* Enable serial port and TH0 interrupts. */
}

/******************/
void init816() small
/******************/
{
    hello816();
    transmit("{Z}");
    poll816();      //Flush output buffer.

ledInit(COMMONANODE,LEDWIDTH8);
    lcdInit(LCDENABLE0,LCDLINES4,LCDWIDTH20);

lcdWriteStr(LCDDISPLAY0,"1 Demo LED Display\n");
    lcdWriteStr(LCDDISPLAY1,"2 Demo LCD Display\n");
    lcdWriteStr(LCDDISPLAY2,"3 Demo Keypad & Enc\n");
    lcdWriteStr(LCDDISPLAY3,"4 Other features\n");

ledWriteStr(LEDDISPLAY0,"--------\n");
    ledWriteStr(LEDDISPLAY1,"--------\n");
    ledWriteStr(LEDDISPLAY2,"--------\n");
    ledWriteStr(LEDDISPLAY3,"--------\n");

}

/****************/
void delay(uint t)
/****************/
{
    uint k,l;

for(k=t;k>0;--k){
        for(l=1000;l>0;--l);
    }
}

/************/
void ledDemo()
/************/
{
    //Start by showing the different modes of display
```

IQ Systems, Inc          E- page 3

"C" Code Listing for the IQC816 Demo Box

```c
//Both numeric and alpha modes:
int i;
uchar k,l,n;
char code msg[]="AN IllUSTRATION OF A 5CRO11ING DI5P1AQ    ";

ledFormat(LEDDISPLAY0,LEFT,NUMERIC);
ledFormat(LEDDISPLAY2,LEFT,ALPHA);

lcdClearAll();
lcdWriteStr(LCDDISPLAY0,"LED display supports\n");
lcdWriteStr(LCDDISPLAY1,"Numeric, Alpha and  \n");
lcdWriteStr(LCDDISPLAY2,"Undecoded Byte modes\n");

ledWriteStr(LEDDISPLAY0,"3.1415926\n");
ledWriteStr(LEDDISPLAY1,"12.345678\n");
ledWriteStr(LEDDISPLAY2,"FUNCTION\n");
ledWriteStr(LEDDISPLAY3,"ERROR 53\n");

WaitForEnter

//Show the variable width capability.
lcdClearAll();
lcdWriteStr(LCDDISPLAY0,"The LED display can\n");
lcdWriteStr(LCDDISPLAY1,"be formatted to be \n");
lcdWriteStr(LCDDISPLAY2,"any width from 1->8\n");
lcdWriteStr(LCDDISPLAY3,"chars any polarity.\n");

for(l=8;l>0;--l){
    ledInit(COMMONANODE,('0'+l));
    delay(100);
}

//Show left right formatting
ledInit(COMMONANODE,LEDWIDTH8);
ledFormat(LEDDISPLAY0,LEFT,NUMERIC);
ledFormat(LEDDISPLAY1,RIGHT,NUMERIC);
ledFormat(LEDDISPLAY2,LEFT,NUMERIC);
ledFormat(LEDDISPLAY3,RIGHT,NUMERIC);

lcdClearAll();
lcdWriteStr(LCDDISPLAY0,"The displays can be\n");
lcdWriteStr(LCDDISPLAY1,"INDEPENDENTLY  left\n");
lcdWriteStr(LCDDISPLAY2,"or right JUSTIFIED \y");
lcdWriteStr(LCDDISPLAY3,"in any width.      \n");

ledWriteStr(LEDDISPLAY0,"3.142\n");
ledWriteStr(LEDDISPLAY1,"1234\n");
ledWriteStr(LEDDISPLAY2,"1.652\n");
ledWriteStr(LEDDISPLAY3,"89.06\n");

while(popSwitch());//Empty the switch stack.
WaitForEnter

//Show the various cursor modes.
ledFormat(LEDDISPLAY0,LEFT,NUMERIC);
ledFormat(LEDDISPLAY1,LEFT,NUMERIC);
ledFormat(LEDDISPLAY2,LEFT,ALPHA);
```

"C" Code Listing for the IQC816 Demo Box

```
    ledFormat(LEDDISPLAY3,LEFT,ALPHA);

ledWriteStr(LEDDISPLAY0,"3.1415926\n");
    ledWriteStr(LEDDISPLAY1,"12.345678\n");
    ledWriteStr(LEDDISPLAY2,"FUNCTION\n");
    ledWriteStr(LEDDISPLAY3,"ERROR 53\n");

ledAutoInc(OFF);
    ledMakeActive(LEDDISPLAY0);
    ledCursor(DIGIT);
    ledCursor(ON);

lcdClearAll();
    lcdWriteStr(LCDDISPLAY0,"The 816 has 2 cursor\n");
    lcdWriteStr(LCDDISPLAY1,"types.   BRIGHT  UP \n");
    lcdWriteStr(LCDDISPLAY2,"shown here and .....\n");

//Move the cursor along each of the displays
    poll816();
    do{
        ledMakeActive(LEDDISPLAY0);
        for(k='0';k<'8';++k){
            ledMoveCursor(k);
            ledCursor(ON);
            delay(20);
        }
        ledMakeActive(LEDDISPLAY1);
        for(k='7';k>='0';--k){
            ledMoveCursor(k);
            delay(20);
        }
        ledMakeActive(LEDDISPLAY2);
        for(k='0';k<'8';++k){
            ledMoveCursor(k);
            delay(20);
        }
        ledMakeActive(LEDDISPLAY3);
        for(k='7';k>='0';--k){
            ledMoveCursor(k);
            delay(20);
        }
        poll816();
    }while(popSwitch()!=ENTERKEY);

//Illustrate the write at cursor location capability.
    //First clear all displays.

ledClear(LEDDISPLAY0);ledClear(LEDDISPLAY1);
    ledClear(LEDDISPLAY2);ledClear(LEDDISPLAY3);

lcdClearAll();
    lcdWriteStr(LCDDISPLAY0,"a FLASHING UNDERBAR \n");
    lcdWriteStr(LCDDISPLAY1,"cursor,  shown here\n");
    lcdWriteStr(LCDDISPLAY2,"inconjunction with  \n");
    lcdWriteStr(LCDDISPLAY3,"random char write.  \n");

//Now turn on the flashing underbar cursor.
```

"C" Code Listing for the IQC816 Demo Box

```c
ledCursor(LINE);ledCursor(ON);

//Move the cursor and then write a char
do{
    i=rand()%4;
    k=(char)i+'0';
    ledMakeActive(k);
    i=rand()%8;
    k=(char)i+'0';
    ledMoveCursor(k);
    delay(100);
    i=rand()%10;
    k=(char)i+'0';
    ledWriteChar(k);
    poll816();
}while(popSwitch()!=ENTERKEY);

lcdClearAll();
lcdWriteStr(LCDDISPLAY0,"16 & 14 SEGMENT LED \n");
lcdWriteStr(LCDDISPLAY1,"displays can be used\n");
lcdWriteStr(LCDDISPLAY2,"directly via the \n");
lcdWriteStr(LCDDISPLAY3,"UNDECODED BYTE MODE.\n");

ledFormat(LEDDISPLAY0,LEFT,ALPHA);
ledFormat(LEDDISPLAY1,LEFT,ALPHA);
ledFormat(LEDDISPLAY2,LEFT,ALPHA);
ledFormat(LEDDISPLAY3,LEFT,ALPHA);

ledWriteStr(LEDDISPLAY0,"16 - 14 \n");
ledWriteStr(LEDDISPLAY1,"SEG  LED\n");
ledWriteStr(LEDDISPLAY2,"DISPLAQS\n");
ledWriteStr(LEDDISPLAY3,"--------\n");

WaitForEnter

//Finally illustrate the flashing display capability.
lcdClearAll();
lcdWriteStr(LCDDISPLAY0,"A FLASH MODE is \n");
lcdWriteStr(LCDDISPLAY1,"available to flag \n");
lcdWriteStr(LCDDISPLAY2,"warning or error \n");
lcdWriteStr(LCDDISPLAY3,"conditions.        \n");

ledFormat(LEDDISPLAY0,LEFT,NUMERIC);
ledFormat(LEDDISPLAY1,LEFT,NUMERIC);
ledWriteStr(LEDDISPLAY0,"3.1415926\n");
ledWriteStr(LEDDISPLAY1,"12.345678\n");
ledWriteStr(LEDDISPLAY2,"FUNCTION\n");
ledWriteStr(LEDDISPLAY3,"ERROR 53\n");

//Flash the displays
transmit("{E11}");   //ledFlash(ON);
while(popSwitch()); //Empty the switch stack.
WaitForEnter
transmit("{E10}");   //ledFlash(OFF);

//Scrolling text demo.
//An illustration of a scrolling display.
lcdClearAll();
```

IQ Systems, Inc     E- page 6

"C" Code Listing for the IQC816 Demo Box

```c
    lcdWriteStr(LCDDISPLAY0,"Finally   SCROLLING \n");
    lcdWriteStr(LCDDISPLAY1,"can   be implemented.\n");
    lcdWriteStr(LCDDISPLAY2,"This is available in\n");
    lcdWriteStr(LCDDISPLAY3,"all display modes.  \n");

ledFormat(LEDDISPLAY0,RIGHT,ALPHA);
    ledWriteStr(LEDDISPLAY0,"--------\n");
    ledWriteStr(LEDDISPLAY1,"--------\n");
    ledWriteStr(LEDDISPLAY2,"--------\n");
    ledWriteStr(LEDDISPLAY3,"--------\n");
    ledMakeActive(LEDDISPLAY0);
    ledMoveCursor('7');
    ledAutoInc(ON);
    k=0;
    do{
        ledWriteChar(msg[k]);
        delay(20);
        if(k<40) ++k;else k=0;
        poll816();
    }while(popSwitch()!=ENTERKEY);

//Bus write to the 377 indicator latch.
    k=1;
    do{
        writePort(DATA,k);
        delay(50);
        if(k>=0x80)
            k=1;
        else
            k=k<<1;
        poll816();
    }while(popSwitch()!=ENTERKEY);

}

/*************/
void lcdDemo()
/*************/
{
    int i;
    uchar k,l;

lcdClearAll();
    lcdWriteStr(LCDDISPLAY0,"The IQC816  supports\n");
    lcdWriteStr(LCDDISPLAY1,"16,  20,  24 and  40\n");
    lcdWriteStr(LCDDISPLAY2,"chars wide  displays\n");
    lcdWriteStr(LCDDISPLAY3,"with 1, 2 or 4 lines\n");

WaitForEnter lcdClearAll();
    lcdWriteStr(LCDDISPLAY0,"All LCD commands are\n");
    lcdWriteStr(LCDDISPLAY1,"syntactically the   \n");
    lcdWriteStr(LCDDISPLAY2,"same  as  those  for\n");
    lcdWriteStr(LCDDISPLAY3,"the LED displays.   \n");

WaitForEnter
```

IQ Systems, Inc                E- page 7

"C" Code Listing for the IQC816 Demo Box

```
lcdClearAll();
lcdWriteStr(LCDDISPLAY0,"Lines can be written\n");
lcdWriteStr(LCDDISPLAY1,"and   cleared   on   an\n");
lcdWriteStr(LCDDISPLAY2,"individual basis, as\n");
lcdWriteStr(LCDDISPLAY3,"with the LED display\n");

WaitForEnter do{
    lcdClear(LCDDISPLAY0);
    delay(75);
    lcdWriteStr(LCDDISPLAY0,"Lines can be written\n");
    delay(75);
    lcdClear(LCDDISPLAY1);
    delay(75);
    lcdWriteStr(LCDDISPLAY1,"and   cleared   on   an\n");
    delay(75);
    lcdClear(LCDDISPLAY2);
    delay(75);
    lcdWriteStr(LCDDISPLAY2,"individual basis, as\n");
    delay(75);
    lcdClear(LCDDISPLAY3);
    delay(75);
    lcdWriteStr(LCDDISPLAY3,"with the LED display\n");
    poll816();
} while(popSwitch()!=ENTERKEY);

lcdClearAll();
lcdWriteStr(LCDDISPLAY0,"Both line and  digit\n");
lcdWriteStr(LCDDISPLAY1,"cursors are provided\n");
lcdWriteStr(LCDDISPLAY2,"                    \n");
lcdWriteStr(LCDDISPLAY3,"                    \n");

WaitForEnter

//Now turn on the flashing underbar cursor.
lcdClearAll();
lcdCursor(ON);
lcdCursor(LINE);

//Move the cursor and then write a char
do{
    i=rand()%4;
    k=(char)i+'0';
    lcdMakeActive(k);
    i=rand()%20;
    k=(char)i;
    lcdMoveCursor(k);
    delay(100);
    i=rand()%10;
    k=(char)i+'0';
    lcdWriteChar(k);
    delay(10);
    poll816();
}while(popSwitch()!=ENTERKEY);
}
```

IQ Systems, Inc      E-page 8

'C' Code Listing for the IQC816 Demo Box

```c
/***********/
void kbDemo()
/***********/
{
    //This routine displays the values of two encoders
    //on the LCD and LED displays and then shows the
    //multiple on a third and any key scan codes on a fourth.

define ESCAPEKEY ENTERKEY char enc0,enc1,sw;
    char xdata str[30];
    int prd;

enc0=enc1=sw=0;

//Init the LCD
    lcdClearAll();

//Init the LED
    ledFormat(LEDDISPLAY0,LEFT,ALPHA);
    ledFormat(LEDDISPLAY1,LEFT,ALPHA);
    ledFormat(LEDDISPLAY2,LEFT,ALPHA);
    ledFormat(LEDDISPLAY3,LEFT,ALPHA);

sprintf(str,"PR %d\n",prd);
    ledWriteStr(LEDDISPLAY0,str);
    sprintf(str,"EN1 %d\n",(int)enc0);
    ledWriteStr(LEDDISPLAY1,str);
    sprintf(str,"EN2 %d\n",(int)enc0);
    ledWriteStr(LEDDISPLAY2,str);
    sprintf(str,"SCAN %X\n",(int)sw);
    ledWriteStr(LEDDISPLAY3,str);

sprintf(str,"Product  = %d         \n",prd);
    lcdWriteStr(LCDDISPLAY0,str);
    sprintf(str,"Encoder1 = %d         \n",(int)enc0);
    lcdWriteStr(LCDDISPLAY1,str);
    sprintf(str,"Encoder2 = %d         \n",(int)enc0);
    lcdWriteStr(LCDDISPLAY2,str);
    sprintf(str,"Scan code= %X         \n",(int)sw);
    lcdWriteStr(LCDDISPLAY3,str);

lcdCursor(OFF);

while(sw != ESCAPEKEY){
        poll816();
        if(encoder0Flag){
            enc0=readEncoder('0');
            sprintf(str,"EN1 %d\n",(int)enc0);
            ledWriteStr(LEDDISPLAY1,str);
            sprintf(str,"Encoder1 = %d         \n",(int)enc0);
            lcdWriteStr(LCDDISPLAY1,str);
        } if(encoder1Flag){
            enc1=readEncoder('1');
```

"C" Code Listing for the IQC816 Demo Box

```
        sprintf(str,"EN2 %d\n",(int)enc1);
        ledWriteStr(LEDDISPLAY2,str);
        sprintf(str,"Encoder2 = %d      \n",(int)enc1);
        lcdWriteStr(LCDDISPLAY2,str);
    } if(sw=popSwitch()){
        sprintf(str,"SCAN %X\n",((int)sw&0xFF));
        ledWriteStr(LEDDISPLAY3,str);
        sprintf(str,"Scan code= %X      \n",((int)sw&0xFF));
        lcdWriteStr(LCDDISPLAY3,str);
    } if(encoder0Flag || encoder1Flag){
        prd=enc0*enc1;
        sprintf(str,"PR %d\n",prd);
        ledWriteStr(LEDDISPLAY0,str);
        sprintf(str,"Product  = %d      \n",prd);
        lcdWriteStr(LCDDISPLAY0,str);
    } encoder0Flag=encoder1Flag=0;
    }
}

/*******************/
void makeErrorSound() small
/*******************/
{
    makeSound('4','9');  //The duration here need only be longer
    delay(40);           //than this delay period
    makeSound('8','2');  //because this write will retrigger the
                         //tone generator.
}
```

IQ Systems, Inc

APPENDIX F

Message Format Specification for the IQ1000 Bus

Rev 0.3
Orig date: July 28th 1995.
Rel date: Aug 14th 1995.

Introduction

This is the initial specification for the IQ1000 message format. Consideration has been given for all dialogs up to and including Level 2. The hierarchy for expanding thro' to level 3 and beyond is also described. The bus hardware is user defined but certain minimum requirements need to be met for Level 2 communication. At a minimum the bus must be able to handle collision. Preferably the bus also has a mechanism that provides for encoding message priority. The I$^2$C and CAN busses achieve this using an active low wired AND logic that has the additional advantage of preserving the message of the winning master. These busses are also simple to implement and inherently safe in contention situations.

Header Format and Packet Identifiers

There is a single information packet defined for the IQ bus. Its construction is detailed below:

toAddr objectName function{parameter field}fAddr fName#checksum~ where:

| | |
|---|---|
| toAddr | optional address & implicit priority (explained later) hex coded with lower case characters a thro' f and decimal digits. The field can be of arbitrary length. |
| objectName | must start with an upper case letter A thro' Z and can additionally contain upper case characters A thro' Z and decimal digits. This name can also include the reserved name '!' meaning the host. The field can be of arbitrary length. |
| function | must start with an lower case letter a thro' z and can additionally contain upper case characters a thro' z and decimal digits. Additionally the reserved names @ and ^ can be employed. The field can be of arbitrary length. |
| { | signifies the start of the functions parameter field. Can be omitted if no parameters and no from address. |
| parameter field | can contain anything except >. If this character needs to be used then it must be literalized with a backslash. Preferably parameters are separated with commas. |
| } | signifies end of parameter field. |
| > | signifies a parameter field that will be continued in the next message. |
| fAddr | optional from address that obeys the above rules on both address and objectName. |
| fName | optional from objectName. |
| # | start of optional checksum or CRC |
| ~ | end of packet char. |

IQ Systems Inc.

IQ Bus Protocol Specification - Rev 0.3

Example1:
  0fUe0{008}!~

This is a packet destined for an object called U of address/priority 0f. In this object we want to execute function e0 and pass the parameter(s) 008 - we can't tell from just looking at the message. The message came from the host, which is pre-defined to have the name '!'.

Example 2

12USERINTFdisplay{12.067,"Hello world"}12DATAINTF~

This much longer message is destined for an object called USERINTF with address 12. The parameters 12.067 and "Hello world" are being passed to a function called 'display'. It came from an object called DATAINTF with address 12. we can readily tell that there are two parameters for this object because of the comma delimiter.

Reserved Names
The following are reserved names (field dependent) in the protocol:

| Name | Field | Meaning |
|---|---|---|
| ! | name | the mandatory name of the host. This character is the lowest valued printable ASCII character and thus the highest priority in an active low logic bus system. Thus a peripheral can always instantly get a message back to the host if necessary. |
| $ | function | reserved function name for a "return data" message. |
| ^ | function | reserved function name for an acknowledge. |
| @ | function | reserved function name for passing scripts. The script itself is a parameter of this function. |

Transmitting Script Files
Level 2 objects are able to execute scripts whenever a 'recognized' event occurs. Events are typically:

(i)   the receipt of a message or,
  (ii)  the input of external data (i.e. the receipt of a sample in an A/D converter, depression of a switch etc.).

A script message has the standard form with the script enclosed in the parameter field. An example would be:

A@{ch0,1,printf("Ue5{0\}~Uf0~Uf5{The RMS value = %f\}~",ch0Value);}!~

This packet is interpreted as follows:
A         Name of the object message addressed to - numeric addr omitted(optional)
@         Identifies this as a linking script.
{         Start of the parameter field IQ Bus Protocol Specification - R  1.3

| | |
|---|---|
| ch0 | First parameter meaning that the script is to be linked to primary message ch0. |
| 1 | Second parameter meaning that this is to be post executed (0 might mean pre executed) once the primary message has been executed. |
| printf(".. | The script itself which in this example is in a high level language and is only one line long. Note that the literalization of the end parameter field, i.e. \}, within the script. Note also the reference to the instance parameter of this object called ch0Value. |
| } | The closing character for the parameter field. |
| ! | The name of the sender , in this case the host. Note that this format enables objects to initialize other objects. |
| ~ | The end of packet character. |

Message length & the continuation char '>'

Certain messages may be unacceptably long, given bus dynamics, latencies etc. Therefore the IQ protocol provides for parameter fields to be broken up into an arbitrary number of smaller packets. A long parameter field (i.e. a script message) can be terminated with the continuation char '>' instead of the end parameter field char '}'.
Example:

```
A@{ch0,1,printf("Ue5{0\}~Uf0~Uf5{The RMS value = %f\}~",ch0Value);>!~
...... additional bus traffic .......
A@{printf("Us{12\}~");}!~
```

Note that the first portion of the script messages causes the LED0 display to display the message + value, and is then terminated with a parameter field continuation char. The final part of the script arrives sometime later and literally appends the line to output a tone , printf("Us{12\}~"); , to the existing program. Any number of continuation messages may be used. Each of these packets can contain the message source information if required.

Comms error detection

The protocol provides for an optional comms error detection field. This field has its own start char '#' and is coded in hex. The error detection algorithm is application dependent and might typically be either CRC or checksum. The field is terminated by the end of packet char '~'.

Returning Data

The reserved char '$' is used as the function name on packets that represent "returned data" from some function that the object has been requested to execute. For example reading the output buffer on the Fornt Panel Object returns a string of hex data. This can enter the bus system at a somewhat later point in time than other information that is "floating- around". Thus all objects that expect data to be returned to them need to know how to process the '$' function, the parameter field format is as follows:

```
....{callingFunctionName,data1,data2,....dataN}....
```

Thus the reading of the output buffer and the return of the data packet would look like the following:

IQ Bus Protocol Specification - Rev. 0.3

Uo!~          Read the output buffer on object U
.... other traffic ....
!$<o,12,5F>U~     Data message to the host from object U. The first parameter defines the calling function 'o' and the we then have 12 and 5F as data.

In this manner if we wanted to take the reading of the output buffer away from the host and allocate it to an object called X all we would need to do is:

UoX~          Change the origin address from ! to X
.... other traffic ....
X$<o,12,5F>U~    and the returned data will now be routed to object X.

Sending an Acknowledgement
An object can return an acknowledgement, usually of task completion, in the following manner:

^~          The most basic acknowledgement.

!^U~        This message is for the host, the function is acknowledge there are no parameters and its from an object called 'U'.

!^{c0}U~    This is an expansion of the above. Now the ack message describes, in the parameter field, that the function 'c0' in the object that is being acknowledged.

Migrating the protocol to higher levels
The following is an outline of how the new protocol can be extended to cope with future inter bus expansion. Figure 1 illustrates a system with two separate object bus systems.

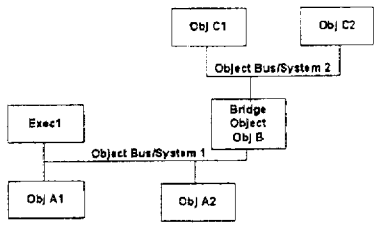

Figure 1
Multiple Bus Object System

Separate bus systems might be needed to cope with
1.     Traffic.
2.     Different protocols, in which case the bridge object would also perform a translation function.
3.     Be remote from the 'base' system.

IQ Bus Protocol Specification - Rev 0.3

With the IQ protocol, communication with this remote bus would be handled by making the bridge object the target of all cross bus traffic and making the parameters the destination message, thus:

Bs(C1func(sys1,34.90,45.98,Hi there\))A1~

Explanation of the message packet:
B           name of the bridge object - the message's destination
s           the name given to the send function within the bride object.
(           start of parameter field.
Dfunct...   the parameters of this message are the new message for the other object bus system - note again the literalised end of param field for the new message. The bus system from which the message originated (sys1) is included as a parameter in the message to the target object.
A1          The name of the source object.
~           The end of packet symbol.

Mapping the IQ protocol onto various hardware buses

The following bus types have been considered for the hardware level of a silicon object system.

I2C
Device address could either be made a fixed number for all IQ bus components, or it could have the address component of the IQ protocol mapped directly into it. The current thinking is to allocate a single address for all IQ bus compliant devices. The R/W bit would be permanently in the write (low) state, since objects do not provide for the peek/poke mode of operation of traditional I2C components.

The message packet is then transmitted on a byte by byte basis using the standard protocol. The end of packet char is mapped to the I2C bus stop condition.

SPI
More work needs to be done to ensure that hardware bus contention issues can be dealt with properly. The mapping will on a literal byte for byte basis with the end of packet info represented by 0xFF.

UART/MDUART/RS485
Only relevant to level 1 systems. Byte for byte mapping with the end of message char encoded as 0xFF.

CAN
Device address/ name maps directly into the address field. The control field would be the likely site of the function and then the data maps to the data field. Given the packet size limitations of this bus the message continuation facilities would likely be frequently needed.

IQ Bus Protocol Specification - Rev 0.3

Appendix A

Note on the h/w encoding of priority on the bus.

There are a number of serial busses that use a active pull down, resistive pull up technique. These busses enable any device to enforce a zero by turning on the open drain output transistor, but all devices must be off to cause the data line to go high.

This attribute is used by the I2C and CAN buses to encode priority. Given there are a number of potential masters that want to seize the bus after the current message is terminated then we will assume they all output the messages. Each of the potential masters examines the bus after putting out its zero or one. Given that a zero is dominant over a one if a master finds a disparity between the bus and the level it expects then it is required to immediately exit and become a receiver since the eventual winning master might well be wanting to transfer data to it. It is also now obvious that the lower the initial address the higher the priority the master has in these negotiations.

Appendix B

Minimal Forms

The table below provides some examples of old IQC816 messages and the least form of the new protocol. The new messages are more verbose but not by too high a margin.

| IQC816 messages | Minimum New Message | Ratio Old/New |
|---|---|---|
| {E008} | Ue0{08}~ | 6/8 |
| {F5}Hi there world\n | Uf5{Hi there world}~ | 19/20 |
| {A1} | Ua{1}~ | 4/6 |
| {C0042} | Uc0{042}~ | 7/9 |

Given the object designer's freedom to determine what's a function name and what are parameters the following chart also represents even shorter, syntacically correct messages.

| IQC816 messages | Minimum New Message | Ratio Old/New |
|---|---|---|
| {E008} | Ue008~ | 6/6 |
| {F5}Hi there world\n | Uf5Hi there world~ | 19/18 |
| {A1} | Ua1~ | 4/6 |
| {C0042} | Uc0042~ | 7/9 |

I claim:

1. A method of developing a distributed processing system, comprising:
   a) providing a host processor;
   b) providing a high level message-based command language for use by the host processor to communicate with an object oriented processor having a defined functionality, wherein commands issued by the host processor are interpreted by the object oriented processor to perform the defined functionality and the object oriented processor returns results of performing the defined functionality to the host processor using the command language;
   c) writing program code for the host processor using the command language;
   d) providing the object oriented processor by one of emulating the object oriented processor in hardware, simulating the object oriented processor in software, realizing the object oriented processor in hardware, or realizing the object oriented processor in firmware;
   e) coupling the object oriented processor to the host processor;
   f) running the program code on the host processor;
   g) de-bugging the program code.

2. A method according to claim 1, wherein:
   the object oriented processor is simulated in software on the host processor.

3. A method according to claim 1, wherein:
   the host processor is a general purpose computer, and
   the program code and command language are portable to other processors.

4. A method according to claim 1, wherein:
   the object oriented processor is realized as a virtual machine.

5. A method according to claim 1, wherein:
   said coupling of the object oriented processor to the host processor is via a message based communications link.

6. A method according to claim 1, wherein:
   the communications link is a physical bus.

7. A method according to claim 1, wherein:
   the command language includes error codes for use by the object oriented processor in response to commands from the host processor where the commands from the host processor contain errors in syntax or invalid parameters.

8. A method for debugging a distributed processing system program in which a host processor calls upon at least one object oriented processor to perform a specific function, said method comprising:
   a) providing a high level command language for use by the host processor within the host program to call upon the object oriented processor to perform the specific function and for the object oriented processor to return the results of the specific function to the host processor;
   b) realizing the object oriented processor as a virtual machine;
   c) obtaining source code for the virtual machine;
   d) providing a first generation of source code for the host processor;
   e) compiling or interpreting the virtual machine source code and the first generation source code on a development computer;
   f) running the compiled or interpreted virtual machine source code and the compiled or interpreted first generation source code on the development computer; and
   g) debugging the first generation source code using known methods.

9. A method according to claim 8, further comprising:
   i) providing the high level command language with error code messages for use by the object oriented processor;
   j) utilizing the error code messages when debugging the code for the host processor.

10. A method according to claim 8, further comprising:
    i) obtaining a second generation of source code;
    j) compiling or interpreting the second generation of source code to run on the development computer;
    k) running the compiled or interpreted code on the development computer; and
    l) debugging the second generation source code.

11. A method for debugging host processor software in a distributed processing system program in which the host processor calls upon at least one object oriented processor to perform a specific function using a high level command language and the object oriented processor is implemented as a virtual machine using code which is previously debugged, said method comprising:
    a) obtaining source code for the virtual machine;
    b) providing a first generation of source code for the host processor;
    c) compiling or interpreting the virtual machine source code and the first generation source code on a development computer;
    d) running the compiled or interpreted virtual machine source code and the compiled or interpreted first generation source code on the development computer; and
    e) debugging the first generation source code using known methods.

12. A method according to claim 11, further comprising:
    f) providing the high level command language with error code messages for use by the object oriented processor;
    g) utilizing the error code messages when debugging the code for the host processor.

13. A method according to claim 11, further comprising:
    f) obtaining a second generation of source code;
    g) compiling or interpreting the second generation of source code to run on the development computer;
    h) running the compiled or interpreted code on the development computer; and
    i) debugging the second generation source code.

* * * * *